United States Patent
Raghavan et al.

(10) Patent No.: US 10,863,474 B2
(45) Date of Patent: Dec. 8, 2020

(54) MILLIMETER-WAVELENGTH NETWORK MAP FOR USE IN A BEAMFORMING PROCEDURE

(71) Applicant: QUALCOMM Incorporated, San Diego, CA (US)

(72) Inventors: Vasanthan Raghavan, West Windsor Township, NJ (US); Assaf Touboul, Netanya (IL); Junyi Li, Chester, NJ (US); Udara Fernando, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/694,530

(22) Filed: Sep. 1, 2017

(65) Prior Publication Data

US 2018/0115958 A1    Apr. 26, 2018

Related U.S. Application Data

(60) Provisional application No. 62/411,435, filed on Oct. 21, 2016, provisional application No. 62/411,503, (Continued)

(51) Int. Cl.
*G06F 3/00* (2006.01)
*H04W 64/00* (2009.01)
(Continued)

(52) U.S. Cl.
CPC .......... *H04W 64/006* (2013.01); *H04B 7/026* (2013.01); *H04B 7/0408* (2013.01);
(Continued)

(58) Field of Classification Search
CPC .. H04B 7/0617; H04B 7/0639; H04B 7/0452; H04B 7/086; H04B 7/0408;
(Continued)

(56) References Cited

U.S. PATENT DOCUMENTS 8,305,987 B2    11/2012  Fong et al.
8,559,294 B2    10/2013  Vook et al.
(Continued)

OTHER PUBLICATIONS

International Search Report and Written Opinion—PCT/US2017/050100—ISA/EPO—dated Dec. 6, 2017.

*Primary Examiner* — Gary Lafontant
(74) *Attorney, Agent, or Firm* — Arent Fox, LLP

(57) ABSTRACT

Methods, systems, and devices for wireless communication are described. A network server may configure a base station for beamforming communications based on a service type of data used by a user equipment (UE). The network server may determine the service type of the data based on position data of the UE, along with other statistical information related to data usage. The position information may include global position system (GPS) information, gyroscope information, accelerometer information, or information related to the UE's subarray geometry. The base station may receive the position information from the UE and convey it to the network server. The network server may use the position information to generate a network map and to identify the service type of communication.

30 Claims, 65 Drawing Sheets

Related U.S. Application Data filed on Oct. 21, 2016, provisional application No. 62/414,645, filed on Oct. 28, 2016, provisional application No. 62/414,642, filed on Oct. 28, 2016.

(51) Int. Cl.

| | | |
|---|---|---|
| *H04B 7/0408* | (2017.01) | |
| *H04W 4/02* | (2018.01) | |
| *H04B 7/0456* | (2017.01) | |
| *H04B 7/06* | (2006.01) | |
| *H04B 7/08* | (2006.01) | |
| *H04W 4/50* | (2018.01) | |
| *H04B 7/0452* | (2017.01) | |
| *H04L 25/03* | (2006.01) | |
| *H04W 16/28* | (2009.01) | |
| *H04W 36/32* | (2009.01) | |
| *H04B 7/026* | (2017.01) | |
| *H04W 74/00* | (2009.01) | |
| *H04W 36/00* | (2009.01) | |
| *H04W 16/14* | (2009.01) | |

(52) U.S. Cl.
CPC ......... *H04B 7/0452* (2013.01); *H04B 7/0478* (2013.01); *H04B 7/063* (2013.01); *H04B 7/0639* (2013.01); *H04B 7/0663* (2013.01); *H04B 7/0695* (2013.01); *H04B 7/0697* (2013.01); *H04B 7/0834* (2013.01); *H04L 25/03898* (2013.01); *H04W 4/023* (2013.01); *H04W 4/025* (2013.01); *H04W 4/50* (2018.02); *H04W 16/28* (2013.01); *H04W 36/32* (2013.01); *H04W 74/006* (2013.01); *H04W 16/14* (2013.01); *H04W 36/0072* (2013.01)

(58) Field of Classification Search
CPC .... H04B 7/0695; H04B 7/088; H04B 7/0802; H04B 7/0897; H04W 16/28; H04W 72/046; H04W 48/12; H04W 72/042; H04W 64/00; H04W 36/32

See application file for complete search history.

(56) References Cited

U.S. PATENT DOCUMENTS

| | | |
|---|---|---|
| 9,215,644 B2 | 12/2015 | Kohli |
| 9,306,646 B2 | 4/2016 | Park et al. |
| 9,343,808 B2 * | 5/2016 | Harel ............... H01Q 3/00 |
| 9,391,678 B2 | 7/2016 | Maltsev et al. |
| 9,537,552 B2 | 1/2017 | Li et al. |
| 2007/0161371 A1 | 7/2007 | Dobrowski et al. |
| 2008/0205533 A1 | 8/2008 | Lee et al. |
| 2009/0044128 A1 * | 2/2009 | Baumgarten ....... G06F 16/9577 |
| | | 715/738 |
| 2011/0249637 A1 | 10/2011 | Hammarwall et al. |
| 2013/0286960 A1 | 10/2013 | Li et al. |
| 2013/0301454 A1 | 11/2013 | Seol et al. |
| 2014/0044042 A1 | 2/2014 | Moshfeghi |
| 2014/0073337 A1 | 3/2014 | Hong et al. |
| 2014/0177607 A1 | 6/2014 | Li et al. |
| 2014/0211731 A1 | 7/2014 | Inoue et al. |
| 2014/0307654 A1 | 10/2014 | Kim et al. |
| 2014/0334566 A1 | 11/2014 | Kim et al. |
| 2015/0004918 A1 | 1/2015 | Wang et al. |
| 2015/0045048 A1 | 2/2015 | Xu et al. |
| 2015/0092676 A1 | 4/2015 | Periyalwar |
| 2015/0230263 A1 * | 8/2015 | Roy .................. H04W 36/0083 |
| | | 455/452.2 |
| 2015/0302123 A1 * | 10/2015 | Gloss .................. G06F 17/5022 |
| | | 703/13 |
| 2015/0326359 A1 | 11/2015 | Subramanian et al. |
| 2015/0341095 A1 | 11/2015 | Yu et al. |
| 2015/0351135 A1 | 12/2015 | Schmidt et al. |
| 2015/0372656 A1 * | 12/2015 | Mow ...................... H03H 7/38 |
| | | 455/77 |
| 2016/0020876 A1 | 1/2016 | Raghavan et al. |
| 2016/0080060 A1 | 3/2016 | Yu et al. |
| 2016/0285522 A1 | 9/2016 | Kasher et al. |
| 2016/0316465 A1 | 10/2016 | Sahlin et al. |
| 2016/0330643 A1 | 11/2016 | Sahin et al. |
| 2016/0337916 A1 | 11/2016 | Deenoo et al. |
| 2016/0380820 A1 | 12/2016 | Horvitz et al. |
| 2017/0026951 A1 | 1/2017 | Lou et al. |
| 2018/0115358 A1 | 4/2018 | Raghavan et al. |

* cited by examiner

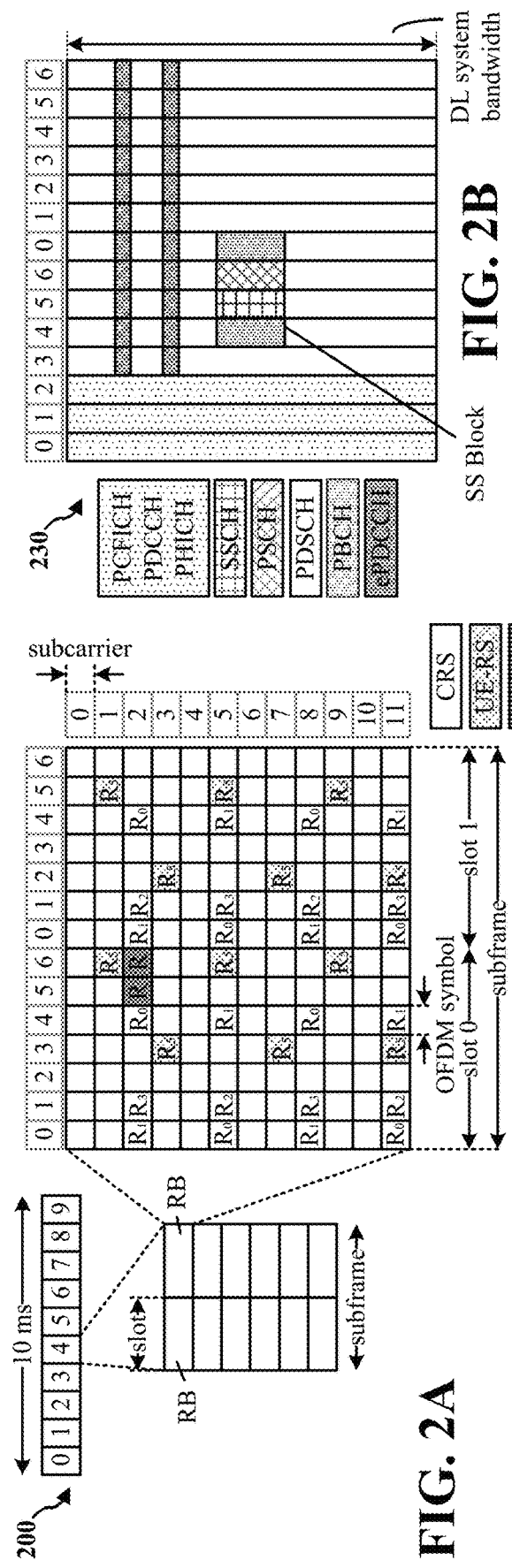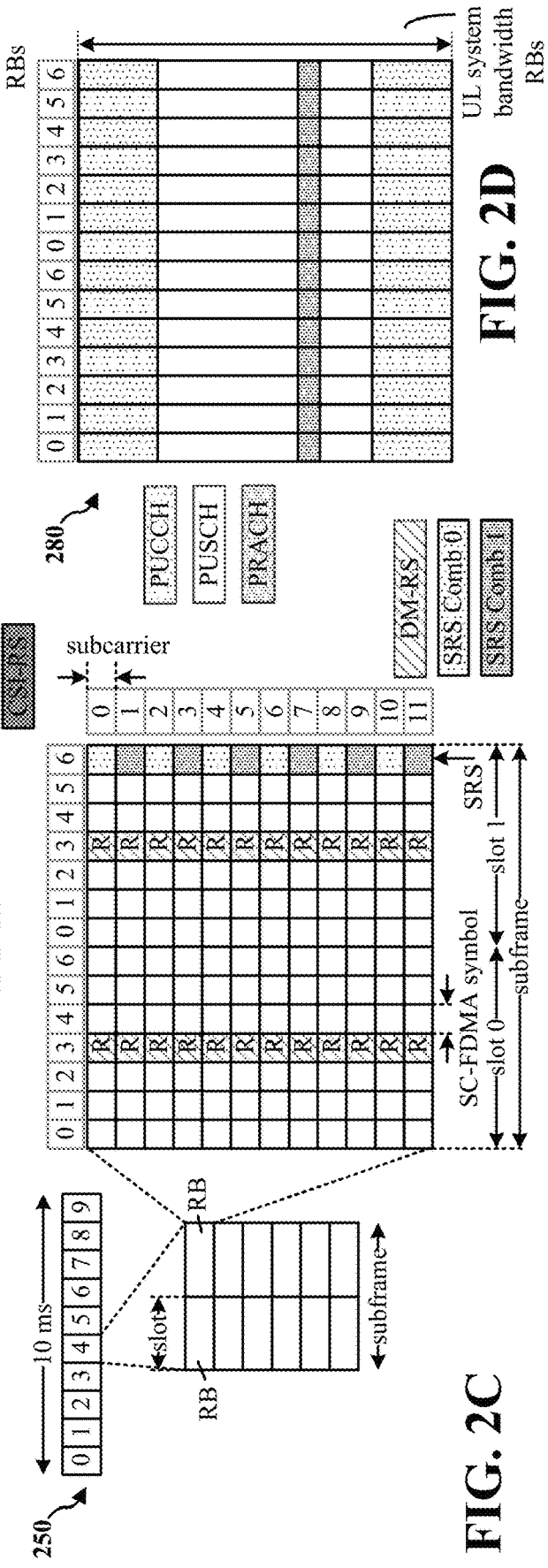

MILLIMETER-WAVELENGTH NETWORK MAP FOR USE IN A BEAMFORMING PROCEDURE

CROSS-REFERENCE TO RELATED APPLICATION(S)

This application claims the benefit of U.S. Provisional Application Ser. No. 62/411,435, entitled "MILLIMETER-WAVELENGTH NETWORK MAP FOR USE IN A BEAMFORMING PROCEDURE" and filed on Oct. 21, 2016; U.S. Provisional Application Ser. No. 62/411,503, entitled "CROWDSOURCING MILLIMETER WAVE NETWORK GEOMETRY WITH A CLOUD-BASED SERVER" and filed on Oct. 21, 2016; U.S. Provisional Application Ser. No. 62/414,645, entitled "UE LOCALIZATION VIA MILLIMETER-WAVE NETWORK MAP" and filed on Oct. 28, 2016; and U.S. Provisional Application Ser. No. 62/414,642, entitled "MILLIMETER-WAVE NETWORK OPTIMIZATION A NETWORK MAP" and filed on Oct. 28, 2016. The disclosures of the preceding provisional applications are expressly incorporated by reference herein in its entirety.

INTRODUCTION

The present disclosure relates generally to communication systems, and more particularly, to a millimeter-wavelength (mmW) network map for use in a beamforming procedure.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

One way to meet the increasing demand for mobile broadband may be to utilize the mmW spectrum in addition to other spectrums (e.g., LTE spectrum). However, communications using the mmW radio frequency band have extremely high path loss and a short range. Beamforming may be used to compensate for the extreme high path loss and short range. Beamforming techniques and methods are currently needed for providing seamless and continuous coverage for a UE operating in the mmW radio frequency band.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One way to meet the increasing demand for mobile broadband may be to utilize the millimeter-wavelength (mmW) spectrum in addition to other spectrum(s) (e.g., LTE spectrum). Communications using the mmW radio frequency band have extremely high path loss and a short range. Beamforming may be used to compensate for the extreme high path loss and short range. However, due to the potentially large number of antennas at an mmW base station and subarrays at a user equipment (UE), the number of possible beams that may need to be scanned during a beamforming procedure can be quite large. A scanning process for a large number of potential beams may take an undesirable amount of time and create significant beam overhead.

In order to speed up beam scanning processes and to reduce beam overhead, a beam scanning procedure may use broader beams at base station and a pseudo-omni beam at the UE. While speeding up the beam scanning process and reducing beam overhead, this beam scanning procedure has a tradeoff with respect to peak beamforming gain. Accordingly, a need exists for a technique that reduces the time needed to perform a beamforming procedure and that does not also cause the peak beamforming gain to suffer.

In one aspect of the present disclosure a network entity may create an mmW map and/or determine an mmW cell geometry for use in seeding a narrow beam base station codebook and a directional UE codebook. In an aspect, the network entity may use the mmW cell map and/or geometry to determine respective beam subsets in the base station codebook and the UE codebook that are most likely to yield an access beam for communications between the base station and the UE. In this way, beamforming procedure may be improved (e.g., latency may be reduced) by reducing the number of potential beams that may need to be scanned while maintaining peak performance gain that is provided by scanning narrow beams.

In an aspect of the disclosure, a first method, a first computer-readable medium, and a first apparatus are provided. The first apparatus may be a network entity such as a server, for example. The first apparatus may be configured to receive at least one of a first set of reports associated with at least one user equipment (UE) and a second set of reports associated with at least one base station. A first report of the first set of reports may include at least one of positioning information associated with the at least one UE, gyroscope information associated with one or more antenna components of the at least one UE, and accelerometer information associated with the at least one UE. The first apparatus may be configured to generate a millimeter wave network map based on the received first and/or second set of reports and to transmit the millimeter wave network map to the at least one UE or to the at least one base station. The network map may assist base stations and UEs with millimeter wave transmissions throughout the network. In an aspect, the first report of the first set of reports may include a first set of metrics associated with a first beam reference signal (BRS) from the at least one UE, and a second report of the second set of reports may include a second set of metrics associated with a second BRS from the at least one base station. In an aspect, the first set of metrics may include at least one of beam state information (BSI), beam reference signal received power (RSRP) or reference signal received quality (RSRQ) measurements, channel quality information (CQI), or a signal to noise ratio (SNR) associated with the first BRS. In an aspect, the second set of metrics includes at least one of BSI, beam RSRP or RSRQ measurements, CQI, or an SNR associated with the second BRS. In an aspect, the second report further includes at least one of positioning information associated with the at least one base station, gyroscope information associated with one or more antenna components of the at least one base station, and serving beam information for one or more UEs served by the at least one base station. In an aspect, the generation the mmW network map may include selecting, based on the first and second set of reports, one or more UE antenna components for the at least one UE for mmW transmissions, and selecting, based on the first and second set of reports, one or more base station antenna components for the at least one base station for mmW transmissions, wherein the mmW network map indicates the one or more UE antenna components and the one or more base station antenna components. In an aspect, the one or more UE antenna components are selected based on at least one of a SNR associated with the one or more UE antenna components, a blockage associated with the one or more UE antenna components, or an interference management objective, and the one or more base station antenna components are selected based on at least one of a SNR associated with the one or more base station antenna components, a blockage associated with the one or more base station antenna components, or the interference management objective. In an aspect, the mmW network map is transmitted via a mmW control channel or a low frequency channel.

In an aspect of the disclosure, a second method, a second computer-readable medium, and a second apparatus are provided. The second apparatus may be UE. The second apparatus may transmit a beam reference signal (BRS) to a base station. The second apparatus may receive feedback from the base station based on the transmitted BRS. The second apparatus may generate a report based at least in part on the feedback, wherein the report includes at least one of positioning information associated with the UE, gyroscope information associated with one or more antenna components of the UE, and accelerometer information associated with the UE. The second apparatus may transmit to a server the report that includes the received feedback. In an aspect, the feedback includes at least one of BSI, beam RSRP or RSRQ measurements, CQI, or an SNR associated with the BRS. In an aspect, the second apparatus may receive a mmW network map based on the transmitted report. In an aspect, the mmW network map identifies a first set of antenna components associated with the UE and a second set of antenna components associated with at least one base station for mmW transmissions between the UE and the at least one base station, and the at least one base station is a serving base station or a target base station. In an aspect, the second apparatus may communicate with the at least one base station over a mmW network based on the received mmW network map.

In an aspect of the disclosure, a third method, a third computer-readable medium, and a third apparatus are provided. The third apparatus may be a base station. The third apparatus may transmit a BRS to a UE. The third apparatus may receive feedback from the UE based on the transmitted BRS. The third apparatus may generate a report based at least in part on the feedback, wherein the report includes at least one of positioning information associated with the base station, gyroscope information associated with one or more antenna components of the base station, and serving beam information to different UEs associated with the base station. The third apparatus may transmit to a server the report that includes the received feedback. In an aspect, the feedback includes at least one of BSI, beam RSRP or RSRQ measurements, CQI, or an SNR associated with the BRS. In an aspect, the third apparatus may receive a mmW network map based on the transmitted report. In an aspect, the mmW network map identifies a first set of antenna components associated with the base station and a second set of antenna components associated with at least one UE for mmW transmissions between the base station and the at least one UE. In an aspect, the third apparatus may communicate with the at least one UE over a mmW network based on the received mmW network map.

In an aspect of the disclosure, a fourth method, a fourth computer-readable medium, and a fourth apparatus are provided. The fourth apparatus may be a base station. The fourth apparatus may receive information associated with a beamforming procedure from a network entity, the information including: a subframe structure for use during the beamforming procedure, first codebook information for use by the base station during the beamforming procedure, and second codebook information to be used by a UE during the beamforming procedure. The fourth apparatus may determine an access beam for use in communicating with the UE based on at least one of the subframe structure, the first codebook information, and the second codebook information. The fourth apparatus may communicate with the UE using the determined access beam. In an aspect, the first codebook information indicates a first subset of beam orientations in a base station codebook, the second codebook information indicates a second subset of beam orientations in a UE codebook, and distinct groups in the second subset of beam orientations are each associated with a different antenna subarray of the UE. In an aspect, the fourth apparatus may determine all possible access beams based on the first subset of beam orientations in the base station codebook and the second subset of beam orientations in the UE codebook by: (i) applying each beam orientation in the first subset of beam orientations to one beam orientation in the second subset of beam orientations during a contiguous symbol block in the subframe structure; and (ii) repeating (i) over different contiguous symbol blocks in the subframe structure until all possible access beams are determined. In an aspect, the fourth apparatus may determine the access beam further based on selection of one of the possible access beams for use as the access beam when a reference signal measurement associated with the one of the possible access beams meets a threshold criteria. In an aspect, the fourth apparatus may determine the access beam further based on reception of information related to the reference signal measurement from the UE. In an aspect, the fourth apparatus may transmit at least part of the information associated with the beamforming procedure to the UE. In an aspect, the fourth apparatus may determine first metric information associated with the fourth apparatus; receive second metric information associated with the UE, the second metric information including at least one of global positioning system (GPS) information associated with the UE, gyroscope information associated with the UE, or accelerometer information associated with the UE; and transmit the first metric information and the second metric information to the network entity. In an aspect, the information associated with the beamforming procedure that is received from the network entity is based on the first metric information and the second metric information. In an aspect, the fourth apparatus may be a base station that is a mmW base station. In an aspect, the network entity is a cloud-based server.

In an aspect of the present disclosure, a fifth method, fifth computer-readable medium, and fifth apparatus are provided. The fifth apparatus may be a UE. The fifth apparatus may receive information associated with a beamforming procedure from a base station, the information including: a subframe structure for use during the beamforming procedure, first codebook information for use by the base station during the beamforming procedure, and second codebook information for use by the UE during the beamforming procedure. The fifth apparatus may determine an access beam for use in communicating with the base station based on at least one of the subframe structure, the first codebook information, and the second codebook information. The fifth apparatus may communicate with the base station using the determined access beam. In an aspect, the first codebook information indicates a first subset of beam orientations in a base station codebook, the second codebook information indicates a second subset of beam orientations in a UE codebook, and distinct groups in the second subset of beam orientations are each associated with a different antenna subarray of the UE. The fifth apparatus may determine all possible access beams based on the first subset of beam orientations in the base station codebook and the second subset of beam orientations in the UE codebook by: (i) fixing a first beam orientation associated with a first antenna subarray of the UE for a duration of a first contiguous symbol block in the subframe structure; (ii) applying each beam orientation in the first subset of beam orientations to the first beam orientation associated with a first antenna subarray of the UE during the first contiguous symbol block; and (iii) repeating (i) and (ii) using each beam orientation in the first subset of beam orientations and the second subset of beam orientations until all of the possible access beams have been determined. In an aspect, the fifth apparatus may determine the access beam further based on selection of one of the possible access beams for use as the access beam when a reference signal measurement associated with the one of the possible access beams meets a threshold criteria. In an aspect, the fifth apparatus may determine the access beam based on transmission of information related to the reference signal measurement to the base station. In an aspect, the fifth apparatus may determine metric information associated with the fifth apparatus; transmit the metric information to the base station, the metric information including at least one of GPS information associated with the UE, gyroscope information associated with the UE, or accelerometer information associated with the UE. In an aspect, the information associated with the beamforming procedure that is received from the base station is based at least in part on the metric information. In an aspect, the base station is a mmW base station.

In an aspect of the disclosure, a sixth method, sixth computer-readable medium, and sixth apparatus are provided. The sixth apparatus may be a server, such as a cloud-based server. The sixth apparatus may receive base station metric information associated with a base station and UE metric information associated with a UE, the UE metric information including at least one of first location information associated with the UE, gyroscope information associated with the UE, or accelerometer information associated with the UE. The sixth apparatus may determine a geometry of a mmW cell based on at least one of the base station metric information or the UE metric information. The sixth apparatus may determine a first subset of beam orientations in a base station codebook and a second subset of beam orientations in a UE codebook based on the geometry of the mmW cell, the first subset of beam orientations and the second subset of beam orientations for use in determining an access beam. The sixth apparatus may determine a subframe structure based on at least one of the first subset of beam orientations or the second subset of beam orientations, the subframe structure being used in a beamforming procedure by the base station and the UE. The sixth apparatus may transmit information associated with the first subset of beam orientations, the second subset of beam orientations, and the subframe structure to the base station. The sixth apparatus may determine an accuracy of the first location information associated with the UE; and determine second location information associated with the UE when the accuracy of the first location information does not meet a threshold criteria, wherein the geometry of the mmW cell is determined at least in part using the second location information when the accuracy of the first location information does not meet the threshold criteria, and wherein the geometry of the mmW cell is determined at least in part using the first location information when the accuracy of the first location information meets the threshold criteria. In an aspect, the sixth apparatus may determine the accuracy of the first location information associated with the at least one UE by determining triangulation information of the at least one UE based at least in part on location information obtained from a plurality of base stations, and comparing the first location information with triangulation information associated with the at least one UE, wherein the second location information is based on the triangulation information when the accuracy of the first location information does not meet a threshold criteria. In an aspect, the sixth apparatus may determine if one or more access beams for communications between the at least one base station and the at least one UE will cause interference with a second access beam used for communications between the at least one base station and a different UE, and prioritize the information associated with the first subset of beam orientations and the second subset of beam orientations when the one or more access beams are determined to cause interference to the second access beam.

In an aspect of the present disclosure, a seventh method, seventh computer-readable medium, and seventh apparatus are provided. The seventh apparatus may be a network entity (e.g., network server). The seventh apparatus may receive, at the network server, position information associated with a UE, identify a service type associated with the UE based at least in part on the position information, identify a network map, the network map including a location of the UE and a base station, identify a beamforming configuration for communication between the base station and the UE based at least in part on the service type and the network map, and transmit the beamforming configuration to the base station. In an aspect, the position information includes GPS information, gyroscope information, accelerometer information, UE subarray geometry information, or beam information from any of the UE subarrays, or a combination thereof. The seventh apparatus may identify that the service type associated with the UE may be different from a previous service type associated with the UE. In an aspect, the service type comprises a QoS class identifier. In an aspect, the service type includes a voice communications service type, a video service type, a high-definition video service type, a real-time gaming service type, a mission critical communications service type, an Internet protocol multimedia subsystem (IMS) communications service type, or a combination thereof. In an aspect, the beamforming configuration includes a beam direction, a beam type, a subframe configuration, or a combination thereof. The seventh apparatus may receive the position information based on receiving position information for a second UE from a second base station. In an aspect, the network map comprises a relative location of the second UE and the second base station. In an aspect, the network server comprises a part of a core network.

In an aspect of the present disclosure, an eighth method, eighth computer-readable medium, and eighth apparatus are provided. The eighth apparatus may be a base station. The eighth apparatus may receive, at the base station, position information from a UE, transmit the position information to a network server, receive, from the network server, a beamforming configuration based at least in part on the position information, and transmit data to the UE based at least in part on the beamforming configuration, wherein the beamforming configuration is based at least in part on a service type of the data and the position information. The eighth apparatus may transmit a BRS. The eighth apparatus may communicate with the UE based at least in part on transmitting the BRS, wherein transmitting the data to the UE may be based at least in part on the communication. In an aspect, the beamforming configuration comprises a beam direction, a beam type, or a subframe type, or a combination thereof. In an aspect, the beamforming configuration includes one or more beam directions. In an aspect, the beamforming configuration may be based at least in part on a location of a second UE, a second base station, or a combination thereof.

In an aspect of the present disclosure, an ninth method, ninth computer-readable medium, and ninth apparatus are provided. The ninth apparatus may be a UE. The ninth apparatus may identify, at the UE, position information of the UE, transmit the position information to a base station, and receive data from the base station based at least in part on a beamforming configuration, wherein the beamforming configuration is based at least in part on a service type of the data and the position information. The ninth apparatus may scan for a BRS. The ninth apparatus may detect the BRS on one or more beams. The ninth apparatus may communicate with the base station based at least in part on detecting the BRS, wherein receiving the data from the base station may be based at least in part on the communications. The ninth apparatus may transmit metrics to the base station, wherein transmitting the position information may be based at least in part on detecting the BRS. In an aspect, the metrics include a channel quality indicator, a signal strength indicator, or a beam identifier, or a combination thereof. In an aspect, the position information comprises GPS information, gyroscope information, accelerometer information, UE subarray geometry information, or beam information from any of the UE subarrays, or any combination thereof. In an aspect, the service type includes a QoS class identifier. In an aspect, the service type includes a voice communications service type, a video service type, a high-definition video service type, a real time gaming service type, a mission critical communications service type, or an IMS communications service type. In an aspect, the beamforming configuration includes a beam direction, a beam type, or a subframe configuration, or a combination thereof. In an aspect, the beamforming configuration includes one or more beam directions. In an aspect, the beam direction may be based at least in part on a location of a second UE. In an aspect, the data from the base station may be received using a plurality of antennas of the UE.

In an aspect of the present disclosure, a tenth method, tenth computer-readable medium, and tenth apparatus are provided. The tenth apparatus may be a network entity (e.g., network server). The tenth apparatus may receive position information associated with a UE, identify a network map based at least in part on the position information, determine a beamforming parameter associated with a handover based at least in part on the position information and the network map, and transmit the beamforming parameter to a base station associated with the handover. The tenth apparatus may identify the base station from a plurality of base stations based at least in part on the position information and the network map, wherein the determination of the beamforming parameter may be based at least in part on identifying the base station. The tenth apparatus may determine a probability that the UE will enter a cell associated with the base station based at least in part on the position information. The tenth apparatus may transmit an indication of the probability to the base station. The tenth apparatus may determine the probability that the UE will enter the cell associated with the base station by identifying a trajectory of the UE based at least in part on the position information. The tenth apparatus may receive the position information comprises receiving position information periodically. The position information may include GPS information, or gyroscope information, or accelerometer information, or UE subarray geometry information, or beam information from a UE subarray, or any combination thereof. In an aspect, the position information indicates a beam evolution based at least in part on communication between the UE and a serving base station. In an aspect, the position information may include a position of the UE at each of multiple times, or a change in position of the UE over time, or a combination thereof. In an aspect, the beamforming parameter may include a beam orientation, a beam width, a beam separation, a beam pattern, or a combination thereof. In an aspect, the position information may be received from a second base station associated with the UE. In an aspect, the position information may be received from the UE. In an aspect, the position information may be received via a mmW control channel or a lower frequency channel. In an aspect, the network map may include relative locations of mmW cells, coverage areas of the mmW cells, and the UE.

In an aspect of the present disclosure, an eleventh method, eleventh computer-readable medium, and eleventh apparatus are provided. The eleventh apparatus may establish a connection with a network server, receive, at a base station, a beamforming parameter from the network server, the beamforming parameter based at least in part on a network map and position information associated with a UE, determine, by the base station, a beam configuration for communicating with the UE based at least in part on the beamforming parameter, and communicate with the UE based at least in part on the beam configuration. The eleventh apparatus may identify an indication that the UE will enter a cell associated with the base station at a future time. The eleventh apparatus may receive the indication from the network server. The eleventh apparatus may determine the beam configuration may be based at least in part on the indication. The eleventh apparatus may perform handover of the UE from a second base station to the base station based at least in part on the indication and the beam configuration. In an aspect, the handover may be performed after the future time. The eleventh apparatus may identify a frame structure associated with the UE, wherein transmission of the beam configuration may be based at least in part on the frame structure. The eleventh apparatus may receive handover information from the network server, the handover information associated with a second base station. In an aspect, the beam configuration comprises beam scanning information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a DL frame structure, DL channels within the DL frame structure, an UL frame structure, and UL channels within the UL frame structure, respectively.

DETAILED DESCRIPTION

Figure 1:
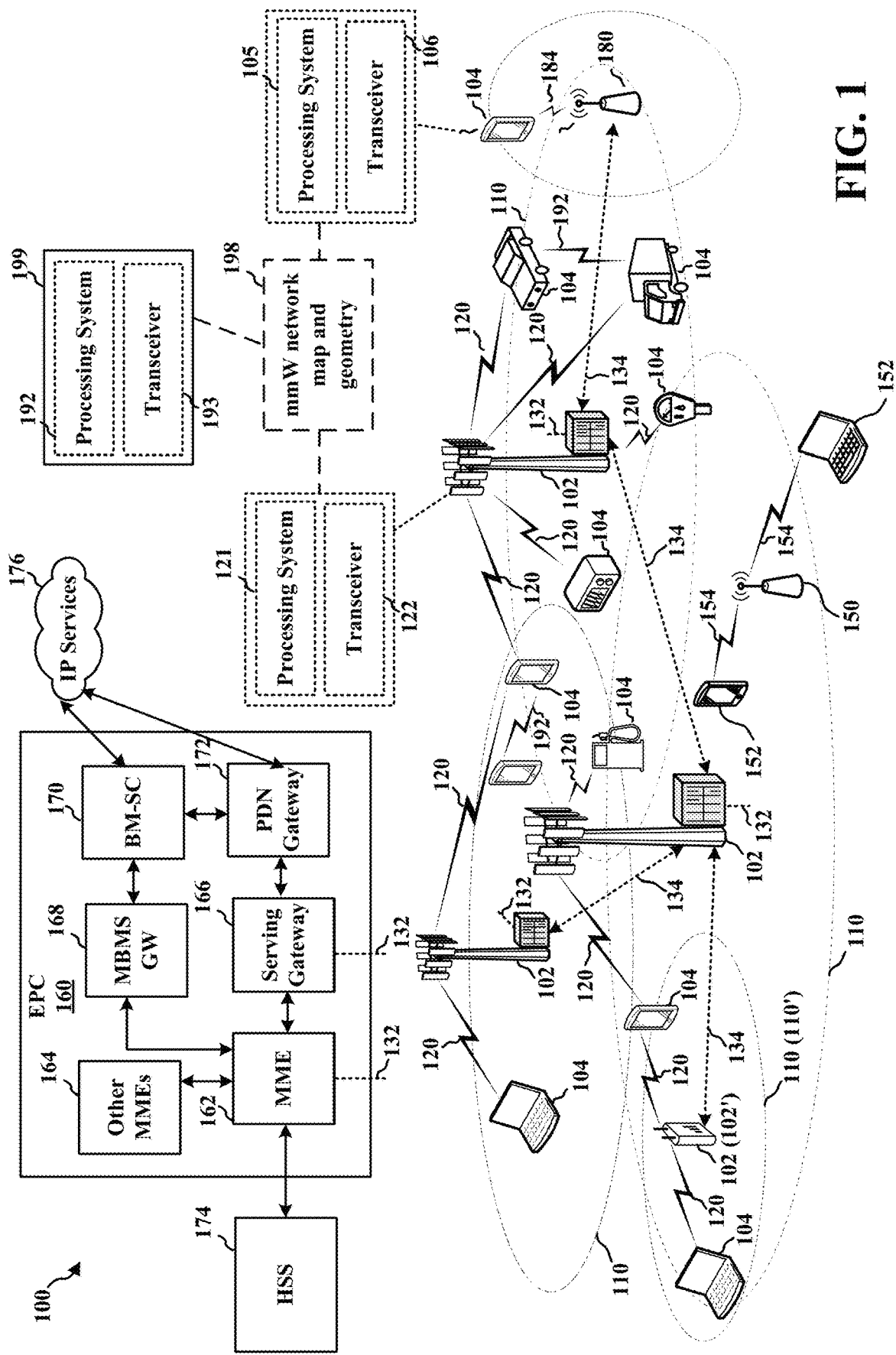
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIGS. 1-14 describe aspects of a crowd-sourcing a millimeter-wave (mmW) network map (also known as a geometry) via a cloud-based server. In various aspects, a user equipment (UE) may receive one or more reference signals from a base station along one or more beams. The UE may measure various metric information based on the received reference signals. The metric information may be related to one or more beams, such as beam state information, channel quality indicators, and the like. When the UE reports such metric information, the UE may also report information about the geographic location of the UE, gyroscope information associated with the UE, and/or accelerometer information associated with the UE. The UE may report the aforementioned information to a cloud-based server (e.g., through a base station).

Similar to the UE, a base station may report information associated with the base station to the cloud-based server. Information associated with the base station may include geographic position information associated with the base station, information associated with one or more beams used to serve one or more UEs, gyroscope information, and so forth.

The cloud-based server may receive the information associated with the UE and the information associated with the base station. The cloud-based server may generate a mmW heat map of a network geometry based on the information associated with the UE and the information associated with the base station. The mmW heat map may indicate areas of "good" coverage provided by one or more base stations. The cloud-based server may provide this generated mmW heat map to one or more base stations and/or one or more UEs, which may be used by a respective base station and/or respective UE for initial access or beam search, UE localization and/or ranging, base station operations and performance (e.g., handover), network operation diagnostics, and the like.

FIGS. 15-25 are directed to beam scanning based on a mmW network map. In various aspects, a UE may report information about the geographic location of the UE, gyroscope information associated with the UE, and/or accelerometer information associated with the UE. The UE may report the aforementioned information to a cloud-based server (e.g., through a base station).

Similar to the UE, a base station may report information associated with the base station to the cloud-based server. Information associated with the base station may include geographic position information associated with the base station, accelerometer information associated with the base station, gyroscope information, and so forth.

The cloud-based server may receive the information associated with the UE and the information associated with the base station. The cloud-based server may generate a mmW network map based on the information associated with the UE and the information associated with the base station. The cloud-based server may then determine beam orientations that may allow for satisfactory communication between the UE and the base station. The cloud-based server may then seed respective base station and UE codebooks using the beam orientations. The base station and UE may then perform a beam scanning process (e.g., beam refinement process) using the seeded codebooks, which may reduce the time needed to perform such a process.

FIGS. 26-45 are directed to UE localization via a mmW network map. In various aspects, a base station may offer one or more services to a UE, such as streaming video services, gaming services, voice services, and so forth. The UE may measure various metric information based on the received reference signals. The metric information may be related to one or more beams, such as beam state information, channel quality indicators, and the like. When the UE reports such metric information, the UE may also report information about the antenna subarrays associated with the UE, geographic location of the UE, gyroscope information associated with the UE, and/or accelerometer information associated with the UE. The UE may report the aforementioned information to a cloud-based server (e.g., through a base station).

The cloud-based server may receive the reported information from the UE and may create a mmW network map of mmW cells and the UEs in those cells. The cloud-based server may determine beam orientations that may be satisfactory for one or more UEs and base stations based on the network map.

Additionally, the cloud-based server may accurately localize the UE and detect an impending change in the type of service that the UE may request (e.g., as the UE is rotated to a landscape orientation, the UE may require streaming video service). The cloud-based server may determine the type of service that the UE may request and communicate this information to a base station, e.g., so that the base station may quickly provide this service to the UE.

FIGS. 46-60 are directed to coordination of base station operations using a mmW network map. In various aspects, a UE may report information about the geographic location of the UE, gyroscope information associated with the UE, and/or accelerometer information associated with the UE. The UE may report the aforementioned information to a cloud-based server (e.g., through a base station).

Similar to the UE, a base station may report information associated with the base station to the cloud-based server. Information associated with the base station may include geographic position information associated with the base station, accelerometer information associated with the base station, gyroscope information, and so forth.

The cloud-based server may receive the reported information from the UE and may create a mmW network map of mmW cells and the UEs in those cells. As a UE moves from one coverage area to another coverage area, the cloud-based server may anticipate the UE's movement. The cloud-based server may then provide information to the neighboring base station of the other coverage area regarding the UE. This information may include information related to beam orientations. Accordingly, handover between cells may be improved for a UE.

While the present disclosure describes various aspects, it will be appreciated that the aspects are not mutually exclusive and may be practiced together.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 and eNB 102 may be configured to provide beam feedback to a server 199 and receive, from the server 199, a mmW network map and geometry 198.

Figure 12:
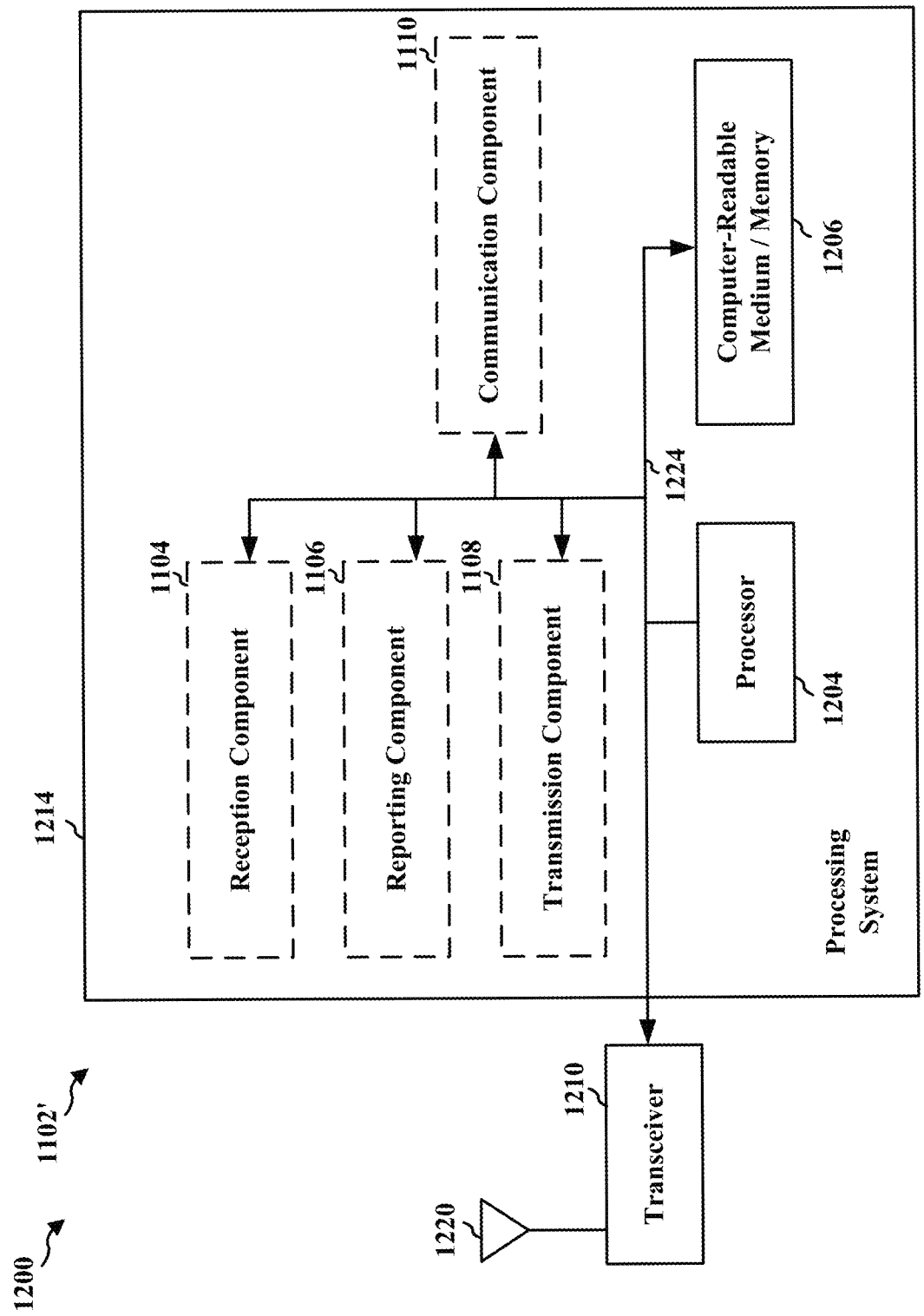
FIG. 12 is a diagram illustrating an example of a hardware implementation for an apparatus employing a processing system.

The UE 104 may include a processing system (e.g., an aspect of the processing system 1214 of FIG. 12) and a transceiver 106 (e.g., an aspect of the transceiver 1210 of FIG. 12). The transceiver 106 may transmit a beam reference signal (BRS) to a base station 102. The transceiver 106 may receive feedback from the base station 102 based on the transmitted BRS. The processing system 105 may generate a report based at least in part on the feedback, and the report may include at least one of positioning information associated with the UE 104, gyroscope information associated with one or more antenna components of the UE 104, and accelerometer information associated with the UE 104. The transceiver 106 may transmit to the server 199 the report that includes the received feedback.

Figure 14:
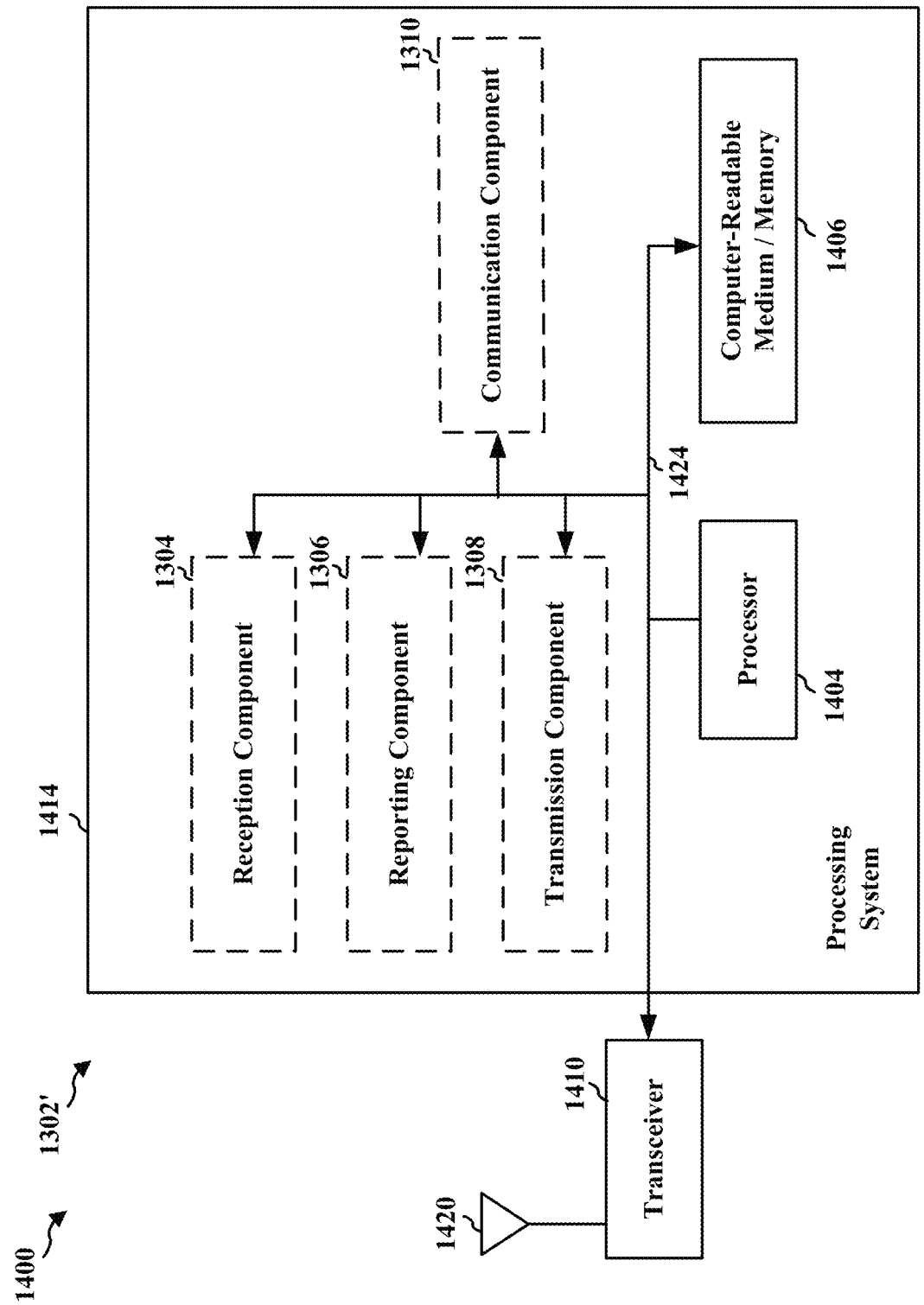
FIG. 14 is a diagram illustrating an example of a hardware implementation for an apparatus employing a processing system.

The base station 102 may include a processing system 121 (e.g., an aspect of the processing system 1414 of FIG. 14) and a transceiver 122 (e.g., an aspect of the transceiver 1410 of FIG. 14). The transceiver 122 may transmit a BRS to a UE 104. The transceiver 122 may receive feedback from the UE 104 based on the transmitted BRS. The processing system 121 may generate a report based at least in part on the feedback, and the report may include at least one of positioning information associated with the base station 102, gyroscope information associated with one or more antenna components of the base station 102, and serving beam information to different UEs (e.g., the UE 104) associated with the base station 102. The transceiver 122 may transmit to a server 199 the report that includes the received feedback.

Figure 10:
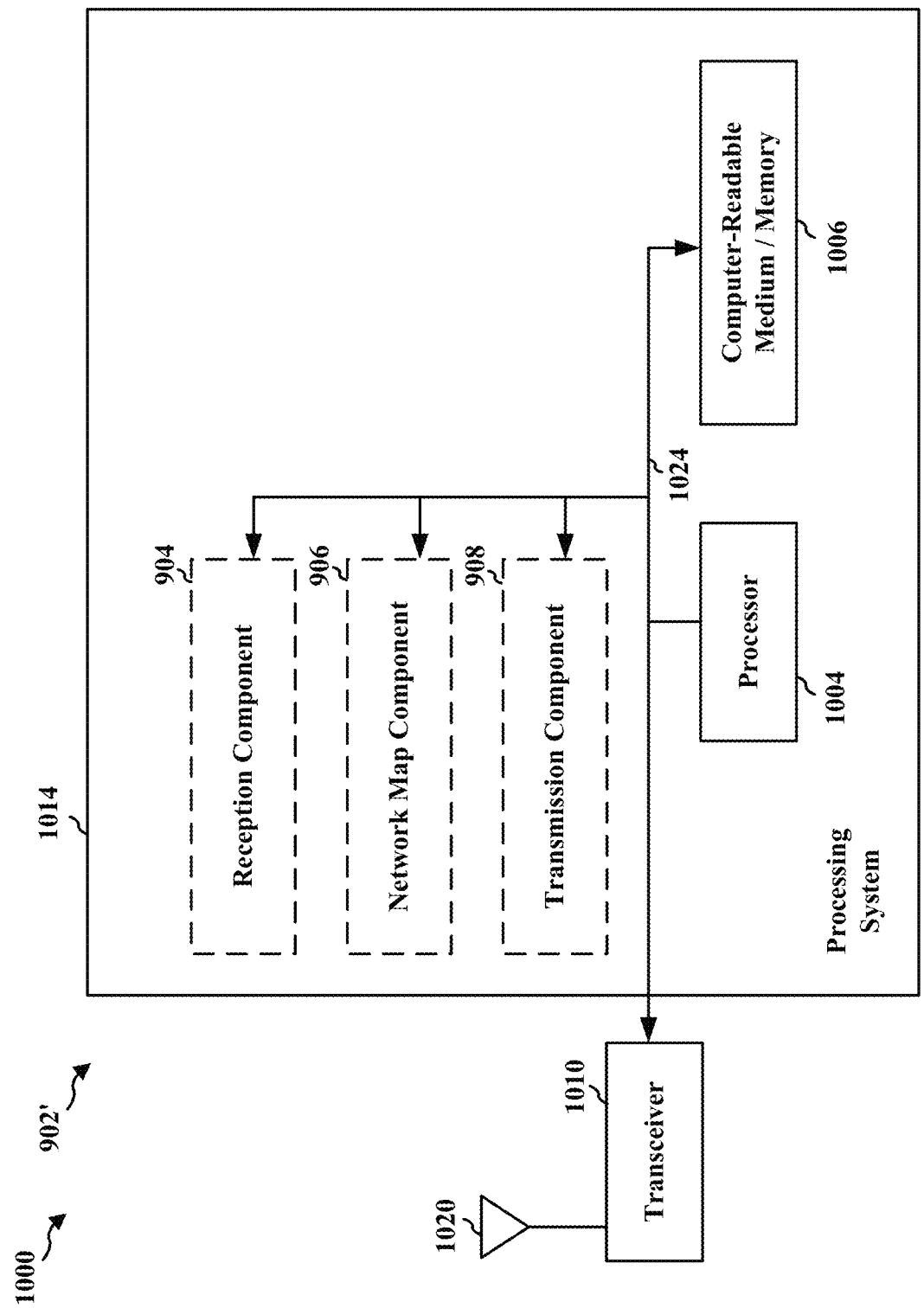
FIG. 10 is a diagram illustrating an example of a hardware implementation for an apparatus employing a processing system.

In aspects, the server 199 may include a processing system 192 (e.g., an aspect of the processing system 1014 of FIG. 10) and a transceiver 193 (e.g., an aspect of the transceiver 1020 of FIG. 10). The transceiver 193 may be configured to receive at least one of a first set of reports associated with at least one UE 104 and a second set of reports associated with at least one base station 102. A first report of the first set of reports may include at least one of positioning information associated with the at least one UE 104, gyroscope information associated with one or more antenna components of the at least one UE 104, and accelerometer information associated with the at least one UE 104.

The processing system 192 may be configured to generate a mmW network map and geometry 198 based on the received first and/or second set of reports. The transceiver 193 may and to transmit the millimeter wave network map and geometry 198 to the at least one UE 104 or to the at least one base station 102. The mmW network map and geometry 198 may assist base stations (e.g., the base station 102) and UEs (e.g., the UE 104) with mmW communication throughout the network.

Throughout this disclosure, different methods, principles, protocols, and techniques are described with respect to eNBs, mmW base stations, and/or base station in general. Disclosure discussed specifically with respect to eNBs and/or mmW base stations may also be applicable to any kind of base station and vice versa.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
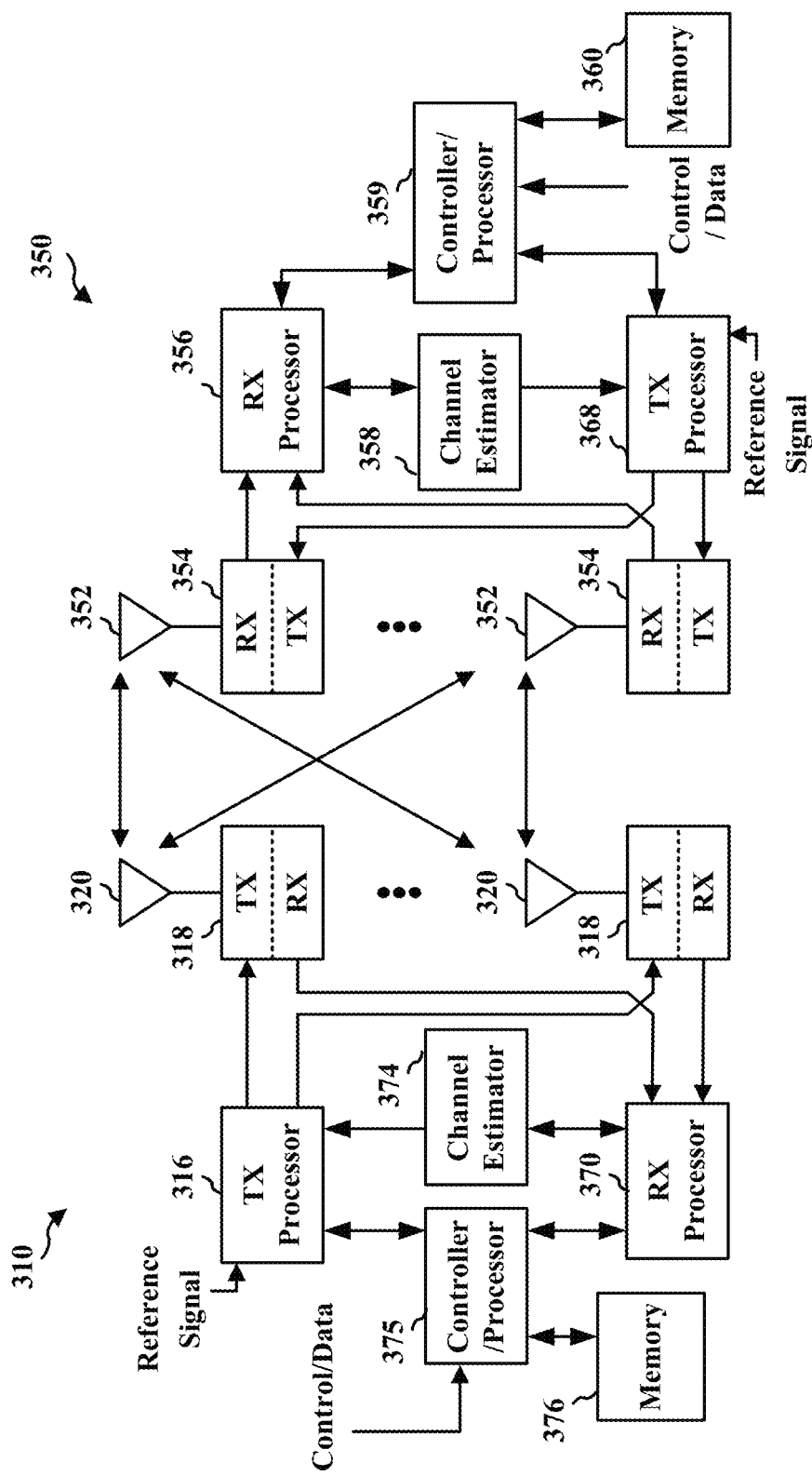
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
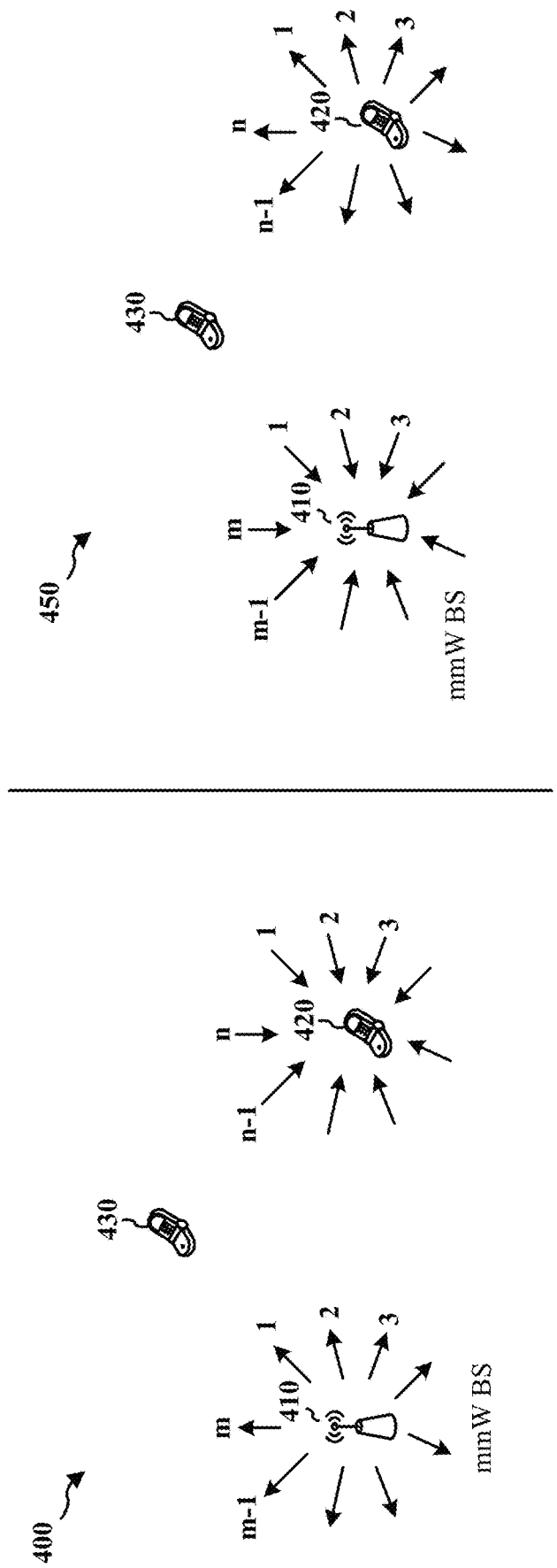
FIG. 4 illustrates diagrams of a millimeter wave (mmW) network.

FIG. 4 illustrates diagrams 400, 450 of a mmW network. In the diagram 400, for example, the mmW network includes a mmW base station 410 and a number of UEs 420, 430. The mmW base station 410 may include hardware for performing analog and/or digital beamforming. If the mmW base station 410 is equipped with analog beamforming, at any one time, the mmW base station 410 may transmit or receive a signal in only one direction. If the mmW base station 410 is equipped with digital beamforming, the mmW base station 410 may concurrently transmit multiple signals in multiple directions or may receive multiple signals concurrently in multiple directions. Further, the UE 420, for example, may include hardware for performing analog and/or digital beamforming. If the UE 420 is equipped with analog beamforming, at any one time, the UE 420 may transmit or receive a signal in only one direction. If the UE 420 is equipped with digital beamforming, the UE 420 may concurrently transmit multiple signals in multiple directions or may concurrently receive multiple signals in multiple directions.

Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters (the super high frequency (SHF) band extends between 3 GHz and 30 GHz, also referred to as centimeter wave). While the disclosure herein refers to mmWs, it should be understood that the disclosure also applies to near mmWs. Further, while the disclosure herein refers to mmW base stations, it should be understood that the disclosure also applies to near mmW base stations.

In order to build a useful communication network in the millimeter wavelength spectrum, a beamforming technique may be used to compensate for path loss. Beamforming technique focuses the RF energy into a narrow direction to allow the RF beam to propagate farther in that direction. Using the beamforming technique, non-line of sight (NLOS) RF communication in the millimeter wavelength spectrum may rely on reflection and/or diffraction of the beams to reach the UE. If the direction becomes blocked, either because of UE movement or changes in the environment (e.g., obstacles, humidity, rain, etc.), the beam may not be able to reach the UE. Thus, in order to ensure that the UE has continuous, seamless coverage, multiple beams in as many different direction as possible may be available. In an aspect, the beamforming technique may require that the mmW base stations and the UEs transmit and receive in a direction that allows the most RF energy to be collected.

In the mmW network, UEs may perform beam sweeps with mmW base stations within range. The beam sweeps may be performed as illustrated in the diagram 400 and/or the diagram 450. Referring to the diagram 400, in a beam sweep, the mmW base station 410 may transmit m beams (e.g., transmit m beacons or m BRSs along the m beams) in a plurality of different spatial directions. The UE 420 listens/scans for the beam transmissions from the mmW base station 410 in n different receive spatial directions. When listening/scanning for the beam transmissions, the UE 420 may listen/scan for the beam sweep transmission from the mmW base station 410 $m$ times in each of the n different receive spatial directions (a total of m*n scans). Alternatively, when listening/scanning for the beam transmissions with digital beamforming, the UE 420 may listen/scan for each beam direction of the m beam directions, and apply different weights (phase and/or amplitude changes) to determine a received signal for n different receive directions of the m transmissions (a total of m scans).

In another configuration, referring to the diagram 450, in a beam sweep, the UE 420 may transmit n beams in a plurality of different spatial directions (e.g., transmit n beacons or n BRSs along the n beams). The mmW base station 410 listens/scans for the beam transmissions from the UE 420 in m different receive spatial directions. When listening/scanning for the beam transmissions, the mmW base station 410 may listen/scan for the beam sweep transmission from the UE 420 $n$ times in each of the m different receive spatial directions (a total of m*n scans). Alternatively, when listening/scanning for the beam transmissions with digital beamforming, the mmW base station 410 may listen/scan for each beam direction of the n beam directions, and apply different weights (phase and/or amplitude changes) to determine a received signal for m different receive directions of the n transmissions (a total of n scans).

Based on the performed beam sweeps, the UEs and/or the mmW base stations determine a channel quality associated with the performed beam sweeps. For example, if the beam sweep process in diagram 400 is performed, the UE 420 may determine the channel quality associated with the performed beam sweeps. However, if the beam sweep process in the diagram 450 is performed, the mmW base station 410 may determine the channel quality associated with the performed beam sweeps. If the UE 420 determines a channel quality associated with the performed beam sweeps, the UE 420 may send the channel quality information (also referred to as beam sweep result information) to the mmW base station 410. If the mmW base station 410 determines a channel quality associated with the performed beam sweeps, the mmW base station 410 may send the beam sweep result information to UE 420.

In an aspect, the channel quality may be affected by a variety of factors. The factors include movement of the UE 420 along a path or due to rotation (e.g., a user holding and rotating the UE 420), movement along a path behind obstacles or within particular environmental conditions (e.g., obstacles, rain, humidity). The UE 420 and the mmW base station 410 may also exchange other information, such as configuration information, for beamforming (e.g., analog or digital beamforming capabilities, beamforming type, timing information, etc.)

Although FIG. 4 shows beam training between the mmW base station 410 and UE 430, beam training may occur between any device (e.g., between two UEs, between a UE and an access point). Further, the mmW base station 410 may be an access point.

Figure 5:
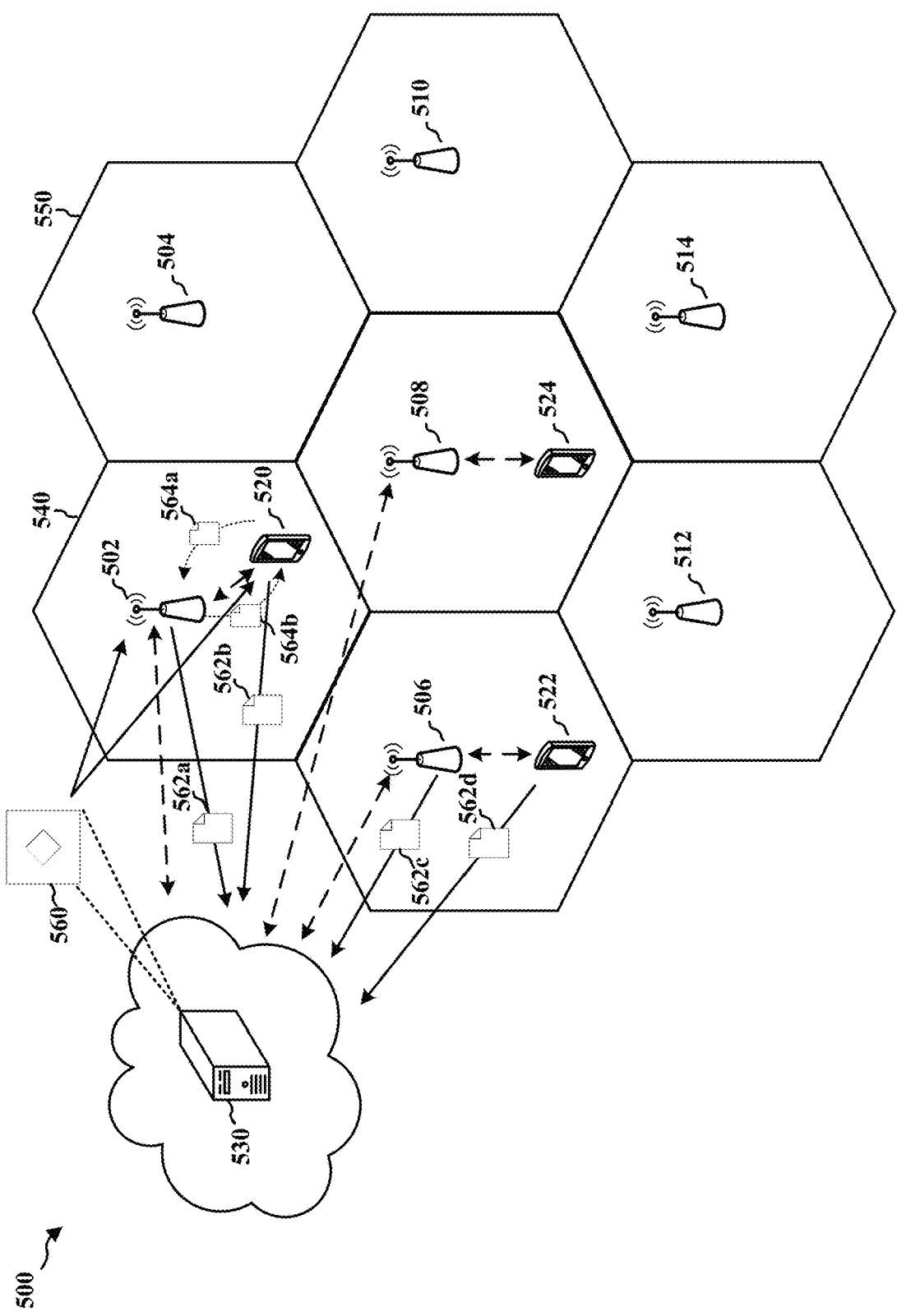
FIG. 5 illustrates a diagram of crowdsourcing a mmW network map (or network geometry) using a server within a mmW network.

FIG. 5 illustrates a diagram 500 of crowdsourcing a mmW network map (or network geometry) using a server within a mmW network. Referring to FIG. 5, a number of base stations may be situated in a network. A first base station 502 may be serving a first cell 540 and a second base station 504 may be serving a second cell 550. A third base station 506, a fourth base station 508, a fifth base station 510, a sixth base station 512, and a seventh base station 514 may each be serving their respective cells.

The first base station 502 be associated with a first UE 520 (e.g., the first UE 520 may be operating on the first cell 540), the third base station 506 may be associated with a second UE 522, and a fourth base station 508 may be associated with a third UE 524. Within the mmW network, each of the aforementioned base stations and UEs may perform beam training with each other to enable mmW communications. For example, the first base station 502 (an eNB or a mmW base station) may periodically transmit BRSs to the first UE 520. The first UE 520 may determine metrics in response to received BRSs. The metrics may include beam state information (BSI), beam reference signal received power (B-RSRP) measurements, beam reference signal received quality (B-RSRQ) measurements, CQI, a signal-to-noise ratio (SNR) related to the BRSs, and/or other metrics or values (e.g., a beam index). The first UE 520 may transmit the determined metrics to the first base station 502, for example, as feedback 564a.

In an aspect, the BSI (e.g., included in feedback 564a) may include a beam index (e.g., an index associated with the beamforming vector from a codebook of beamforming vectors). In various aspects, the beam index may be indicate at least a direction for communicating through a corresponding beam toward a UE (e.g., a beamforming direction). For example, the beam index may be a logical beam index associated with an antenna port, OFDM symbol index, and/or BRS transmission period, which may be indicated by one or more bits (e.g., 9 bits). For example, the first UE 520 may be configured to determine a beam index corresponding to a beam based on a time at which a BRS is received—e.g., a symbol or slot during which a BRS is received may indicate a beam index corresponding to a beam. The beam index may be the mmW analog of the precoding matrix indicator. The CQI may be a proxy used to correct MCS to be used on top of the beam. In another aspect, the metrics may include other information, such as a rank index, which measures the number of layers/ranks used in precoding.

Similarly, the first UE 520 may periodically transmit BRSs to the first base station 502. The first base station 502 may determine metrics in response to received BRSs. The metrics may include BSI, B-RSRP measurements, B-RSRQ measurements, CQI, SNR related to the BRSs, and/or other metrics or values (e.g., a beam index). The first base station 502 may transmit the determined metrics to the first UE 520, for example, as feedback 564b. Other base stations and UEs within the mmW network, including the third and fourth base stations 506, 508 and the second and third UEs 522, 524 may measure similar metrics in response to received BRSs.

After receiving the metrics as feedback 564, each of the base stations and UEs may generate a report 562 based at least in part on the feedback 564 for transmission to a server. For example, the first base station 502 may generate a first report 562a that includes the feedback 564a received from the first UE 520, and the first UE 520 may generate a second report 562b that includes the feedback 564b received from the first base station 502. The first report 562a may further include positioning information associated with the first base station 502, gyroscope information associated with one or more antenna components of the first base station 502, serving beam information for different UEs associated with the first base station 502, and/or other information. In an aspect, the positioning information may include global positioning system (GPS) or global navigation satellite system (GNSS) information. In another aspect, the gyroscope information may indicate the spatial or angular orientation of one or more antenna panels, modules, and/or subarrays at the first base station 502. In another aspect, the serving beam information may indicate a beam direction, beam index, and/or antenna array(s) or subarrays used to serve one or more UEs (e.g., the first UE 520) associated with the first base station 502. The serving beam for the first UE 520 may be the beam that has the best (e.g., greatest) measured SNR at the first UE 520, for example, compared to at least one other SNR measured for at least one other beam. The first base station 502 may transmit the first report 562a to a server 530. In an aspect, the first report 562a may be transmitted using beamforming. In another aspect, the server 530 may be a cloud-based server.

Similarly, the second report 562b may further include positioning information associated with the first UE 520, gyroscope information associated with one or more antenna components of the first UE 520, accelerometer information associated with the first UE 520, and/or other information. In an aspect, the positioning information may indicate GPS or GNSS information associated with the first UE 520. In another aspect, the gyroscope information may indicate the spatial or angular orientation of one or more antenna panels, modules, and/or subarrays at the first UE 520. In another aspect, the accelerometer information may indicate a direction of travel of the first UE 520 and/or a rate at which the first UE 520 is accelerating or decelerating. The first UE 520 may transmit the second report to the server 530 directly or via the first base station 502. In an aspect, the second report may be transmitted using beamforming.

The third base station 506 may generate a third report 562c similar to the first report 562a, although with information (e.g., metric values) corresponding to the third base station 506. The second UE 522 may generate a fourth report 562d similar to the second report 562b, although with information (e.g., metric values) corresponding to the second UE 522.

The server 530 may receive the first report 562a and/or the second report 562b, along with any other additional reports (e.g., the third report 562c) from other base stations (e.g., the third and fourth base stations 506, 508) and/or other additional reports (e.g., the fourth report 562d) from other UEs (e.g., the second and third UEs 522, 524). In an aspect, the first and/or second reports 562a-b may be received via mmW control channels or low-frequency coexisting channels (e.g., a channel having a lower frequency than a frequency associated with a mmW control channel, such as an LTE channel and/or a sub-6 GHz channel).

Based on the received reports, the server 530 may generate a mmW network map 560. In an aspect, the mmW network map 560 may be a heat map that indicates regions of good coverage within a network. A heat map may be a graphical representation of data where the individual values contained in a matrix are represented, for example, as colors. Thus, regions of good coverage may be represented by a first color, regions of marginal coverage may be represented by a second color, and so forth. The regions of good coverage may be identified based on the locations of the base stations and/or UEs when good B-RSRP and/or B-RSRQ measurements are reported (e.g., measurements indicating a received power or received quality above a threshold and/or within a range corresponding to "good" coverage). Regions of good coverage may also be identified based on when CQI or SNR is reported to be above a threshold and/or within a range.

In another aspect, the mmW network map 560 may also indicate mmW communication parameters between one or more base station-UE pairs or UE-UE pairs (for device-to-device (D2D) communication). For example, the mmW network map 560 may indicate to the first base station 502 (and the first UE 520) a first antenna array/subarray of the first base station 502 to use for communicating with the first UE 520. The mmW network map 560 may indicate to the first UE 520 (and the first base station 502) a second antenna subarray of the first UE 520 to use for communicating with the first base station 502. The server 530 may select the antenna subarray (or other antenna components) based on which subarray is associated with the greatest B-RSPQ or the greatest B-RSRQ. In another aspect, the server 530 may select the antenna subarray based on which subarray has better blockage resilience (e.g., based on multiple reports received over time, the server 530 may determine that a subset of antenna subarrays at the UE is less likely to be blocked by an object such as a user's fingers or other physical objects or the server 530 may determine that a subset of antenna arrays/subarrays at the base station is less likely to be blocked by an object).

In another aspect, the server 530 may select the antenna subarray based on an interference management capability or objective. An interference management objective may refer to operations performed by the server 530 to reduce or mitigate interference experienced by a base station and/or a UE. For example, the first base station 502 may be serving the first UE 520 and another UE. The first base station 502 may determine that a first antenna subarray and a second antenna subarray associated with the first UE 520 both received good metrics (e.g., as indicated in feedback 564a). However, the first base station 502 may determine that only a second antenna subarray associated with the other UE received good metrics (e.g., as indicated in other feedback) because the first antenna subarray associated with the other UE exhibited high interference at the other UE (e.g., high interference may be indicated by relatively poor metric values). As such, although the first base station 502 may use the first and second antenna subarrays to communicate with the first UE 520, the server 530 may instruct the first base station 502 to use the first antenna subarray for mmW communication with the first UE 520 and the second antenna subarray for communicating with the other UE based on interference management considerations (e.g., an interference management objective to mitigate interference experienced by the first UE 520 and/or the other UE). The server 530 may provide similar indications to the UEs.

The server 530 may transmit the mmW network map 560 to the first base station 502 and to the first UE 520 directly or via the first base station 502. Similarly, the server 530 may transmit the network map 560 to others base stations and UEs, such as the third and fourth base stations 506, 508 and the second and third UEs 522, 524. In an aspect, the server 530 may transmit the mmW network map 560 via a mmW control channel or a low-frequency coexisting channel.

Upon receiving the mmW network map 560, the UEs and the base stations may communicate with each other based on the mmW network map 560. In an aspect, the mmW network map 560 may be used for initial access during a RACH procedure and/or for beam search and beam training procedures (e.g., beam refinement). The network map 560 may enable base stations and/or UEs to more reliably receive messages during a RACH procedure. Also, the time required for beam training may be reduced due to subarray information indicated in the network map 560. In another aspect, the mmW network map 560 may be used for UE localization and/or ranging. UE ranging may refer to determining a distance between the UE and another wireless system (e.g., another UE or a base station). Regarding UE localization, the server 530 may know the UE location and/or beam orientation. The server 530 may sense that the UE may be seeking a better service from a base station (e.g., because the UE requires better quality of service for different service types). As such, the server 530 may inform the base station to perform a beam refinement procedure for the higher data rate required by the UE (e.g., a data rate commensurate with a Quality of Service (QoS) associated with a service provided to the UE).

In another aspect, the mmW network map 560 may be used to optimize base station performance and operation, including during handoff. For example, referring to FIG. 5, the third UE 524 may move away from the fourth base station 508 into the second cell 550 associated with the second base station 504. During handoff from the fourth base station 508 to the second base station 504, the second base station 504 may communicate with the third UE 524 based on information included in the mmW network map 560.

In another aspect, the mmW network map 560 may be used for network operation diagnosis. For example, the mmW network map 560 may be used to diagnose any areas within the network with poor connectivity (e.g., areas or regions corresponding to metric values (e.g., B-RSRP, B-RSRQ, CQI, SNR, etc. that are below a threshold or within a range corresponding to poor connectivity). In another example, the network map 560 may also be used to verify information such as a UE's location. For example, if a previous report associates the first UE 520, for example, with a first position and a more recent report associates the first UE 520 with a second position, then the server 530 may determine to locate the first UE 520 at the second position based on the more recent report.

Figure 6:
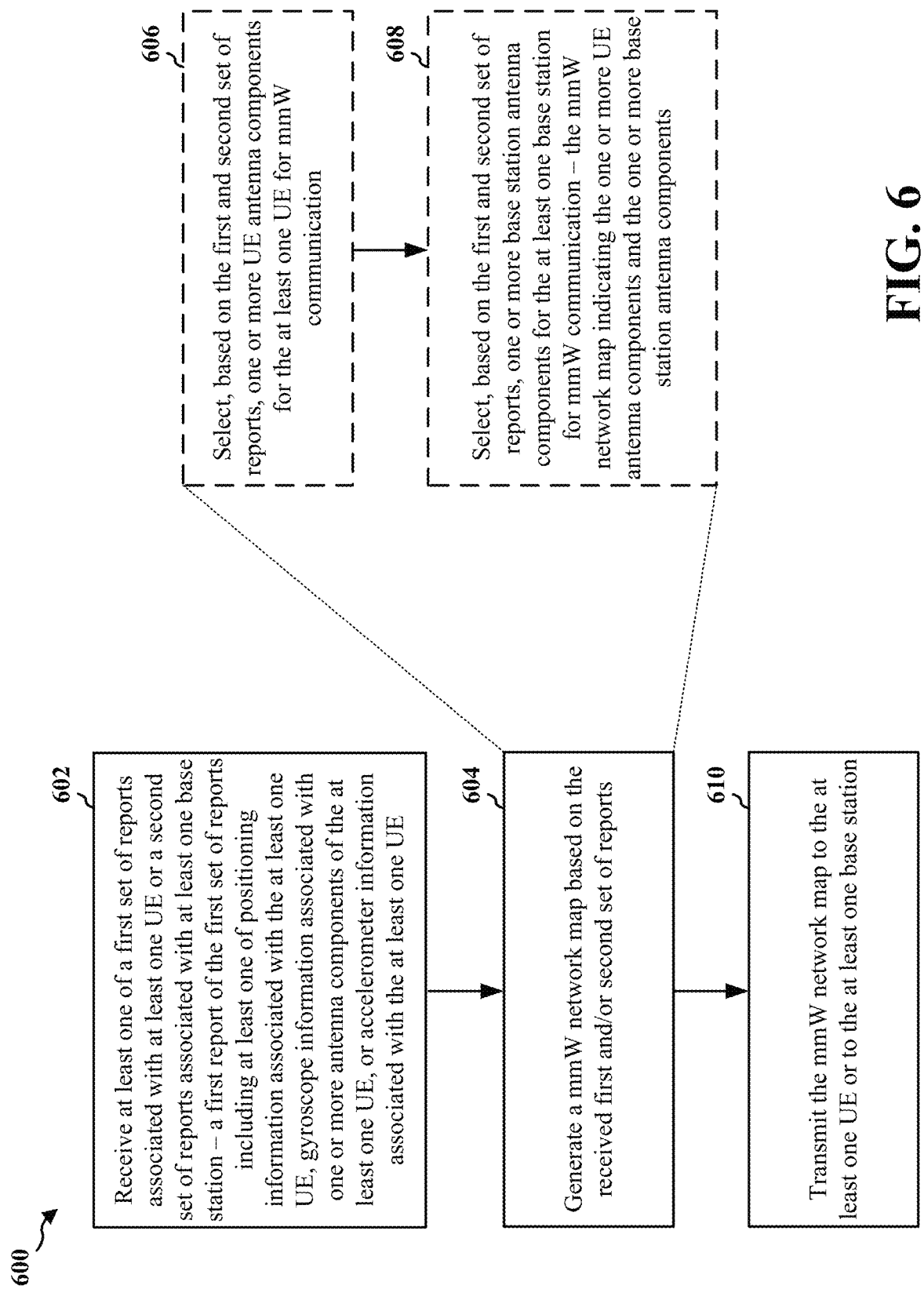
FIG. 6 is a flowchart of a method of wireless communication.

FIG. 6 is a flowchart 600 of a method of wireless communication. The method may be performed by a server (e.g., the server 530, the apparatus 902/902'). In various aspects, one or more operations may be omitted, transposed, and/or contemporaneously performed.

Beginning at operation 602, the server may receive at least one report of a first set of reports associated with at least one UE and/or at least one report of a second set of reports associated with at least one base station. A first report of the first set of reports may include at least one of positioning information associated with the at least one UE, gyroscope information associated with one or more antenna components of the at least one UE, and/or accelerometer information associated with the at least one UE. Additionally or alternatively, the first report may include all or a subset of the metric values indicated by the feedback received by the at least one UE from the at least one base station. A second report of the second set of reports may include positioning information associated with the at least one base station, gyroscope information associated with one or more antenna components of the at least one base station, and/or serving beam information corresponding to the at least one UE served by the at least one base station. Additionally or alternatively, the second report may include all or a subset of the metric values indicated by feedback provided to the at least one base station by the at least one UE. In an aspect, the server may receive the at least one report from the at least one UE and/or the at least one base station via a mmW control channel or a low-frequency coexisting channel. For example, the server may identify a channel that is to carry the mmW network map, and the UE may receive (e.g., detect) the mmW network map on the identified channel.

For example, referring to FIG. 5, the server may correspond to the server 530. The server 530 may receive a first set of reports (e.g., the second and fourth reports 562b, 562d) associated with the first, second, and/or third UEs 520, 522, 524 and a second set of reports (e.g., the first and third reports 562a, 562c) associated with the first, second, third, fourth, fifth, sixth, and/or seventh base stations 502, 504, 506, 508, 510, 512, 514. A first report 562a may include information associated with the first UE 520 and/or positioning information associated with the first base station 502, gyroscope information associated with one or more antenna components of the first base station 502, serving beam information for different UEs associated with the first base station 502, and/or other information. A second report 562b from the first UE 520 may include information associated with the first base station 502 and/or positioning information associated with the first UE 520, gyroscope information associated with 4 antenna components of the first UE 520, and/or accelerometer information associated with the first UE 520 indicating that the first UE 520 is accelerating away from the first base station 502 toward the second base station 504 in the second cell 550.

At operation 604, the server may generate a mmW network map based on the received first and/or second set of reports. For example, the server may generate a heat map that indicates regions of good coverage within a network that includes the one or more UEs and/or the one or more base stations from which the first and/or second set of reports is received. In an aspect, the server may identify a region (e.g., geographical coverage area, a cell, a portion of a cell) that is associated with good coverage. The server may determine that a region has good coverage when one or more values (e.g., a B-RSRP, B-RSRQ, a CQI, an SNR, etc.), received in a report of the first and/or second set of reports, corresponding to that region satisfies (e.g., meets or exceeds) a threshold value or within a range of values that corresponds to good coverage. The server may then generate a mmW network map (e.g., a heat map) that indicates one or more regions associated with the one or more values that satisfy the threshold or is within the range of values.

Referring to FIG. 5, the server 530 may generate the mmW network map 560 based on the first and/or second set of reports 562a-d.

According to an aspect, operation 604 may include operation 606 and/or operation 608. At operation 606, the server may select, based on the first and/or second set of reports, one or more UE antenna components for the at least one UE for mmW communication (e.g., transmissions/or receptions). For example, the server may identify one or more antenna components associated with at least one UE based on at least one report including information associated with the at least one UE. The server may select one or more antenna components associated with the at least one UE based on one or more metric values (e.g., B-RSRP, B-RSRQ, CQI, SNR, etc.) included in at least one report including information associated with the at least one UE, such as a metric value that satisfy a threshold or a metric value that exceed one or more other metric values associated with other antenna components. In the context of FIG. 5, the server 530 may generate the mmW network map 560 by selecting, based on the first and second set of reports 562a-d, one or more UE antenna components for the first, second, and third UEs 520, 522, 524 for mmW communications (e.g., transmissions and/or receptions).

At operation 608, the server may select, based on the first and/or second set of reports, one or more base station antenna components for the at least one base station for mmW communication (e.g., transmissions and/or receptions). For example, the server may identify one or more antenna components associated with at least one base station based on at least one report including information associated with the at least one base station. The server may select one or more antenna components associated with the at least one base station based on one or more metric values (e.g., B-RSRP, B-RSRQ, CQI, SNR, etc.) included in at least one report including information associated with the at least one base station, such as a metric value that satisfy a threshold or a metric value that exceed one or more other metric values associated with other antenna components. In the context of FIG. 5, the server 530 may select, based on the first and second set of reports 562a-d, one or more base station antennas components for the first, second, third, and fourth base stations 502, 504, 506, 508 for mmW communications (e.g., transmissions and/or receptions). The mmW network map 560 may indicate one or more UE antenna components and/or base station antenna components.

At 610, the server may transmit the mmW network map to the at least one UE or to the at least one base station. In an aspect, the server may transmit the mmW network map to the at least one UE via the at least one base station. In an aspect, the server may transmit the mmW network map via a mmW control channel or a low-frequency coexisting channel. For example, the server may select or identify a channel that is to carry the mmW network map, and the server may transmit the mmW network map on the selected or identified channel. Referring to FIG. 5, the server 530 may transmit the mmW network map 560 to the first, second, and third UEs 520, 522, 524 and/or to the first, second, third, and fourth base stations 502, 504, 506, 508.

Figure 7:
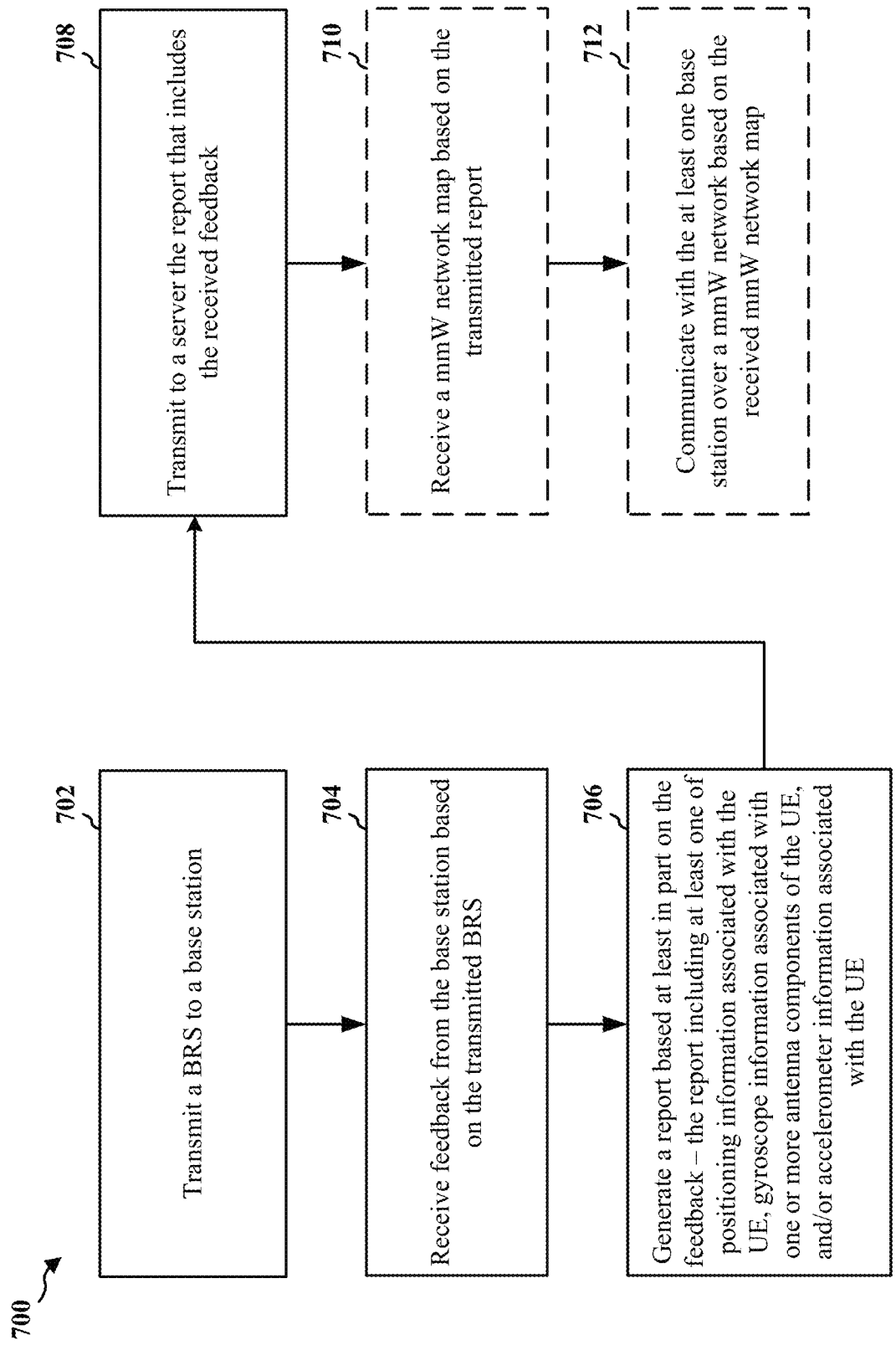
FIG. 7 is a flowchart of a method of wireless communication.

FIG. 7 is a flowchart 700 of a method of wireless communication. The method may be performed by a UE (e.g., the first UE 520, the second UE 522, the third UE 524, the apparatus 1102/1102'). In various aspects, one or more operations may be omitted, transposed, and/or contemporaneously performed.

At operation 702, the UE may transmit a BRS to a base station. For example, the UE may transmit a BRS through a beam to the base station. In an aspect, the UE may transmit a plurality of BRSs through a plurality of beams. For example, the UE may sweep through transmit beams of the UE, transmitting a respective BRS through each transmit beam of the UE through which the UE sweeps. Referring to FIG. 5, the UE may correspond to the first UE 520, and the base station may correspond to the first base station 502. The first UE 520 may transmit a BRS to the first base station 502. The first UE 520 may include one or more antenna components having one or more transmit beams, and the first UE 520 may sweep through those transmit beams by transmitting a BRS through each transmit beam (or a subset of transmit beams). An aspect of sweeping through directions may be illustrated with respect to FIG. 4. The UE 420 may transmit a beam for each direction of the n directions, and the UE 420 may transmit a BRS through each beam corresponding to the n directions.

At operation 704, the UE may receive feedback from the base station based on the transmitted BRS. For example, the UE may receive, from the base station, a message that includes feedback, and the UE may detect or identify one or more metric values in the feedback message, such as BSI, a beam index, B-RSRP, B-RSRQ, CQI, SNR, and/or another metric value measured by the base station based on one or more BRSs transmitted by the UE. Referring to FIG. 5, the first UE 520 may receive feedback 564b from the first base station 502 based on one or more transmitted BRSs. The feedback 564b may include BSI, a beam index, B-RSRP, B-RSRQ, CQI, and/or SNR measured by the first base station 502 based on the BRS.

At 706, the UE may generate a report based at least in part on the feedback. For example, the UE may generate a report, and the UE may include one or more metric values identified from the feedback from the base station in the generated report. In an aspect, the report may include at least one of positioning information associated with the UE, gyroscope information associated with one or more antenna components of the UE, and accelerometer information associated with the UE. For example, the UE may detect positioning information (e.g., based on GPS and/or GNSS) associated with the UE, gyroscope information associated with one or more antenna components of the UE, and/or accelerometer information associated with the UE, and the UE may include one or more of the positioning information, gyroscope information, and/or accelerometer information in the generated report. Referring to FIG. 5, the first UE 520 may generate the second report 562b based at least in part on the feedback 564b. The first UE 520 may generate the second report 562b by inserting all or a subset of the metric values indicated by the feedback 564b into the second report 562b. The first UE 520 may also determine the location of the first UE 520 (e.g., GPS coordinates) and/or determine the orientation of each of the antenna subarrays on the first UE 520. The first UE 520 may insert the location and/or the orientation information into the second report 562b.

At 708, the UE may transmit the report to a server. In an aspect, the report may include the at least a portion of the feedback from the base station. In an aspect, the report may include at least one of positioning information associated with the UE, gyroscope information associated with one or more antenna components of the UE, and accelerometer information associated with the UE. In an aspect, the UE may transmit the report to the server via a base station, such as a base station serving the UE. In an aspect, the UE may transmit the report via at least one mmW control channel or at least one low-frequency coexisting channel. For example, the UE may select or identify a channel that is to carry the report, such as a mmW control channel or a low-frequency coexisting channel, and the UE may transmit the report on the selected or identified channel. Referring to FIG. 5, the first UE 520 may transmit the second report 562b to the server 530. In an aspect, the first UE 520 may transmit the second report 562b to the server 530 via the first base station 502.

At 710, the UE may receive a mmW network map based on the transmitted report. In an aspect, the UE may receive the mmW network map from the server, for example, via a base station. In an aspect, the UE may receive the mmW network map from the server via a mmW control channel or a low-frequency coexisting channel. For example, the UE may identify a channel that is to carry the mmW network map, and the UE may receive (e.g., detect) the mmW network map on the identified channel. Referring to FIG. 5, the first UE 520 may receive the mmW network map 560 from the server 530 based on the transmitted second report 562b. In an aspect, the first UE 520 may receive the mmW network map 560 from the server 530 via the first base station 502.

At 712, the UE may communicate with the at least one base station over a mmW network based on the received mmW network map. The mmW network map may include information associated with one or more base stations and/or one or more UEs. For example, the UE may use the mmW network map for initial access during a RACH procedure and/or for beam search and/or beam training procedures. For example, the UE may identify, based on the mmW network map, an antenna configuration of the UE and/or an antenna configuration of the at least one base station. The UE may transmit or receive a message (e.g., a RACH message) based on the identified antenna configuration. Additionally or alternatively, the UE may identify, based on the mmW network map, a beam associated with the UE (e.g., a beam corresponding to a beam index at the UE) and/or a beam associated with the at least one base station (e.g., a beam corresponding to a beam index at the at least one base station). The UE may transmit or receive a message (e.g., RACH message) and/or signal (e.g., BRS) through the identified beam (e.g., a beam corresponding to a beam index).

Referring to FIG. 5, the first UE 520 may communicate with the first base station 502 over the mmW network based on the received mmW network map 560. In an aspect, the first UE 520 may move in a handoff to the second base station 504, and the first UE 520 may subsequently communicate with the second base station 504 using the mmW network map 560. For example, depending on where within the second cell 550 the first UE 520 is located, the first UE 520 may search for one or more beams previously indicated by the second base station 504 in a report to have good signal strength at the particular location within the second cell 550 in which the first UE 520 is located.

Figure 8:
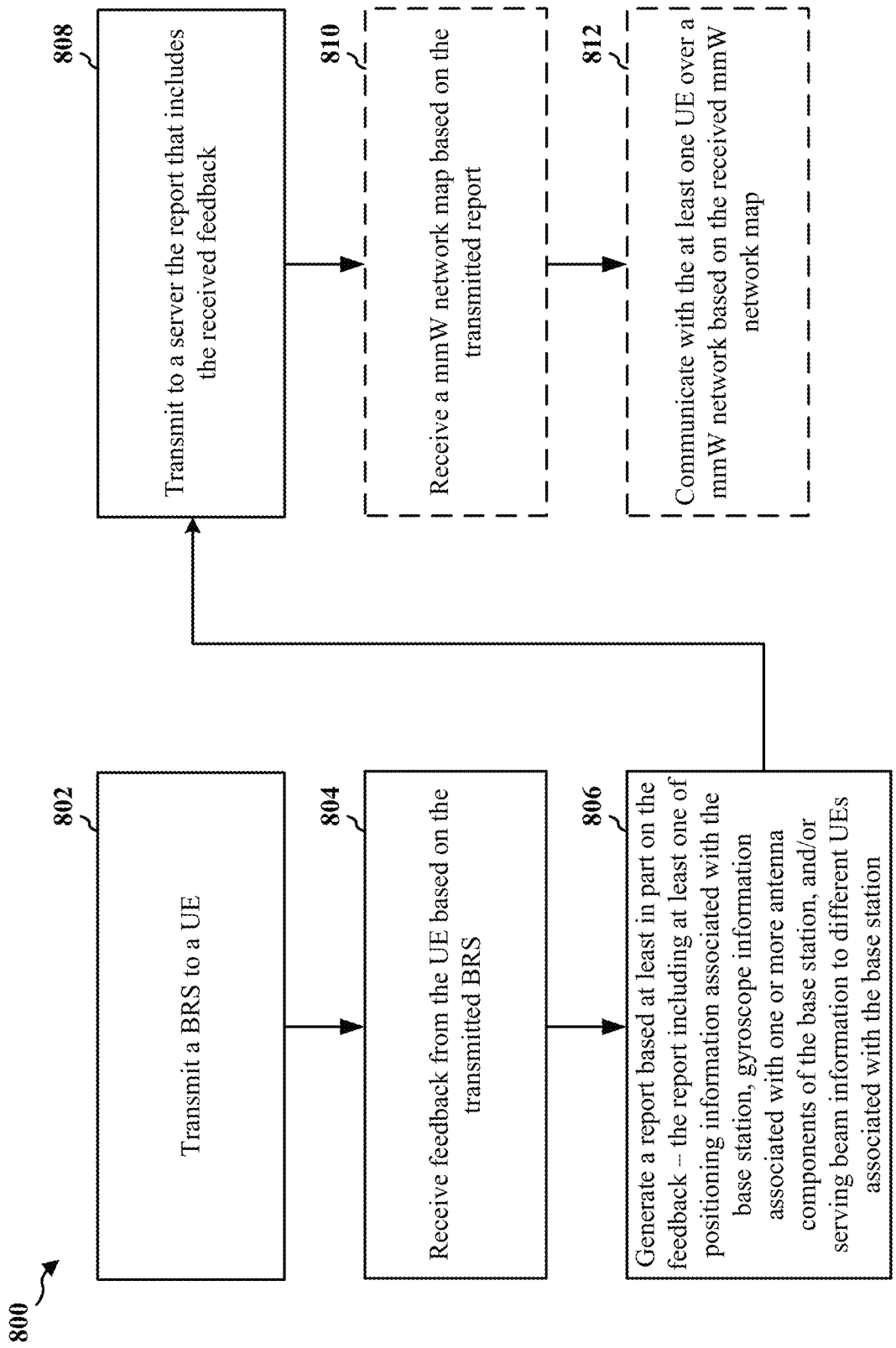
FIG. 8 is a flowchart of a method of wireless communication.

FIG. 8 is a flowchart 800 of a method of wireless communication. The method may be performed by a base station (e.g., the first base station 502, the second base station 504, the apparatus 1302/1302'). In various aspects, one or more operations may be omitted, transposed, and/or contemporaneously performed.

Beginning at operation 802, the base station may transmit a BRS to a UE. In an aspect, the base station may transmit a plurality of BRSs through a plurality of beams. For example, the base station may sweep through transmit beams of the base station, transmitting a respective BRS through each transmit beam of the base station through which the base station sweeps. Referring to FIG. 5, the UE may correspond to the first UE 520, and the base station may correspond to the first base station 502. The first base station 502 may transmit a BRS to the first UE 520. The first base station 502 may include one or more antenna components having one or more transmit beams, and the first base station 502 may sweep through those transmit beams by transmitting a BRS through each transmit beam (or a subset of transmit beams). An aspect of sweeping through directions may be illustrated with respect to FIG. 4. The base station 410 may transmit a beam for each direction of the m directions, and the base station 410 may transmit a BRS through each beam corresponding to the m directions.

At operation 804, the base station may receive feedback from the UE based on the transmitted BRS. For example, the base station may receive, from the UE, a message that includes feedback, and the base station may detect or identify one or more metric values in the feedback message, such as BSI, a beam index, B-RSRP, B-RSRQ, CQI, SNR, and/or another metric value measured by the UE based on one or more BRSs transmitted by the base station. Referring to FIG. 5, the first base station 502 may receive feedback 564a from the first base station 502 based on one or more transmitted BRSs. The feedback 564a may include BSI, a beam index, B-RSRP, B-RSRQ, CQI, and/or SNR measured by the first UE 520 based on the one or more BRSs.

At operation 806, the base station may generate a report based at least in part on the feedback. For example, the base station may generate a report, and the base station may include one or more metric values identified from the feedback from the UE in the generated report. In an aspect, the report may include at least one of positioning information associated with the base station, gyroscope information associated with one or more antenna components of the base station, and/or serving beam information corresponding to different UEs associated with the base station. For example, the base station may detect positioning information (e.g., based on GPS and/or GNSS) associated with the base station, gyroscope information associated with one or more antenna components of the base station, and/or serving beam information to different UEs associated with the base station. The base station may identify serving beam information for a respective UE associated with the base station as a beam corresponding to a beam index through which the base station transmits signals to and/or receives signals from the respective UE. The base station may include, in the generated report, one or more of the positioning information, gyroscope information, and/or serving beam information corresponding to different UEs associated with the base station.

Referring to FIG. 5, the first base station 502 may generate the first report 562a based at least in part on the feedback 564a. The first base station 502 may generate the first report 562a by inserting all or a subset of the metric values indicated by the feedback 564a into the first report 562a. The first base station 502 may also determine the location of the first base station 502 (e.g., GPS coordinates) and/or determine the orientation of each of the antenna arrays or subarrays on the first base station 502. The first base station 502 may identify serving beam information corresponding to the first UE 520, such as a serving beam through which the first base station 502 transmits signals to and/or receives signals from the first UE 520. The first base station 502 may insert the location, the orientation information, and/or the serving beam information into the first report 562a.

At operation 808, the base station may transmit the generated report to a server. In an aspect, the base station may transmit the report via at least one mmW control channel or at least one low-frequency coexisting channel. For example, the base station may select or identify a channel that is to carry the report, such as a mmW control channel or a low-frequency coexisting channel, and the base station may transmit the report on the selected or identified channel. Referring to FIG. 5, the first base station 502 may transmit the first report 562a to the server 530.

At operation 810, the base station may receive a mmW network map based on the transmitted report. In an aspect, the base station may receive the mmW network map from the server via a mmW control channel or a low-frequency coexisting channel. For example, the base station may identify a channel that is to carry the mmW network map, and the base station may receive (e.g., detect) the mmW network map on the identified channel. Referring to FIG. 5, the first base station 502 may receive the mmW network map 560 from the server 530 based on the transmitted first report 562a.

At operation 812, the base station may communicate with the at least one UE over a mmW network based on the received mmW network map. For example, the base station may perform an initial access procedure (e.g., initiated by the at least one UE) based on the mmW network map (e.g., the mmW network map may enable the base station to more reliably receive messages during a RACH procedure). In another aspect, the base station may perform beam search and/or beam training procedures with the at least one UE based on the mmW network map (e.g., the time required for beam training may be reduced based on array/subarray information indicated in the mmW network map). In another aspect, the base station may use the mmW network map for UE localization (e.g., determining a location of the at least one UE and/or determining a beam orientation of the at least one UE) and/or UE ranging (e.g., determining a distance between the at least one UE and another wireless system, such as another UE or base station). In another aspect, the base station may determine, based on the mmW network map, that the base station is to perform a beam refinement procedure for the at least one UE, for example, in order to achieve a higher data rate required by the at least one UE. In another aspect, the base station may access the mmW network map to improve performance and/or operation of the base station, including during handoff of the at least one UE to or from another base station. In another aspect, the base station may use the mmW network map for network operation diagnosis—e.g., the base station may access the mmW network map in order to diagnose any areas within the network with poor connectivity (e.g., areas or regions corresponding to metric values). Referring to FIG. 5, the first base station 502 may communicate with the first UE 520 over the mmW network based on the received mmW network map 560.

Figure 9:
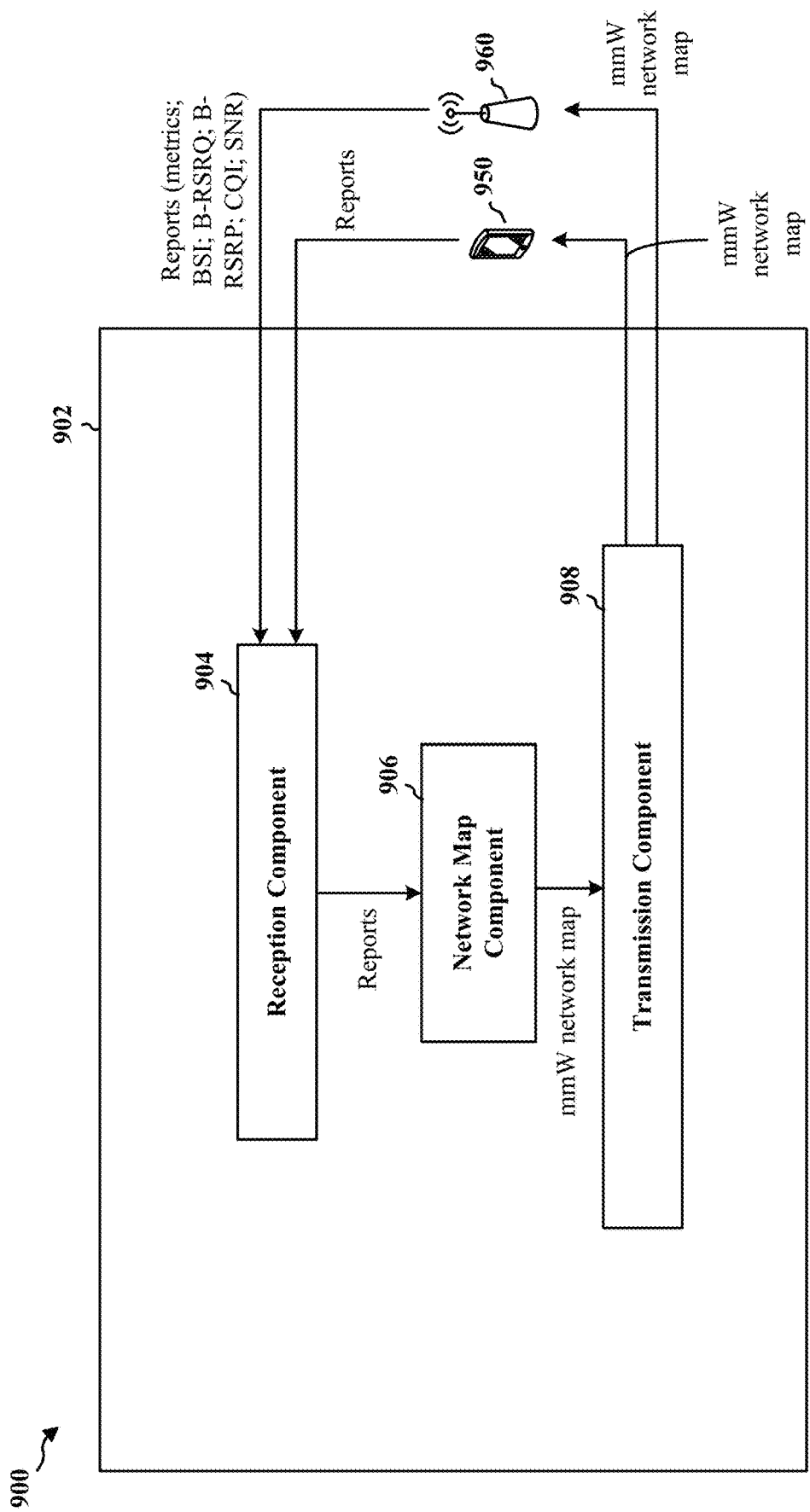
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus 902 may be a server. In one aspect, the apparatus 902 may be a cloud-based server. The apparatus 902 may include additional/other components and/or additional/other data flow. The apparatus includes a reception component 904, a network map component 906, and a transmission component 908.

The reception component 904 may be configured to receive signals from at least one base station 960 and/or at least one UE 950. The transmission component 908 may be configured to transmit signals to the at least one base station 960 and/or the at least one UE 950.

The reception component 904 may be configured to receive at least one of a first set of reports associated with the at least one UE 950. The reception component 904 may receive a first report of the first set of reports on a mmW control channel and/or a low-frequency coexisting channel. The first report of the first set of reports may include at least one of positioning information associated with the at least one UE 950, gyroscope information associated with one or more antenna components of the at least one UE 950, and accelerometer information associated with the at least one UE 950. In an aspect, the first report may include all or a portion of feedback received by the at least one UE 950 from the at least one base station 960 in association with one or more BRSs transmitted by the at least one UE 950, such as BSI, B-RSRP measurements, B-RSRQ measurements, CQI, SNR related to the one or more BRSs, and/or other metrics or values (e.g., a beam index).

The reception component 904 may be configured to receive at least one of a second set of reports associated with the at least one base station 960. The reception component 904 may receive a second report of the second set of reports on a mmW control channel and/or a low-frequency coexisting channel. The second report of the first set of reports may include at least one of positioning information associated with the at least one base station 960, gyroscope information associated with one or more antenna components of the at least one base station 960, and/or serving beam information corresponding to the at least one UE 950. In an aspect, the second report may include all or a portion of feedback received by the at least one base station 960 from the at least one UE 950 in association with one or more BRSs transmitted by the at least one base station 960, such as BSI, B-RSRP measurements, B-RSRQ measurements, CQI, SNR related to the one or more BRSs, and/or other metrics or values (e.g., a beam index).

The network map component 906 may be configured to generate a mmW network map based on the received first set of reports and/or the received second set of reports. For example, the network map component 906 may be configured to select, based on at least one report of the first set of reports and/or at least one report of the second set of reports, one or more UE antenna components associated with the at least one UE 950 for mmW communication (e.g., transmission or reception). In an aspect, the network map component 906 may be configured to select the one or more UE antenna components based on at least one of an SNR associated with the one or more UE antenna components, a blockage associated with the one or more UE antenna components, and/or an interference management objective (e.g., an objective to reduce interference experienced by the at least one UE 950 by selecting one or more antenna components associated with good metric values). The network map component 906 may be configured to generate the mmW network map to indicate the one or more UE antenna components.

The network map component 906 may further be configured to select, based on at least one report of the first set of reports and/or at least one report of the second set of reports, one or more base station antenna components associated with the at least one base station 960 for mmW communication (e.g., transmission or reception). In an aspect, the network map component 906 may be configured to select the one or more base station antenna components based on the one or more base station antenna components based on at least one of a SNR associated with the one or more base station antenna components, a blockage associated with the one or more base station antenna components, or the interference management objective (e.g., an objective to reduce interference experienced by the at least one base station 960 by selecting one or more antenna components associated with good metric values). The network map component 906 may be configured to generate the mmW network map to indicate the one or more base station antenna components.

The network map component 906 may provide the generated mmW network map to the transmission component 908. The transmission component 908 may be configured to transmit the mmW network map to the at least one UE 950 and/or to the at least one base station 960. In an aspect, the transmission component 908 may select or identify a channel that is to carry the mmW network map, such as a mmW control channel or a low-frequency channel (e.g., a coexisting channel having a lower frequency than the frequency associated with the mmW control channel). The transmission component 908 may transmit the mmW network map on the selected or identified channel.

The apparatus may include additional components that perform each of the blocks of the algorithm in the aforementioned flowcharts of FIG. 6. As such, each block in the aforementioned flowcharts of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 908, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908. The components may be software components running in the processor 1004, resident/stored in the computer readable medium/memory 1006, one or more hardware components coupled to the processor 1004, or some combination thereof. The processing system 1014 may be a component of the base station 310 and may include the memory 376 and/or at least one of the TX processor 316, the RX processor 370, and the controller/processor 375.

In one configuration, the apparatus 902/902' for wireless communication includes means for means for receiving at least one of a first set of reports associated with at least one UE and a second set of reports associated with at least one base station. A first report of the first set of reports may include at least one of positioning information associated with the at least one UE, gyroscope information associated with one or more antenna components of the at least one UE, and accelerometer information associated with the at least one UE. The apparatus 902/902' may include means for generating a mmW network map based on the received first and/or second set of reports. The apparatus 902/902' may include means for transmitting the mmW network map to the at least one UE or to the at least one base station.

In an aspect, the first report of the first set of reports may include a first set of metrics associated with a first BRS from the at least one UE, and a second report of the second set of reports may include a second set of metrics associated with a second BRS from the at least one base station. In another aspect, the first set of metrics may include at least one of BSI, beam RSRP or beam RSRQ measurements, CQI, and/or a SNR associated with the first BRS. In another aspect, the second set of metrics may include at least one of BSI, beam RSRP or beam RSRQ measurements, CQI, or a SNR associated with the second BRS. In another aspect, the second report may further include at least one of positioning information associated with the at least one base station, gyroscope information associated with one or more antenna components of the at least one base station, and serving beam information for one or more UEs served by the at least one base station.

In an aspect, the means for generating the mmW network map may be configured to select, based on the first and second set of reports, one or more UE antenna components for the at least one UE for mmW transmissions and to select, based on the first and second set of reports, one or more base station antenna components for the at least one base station for mmW transmissions. The mmW network map may indicate the one or more UE antenna components and the one or more base station antenna components. In another aspect, the one or more UE antenna components are selected based on at least one of a SNR associated with the one or more UE antenna components, a blockage associated with the one or more UE antenna components, and/or an interference management objective. The one or more base station antenna components may be selected based on at least one of a SNR associated with the one or more base station antenna components, a blockage associated with the one or more base station antenna components, and/or the interference management objective. In another aspect, the mmW network map may be transmitted via a mmW control channel or a low frequency channel.

The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means. In another configuration, the means may be another TX Processor, RX Processor, and/or controller processor.

Figure 11:
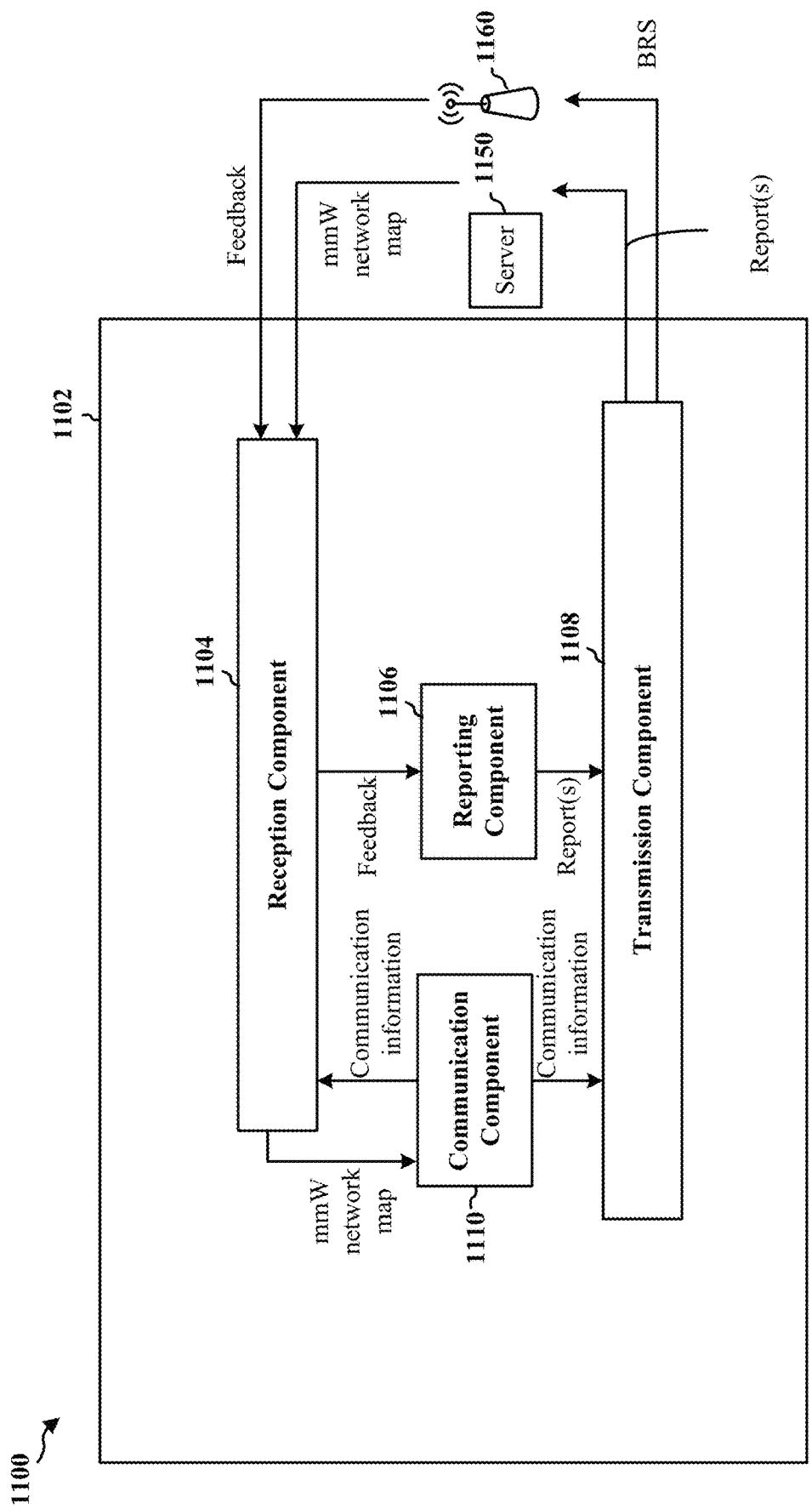
FIG. 11 is a conceptual data flow diagram illustrating the data flow between different means/components in an exemplary apparatus.

FIG. 11 is a conceptual data flow diagram 1100 illustrating the data flow between different means/components in an exemplary apparatus 1102. The apparatus 1102 may be a UE. The apparatus 1102 may include additional/other components and/or additional/other data flow. The apparatus includes a reception component 1104, a reporting component 1106, a transmission component 1108, and a communication component 1110.

The reception component 1104 may be configured to receive signals, for example, from a server 1150 and/or from a base station 1160. The transmission component 1108 may be configured to transmit signals, for example, to the server 1150 and/or to the base station 1160.

In an aspect, the reception component 1104 and/or the transmission component 1108 may include or may be communicatively coupled with one or more antenna components. The one or more antenna components may include one or more antenna subarrays, which may transmit a transmit beam and/or receive through a receive beam. Different antenna subarrays may be differently disposed on the apparatus 1102. In an aspect, the reception component 1104 and the transmission component 1108 may share the one or more antenna components.

The transmission component 1108 may be configured to transmit a BRS to a base station 1160. For example, the transmission component 1108 may be configured to sweep through a plurality of directions and transmit a BRS in each direction of the plurality of directions. Each direction may be associated with a respective beam, so the transmission component 1108 may transmit a respective BRS through a respective beam. At least one BRS may be received by the base station 1160.

The reception component 1104 may be configured to receive feedback from the base station 1160 based on at least one transmitted BRS. The feedback may include at least one of BSI, a B-RSRP, a BRSRQ, CQI, an SNR, or another metric value associated with at least one transmitted BRS. In an aspect, the feedback may include a beam index. The reception component 1104 may provide the feedback to the reporting component 1106.

The reporting component 1106 may be configured to generate a report based at least in part on the feedback. For example, the reporting component 1106 may be configured to generate a report that includes all or a subset of values indicated by feedback received from the base station 1160 (e.g., the generated report may include a beam index, a BSI, a B-RSRP, a B-RSRQ, CQI, an SNR, or another metric value).

In an aspect, the reporting component 1106 may be configured to configured to determine positioning information associated with the apparatus 1102, for example, based on GPS or GNSS information. For example, the reporting component 1106 may include or may be communicatively coupled with a GPS or GNSS component configured to detect a geographic location of the apparatus 1102. The reporting component 1106 may be configured to include the positioning information in the generated report.

In another aspect, the reporting component 1106 may be configured to determine gyroscope information associated with one or more antenna components of the apparatus 1102. For example, the reporting component 1106 may include or may be communicatively coupled with a gyroscope. The gyroscope may detect an orientation of the apparatus 1102, which may correspond to an orientation of the one or more antenna components. The reporting component 1106 may include gyroscope information in the generated report, for example, in order to indicate an orientation of the one or more antenna components.

In another aspect, the reporting component 1106 may be configured to determine accelerometer information associated with one or more antenna components of the apparatus 1102. For example, the reporting component 1106 may include or may be communicatively coupled with an accelerometer. The accelerometer may detect movement, acceleration, and/or deceleration of the apparatus 1102. The reporting component 1106 may include accelerometer information in the generated report, for example, in order to indicate movement of the apparatus 1102.

The transmission component 1108 may be configured to transmit, to the server 1150, the generated report. In an aspect, the generated report may include at least a portion of the feedback, such as a beam index, BSI, beam RSRP or beam RSRQ measurements, CQI, or an SNR associated with one or more transmitted BRSs (e.g., as measured by the base station 1160). The transmission component 1108 may be configured to select or identify a channel that is to carry the report, such as a mmW control channel or low-frequency coexisting channel. The transmission component 1108 may transmit, to the server 1150, the generated report on the selected or identified channel. In an aspect, the transmission component 1108 may transmit the generated report to the server 1150 via the base station 1160.

The reception component 1104 may be configured to receive, from the server 1150, a mmW network map based on the transmitted report. In an aspect, the reception component 1104 may identify a mmW control channel or low-frequency coexisting channel that is to carry the mmW network map, and the reception component 1104 may receive the mmW network map on the identified channel. In an aspect, the reception component 1104 may receive the mmW network map from the server 1150 via the base station 1160. The reception component 1104 may provide the mmW network map to the communication component 1110.

Based on the mmW network map, the communication component 1110 may be configured to communicate with the base station 1160. For example, the communication component 1110 may identify, based on the mmW network map, a first set of antenna components and/or beams associated with the apparatus 1102 and/or a second set of antenna components and/or beams associated with the base station 1160 for mmW communication (e.g., transmissions or receptions) between the apparatus 1102 and the base station 1160. The base station 1160 may be a serving base station or a target base station (e.g., associated with handoff of the apparatus 1102). The communication component 1110 may indicate at least one of the first set of antenna components or the second set of antenna components to the reception component 1104 and/or the transmission component 1108 for communication (e.g., transmission or reception) with the base station 1160.

In another aspect, the communication component 1110 may be configured to communicate with the base station 1160 over a mmW network based on the received mmW network map. For example, based on the mmW network map, the communication component 1110 may identify a transmit beam through which to transmit to the base station 1160 and/or the communication component 1110 may identify a receive beam through which to receive from the base station 1160. Similarly, based on the mmW network map, the communication component 1110 may identify a transmit beam through which the base station 1160 is to transmit and/or the communication component 1110 may identify a receive beam through which the base station 1160 is to receive. The communication component 1110 may indicate identified beams to the reception component 1104 and/or the transmission component 1108.

By way of example, the communication component 1110 may perform a RACH procedure with the base station 1160 using one or more antenna components and/or one or more beams identified based on the mmW network map.

The apparatus may include additional components that perform each of the blocks of the algorithm in the aforementioned flowcharts of FIG. 7. As such, each block in the aforementioned flowcharts of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110 and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1108, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110. The components may be software components running in the processor 1204, resident/stored in the computer readable medium/memory 1206, one or more hardware components coupled to the processor 1204, or some combination thereof.

The processing system 1214 may be a component of the UE 350 and may include the memory 360 and/or at least one of the TX processor 368, the RX processor 356, and the controller/processor 359.

In one configuration, the apparatus 1102/1102' for wireless communication includes means for means for transmitting a BRS to a base station. The apparatus 1102/1102' may include means for receiving feedback from the base station based on the transmitted BRS. The apparatus 1102/1102' may include means for generating a report based at least in part on the feedback. The report may include at least one of positioning information associated with the apparatus 1102/1102', gyroscope information associated with one or more antenna components of the apparatus 1102/1102', and accelerometer information associated with the apparatus 1102/1102'. The apparatus may include means for transmitting to a server the report that includes the received feedback. In an aspect, the feedback may include at least one of BSI, beam RSRP or beam RSRQ measurements, CQI, or an SNR associated with the BRS. In an aspect, the apparatus 1102/1102' may include means for receiving a mmW network map based on the transmitted report. In an aspect, the mmW network map may identify a first set of antenna components associated with the apparatus 1102/1102' and a second set of antenna components associated with at least one base station for mmW transmissions between the apparatus 1102/1102' and the at least one base station. The at least one base station may be a serving base station or a target base station. In an aspect, the apparatus 1102/1102' may include means for communicating with the at least one base station over a mmW network based on the received mmW network map.

The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
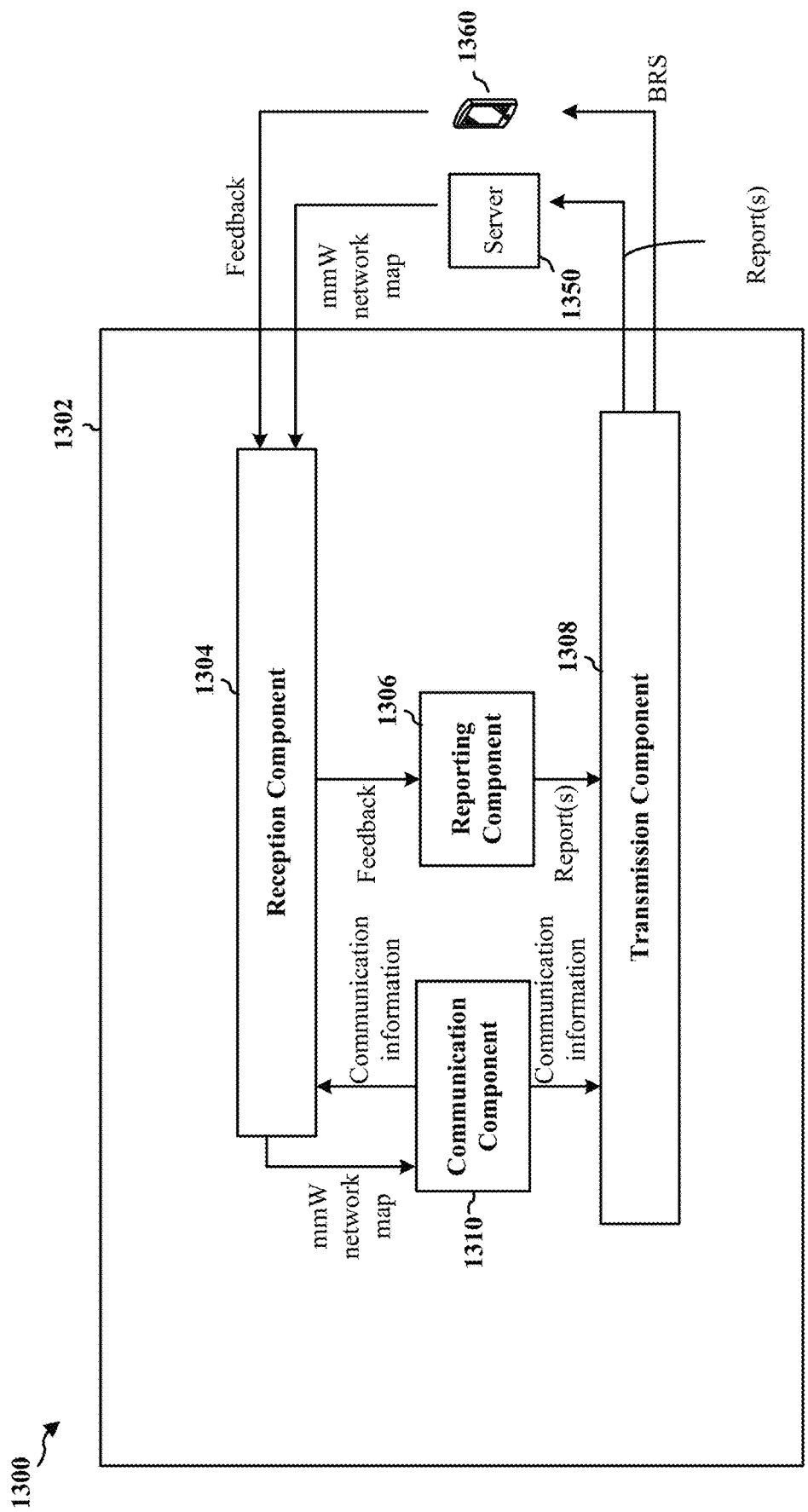
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus may be a base station. The apparatus 1302 may include additional/other components and/or additional/other data flow. The apparatus includes a reception component 1304, a reporting component 1306, a transmission component 1308, and a communication component 1310.

The reception component 1304 may be configured to receive signals, for example, from a server 1350 and/or from a UE 1360. The transmission component 1308 may be configured to transmit signals, for example, to the server 1350 and/or to the UE 1360.

In an aspect, the reception component 1304 and/or the transmission component 1308 may include or may be communicatively coupled with one or more antenna components. The one or more antenna components may include one or more antenna arrays or subarrays, which may transmit a transmit beam and/or receive through a receive beam. Different antenna arrays/subarrays may be differently disposed on the apparatus 1302. In an aspect, the reception component 1304 and the transmission component 1308 may share the one or more antenna components.

The transmission component 1308 may be configured to transmit a BRS to a UE 1360. For example, the transmission component 1308 may be configured to sweep through a plurality of directions and transmit a BRS in each direction of the plurality of directions. Each direction may be associated with a respective beam, so the transmission component 1308 may transmit a respective BRS through a respective beam. At least one BRS may be received by the UE 1360.

The reception component 1304 may be configured to receive feedback from the UE 1360 based on at least one transmitted BRS. The feedback may include at least one of BSI, a B-RSRP, a BRSRQ, CQI, an SNR, or another metric value associated with at least one transmitted BRS. In an aspect, the feedback may include a beam index. The reception component 1304 may provide the feedback to the reporting component 1306.

The reporting component 1306 may be configured to generate a report based at least in part on the feedback. For example, the reporting component 1306 may be configured to generate a report that includes all or a subset of values indicated by feedback received from the UE 1360 (e.g., the generated report may include a beam index, a BSI, a B-RSRP, a B-RSRQ, CQI, an SNR, or another metric value).

In an aspect, the reporting component 1306 may be configured to configured to determine positioning information associated with the apparatus 1302, for example, based on GPS or GNSS information. For example, the reporting component 1306 may include or may be communicatively coupled with a GPS or GNSS component configured to detect a geographic location of the apparatus 1302. The reporting component 1306 may be configured to include the positioning information in the generated report.

In another aspect, the reporting component 1306 may be configured to determine gyroscope information associated with one or more antenna components of the apparatus 1302. For example, the reporting component 1306 may include or may be communicatively coupled with a gyroscope. The gyroscope may detect an orientation of the apparatus 1302, which may correspond to an orientation of the one or more antenna components. The reporting component 1306 may include gyroscope information in the generated report, for example, in order to indicate an orientation of the one or more antenna components.

In another aspect, the reporting component 1306 may be configured to determine serving beam information corresponding to one or more UEs (e.g., the UE 1360) associated with the apparatus 1302. For example, that apparatus 1302 may serve the UE 1360 through a serving beam (e.g., a beam associated with the one or more antenna components). The reporting component 1306 may identify information associated with this serving beam, such as a beam index. The reporting component 1306 may include information associated with the serving beam in the report, such as a beam index and/or an indication of the UE 1360 being served by the serving beam.

The transmission component 1308 may be configured to transmit, to the server 1350, the generated report. In an aspect, the generated report may include at least a portion of the feedback, such as a beam index, BSI, beam RSRP or beam RSRQ measurements, CQI, or an SNR associated with one or more transmitted BRSs (e.g., as measured by the UE 1360). The transmission component 1308 may be configured to select or identify a channel that is to carry the report, such as a mmW control channel or low-frequency coexisting channel. The transmission component 1308 may transmit, to the server 1350, the generated report on the selected or identified channel.

The reception component 1304 may be configured to receive, from the server 1350, a mmW network map based on the transmitted report. In an aspect, the reception component 1304 may identify a mmW control channel or low-frequency coexisting channel that is to carry the mmW network map, and the reception component 1304 may receive the mmW network map on the identified channel. The reception component 1304 may provide the mmW network map to the communication component 1310.

Based on the mmW network map, the communication component 1310 may be configured to communicate with the UE 1360. For example, the communication component 1310 may identify, based on the mmW network map, a first set of antenna components and/or beams associated with the apparatus 1302 and/or a second set of antenna components and/or beams associated with the UE 1360 for mmW communication (e.g., transmissions or receptions) between the apparatus 1302 and the UE 1360. The communication component 1310 may indicate at least one of the first set of antenna components or the second set of antenna components to the reception component 1304 and/or the transmission component 1308 for communication (e.g., transmission or reception) with the UE 1360.

In another aspect, the communication component 1310 may be configured to communicate with the UE 1360 over a mmW network based on the received mmW network map. For example, based on the mmW network map, the communication component 1310 may identify a transmit beam through which to transmit to the UE 1360 and/or the communication component 1310 may identify a receive beam through which to receive from the UE 1360. Similarly, based on the mmW network map, the communication component 1310 may identify a transmit beam through which the UE 1360 is to transmit and/or the communication component 1310 may identify a receive beam through which the UE 1360 is to receive. The communication component 1310 may indicate identified beams to the reception component 1304 and/or the transmission component 1308.

By way of example, the communication component 1310 may perform a RACH procedure with the UE 1360 using one or more antenna components and/or one or more beams identified based on the mmW network map. In another aspect, the communication component 1310 may perform beam search and/or beam training procedures with the UE 1360 based on the mmW network map (e.g., the time required for beam training may be reduced based on array/subarray information indicated in the mmW network map). In another aspect, the communication component 1310 may use the mmW network map for UE localization (e.g., determining a location of the UE 1360 and/or determining a beam orientation of the UE 1360) and/or UE ranging (e.g., determining a distance between the UE 1360 and another wireless system, such as another UE or base station). In another aspect, the communication component 1310 may determine, based on the mmW network map, that the apparatus 1302 is to perform a beam refinement procedure for the UE 1360, for example, in order to achieve a higher data rate required by the UE 1360. In another aspect, the communication component 1310 may access the mmW network map to improve performance and/or operation of the apparatus 1302, including during handoff of the UE 1360 to or from another base station. In another aspect, the communication component 1310 may use the mmW network map for network operation diagnosis—e.g., the communication component 1310 may access the mmW network map in order to diagnose any areas within the network with poor connectivity (e.g., areas or regions corresponding to metric values).

The apparatus may include additional components that perform each of the blocks of the algorithm in the aforementioned flowcharts of FIG. 8. As such, each block in the aforementioned flowcharts of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310 and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1308, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310. The components may be software components running in the processor 1404, resident/stored in the computer readable medium/memory 1406, one or more hardware components coupled to the processor 1404, or some combination thereof. The processing system 1414 may be a component of the base station 310 and may include the memory 376 and/or at least one of the TX processor 316, the RX processor 370, and the controller/processor 375.

In one configuration, the apparatus 1302/1302' for wireless communication includes means for transmitting a BRS to a UE. The apparatus 1302/1302' may include means for receiving feedback from the UE based on the transmitted BRS. The apparatus 1302/1302' may include means for generating a report based at least in part on the feedback. The report may include at least one of positioning information associated with the apparatus 1302/1302', gyroscope information associated with one or more antenna components of the apparatus 1302/1302', and serving beam information to different UEs associated with the apparatus 1302/1302'. The apparatus 1302/1302' may include means for transmitting to a server the report that includes the received feedback. In an aspect, the feedback may include at least one of BSI, beam RSRP or beam RSRQ measurements, CQI, or an SNR associated with the BRS. In one configuration, the apparatus 1302/1302' may include means for receiving a mmW network map based on the transmitted report. In an aspect, the mmW network map may identify a first set of antenna components associated with the apparatus 1302/1302' and a second set of antenna components associated with at least one UE for mmW transmissions between the apparatus 1302/1302' and the at least one UE. In another configuration, the apparatus may include means for communicating with the at least one UE over a mmW network based on the received mmW network map.

The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 15:
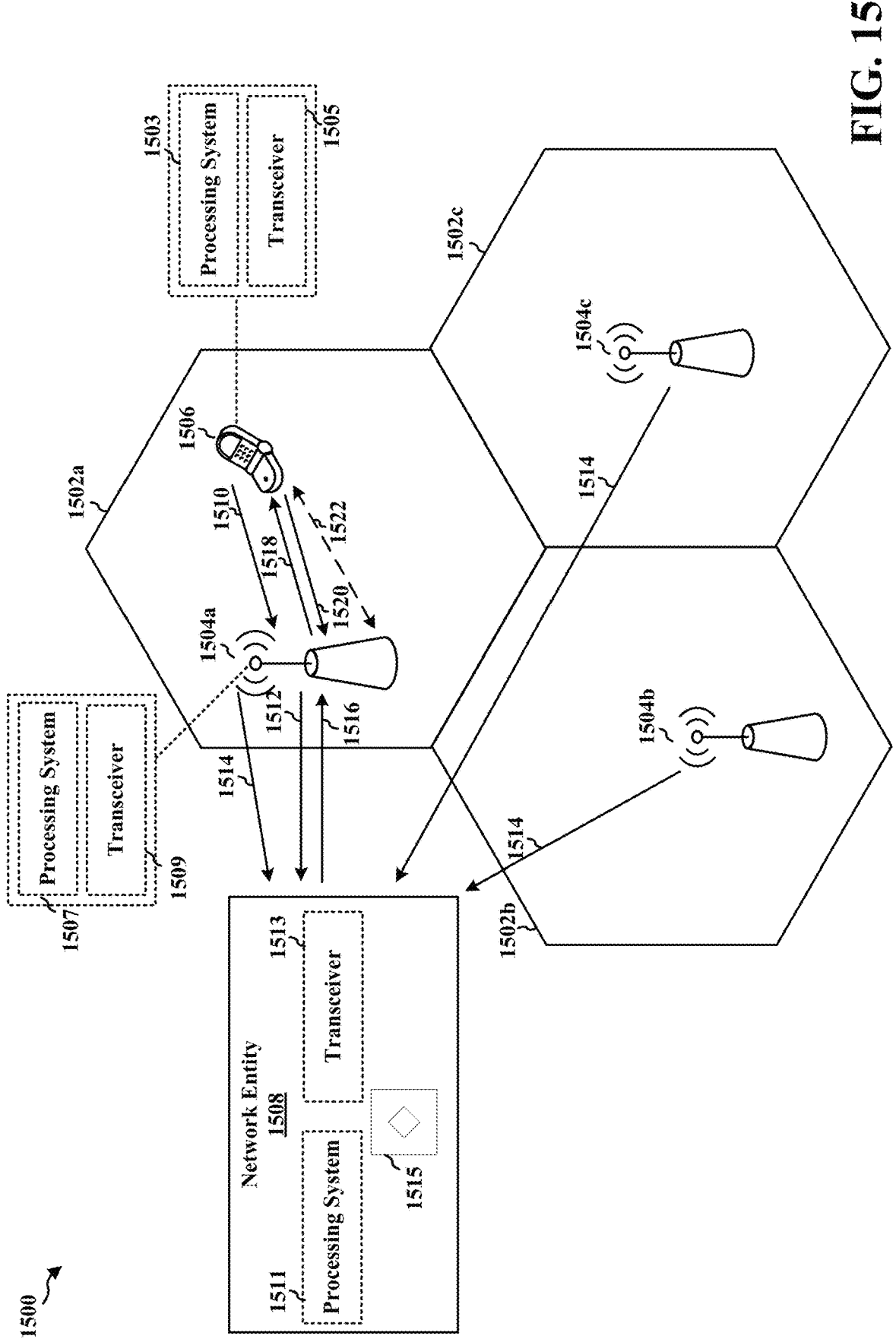
FIG. 15 is a diagram of a mmW communications system that provides a seeded base station codebook and UE codebook for use in a beamforming procedure.

FIG. 15 is a diagram of a wireless communications system 1500 that may enable a beamforming procedure, for example, in order to reduce the time commensurate with a beam scanning process and/or in order to improve performance gain. For example, the beamforming procedure may be performed based on information derived from a mmW cell geometry 1515 (a mmW cell geometry may also be known as a network map, such as the network map 560 illustrated with respect to FIG. 5). The beamforming procedure described with respect to FIG. 15 may decrease the time commensurate with determination of an access beam for use as a communication link between serving base station 1504a and UE 1506.

The wireless communications system 1500 illustrated in FIG. 15 may include, for example, a serving mmW cell 1502a provided by a serving base station 1504a. The serving base station 1504a may include at least a processing system 1507 (e.g., an aspect of the processing system 1914 of FIG. 19) and a transceiver 1509 (e.g., an aspect of the transceiver 1910 of FIG. 19). The wireless communications system 1500 may include a UE 1506. The UE 1506 may include at least a processing system 1503 (e.g., an aspect of the processing system 2214 of FIG. 22) and a transceiver 1505 (e.g., an aspect of the transceiver 2210 of FIG. 22).

In the wireless communications system 1500, the serving base station 1504a and the UE 1506 may communicate using an access beam. A determined or selected access beam may also be known as a serving beam. In various aspects, the serving base station 1504a and the UE 1506 may use a first access beam for downlink communication and a second access beam for uplink communication, and the first access beam may be different from the second access beam (although the first and second access beams may be the same access beam). In one aspect, an access beam may connote a beam orientation at the serving base station 1504a and a beam orientation at the UE 1506. The serving base station 1504*a* may perform a beamforming procedure (e.g., a beam refinement procedure) with the UE 1506, e.g., in order to determine or select an access beam. In one aspect, the beamforming procedure may be performed in order for the serving base station 1504*a* to select a beam orientation of the serving base station 1504*a* and in order for the UE 1506 to select a beam orientation of the UE 1506.

Further, the wireless communications system 1500 may include a first neighbor mmW cell 1502*b* provided by a first neighbor base station 1504*b*, and a second neighbor mmW cell 1502*c* provided by a second neighbor base station 1504*c*. In an aspect, one or more of the serving base station 1504*a*, the first neighbor base station 1504*b*, and/or second neighbor base station 1504*c* may be a mmW base station.

Further, the wireless communications system 1500 may include a network entity 1508 (e.g., a cloud-based server) that is in communication with one or more of the serving base station 1504*a*, the first neighbor base station 1504*b*, the second neighbor base station 1504*c*, and/or the UE 1506. In one aspect, the network entity 1508 may be connected to one or more of the serving base station 1504*a*, the first neighbor base station 1504*b*, and/or the second neighbor base station 1504*c* via a wired connection (e.g., fiber connection, digital subscriber line (DSL), or other high-capacity link). Additionally and/or alternatively, one or more of the serving base station 1504*a*, the first neighbor base station 1504*b*, or the second neighbor base station may be connected to the network entity 1508 via a wireless connection (e.g., using one of the multi-access technologies discussed supra). The network entity 1508 may include a processing system 1511 (e.g., an aspect of the processing system 2514 of FIG. 24) and a transceiver 1513 (e.g., an aspect of the transceiver 2510 of FIG. 25).

In an aspect, the serving base station 1504*a* (using the transceiver 1509) and/or the UE 1506 (using the transceiver 1505) may transmit one or more BRSs. A BRS may include a symbol sequence that is known by both the serving base station 1504*a* and the UE 1506. For example, the serving base station 1504*a* may transmit a BRS along a directional beam with a known symbol sequence and the UE 1506 may test for the same known symbol sequence along certain other sets of directional beams. The UE 1506 may detect different combinations of beams (e.g., beam pairs, in which a first beam corresponds to the serving base station 1504*a* and a second beam corresponds to the UE 1506). The processing system 1503 of the UE 1506 may determine one or more metric values (e.g., B-RSRP, B-RSRQ, CQI, SNR, etc.) associated with different combinations of beams and compare the metric values to one another in order to determine a "best" combination of beams for communication between the serving base station 1504*a* and the UE 1506. By determining which combination of beams works best at both the serving base station 1504*a* and the UE 1506, the processing system 1503 of the UE 1506 may determine the best choice of beams that may subsequently be used as an access beam. In addition, the processing system 1503 of the UE 1506 may use the BRS to estimate the strength of a certain beam direction at the UE 1506, for example, based on an RSRP and/or RSRQ measurement.

By testing multiple beam directions at both the serving base station 1504*a* and the UE 1506, the processing system 1503 of the UE 1506 may determine the best direction (e.g., beam orientation) the serving base station 1504*a* may use as an access beam (or serving beam). For example, the processing system 1503 of the UE 1506 may select a beam corresponding to a highest or best metric value.

In a further aspect, the transceiver 1505 of the UE 1506 may convey information associated with the best choice of beams (e.g., one or more beams having the best or highest metric values) to the serving base station 1504*a* using, for example, a RACH signal. In an additional aspect, the RACH signal may be a sequence of resources that are periodically transmitted on the uplink by the transceiver 1505 of the UE 1506 using a predetermined beam at a particular time. When the processing system 1507 of the serving base station 1504*a* decodes the RACH signal, the processing system 1507 of the serving base station 1504*a* may be able to determine which beams may be used as an access beam for subsequent communication with the UE 1506 (e.g., one or more beams having the best or highest metric values).

In an aspect, the processing system 1503 of the UE 1506 may determine UE metric information that includes one or more of location information (e.g., GPS or GNSS information) associated with the UE 1506, gyroscope information associated with the UE 1506, and/or accelerometer information associated with the UE 1506. In another aspect, the UE metric information may be associated with a BRS. For example, the UE metric information may include one or more of a B-RSRP, B-RSRQ, CQI, SNR, BSI or other information measured by the processing system 1503 of the UE 1506 based on one or more BRSs transmitted by the serving base station 1504*a*. In an aspect, the transceiver 1505 of the UE 1506 may transmit the metric information 1510 to serving base station 1504*a*.

In addition, the processing system 1507 of the serving base station 1504*a* may determine base station metric information that is associated with one or more BRSs. For example, the transceiver 1505 of the UE 1506 may transmit one or more BRSs along one or more beams, and the transceiver 1509 of the serving base station 1504*a* may detect the one or more BRSs. The processing system 1507 of the serving base station 1504*a* may determine one or more metric values (e.g., B-RSRP, B-RSRQ, CQI, SNR, etc.) associated with one or more BRSs received along one or more beams. The processing system 1507 of the serving base station 1504*a* may determine base station metric information that is associated with one or more beam orientations, such as one or more beam orientations corresponding to the best (e.g., highest) metric values (e.g., B-RSRP, B-RSRQ, CQI, SNR, etc.) based on one or more BRSs. In another aspect, the processing system 1507 of the serving base station 1504*a* may determine base station metric information that includes location information associated with the serving base station 1504*a* (e.g., GPS and/or GNSS information), such as where the serving base station 1504*a* is geographically disposed. Alternatively or additionally, the processing system 1507 of the serving base station 1504*a* may determine metric information to include information associated with one or more antenna arrays or subarrays of the serving base station 1504*a*, such as where the arrays or subarrays are disposed or oriented on the serving base station 1504*a*.

The transceiver 1509 of the serving base station 1504*a* may transmit one or more data packets 1512 that include the base station metric information and/or the UE metric information to the network entity 1508. The processing system 1511 of the network entity 1508 may use the information included in the data packet(s) 1512 to determine the geometry 1515 of serving mmW cell 1502*a*. In an aspect, the processing system 1511 of the network entity 1508 may determine the geometry 1515 of the serving mmW cell 1502a using the base station metric information associated with serving base station 1504a, the UE metric information associated with UE 1506, UE metric information association with other UEs, or any combination thereof. For example, the processing system 1511 of the network entity 1508 may determine the geometry 1515 of the serving mmW cell 1502a to include one or more of the location of the serving base station 1504a in relation to one or more (e.g., all) UEs in the serving cell 1502a, a direction in which one or more (e.g., all) UEs are traveling, a speed with which one or more (e.g., all) UEs are traveling, reflective objects and/or surfaces in the serving cell 1502a, and/or objects that may obscure and/or block a line-of-sight path between the serving base station 1504a and one or more of the UEs in the serving cell 1502a.

In one aspect, the processing system 1511 of the network entity 1508 may determine an accuracy of the location information associated with UE 1506 that is included in the data packet 1512. In an aspect, the processing system 1511 of the network entity 1508 may determine the accuracy of the location information by determining triangulation information of the UE 1506 based at least in part on location information 1514 obtained from a plurality of base stations 1504a, 1504b, 1504c, and comparing the location information 1514 in the data packet 1512 with the determined triangulation information. In another aspect, the processing system 1511 of the network entity 1508 may determine triangulation information of the UE 1506 based at least in part on location information 1514 obtained from a plurality of base stations 1504a, 1504b, 1504c when the data packet 1512 does not include GPS and/or GNSS location information.

Although three base stations are illustrated in FIG. 15 as transmitting location information 1514 to network entity 1508, location information from more or fewer than three base stations may be used in determining an accuracy location information without departing from the scope of the present disclosure.

In another aspect, the processing system 1511 of the network entity 1508 may determine if the location information 1514 included in the data packet 1512 meets a threshold criteria. When the location information 1514 does not meet the threshold criteria, the processing system 1511 of the network entity 1508 may determine new location information. For example, the determined new location information may be based on the triangulation information.

In another aspect, the processing system 1511 of the network entity 1508 may determine a geometry 1515 of serving mmW cell 1502a based on the base station metric information, the UE metric information, the metric information of additional UEs, or any combination thereof. In a first aspect, the geometry 1515 of the serving mmW cell 1502a may be determined, by the processing system 1511 of the network entity 1508, based at least in part using the new location information (e.g., triangulation information) when the accuracy of the location information 1514 included in the data packet 1512 does not meet the threshold criteria. In another aspect, the geometry 1515 of the serving mmW cell 1502a may be determined, by the processing system 1511 of the network entity 1508, based at least in part using the location information 1514 included in the data packet 1512 when the accuracy of the location information 1514 included in the data packet 1512 meets the threshold criteria.

In various aspects, the processing system 1511 of the network entity 1508 may determine a first subset of beam orientations for a base station codebook and a second subset of beam orientations for a UE codebook, which may be used as possible access beams based on the determined geometry 1515 of the serving mmW cell 1502a. That is, the processing system 1511 of the network entity 1508 may seed the base station codebook and/or seed the UE codebook to limit the number of beams that need to be scanned during the beamforming procedure or beam scanning process.

In various aspects, a codebook may include information indicating beamforming vectors, as well as techniques for combining beamforming vectors, such as for beam steering and beam selection (e.g., based on a beam index). In an aspect, the base station codebook may be a narrow beam codebook that includes a list of possible base station beam orientations that may be scanned during the beamforming procedure. The UE codebook may be a directional codebook that includes a list of possible UE beams (e.g., grouped according to UE antenna subarray) that may be scanned during the beamforming procedure. Additional details with respect to the seeded base station and UE codebooks are discussed infra, e.g., with respect to FIG. 16A.

Still referring to FIG. 15, based on the number of beams in the first subset of beam orientations and the number of beams in the second subset of beam orientations, the processing system 1511 of the network entity 1508 may determine a subframe structure to be used by the serving base station 1504a and the UE 1506 during the beam forming procedure. Additional details with respect to the determined subframe structure are discussed infra, e.g., with respect to FIG. 16B.

With further reference to FIG. 15, the first subset of beam orientations, the second subset of beam orientations, and the subframe structure may be used by the serving base station 1504a and/or the UE 1506 to determine an access beam. The transceiver 1513 of the network entity 1508 may transmit information 1516 associated with the first subset of beam orientations, the second subset of beam orientations, and/or the subframe structure to the serving base station 1504a and/or the UE 1506.

In another aspect, the processing system 1511 of the network entity 1508 may determine if one or more of the possible access beams (e.g., used by the serving base station 1504a and the UE 1506) may cause interference with a second access beam used for communications between the serving base station 1504a and a different UE (e.g., another UE operating on the cell 1502a provided by the serving base station 1504a). When the processing system 1511 of the network entity 1508 determines that one or more of the possible access beams may cause interference, the processing system 1511 of the network entity 1508 may prioritize the information associated with the first subset of beam orientations and/or the second subset of beam orientations such that the access beam determined for use in communications between the serving base station 1504a and the UE 1506 will cause the least amount of interference (e.g., to communications between the serving base station 1504a and the different UE). For example, the processing system 1511 of the network entity 1508 may associate a respective first priority with each beam orientation of the first subset of beam orientations and/or associate a respective second priority with each beam orientation of the second subset of beam orientations. A higher associated priority may indicate to the serving base station 1504a and/or the UE 1506 a preference for that beam orientation instead of a beam orientation associated with a lower priority—e.g., so that the serving base station 1504a and/or the UE 1506 may select the beam orientation having the higher associated priority. The processing system 1511 of the network entity 1508 may indicate, in the information 1516 transmitted to the serving base station 1504a, the priority of the access beams.

The transceiver 1509 of the serving base station 1504a may receive the information 1516 from the network entity 1508. The transceiver 1509 of the serving base station 1504a may transmit information 1518 associated at least one of the first subset of beam orientations, the second subset of beam orientations, and the subframe structure to the UE 1506. The information 1518 may include all or a portion of the information 1516 received by the serving base station 1504a from the network entity 1508.

The processing system 1507 of the serving base station 1504a and the processing system 1503 of the UE 1506 may determine all possible access beams based on the first subset of beam orientations in the base station codebook and/or the second subset of beam orientations in the UE codebook by: (i) applying each beam orientation in the first subset of beam orientations to one beam orientation in the second subset of beam orientations during a contiguous symbol block in the subframe structure indicated by the network entity 1508, and (ii) repeating (i) over different contiguous symbol blocks in the subframe structure until all possible access beams are determined (e.g., as described with respect to FIG. 16B). Because the first subset of beam orientations and the second subset of beam orientations may not include all possible beam orientations, the processing system 1507 of the serving base station 1504a and the processing system 1503 of the UE 1506 may refrain from scanning all possible beam orientations, but instead scan those indicated by the first subset of beam orientations and/or the second set of beam orientations.

In one aspect, the processing system 1507 of the serving base station 1504a and the processing system 1503 of the UE 1506 may perform a beam refinement procedure or beam scanning procedure based on the information 1516, 1518, for example, in order to determine an access beam. For example, the processing system 1507 of the serving base station 1504a may apply each beam orientation in the first subset of beam orientations to one beam orientation in the second subset of beam orientations during a contiguous symbol block in the subframe structure by causing the transceiver 1509 to transmit a respective reference signal (e.g., BRS or beam refinement reference signal (BRRS)) along each beam orientation of the first subset of beam orientations. The processing system 1507 of the serving base station 1504a may cause the transceiver 1509 to signal a configuration (e.g., symbol sequence) of the reference signal (e.g., BRS or BRRS) to the UE 1506, for example, via DCI.

The transceiver 1505 of the UE 1506 may receive a reference signal (e.g., BRS or BRRS) and the processing system 1503 of the UE 1506 may measure a respective metric value (e.g., RSRP, RSRQ, RF energy level, etc.) for each reference signal received along each possible access beam (e.g., a beam orientation pair of one beam orientation of the first subset of beam orientations and one beam orientation of the second subset of beam orientations). When a metric value associated with the one of the possible access beams meets a threshold criteria, such as an RF energy level, RSRP value, or RSRQ value, then the processing system 1503 of the UE 1506 may determine the access beam corresponding to that beam orientation pair. For example, the processing system 1503 of the UE 1506 may measure an RSRP, RSRQ, or RF energy level associated with each BRS or BRRS received along each possible access beam. The processing system 1503 of the UE 1506 may identify a beam index corresponding to an access beam 1522 when the measured RSRP, RSRQ, or RF energy level measured for the access beam 1522 satisfies a threshold or exceeds other respective RSRP, RSRQ, or RF energy levels measured for other respective possible access beams.

In an aspect, the transceiver 1505 of the UE 1506 may transmit information 1520 indicating the beam index corresponding to the access beam 1522 and/or indicating the metric value (e.g., RSRP, RSRQ, or RF energy level, etc.) measured for the access beam 1522. Accordingly, the processing system 1507 of the serving base station 1504a may determine an access beam 1522 for use in wireless communications when information 1520 related to the reference signal measurement (e.g., BRS or BRRS measurement) is received from the UE 1506. In an aspect, the transceiver 1505 of the UE 1506 may transmit the information 1520 to the serving base station 1504a using a RACH signal (e.g., RACH subframe). Once an access beam 1522 is selected from all of the possible access beams, the serving base station 1504a and the UE 1506 may communicate using the access beam 1522.

Figure 16A:
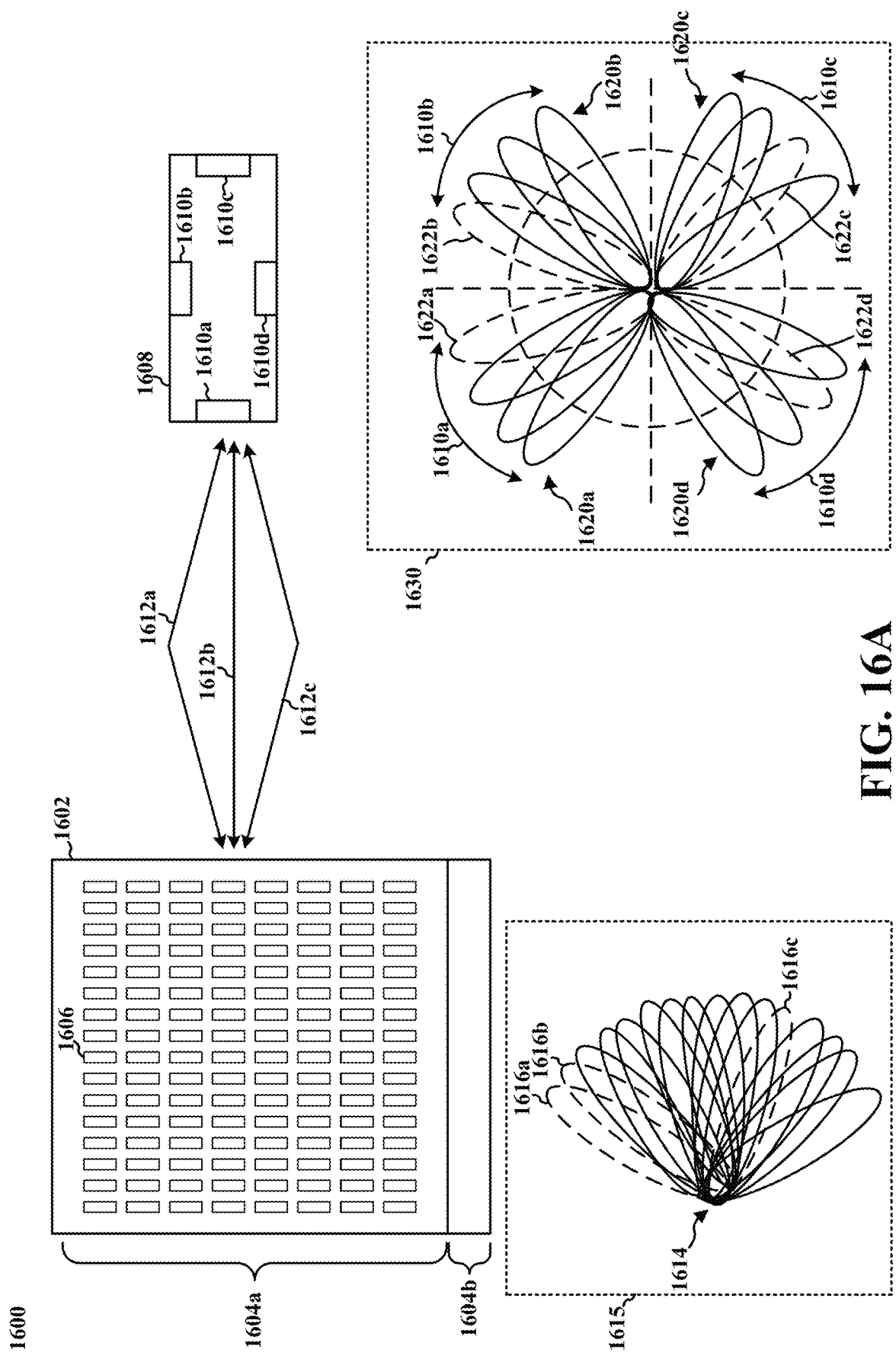
FIG. 16A is a diagram of an mmW communications system in which a serving base station and a UE perform a beamforming procedure by scanning possible beams in the seeded base station and UE.

FIG. 16A illustrates a wireless communications system 1600 in which a serving base station 1602 and a UE 1608 perform a beamforming procedure by scanning three possible access beams 1612a, 1612b, 1612c. The beamforming procedure illustrated in FIG. 16A may be performed using a seeded base station codebook 1615 and a seeded UE codebook 1630. In an aspect, the base station 1602 may be an mmW base station. In various aspects, a possible access beam of the access beams 1612a, 1612b, 1612c may be a beam along a beam orientation 1614 of the base station 1602 and a beam along a beam orientation 1620a, 1620b, 1620c, 1620d of the UE 1608. For example, the base station 1602 and the UE 1608 may communicate (e.g., uplink communication and/or downlink communication) along a first access beam 1612a that is a pair of a first beam orientation 1616a at the base station and a first beam orientation 1622a at the UE 1608. Illustratively, the base station 1602 may transmit signals along the first beam orientation 1616a and the UE 1608 may receive those signals along the first beam orientation 1622a. In another example, the UE 1608 may transmit signals along a second beam orientation 1616b and the base station 1602 may receive those signals along a second beam orientation 1616b.

In various aspects, the base station 1602 may be an aspect of the serving base station 1504a and the UE 1608 may be an aspect of the UE 1506 of FIG. 15. For example, the transceiver 1509 of the base station 1504a may be coupled with circuitry 1604b to drive the antenna array 1604a, e.g., based on instructions provided by the processing system 1507. The transceiver 1505 of the UE 1506 may be coupled with the antenna subarrays 1610a-d, for example, in order to communicate based on instructions provided by the processing system 1503. In aspects, the network entity 1508 may send the base station codebook 1615 and the UE codebook 1630 to the base station 1504a and the UE 1506, for example, as information 1516. Further to an example, the base station 1504a may provide at least the UE codebook 1630 to the UE 1506 as information 1518.

In aspects, the serving base station 1602 includes an antenna array 1604a and circuitry 1604b that is used to drive the antenna array 1604a. In the particular example illustrated in FIG. 16A, the antenna array 1604a includes 128 individual antennas 1606 arranged into 16 columns and 8 rows—e.g., 16 antennas 1606 in the azimuth and 8 antennas 1606 in the elevation (or altitude). The number of antennas 1606, columns, and/or rows illustrated in the base station antenna array 1604a in FIG. 16A is not intended to be limiting. For example, more or fewer antennas 1606, columns, and/or rows may be included in the base station antenna array 1604a without departing from the scope of the present disclosure (e.g., 32 rows and 4 columns, which may be narrower in the azimuth but wider in the elevation). In addition, each of the antennas 1606 illustrated in FIG. 16A may provide a beam width, for example, in an azimuth of approximately 6°-7° and in an elevation of approximately 12°.

Still referring to FIG. 16A, the UE 1608 may include a first UE subarray 1610a, a second UE subarray 1610b, a third subarray 1610c, and a fourth subarray 1610d. Depending on how the user is holding the UE 1608 and/or the environment, one or more of the subarrays 1610a, 1610b, 1610c, 1610d may be covered by the user's hand and/or occluded by an obstacle. Location information, accelerometer information, and/or gyroscope information, discussed supra with respect to FIG. 15, may indicate which (if any) of the subarrays are covered by the user's hand, blocked by obstacles, and/or how subarrays 1610a, 1610b, 1610c, 1610d are oriented. If one of the subarrays 1610a, 1610b, 1610c, 1610d is blocked or oriented in such a way as to occlude a beam path, certain beams associated with that subarray may be excluded from the seeded UE codebook 1630.

In aspects, the processing system 1511 of the network entity 1508 may seed the base station codebook 1615 and the UE codebook 1630, for example, based on the determined mmW cell geometry 1515 and/or metric information (e.g., included in data packets 1512, which may include RSRPs, RSRQs, or RF energy levels associated with BRSs and/or BRRSs received along possible access beams at the base station 1504a and the UE 1506). In aspects, using mmW cell geometry 1515 and/or metric information, the processing system 1511 of the network entity 1508 in FIG. 15 may determine that a subset of beam orientations for the base station codebook 1615 and the UE codebook 1630. For example, out of the set of sixteen beam orientations 1614 in the base station codebook 1615, a subset of three beam orientations 1616a, 1616b, and 1616c may be preferably used during the beamforming procedure or beam scanning process. Accordingly, the processing system 1511 of the network entity 1508 may seed the base station codebook 1615 with information indicating the subset of three beam orientations 1616a, 1616b, and 1616c.

Further to such an example, using the determined mmW cell geometry 1515 and/or metric information, the processing system 1511 of the network entity 1508 in FIG. 15 may determine that each of beam orientations 1622a, 1622b, 1622c, 1622d selected from each group of beam orientations associated with one of the UE subarrays 1610a, 1610b, 1610c, 1610d may be preferably used during the beamforming procedure or beam scanning process. Accordingly, the processing system 1511 of the network entity 1508 may seed the UE codebook 1630 with information indicating the beam orientations 1622a, 1622b, 1622c, 1622d respectively corresponding to the UE subarrays 1610a, 1610b, 1610c, 1610d.

Based on the number of beams in the first subset of beam orientations and the number of beams in the second subset of beam orientations, the processing system 1511 of the network entity 1508 may determine a subframe structure to be used by the serving base station 1602 and the UE 1608 during the beam forming procedure. The subframe structure associated with the example illustrated in FIG. 16A may be discussed infra with respect to FIG. 16B.

Figure 16B:
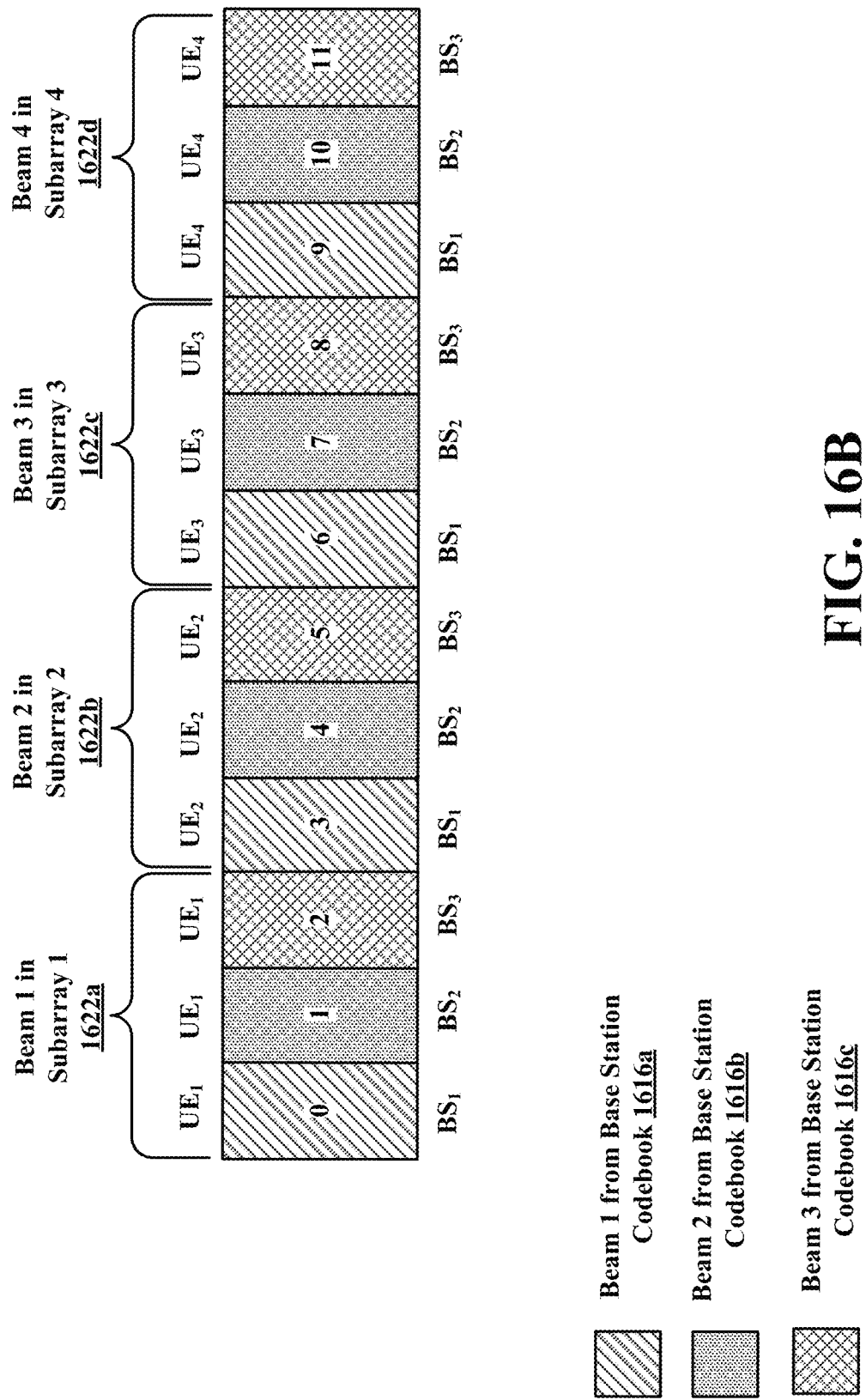
FIG. 16B is a diagram of an exemplary subframe structure for use in a beamforming procedure in accordance with certain aspects of the disclosure.

FIG. 16B illustrates an exemplary subframe structure 1645 that the processing system 1511 of the network entity 1508 may determine based on the subset of beam orientations 1616a, 1616b, 1616c in the base station codebook 1615 and the subset of beam orientations 1622a, 1622b, 1622c, 1622d in the UE codebook 1630 discussed supra with respect to FIG. 16A. For example, the subframe structure 1645 of FIG. 16B includes twelve symbols (e.g., 0, 1, 2, 3, 4, 5, 6, 7, 8, 9, 10, 11). Each of the twelve symbols in FIG. 16B may be used to scan one of the twelve possible access beams in the example of FIG. 16A. According to aspects, the processing system 1511 of the network entity may assign a symbol to each beam orientation pair (e.g., a beam orientation pair may include a beam orientation 1616a, 1616b, 1616c of the base station 1602 paired with a beam orientation 1622a, 1622b, 1622c, 1622d of the UE 1608). Accordingly, each possible beam orientation pair may be scanned at an assigned symbol.

In one aspect, each of the seeded beam orientations in the base station codebook 1615 may be applied to one of the seeded beam orientations in the UE codebook 1630 during a contiguous symbol block in the subframe structure 1645. For example for symbols 0, 1, and 2, respectively, each of the beam orientations 1616a, 1616b, 1616c from the base station codebook 1615 are applied to a beam orientation 1622a associated with the first UE subarray 1610a and indicated by the UE codebook 1630. Similarly for symbols 3, 4, and 5, respectively, each of the beam orientations 1616a, 1616b, 1616c from the base station codebook 1615 are applied to beam orientation 1622b associated with the second UE subarray 1610b and indicated by the UE codebook 1630. Further, for symbols 6, 7, and 8, respectively, each of the beam orientations 1616a, 1616b, 1616c from the base station codebook 1615 are applied to the beam orientation 1622c associated with the third subarray 1610c and indicated by the UE codebook 1630. Still further, for symbols 9, 10, and 11, respectively, each of the beam orientations 1616a, 1616b, 1616c from the base station codebook 1615 are applied to the beam orientation 1622d associated with the fourth subarray 1610d and indicated by the UE codebook 1630.

That is, each of the seeded beam orientations in the base station codebook 1615 may be scanned across each one of the directional beam orientations in the UE codebook 1630 to determine all of the possible access beams. In order to scan the possible access beams, at least one of the base station 1602 and/or the UE 1608 may transmit a signal (e.g., BRS or BRRS) in the assigned symbol for each beam orientation pair. The other one of the base station 1602 and/or the UE 1608 may receive the signal (e.g., BRS and/or BRRS) and measure a value indicating quality (e.g., RSRP, RSQP, RF energy, etc.). The beam orientation pair having a highest or best measured value may be selected as a serving beam.

In the example illustrated in FIGS. 16A and 16B, there are twelve possible access beams (e.g., (3 beams at the base station 1602)×(4 directional beams at the UE 1608)=12 possible access beams). Thus, a possible access beam may be a directional beam along one of the directional beam orientations 1614 by the base station 1602 and a directional beam along one of the directional beam orientations 1620a, 1620b, 1620c, 1620d by the UE 1608.

An access beam from the twelve possible access beams may be scanned using one of the twelve symbols in the subframe structure 1645 illustrated in FIG. 16B. Without seeding the base station codebook 1615 and the UE codebook 1630, the number of possible access beams that would be scanned during the beamforming procedure of FIGS. 16A and 16B would be 256 (e.g., (16 beams at the base station)×

(16 directional beams at the UE)=256 possible access beams). In other words, using the beamforming procedure of the present disclosure, an appreciably fewer number of possible access beams may be scanned than if the conventional narrow beam scanning processes were used. In addition, the peak beamforming gain of the present beamforming procedure may not suffer because narrow beam codebooks are used (e.g., narrow beams may allow for better beamforming gain compared to wide beams).

Figure 17A:
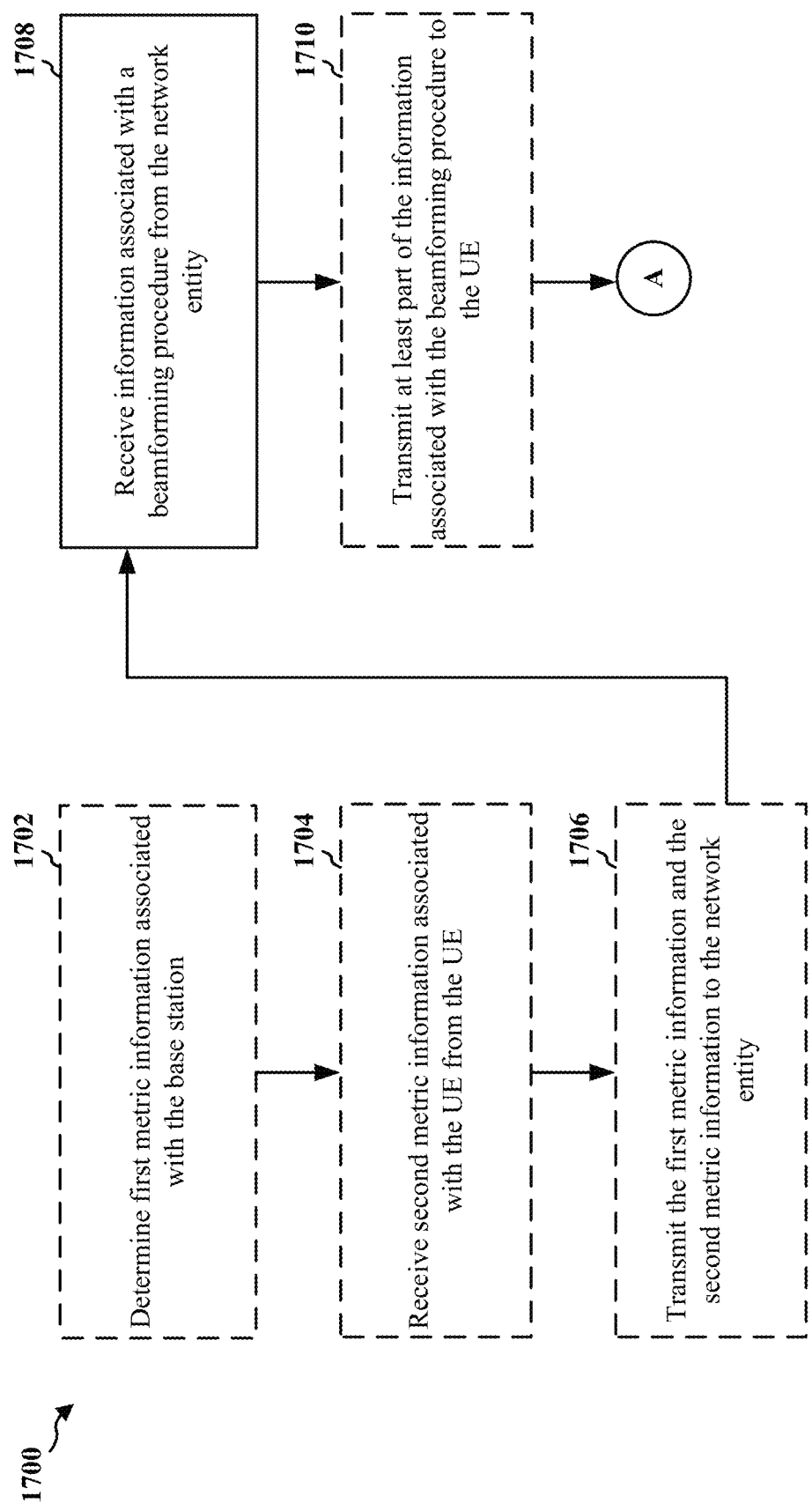
FIGS. 17A and 17B are a flowchart of a method of wireless communication.
Figure 17B:
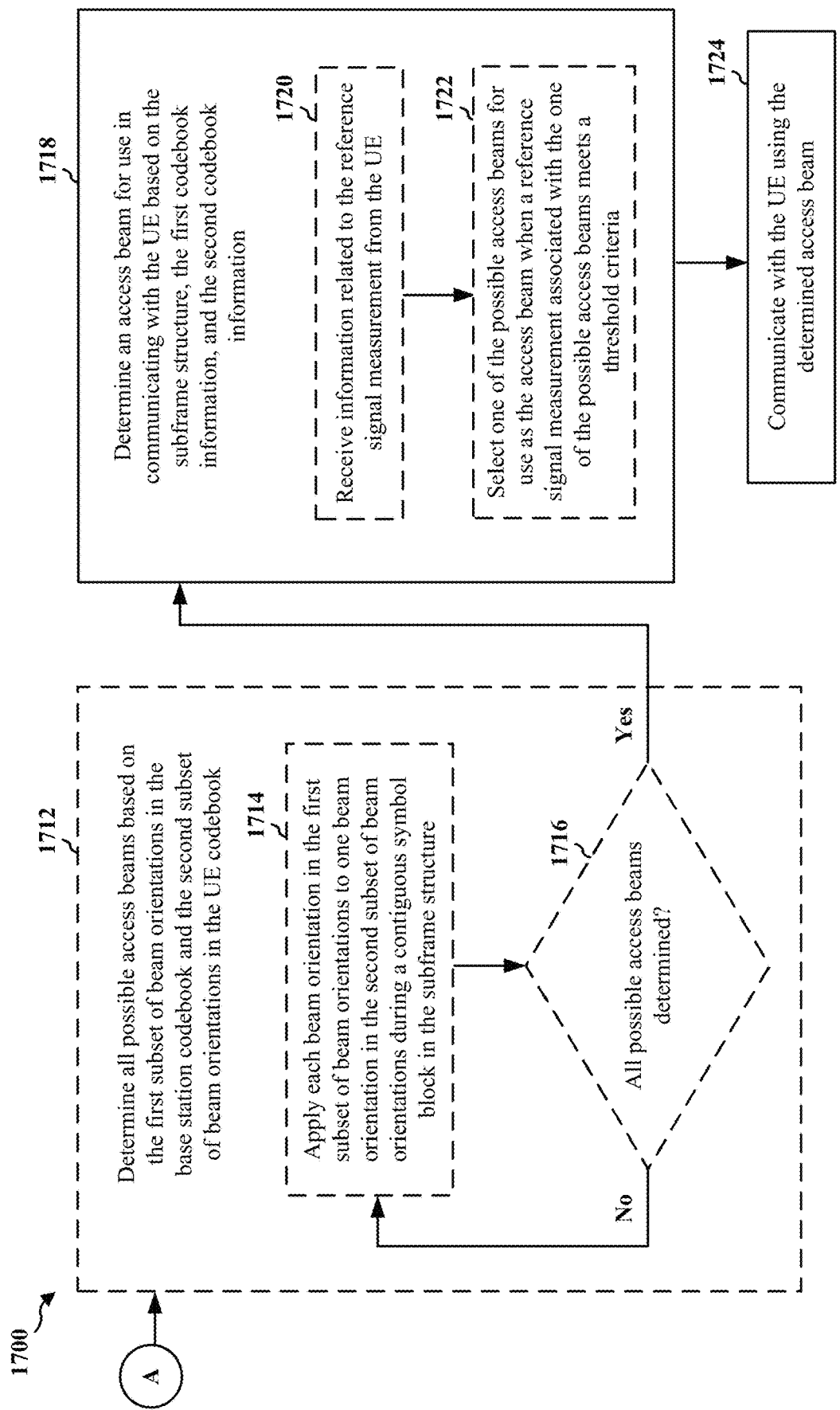

FIGS. 17A and 17B are a flowchart 1700 of a method of wireless communication. The method may be performed by a base station (e.g., the serving base station 1504a or another apparatus). For example, the base station may be an mmW base station in communication with a UE and a network entity (e.g., cloud-based server). Operations indicated with dashed lines represent optional operations for various aspects of the disclosure. One or more operations may be omitted, transposed, and/or contemporaneously performed.

As seen in FIG. 17A, at operation 1702, the base station may determine first metric information the base station. For example, the base station may receive, from the UE, at least one BRS along one or more beams. The BRS may include a known symbol sequence, and a base station may test for the known symbol sequence along one or more beams. The base station may determine (e.g., measure or identify) one or more metric values based on one or more BRSs received along one or more directional beams—e.g., the base station may determine a beam index or BSI and/or measure a B-RSRP, B-RSRQ, CQI, SNR, or another value. The base station may include one or more values, such as a determined beam index, B-RSRP, B-RSRQ, CQI, SNR, or another value in the first metric information. In one aspect, the base station may include other information in the first metric information, such as information associated with a location of the base station and/or information associated with an antenna array of the base station.

With respect to FIG. 15, the processing system 1507 of the serving base station 1504a may determine base station metric information. In an aspect, the base station metric information may include information associated with a location of the base station 1504a, one or more UEs that are operating on the cell 1502a, information about the cell 1502a (including obstacles that may affect beam paths), and so forth. In an aspect, the base station metric information may include information that is associated with a BRS. In an aspect, the BRS may include a symbol sequence that is known by both the serving base station 1504a and the UE 1506. The processing system 1507 of the serving base station 1504a may receive a BRS along a beam and may test for a known symbol sequence along certain other sets of directional beams. In addition, the processing system 1507 of the base station 1504a may estimate, using the BRS, the strength of a certain beam direction at the base station 1504a based on a RSRP or RSRQ measurement.

As also seen in FIG. 17A, at operation 1704, the base station may receive second metric information associated with the UE. For example, the base station may transmit one or more BRSs that may include a symbol sequence that is known by both the base station and the UE. The UE may determine or measure one or more values, such as a beam index, BSI, B-RSRP, B-RSRQ, CQI, SNR, etc. Additionally or alternatively, the UE may determine a best choice of beams that may be used as an access beam. In addition, the BRS may be used to estimate the strength of a certain beam direction at the UE based on a measured value (e.g., RSRP or RSRQ measurement). The UE may transmit the determined or measured values (e.g., beam index, BSI, B-RSRP, B-RSRQ, CQI, SNR, etc.) to the base station, which the base station may receive the values and may identify as second metric information. In one aspect, the base station may receive, from the UE, information associated with the best choice of beams (e.g., beam index, BSI, B-RSRP, B-RSRQ, CQI, SNR, etc.), for example, using a RACH signal. In an aspect, the second metric information may include at least one of GPS information associated with the UE, gyroscope information associated with the UE, or accelerometer information associated with the UE.

Referring to FIG. 15, the transceiver 1509 of the serving base station 1504a may receive, from the UE 1506, the metric information 1510. In an aspect, the processing system 1507 of the base station 1504a may determine, from the UE metric information, one or more of location information (e.g., GPS or GNSS information) associated with the UE 1506, gyroscope information associated with the UE 1506, or accelerometer information associated with the UE 1506. In another aspect, the UE metric information may be associated with a BRS. In an aspect, the BRS may include a symbol sequence that is known by both the serving base station 1504a and the UE 1506. The transceiver 1509 of the serving base station 1504a may transmit a BRS along a directional beam with a known symbol sequence and the processing system 1503 of the UE 1506 may test for the same known symbol sequence along certain other sets of directional beams. By checking which combination of beams works best at both the serving base station 1504a and the UE 1506, the UE 1506 may determine the best choice of beams that may subsequently be used as an access beam. The transceiver 1509 of the base station 1504a may receive, from the UE 1506, information indicating the best choice of beams. In one aspect, the processing system 1507 of the base station 1504a may estimate, based on BRS measurements, the strength of a certain beam direction at the UE 1506. By testing multiple beam directions at both serving base station 1504a and UE 1506, the processing system 1507 of the base station 1504a may determine the best direction (e.g., beam orientation) the serving base station 1504a can use as an access beam. In a further aspect, the transceiver of the base station 1504a may receive, from the UE 1506, information associated with the best choice of beams to the serving base station 1504a, e.g., using a RACH signal.

As further seen in FIG. 17A, at operation 1706, the base station may transmit the first metric information and the second metric information to a network entity. For example, the base station may generate one or more data packets. The base station may include, in the one or more data packets, at least a portion of the first metric information (e.g., a beam index, BSI, B-RSRP, B-RSRQ, CQI, SNR, etc.), location information associated with the base station, and/or at least a portion of the second metric information (e.g., metric values measured by the UE and provided to the base station, GPS information associated with the UE, gyroscope information associated with the UE, and/or accelerometer information associated with the UE). The base station may transmit the one or more data packets, including the at least a portion of the first metric information and the at least a portion of the second metric information, to the network entity.

Referring to FIG. 15, the transceiver 1509 of the serving base station 1504a may transmit, to the network entity 1508, one or more data packets 1512 that include the base station metric information and/or the UE metric information. The network entity 1508 may use the information included in the data packet(s) 1512 to determine the geometry 1515 of serving mmW cell 1502a.

As additionally seen in FIG. 17A, at operation 1708, the base station may receive information associated with a beamforming procedure from a network entity. In an aspect, the information associated with the beamforming procedure may include a subframe structure for use during the beamforming procedure, first codebook information associated with the base station during the beamforming procedure, and second codebook information associated with the UE during the beamforming procedure. In an aspect, the first codebook information may indicate a first subset of beam orientations in a base station codebook. In an aspect, the second codebook information may indicate a second subset of beam orientations in a UE codebook. In an aspect, distinct groups of beam orientations in the second subset of beam orientations may each be associated with a different antenna subarray of the UE.

Referring to FIG. 15, the transceiver 1509 of the serving base station 1504*a* may receive, from the network entity 1508, information 1516 associated with the first subset of beam orientations, the second subset of beam orientations, and a subframe structure. Referring to FIG. 16A, the base station 1602 (e.g., the serving base station 1504*a*) may receive the base station codebook 1615, which may include information indicating the subset of three beam orientations 1616*a*, 1616*b*, and 1616*c*. The base station codebook 1615 may indicate the beam orientations which may be preferably used during the beamforming procedure or beam scanning process. Further, the base station 1602 (e.g., the serving base station 1504*a*) may receive UE codebook 1630, which may include information indicating the subset of four beam orientations 1622*a*, 1622*b*, 1622*c*, 1622*d* selected from each group of beam orientations associated with one of the UE subarrays 1610*a*, 1610*b*, 1610*c*, 1610*d*. The UE codebook 1630 may indicate the beam orientations may be preferably used during the beamforming procedure or beam scanning process. As illustrated, distinct groups of beam orientations 1622*a*, 1622*b*, 1622*c*, 1622*d* in the second subset of beam orientations may each be associated with a different antenna subarray of the UE 1610*a*, 1610*b*, 1610*c*, 1610*d* (e.g., the first group of beam orientations including the first beam orientation 1722*a* may be associated with a first antenna subarray 1710*a*, etc.). Referring to FIG. 16B, the base station 1602 (e.g., the serving base station 1504*a*) may receive the subframe structure 1645.

As also seen in FIG. 17A, at operation 1710, the base station may transmit at least part of the information associated with the beamforming procedure to the UE. For example, the base station may determine information received from the base station including the subframe structure for use during the beamforming procedure, the first codebook information for use by the base station during the beamforming procedure, and the second codebook information for use by the UE during the beamforming procedure. The base station may generate a message that includes at least one of the subframe structure for use during the beamforming procedure, the first codebook information for use by the base station during the beamforming procedure, and the second codebook information for use by the UE during the beamforming procedure. The base station may transmit the generated message to the UE.

Referring to FIG. 15, the transceiver 1509 of the serving base station 1504*a* may transmit information 1518 associated at least one of the first subset of beam orientations, the second subset of beam orientations, and/or the subframe structure to the UE 1506. Referring to FIG. 16A, the base station 1602 (e.g., the serving base station 1504*a*) may transmit, to the UE (e.g., the UE 1506), information indicating the subset of three beam orientations 1616*a*, 1616*b*, and 1616*c*, which may be preferably used during the beamforming procedure or beam scanning process. Further, the base station (e.g., the serving base station 1504*a*) may transmit, to the UE (e.g., the UE 1506), information indicating the subset of four beam orientations 1622*a*, 1622*b*, 1622*c*, 1622*d* selected from each group of beam orientations associated with one of the UE subarrays 1610*a*, 1610*b*, 1610*c*, 1610*d*, which may be preferably used during the beamforming procedure or beam scanning process. Referring to FIG. 16B, the base station (e.g., the serving base station 1504*a*) may transmit, to the UE (e.g., the UE 1506), information indicating the subframe structure 1645.

As seen in FIG. 17B, at 1712, the base station may determine all possible access beams based on the first subset of beam orientations in the base station codebook and the second subset of beam orientations in the UE codebook. For example, referring to FIG. 15, the processing system 1507 of the serving base station 1504*a* may determine all possible access beams based on the first subset of beam orientations in the base station codebook and the second subset of beam orientations in the UE codebook. In addition, referring to FIG. 16B, the base station 1602 may scan each of the seeded beam orientations in the base station codebook 1615 across each one of the directional beam orientations seeded in the UE codebook 1630 in order to determine all of the possible access beams. In the example illustrated in FIGS. 16A and 16B, there are twelve possible number of access beams (e.g., (3 beams at the base station)×(4 directional beams at the UE)=12 possible access beams).

As also seen in FIG. 17B, at 1714, the base station may determine all possible access beams by applying each beam orientation in the first subset of beam orientations to one beam orientation in the second subset of beam orientations during a contiguous symbol block in the subframe structure. For example, at least one of the base station and/or the UE may transmit a signal (e.g., BRS or BRRS) in the assigned symbol corresponding to a respective beam orientation in the first subset of beam orientations and a respective beam orientation in the second subset of beam orientations. The other one of the base station and/or the UE may receive the signal (e.g., BRS and/or BRRS) and measure a value indicating quality (e.g., RSRP, RSQP, RF energy, etc.). The beam orientation pair having a highest or best measured value may be selected as a serving beam (e.g., the base station may select a beam orientation and/or the base station may receive, from the UE, a beam orientation or measurement indicating a beam orientation).

With reference to FIG. 16B, each of the seeded beam orientations in the base station codebook 1615 may be applied to one of the seeded beam orientations in the UE codebook 1630 during a contiguous symbol block in the subframe structure 1645. For example, each of the beam orientations 1616*a*, 1616*b*, 1616*c* from the base station codebook are applied to beam orientation 1622*a* associated with the first UE subarray 1610*a* in symbols 0, 1, and 2, respectively.

As further seen in FIG. 17B, at 1716, the base station may determine if all possible access beams have been determined and/or evaluated. If all possible access beams have not been determined and/or evaluated, 1714 may be repeated over different contiguous symbol blocks in the subframe structure until all possible access beams are determined. For example, referring to FIGS. 16A and 16B, each of the seeded beam orientations in the base station codebook 1615 may be applied to one of the seeded beam orientations in the UE codebook 1630 during a contiguous symbol block in the subframe structure 1645. For example, each of the beam orientations 1616*a*, 1616*b*, 1616*c* from the base station codebook 1615 are applied to beam orientation 1622*a* associated with the first UE subarray 1610*a* (indicated by the UE codebook 1630) in symbols 0, 1, and 2, respectively. In addition, each of the beam orientations 1616*a*, 1616*b*, 1616*c* from the base station codebook are applied to beam orientation 1622*b* associated with the second UE subarray 1610*b* (indicated by the UE codebook 1630) in symbols 3, 4, and 5, respectively. Further, each of the beam orientations 1616*a*, 1616*b*, 1616*c* from the base station codebook 1615 are applied to the beam orientation 1622*c* associated with the third UE subarray 1610*c* (indicated by the UE codebook 1630) in symbols 16, 7, and 8, respectively. Still further, each of the beam orientations 1616*a*, 1616*b*, 1616*c* from the base station codebook 1615 are applied to the beam orientation 1622*d* associated with the fourth UE subarray 1610*d* (indicated by the UE codebook 1630) in symbols 9, 10, and 11, respectively.

As seen in FIG. 17B, at 1718, the base station may determine an access beam for use in communicating with the UE based on at least one of the subframe structure, the first codebook information, and the second codebook information when all possible access beams have been determined and/or evaluated. For example, referring to FIG. 15, the serving base station 1504*a* and/or the UE 1506 may determine an access beam 1519 for use in wireless communications when a BRS or BRRS measurement associated with the one of the possible access beams meets a threshold criteria. For example, the threshold criteria may include an RF energy level, RSRP, or RSRQ of the BRS or BRRS.

As further seen in FIG. 17B, at 1720, the base station may determine an access beam for use in communicating with the UE based on information related to a reference signal measurement of the access beam from the UE. The reference signal may be a BRS or BRRS. For example, the base station may receive, from the UE, information indicating a measurement value (e.g., RSRP, RSRQ, RF energy) and/or a beam orientation (e.g., beam index). The base station may select or determine a beam orientation of the base station based on the information received from the UE. Referring to FIG. 15, the processing system 1507 of the serving base station 1504*a* may determine an access beam 1519 for use in wireless communications based on information 1520 related to the reference signal measurement of the access beam is received from the UE 1506.

As also seen in FIG. 17B, at 1722, the base station may select one of the possible access beams for use as the access beam when a BRS measurement associated with the one of the possible access beams meets a threshold criteria. For example, the base station may compare respective measured values (e.g., RSRP, RSRQ, RF energy) corresponding to respective access beams. The base station may select an access beam having a highest or best measured value when compared to other measured values of other access beams. Referring to FIG. 15, the processing system 1507 of the serving base station 1504*a* may determine an access beam 1522 for use in wireless communications when a BRS measurement associated with the access beam 1522 meets a threshold criteria. For example, the threshold criteria may include an RF energy level of the BRS.

As further seen in FIG. 17B, at 1724, at the base station may communicate with the UE using the determined access beam. For example, the base station may send and/or receive signals along the determined access beam. For example, referring to FIG. 15, once an access beam is selected from all of the possible access beams, the serving base station 1504*a* and the UE 1506 may communicate using the access beam 1522.

Figure 18:
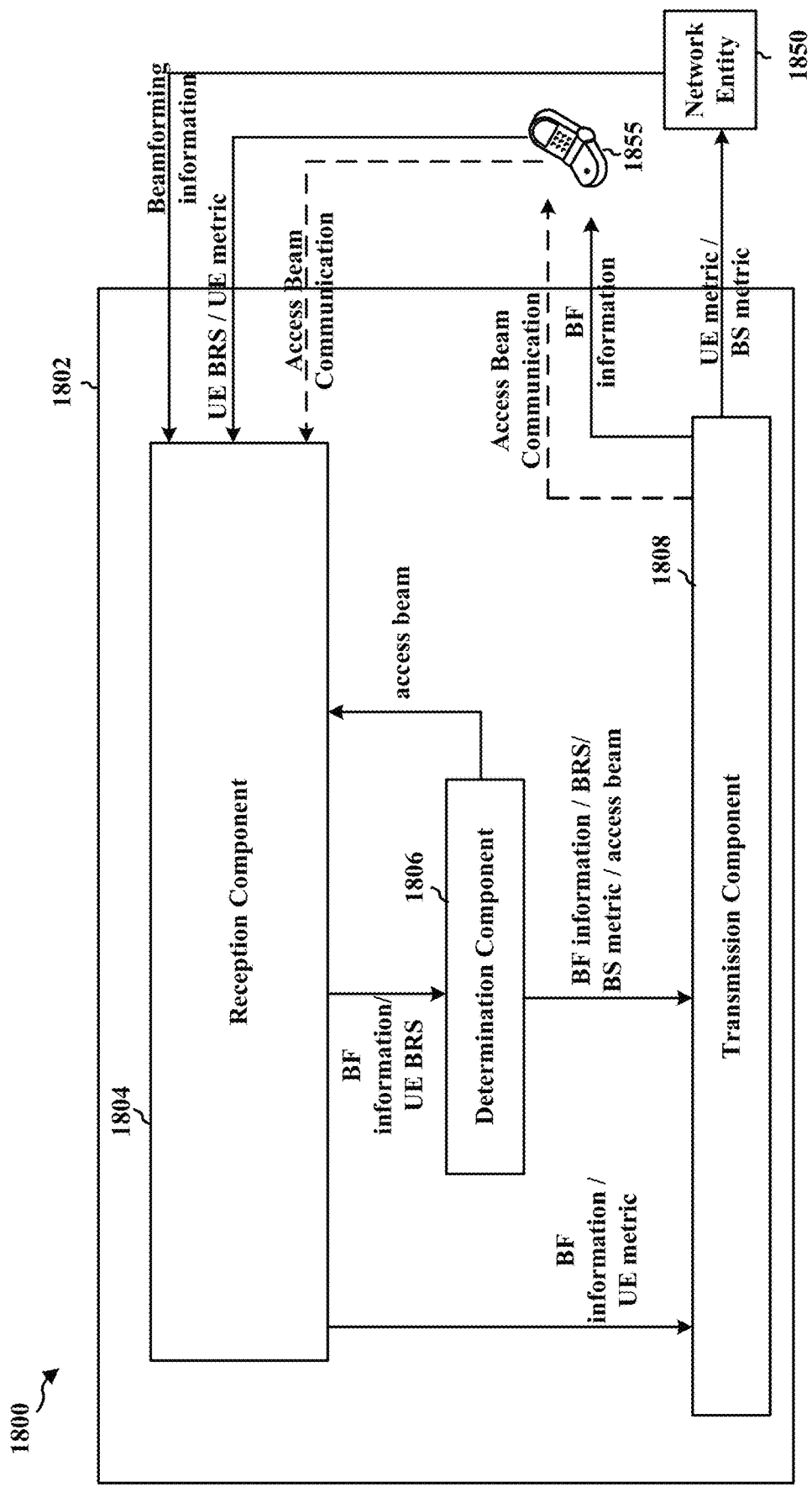
FIG. 18 is a conceptual data flow diagram illustrating the data flow between different means/components in an exemplary apparatus.

FIG. 18 is a conceptual data flow diagram 1800 illustrating the data flow between different means/components in an exemplary apparatus 1802. The apparatus may be a base station that is in communication with a network entity 1850 (e.g., cloud-based server) and a UE 1855. The illustrated components and data flow of the diagram 1800 are illustrative, and the present disclosure contemplates additional and/or other components and/or data flow.

The apparatus 1802 may include a determination component 1806 that may determine base station metric information the apparatus. In an aspect, the base station metric information may include information associated with one or more metric values measured for one or more BRSs, such as RSRP, RSRQ, and/or RF energy levels measured based on one or more BRSs received by the reception component 1804. The determination component 1806 may generate a signal that includes information associated with the base station metric information and provide the signal to a transmission component 1808. In addition, a reception component 1804 may receive UE metric information associated with UE 1855 from the UE 1855. In an aspect, the UE metric information may include at least one of GPS information associated with the UE 1855, gyroscope information associated with the UE 1855, and/or accelerometer information associated with the UE 1855. In an aspect, the UE metric information may include information associated with one or more metric values measured by the UE 1855, such as RSRP, RSRQ, and/or RF energy levels measured based on a BRS transmitted by the transmission component 1808 and received by the UE 1855.

The transmission component 1808 may transmit the UE metric information and the base station metric information to the network entity 1850. Additionally, the reception component 1804 may receive information associated with a beamforming procedure (e.g., beamforming information) from network entity 1850. In an aspect, the beamforming information may include a subframe structure for use during a beamforming procedure, first codebook information associated with the apparatus 1802 to be used during the beamforming procedure, and second codebook information associated with the UE 1855 to be used during the beamforming procedure. In an aspect, the first codebook information may indicate a first subset of beam orientations in a base station codebook, e.g., for use by the apparatus 1802. In an aspect, the second codebook information may indicate a second subset of beam orientations in a UE codebook, e.g., associated with beam orientations at the UE 1855. In one aspect, distinct groups in the second subset of beam orientations may each be associated with a different antenna subarray of the UE 1855. In an aspect, the beamforming information that is received from the network entity 1850 may be based on the UE metric information and/or the base station metric information.

The reception component 1804 may provide a signal associated with the beamforming information to the transmission component 1808. The transmission component 1808 may transmit at least part of the beamforming information (e.g., the UE codebook information and/or the subframe structure) to the UE 1855. The reception component 1804 may send a signal including the beamforming information to determination component 1806. The determination component 1806 may determine all possible access beams based on the first subset of beam orientations in the base station codebook and the second subset of beam orientations in the UE codebook. For example, the determination component 1806 may determine all possible access beams by applying each beam orientation in the first subset of beam orientations to one beam orientation in the second subset of beam orientations during a contiguous symbol block in the subframe structure. In addition, the determination component 1806 may determine if all possible access beams have been determined and/or evaluated. When all possible access beams have not been determined and/or evaluated, the determination component 1806 may repeat the application of a respective beam orientation to a respective contiguous symbol block in the subframe structure until all possible access beams are determined.

In an aspect, the determination component 1806 may determine an access beam for use in communicating with the UE based on at least one of the subframe structure, the first codebook information, and the second codebook information when all possible access beams have been determined and/or evaluated. For example, the determination component 1806 may determine an access beam for use in communicating with the UE 1855 based on information related to a reference signal measurement (e.g., a metric value measured in association with a BRS or BRRS) of the access beam from the UE 1855 that is received by the reception component 1804. In one aspect, the reception component 1804 may receive information indicating a beam index corresponding to a beam orientation associated with the access beam.

In an aspect, the reception component 1804 may send a signal associated with one or more reference signal measurements (e.g., received from the UE 1855) to the determination component 1806. The determination component 1806 may select one of the possible access beams for use as the access beam (e.g., current serving beam) when a BRS measurement associated with the one of the possible access beams meets a threshold criteria. The threshold criteria may be, for example, a predetermined threshold value and/or a best or highest metric value of one access beam in comparison to other metric values measured for other possible access beams. Once the access beam has been selected, the determination component 1806 may send a signal associated with the selected access beam to the reception component 1804. Additionally or alternatively, the determination component 1806 may send a signal associated with the selected access beam to the transmission component 1808. The transmission component 1808 and the reception component 1804 may communicate the UE 1855 using the access beam. In one aspect, the determination component 1806 may select one beam for the transmission component 1808, but select a different beam for the reception component 1804.

The apparatus may include additional components that perform each of the blocks of the algorithm in the aforementioned flowcharts of FIGS. 17A and 17B. As such, each block in the aforementioned flowcharts of FIGS. 17A and 17B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 19:
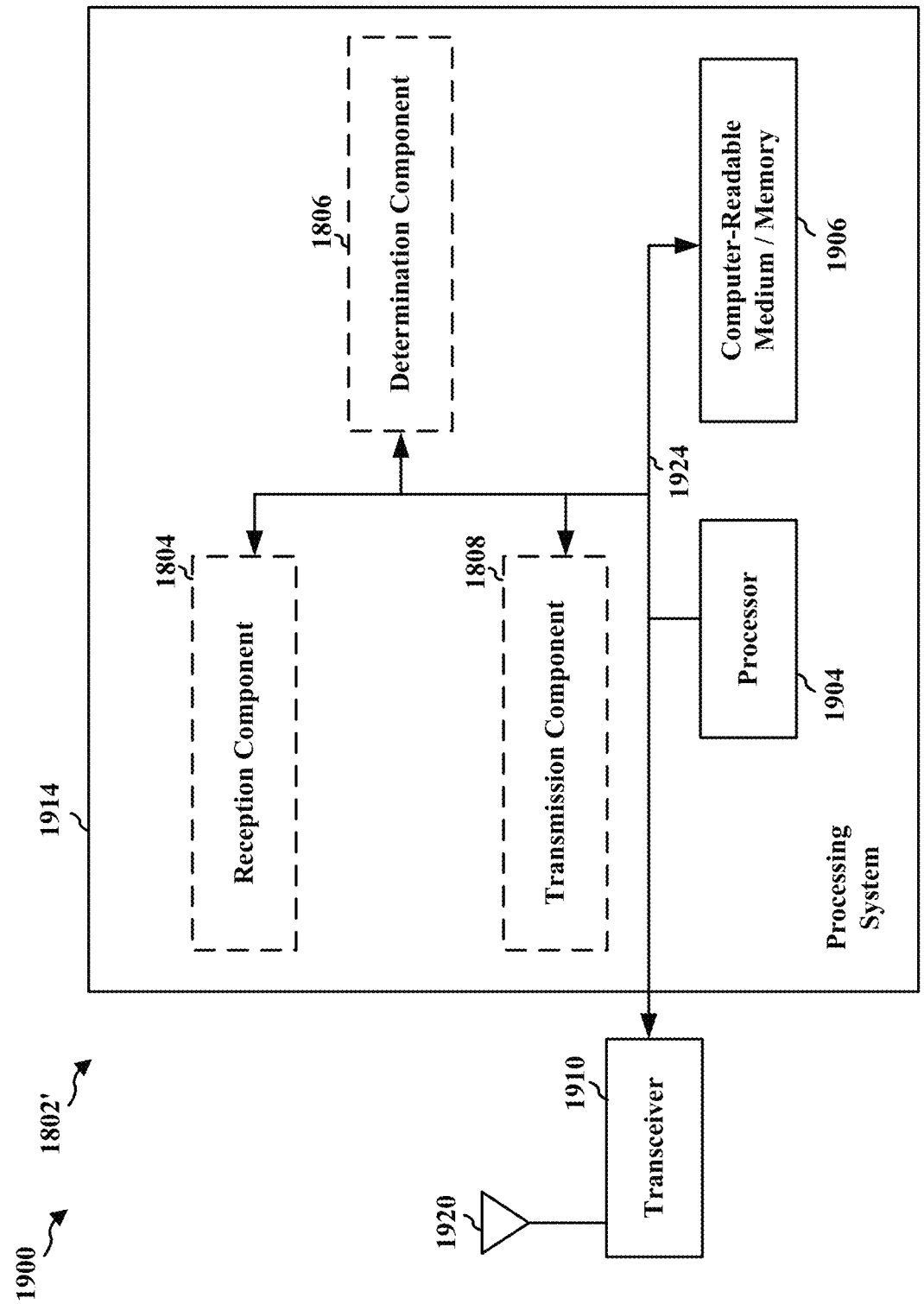
FIG. 19 is a diagram illustrating an example of a hardware implementation for an apparatus employing a processing system.

FIG. 19 is a diagram 1900 illustrating an example of a hardware implementation for an apparatus 1802' employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware components, represented by the processor 1904, the components 1804, 1806, 1808, and the computer-readable medium/memory 1906. The bus 1924 may also link various other circuits such as timing sources, peripherals, voltage regulators, and power management circuits, which are well known in the art, and therefore, will not be described any further.

The processing system 1914 may be coupled to a transceiver 1910. The transceiver 1910 is coupled to one or more antennas 1920. The transceiver 1910 provides a means for communicating with various other apparatus over a transmission medium. The transceiver 1910 receives a signal from the one or more antennas 1920, extracts information from the received signal, and provides the extracted information to the processing system 1914, specifically the reception component 1804. In addition, the transceiver 1910 receives information from the processing system 1914, specifically the transmission component 1808, and based on the received information, generates a signal to be applied to the one or more antennas 1920. The processing system 1914 includes a processor 1904 coupled to a computer-readable medium/memory 1906. The processor 1904 is responsible for general processing, including the execution of software stored on the computer-readable medium/memory 1906. The software, when executed by the processor 1904, causes the processing system 1914 to perform the various functions described supra for any particular apparatus. The computer-readable medium/memory 1906 may also be used for storing data that is manipulated by the processor 1904 when executing software. The processing system 1914 further includes at least one of the components 1804, 1806, 1808. The components may be software components running in the processor 1904, resident/stored in the computer readable medium/memory 1906, one or more hardware components coupled to the processor 1904, or some combination thereof. The processing system 1914 may be a component of the base station 310 and may include the memory 376 and/or at least one of the TX processor 316, the RX processor 370, and the controller/processor 375.

In one configuration, the apparatus 1802/1802' for wireless communication may include means for receiving information associated with a beamforming procedure from a network entity. In one aspect, the network entity may be a cloud-based server. In an aspect, the information may include a subframe structure for use during the beamforming procedure, first codebook information for use by the apparatus 1802/1802' during the beamforming procedure, and second codebook information to be used by a UE during the beamforming procedure. In a further aspect, the first codebook information may indicate a first subset of beam orientations in a base station codebook. In an additional aspect, the second codebook information may indicate a second subset of beam orientations in a UE codebook. In still a further aspect, distinct groups in the second subset of beam orientations are each associated with a different antenna subarray of the UE. In another configuration, the apparatus 1802/1802' for wireless communication may include means for determining all possible access beams based on the first subset of beam orientations in the base station codebook and the second subset of beam orientations in the UE codebook by: (i) applying each beam orientation in the first subset of beam orientations to one beam orientation in the second subset of beam orientations during a contiguous symbol block in the subframe structure, and (ii) repeating (i) over different contiguous symbol blocks in the subframe structure until all possible access beams are determined. In an aspect, the means for determining the access beam is configured to select one of the possible access beams for use as the access beam when a reference signal measurement associated with the one of the possible access beams meets a threshold criteria. In another aspect, the means for determining the access beam is further configured to receive information related to the reference signal measurement from the UE. In yet another configuration, the apparatus 1802/1802' for wireless communication may include means for determining first metric information associated with the apparatus 1802/1802'. In a further configuration, the apparatus 1802/1802' for wireless communication may include means for receiving second metric information associated with the UE. In an aspect, the second metric information may include at least one of GPS information associated with the UE, gyroscope information associated with the UE, or accelerometer information associated with the UE. In an additional configuration, the apparatus 1802/1802' for wireless communication may include means for transmitting the first metric information and the second metric information to the network entity. In an aspect, the information associated with the beamforming procedure that is received from the network entity may be based on the first metric information and the second metric information. In one aspect, the apparatus 1802/1802' for wireless communication may be a mmW base station. In another configuration, the apparatus 1802/1802' for wireless communication may include means for communicating with the UE using the access beam.

The aforementioned means may be one or more of the aforementioned components of the apparatus 1802 and/or the processing system 1914 of the apparatus 1802' configured to perform the functions recited by the aforementioned means. As described supra, the processing system 1914 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 20A:
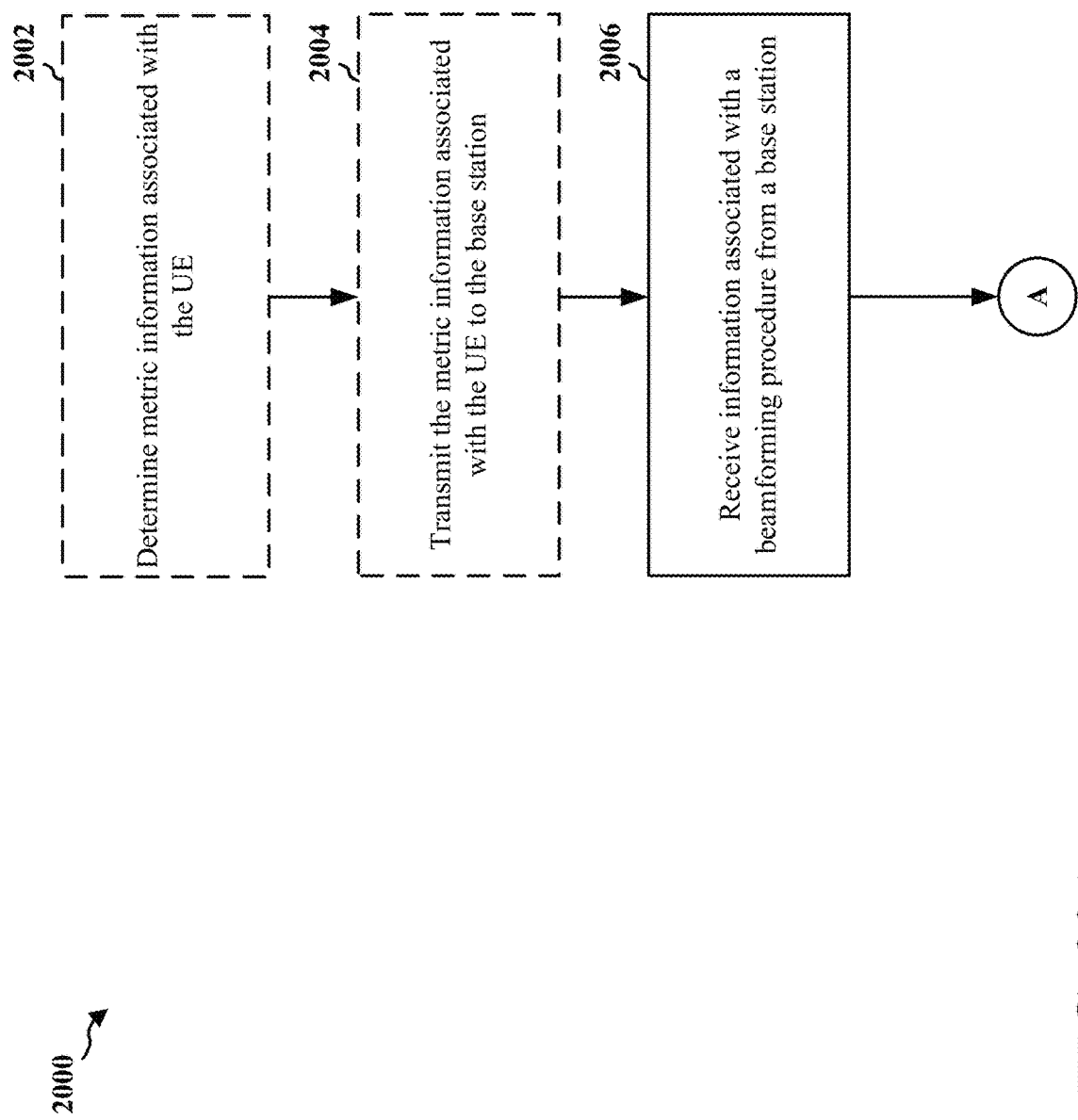
FIGS. 20A-20C are a flowchart of a method of wireless communication.
Figure 20B:
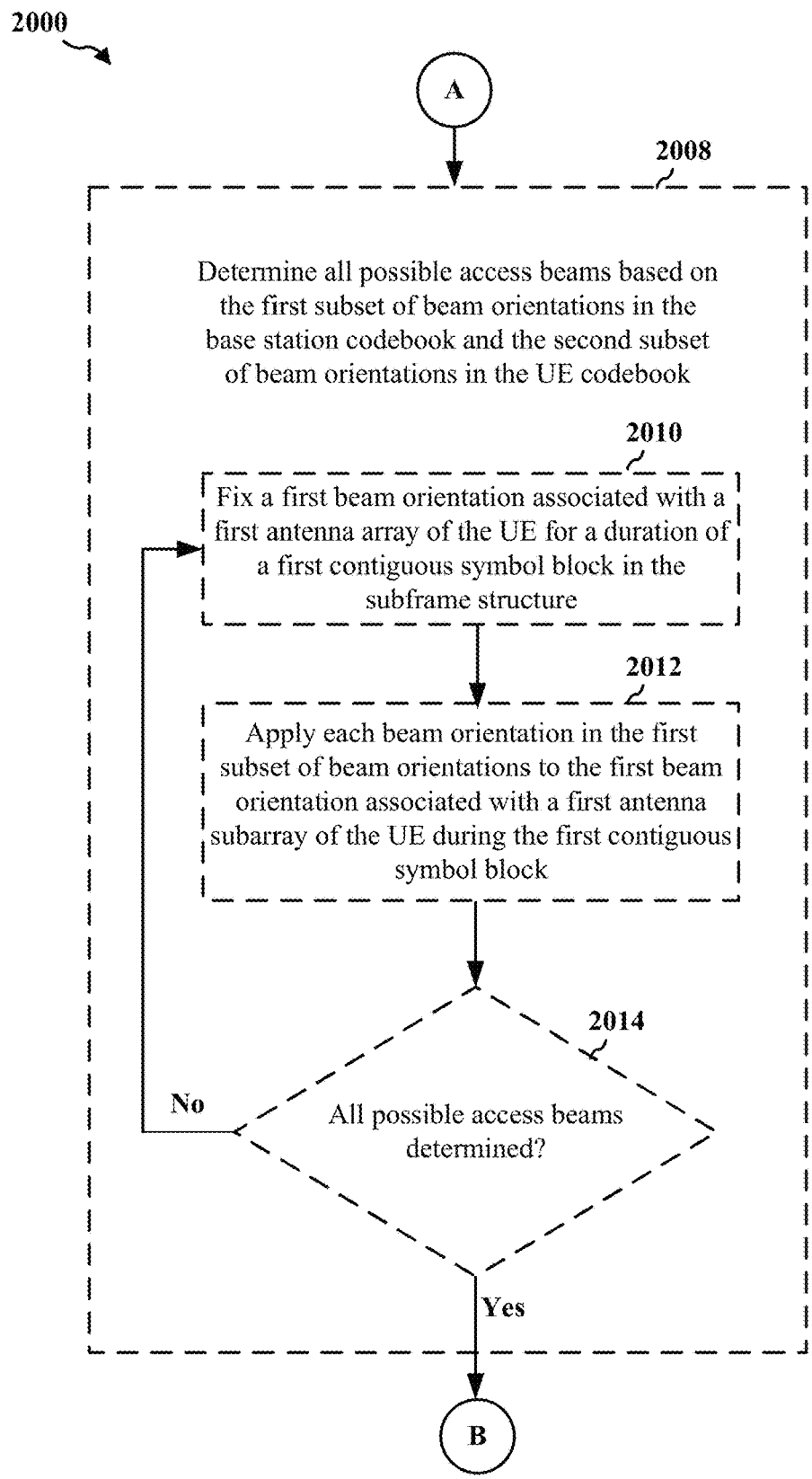
Figure 20C:
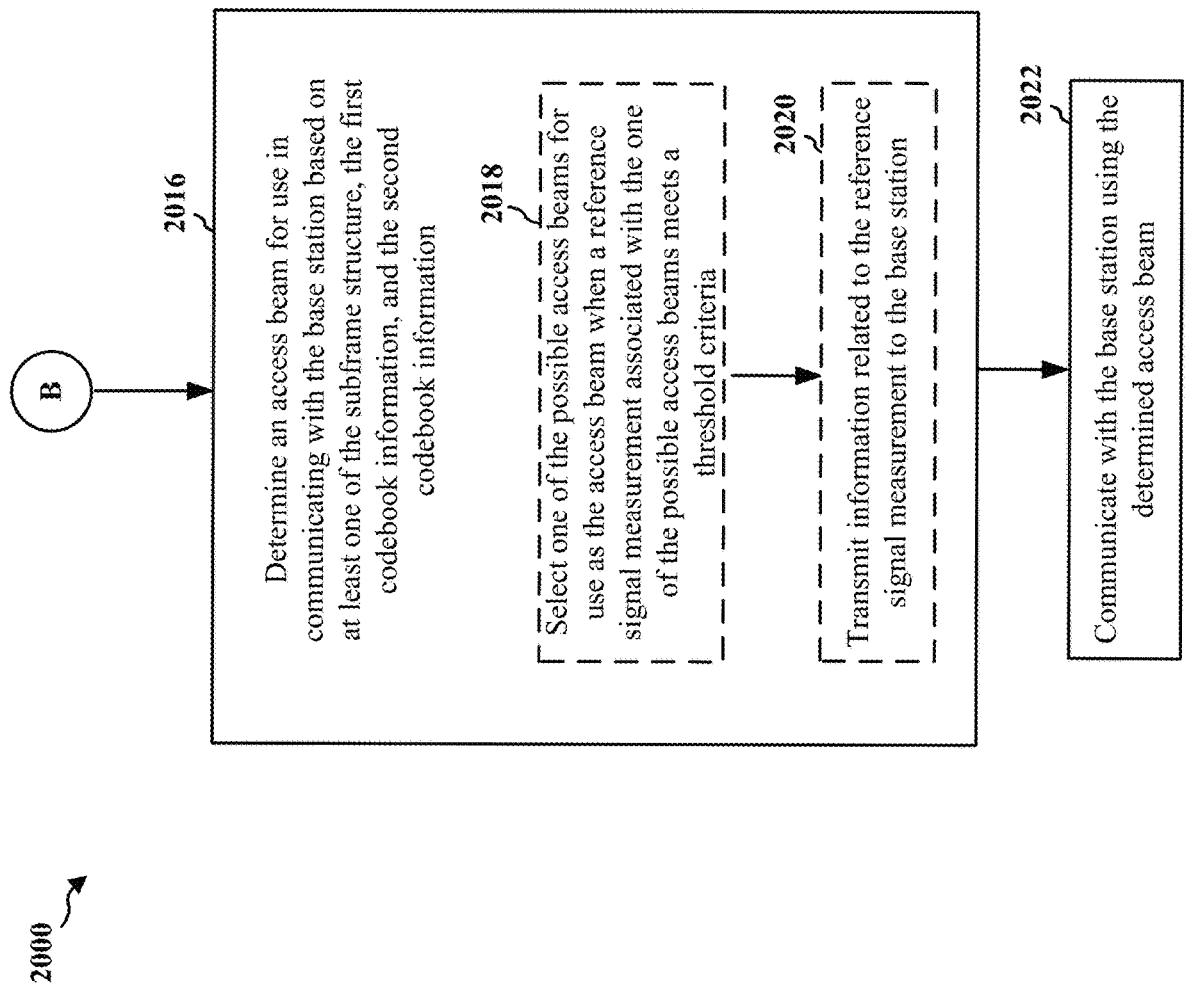

FIGS. 20A-20C are a flowchart 2000 of a method of wireless communication. The method may be performed by a UE (e.g., the UE 1506, the UE 1608, the apparatus 2102/2102'). For example, the UE may be in communication with an mmW base station that communicates with a network entity (e.g., a cloud-based server). Operations indicated with dashed lines represent optional operations for various aspects of the disclosure.

As seen in FIG. 20A, at 2002, the UE may determine metric information associated with the UE. For example, the UE may receive a respective BRS along a respective beam orientation of the UE. The UE may measure a metric value (e.g., an RSRP, RSRQ, RF energy level, or another value). The UE may measure a plurality of metric values for a plurality of beam orientations, and a respective metric value may correspond to a respective beam orientation. The UE may include one or more metric values in the metric information. In another aspect, the metric information may include at least one of GPS information associated with the UE, gyroscope information associated with the UE, or accelerometer information associated with the UE. For example, the UE may detect at least one signal output from a component of the UE (e.g., a GNS/GNSS component, gyroscope, accelerometer, etc.), and the UE may determine at least a portion of the metric information based on the detected signal.

Referring to FIG. 15, the processing system 1503 of the UE 1506 may determine UE metric information that includes one or more of location information (e.g., GPS) associated with the UE 1506, gyroscope information associated with the UE 1506, or accelerometer information associated with the UE 1506. In another aspect, the UE metric information may be associated with a BRS, such as a metric value measured for a BRS received from the base station 1504a. In an aspect, a BRS may include a symbol sequence that is known by both the serving base station 1504a and the UE 1506. The serving base station 1504a may transmit a BRS, with a known symbol sequence, along a transmit directional beam and the transceiver 1505 of the UE 1506 may receive the BRS along a receive directional beam. The UE 1506 may test for the same known symbol sequence along certain other sets of directional beams. By checking which combination of beams (e.g., a transmit directional beam of the base station 1504a and a receive directional beam of the UE 1506) works best at both the serving base station 1504a and the UE 1506, the UE 1506 may determine the best choice of beams that may subsequently be used as an access beam. The processing system 1503 of the UE 1506 may check which combination of beams works best by measuring a respective metric value for each combination of beams and comparing the measured metric values to one another to determine a best or highest metric value, which may then correspond to a best choice of beams. In addition, the BRS may be used to estimate the strength of a certain beam direction at the UE 1506 based on a RSRP, RSRQ, and/or RF energy level measurement. By testing multiple beam directions at both serving base station 1504a and UE 1506, the processing system 1503 of the UE 1506 may determine the best direction (e.g., beam orientation) between the UE 1506 and the serving base station 1504a to be used as an access beam (e.g., serving beam). In a further aspect, the transceiver 1505 of the UE 1506 may convey information associated with the best choice of beams to the serving base station 1504a using, for example, a RACH signal. In an additional aspect, the RACH signal may be a sequence of resources that are periodically transmitted on the uplink by the transceiver 1505 of the UE 1506 using a predetermined beam at a predetermined time. When the serving base station 1504a decodes the RACH signal, the serving base station 1504a may be able to determine which beams may be used as an access beam for subsequent communication with the UE 1506.

As also seen in FIG. 20A, at 2004, the UE may transmit the metric information to the base station. For example, the UE may generate a message that indicates the metric information, and the UE may send the metric information to the base station. For example, referring to FIG. 15, the transceiver 1505 of the UE 1506 may transmit the metric information 1510 to serving base station 1504a.

As further seen in FIG. 20A, at 2006, the UE may receive information associated with a beamforming procedure from a base station. For example, the UE may receive, from the base station, at least one signal, and the UE may decode the at least one signal to detect information associated with the beamforming procedure. In an aspect, the information may include a subframe structure for use during the beamforming procedure, first codebook information for use by the base station during the beamforming procedure, and/or second codebook information for use by the UE during the beamforming procedure. In an aspect, the first codebook information may indicate a first subset of beam orientations in a base station codebook. In an aspect, the second codebook information may indicate a second subset of beam orientations in a UE codebook. In an aspect, distinct groups in the second subset of beam orientations may each be associated with a different antenna subarray of the UE.

Referring to FIG. 15, the first subset of beam orientations, the second subset of beam orientations, and the subframe structure may be used by the serving base station 1504a and the UE 1506 to determine an access beam. The network entity 1508 may transmit information 1516 associated with the first subset of beam orientations, the second subset of beam orientations, and the subframe structure to the serving base station 1504a. The serving base station 1504a may transmit information 1518 associated at least one of the first subset of beam orientations, the second subset of beam orientations, and the subframe structure to the UE 1506. Accordingly, the transceiver 1505 of the UE 1506 may receive information 1518 associated at least one of the first subset of beam orientations, the second subset of beam orientations, and the subframe structure. In addition, referring to FIG. 16A, using the determined mmW cell geometry 1515, the processing system 1511 of the network entity 1508 in FIG. 15 may determine that each of the beam orientations 1622a, 1622b, 1622c, 1622d selected from each group of beam orientations associated with one of the UE subarrays 1610a, 1610b, 1610c, 1610d may be preferably used during the beam scanning process. In other words, the UE codebook 1630 may be seeded with information indicating the beam orientations 1622a, 1622b, 1622c, 1622d selected for each one of the UE subarrays 1610a, 1610b, 1610c, 1610d.

As seen in FIG. 20B, at 2008, the UE may determine all possible access beams based on the first subset of beam orientations in the base station codebook and the second subset of beam orientations in the UE codebook. For example, referring to FIG. 15, the processing system 1503 of the UE 1506 may determine, in coordination with the base station 1504a, all possible access beams based on the first subset of beam orientations in the base station codebook 1615 and the second subset of beam orientations in the UE codebook 1630. In addition, referring to FIG. 16B, each of the seeded beam orientations in the base station codebook 1615 may be scanned across each one of the seeded directional beam orientations to determine all of the possible access beams. In the example illustrated in FIGS. 16A and 16B, there are twelve possible number of access beams (e.g., (3 beams at the base station)×(4 directional beams at the UE)=12 possible access beams).

As also seen in FIG. 20B, at 2010, the UE may determine all the possible access beams by fixing a first beam orientation associated with a first antenna subarray of the UE for a duration of a first contiguous symbol block in the subframe structure. For example, the UE may determine a first beam orientation that corresponds to a first contiguous symbol block of a subframe, and the UE may direct (e.g., generate or active) a beam of the first subarray to the first beam orientation during the corresponding first contiguous symbol block.

Referring to FIG. 15, the processing system 1503 of the UE 1506 may determine all possible access beams by fixing a first beam orientation associated with a first antenna subarray associated with the transceiver 1505 of the UE 1506 for a duration of a first contiguous symbol block in a subframe structure. Referring to FIGS. 16A and 16B, each of the seeded beam orientations 1616a, 1616b, 1616c in the base station codebook 1615 may be applied to one of the seeded beam orientations 1622a, 1622b, 1622c, 1622d in the UE codebook 1630 during a contiguous symbol block in the subframe structure 1645.

As additionally seen in FIG. 20B, at 2012, the UE may further determine all the possible access beams by applying each beam orientation in the first subset of beam orientations (e.g., in the base station codebook) to the first beam orientation associated with a first antenna subarray of the UE during the first contiguous symbol block. For example, the UE may receive, through the first beam orientation fixed at the UE, a respective signal (e.g., BRS or BRRS) along each beam orientation of the first subset of beam orientations (e.g., each beam orientation seeded in the base station codebook) for each symbol of the first contiguous symbol block of the subframe. For each signal received, the UE may measure a metric value (e.g., RSRP, RSRQ, RF energy level, etc.) that corresponds to a combination of the first beam orientation fixed at the UE and a respective beam orientation of the first subset of beam orientations (e.g., each beam orientation seeded in the base station codebook).

For example, referring to FIGS. 16A and 16B, each of the seeded beam orientations in the base station codebook may be applied to one of the seeded beam orientations in the UE codebook during a contiguous symbol block in the subframe structure 1645. For example, each of the beam orientations 1616a, 1616b, 1616c from the base station codebook are applied to beam orientation 1622a associated with the first UE subarray 1610a in symbols 0, 1, and 2, respectively, of the subframe structure 1645.

As further seen in FIG. 20B, at 2014, the UE may determine if all possible access beams have been determined and/or evaluated. For example, the UE may compare the number of metric values measured for possible access beams to the total number of possible access beams, and if the number of measured metric values equals the number of possible access beams then the UE may determine that all possible access beams have been determined and/or evaluated. Otherwise, the UE may determine that all possible access beams have not been determined and/or evaluated.

If all possible access beams have not been determined and/or evaluated, 2010 and 2012 may be repeated using each beam orientation in the first subset of beam orientations and the second subset of beam orientations until all of the possible access beams have been determined. For example, returning to operation 2010, the UE may fix a next beam orientation associated with a next antenna subarray of the UE for a next contiguous symbol block. Returning to operation 2012, the UE may receive, through the next beam orientation fixed at the UE, a respective signal (e.g., BRS or BRRS) along each beam orientation of the first subset of beam orientations (e.g., each beam orientation seeded in the base station codebook) for each symbol of the next contiguous symbol block of the subframe. For each signal received, the UE may measure a metric value (e.g., RSRP, RSRQ, RF energy level, etc.) that corresponds to a combination of the next beam orientation fixed at the UE and a respective beam orientation of the first subset of beam orientations (e.g., each beam orientation seeded in the base station codebook).

Referring to FIG. 16B, each of the seeded beam orientations in the base station codebook may be applied to one of the seeded beam orientations in the UE codebook during a contiguous symbol block in the subframe structure 1645. For example, each of the beam orientations 1616a, 1616b, 1616c from the base station codebook 1615 are applied to the second beam orientation 1622b associated with the second UE subarray 1610b in symbols 3, 4, and 5, respectively. Using the second fixed beam orientation 1622b, the UE 1608 may measure a respective metric value for each signal received along each beam orientation of the first subset of beam orientations. Further, each of the beam orientations 1616a, 1616b, 1616c from the base station codebook 1615 are applied to the third beam orientation 1622c associated with the third UE subarray 1610c in symbols 6, 7, and 8, respectively. Using the third fixed beam orientation 1622c, the UE 1608 may measure a respective metric value for each signal received along each beam orientation of the first subset of beam orientations during a respective one of symbols 6, 7, and 8. Still further, each of the beam orientations 1616a, 1616b, 1616c from the base station codebook are applied to the beam orientation 1622d associated with the fourth UE subarray 1610d in symbols 9, 10, and 11, respectively. Using the fourth fixed beam orientation 1622d, the UE 1608 may measure a respective metric value for each signal received along each beam orientation of the first subset of beam orientations during a respective one of symbols 9, 10, and 11.

As seen in FIG. 20C, at 2016, the UE may determine an access beam for use in communicating with the base station based on at least one of the subframe structure, the first codebook information, and the second codebook information when all the possible access beams have been determined and/or evaluated. In one aspect, the UE may receive information indicating an access beam from the base station, and the UE may determine the access beam based on the information indicating the access beam. For example, referring to FIG. 15, the transceiver 1505 of the UE 1506 may receive the information indicating an access beam from the serving base station 1504a, and the processing system 1503 of the UE 1506 may determine the access beam 1522 based on the information received from the base station 1504a.

As also seen in FIG. 20C, at 2018, the UE may determine the access beam by selecting one of the possible access beams for use as the access beam when a reference signal measurement (e.g., BRS or BRRS measurement) associated with the one of the possible access beams meets a threshold criteria. For example, the threshold criteria may include a best or highest metric value measured for a BRS or BRRS. The UE may compare each metric value measured for each combination of beam orientations to one another, and the UE may select a highest or best metric value. For example, referring to FIG. 15, the serving base station 1504a and/or the UE 1506 may determine an access beam 1519 for use in wireless communications when a reference signal measurement associated with the one of the possible access beams meets a threshold criteria. In an aspect, the processing system 1503 of the UE 1506 may determine an access beam 1522 for use in wireless communications with the base station 1504a when a reference signal measurement associated with the one of the possible access beams meets a threshold criteria. For example, the threshold criteria may include an RSRP, RSRQ, or RF energy level of a BRS or BRRS (e.g., in comparison to other RSRPs, RSRQs, or RF energy levels measured for other BRSs or BRRSs).

As additionally seen in FIG. 20C, at 2020, the UE may further determine the access beam by transmitting information related to the reference signal measurement to the base station. For example, the UE may generate a message that includes information indicating at least a beam orientation of the first subset of beam orientations (e.g., a beam orientation included in the seeded base station codebook), and the UE may send the message to the base station. In one aspect, the information indicating the beam orientation may include a beam index. Referring to FIG. 15, the transceiver 1505 of the UE 1506 may transmit, to the serving base station 1504a, information 1520 indicating an access beam 1522 for use in wireless communications.

As further seen in FIG. 20C, at 2022, the UE may communicate with the base station using the determined access beam. For example, the UE use (e.g., activate or generate) a beam corresponding to the selected beam orientation of a selected antenna subarray (e.g., a beam orientation corresponding to a best or highest metric value), and the UE may send and/or receive signals using the beam corresponding to the selected beam orientation. Referring to FIG. 15, once an access beam 1522 is selected from all of the possible access beams, the serving base station 1504a and the UE 1506 may communicate using the access beam 1522. For example, the transceiver 1505 of the UE 1506 may cause signals to be transmitted to and/or received from the base station 1504a along the determined access beam 1522.

Figure 21:
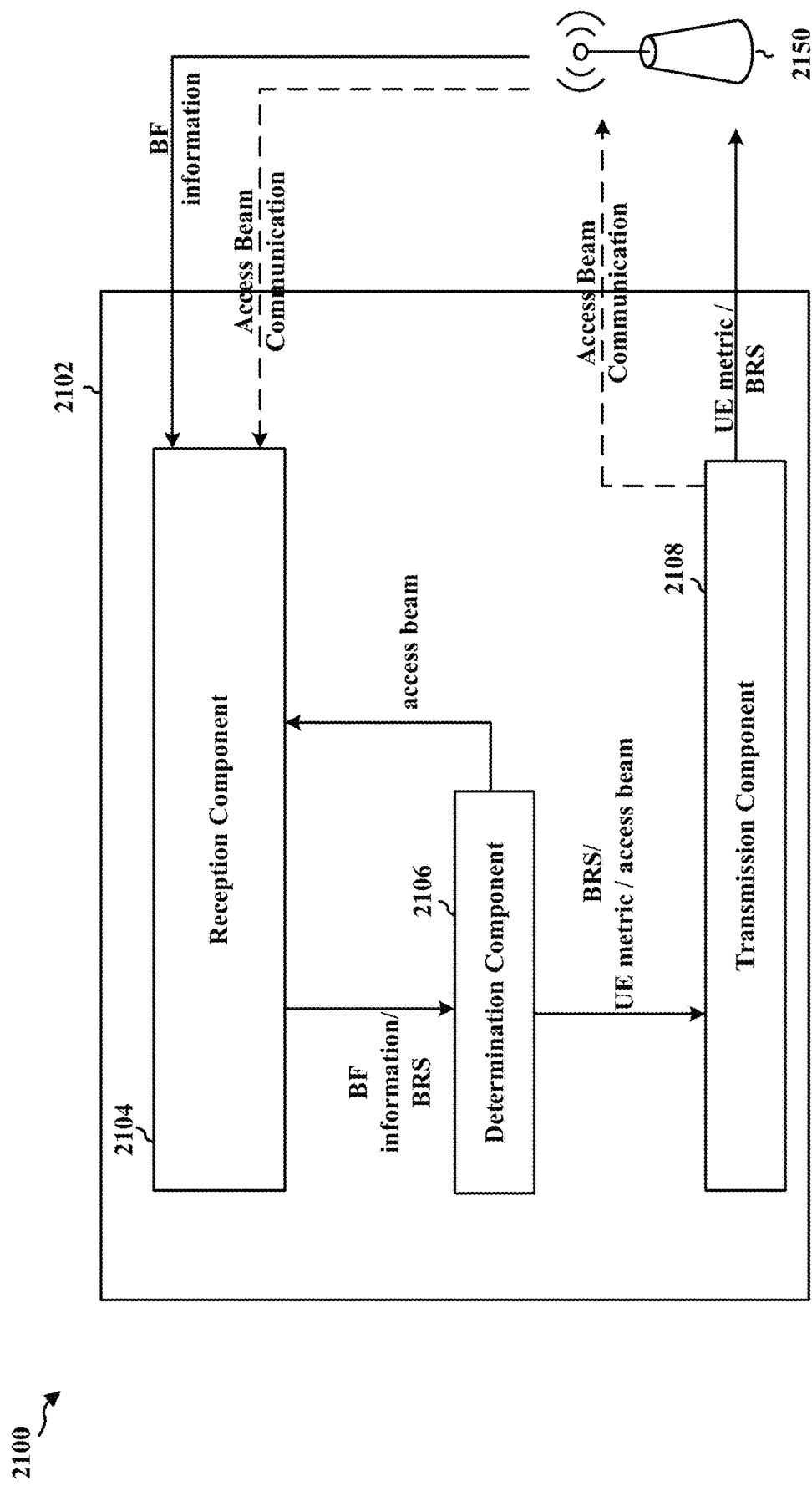
FIG. 21 is a conceptual data flow diagram illustrating the data flow between different means/components in an exemplary apparatus.

FIG. 21 is a conceptual data flow diagram 2100 illustrating the data flow between different means/components in an exemplary apparatus 2102. The apparatus 2102 may be a UE that is in communication with base station 2150 (e.g., mmW base station).

The apparatus 2102 may include a determination component 2106 that may determine metric information associated with the apparatus 2102. The determination component 2106 may include, in the UE metric information, at least one of information associated with a location of the 2102, information associated with a gyroscope of the 2102, and/or information associated with an accelerometer of the apparatus 2102. In an aspect, the UE metric information may include information associated with one or more antenna subarrays of the apparatus 2102. In an aspect, the UE metric information may include one or more metric values measured for one or more signals (e.g., BRSs) transmitted by the base station 2150 to the apparatus 2102.

The determination component 2106 may send a signal associated with UE metric information to a transmission component 2108. The transmission component 2108 may transmit the UE metric information to the base station 2150. In addition, a reception component 2104 may receive information associated with a beamforming procedure (e.g., beamforming information) from the base station 2150. In an aspect, the information may include a subframe structure for use during the beamforming procedure, first codebook information for use by the base station 2150 during the beamforming procedure, and second codebook information for use by the apparatus during the beamforming procedure. In an aspect, the information associated with the beamforming procedure may include a subframe structure for use during the beamforming procedure, first codebook information for use by the base station 2150 during the beamforming procedure, and second codebook information to be used by the apparatus 2102 during the beamforming procedure. In a further aspect, the first codebook information may indicate a first subset of beam orientations in a base station codebook. In another aspect, the second codebook information may indicate a second subset of beam orientations in a UE codebook. In an aspect, distinct groups in the second subset of beam orientations may each be associated with a different antenna subarray of the apparatus 2102.

In aspects, the reception component 2104 may send a signal associated with the beamforming information to the determination component 2106. The determination component 2106 may determine all possible access beams based on the first subset of beam orientations in the base station codebook and the second subset of beam orientations in the UE codebook. For example, the determination component 2106 may determine all possible access beams by fixing a first beam orientation associated with a first antenna subarray of the apparatus 2102 for a duration of a first contiguous symbol block in the subframe structure. In addition, the determination component 2106 may further determine all access beams by applying each beam orientation in the first subset of beam orientations to the first beam orientation associated with a first antenna subarray of the apparatus 2102 during the first contiguous symbol block.

Still further, the determination component 2106 may determine if all possible access beams have been determined and/or evaluated. Additionally, the determination component 2106 may determine an access beam for use in communicating with the base station 2150 based on at least one of the subframe structure, the first codebook information, and the second codebook information when all the possible access beams have been determined and/or evaluated. For example, determination component 2106 may determine the access beam by selecting one of the possible access beams for use as the access beam when a BRS measurement associated with the one of the possible access beams meets a threshold criteria.

The determination component 2106 may send a signal associated with the BRS measurement to the transmission component 2108. The transmission component 2108 may transmit information associated with the BRS measurement to base station 2150. Still further, the determination component 2106 send a signal associated with the determined access beam to the transmission component 2108 and the reception component 2104, respectively. The reception component 2104 and the transmission component 2108 may use the access beam to communicate with the base station 2150. In aspects, the determination component 2106 may determine different access beam orientations for transmission and reception, and so the determination component 2106 may signal information associated with a first access beam (e.g., a first beam orientation) to the transmission component 2108, but signal information associated with a second access beam (e.g., a second beam orientation) to the reception component 2104.

The apparatus may include additional components that perform each of the blocks of the algorithm in the aforementioned flowcharts of FIGS. 20A-20C. As such, each block in the aforementioned flowcharts of FIGS. 20A-20C may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 22:
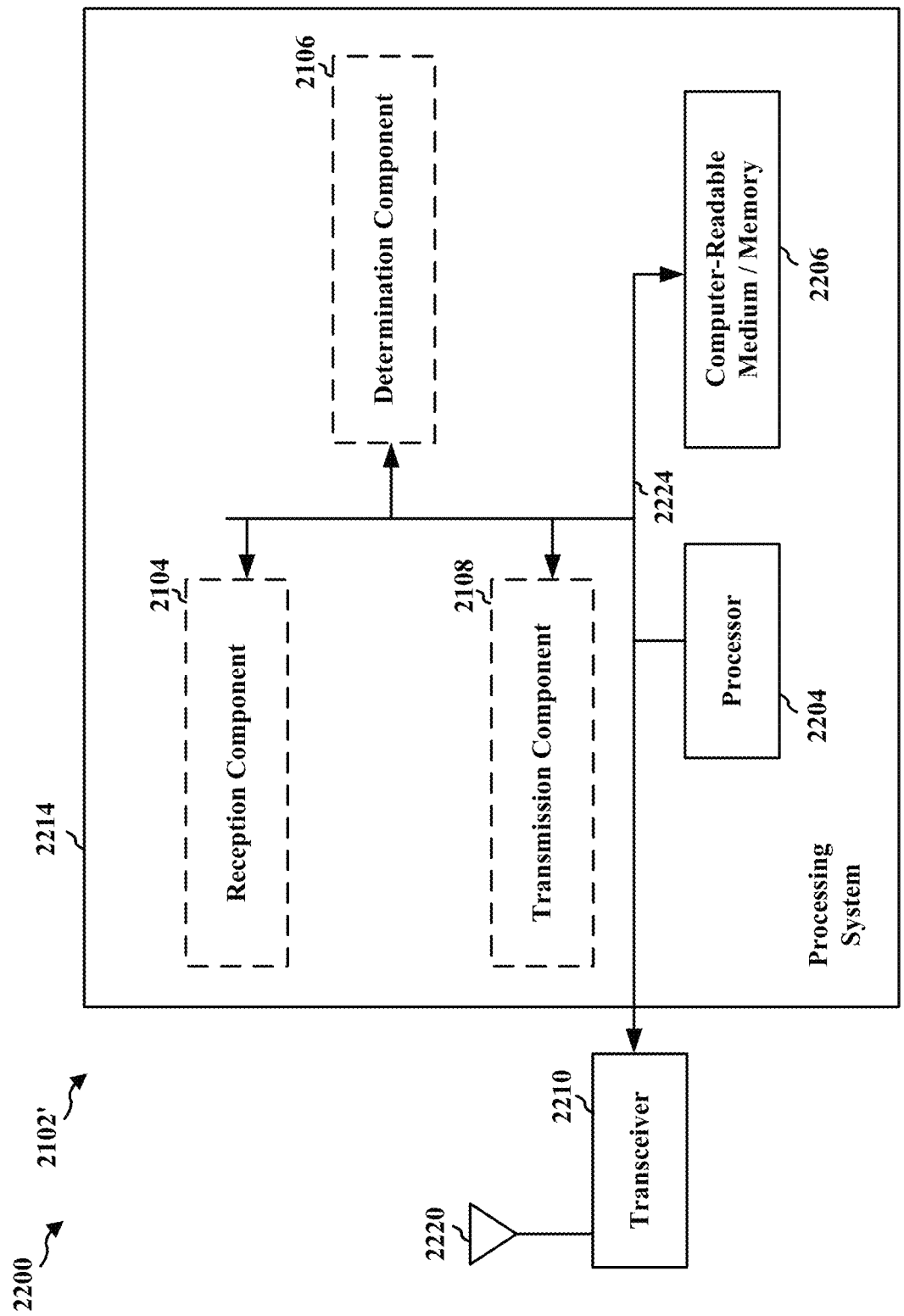
FIG. 22 is a diagram illustrating an example of a hardware implementation for an apparatus employing a processing system.

FIG. 22 is a diagram 2200 illustrating an example of a hardware implementation for an apparatus 2102' employing a processing system 2214. The processing system 2214 may be implemented with a bus architecture, represented generally by the bus 2224. The bus 2224 may include any number of interconnecting buses and bridges depending on the specific application of the processing system 2214 and the overall design constraints. The bus 2224 links together various circuits including one or more processors and/or hardware components, represented by the processor 2204, the components 2104, 2106, 2108, and the computer-readable medium/memory 2206. The bus 2224 may also link various other circuits such as timing sources, peripherals, voltage regulators, and power management circuits, which are well known in the art, and therefore, will not be described any further.

The processing system 2214 may be coupled to a transceiver 2210. The transceiver 2210 is coupled to one or more antennas 2220. The transceiver 2210 provides a means for communicating with various other apparatus over a transmission medium. The transceiver 2210 receives a signal from the one or more antennas 2220, extracts information from the received signal, and provides the extracted information to the processing system 2214, specifically the reception component 2104. In addition, the transceiver 2210 receives information from the processing system 2214, specifically the transmission component 2108, and based on the received information, generates a signal to be applied to the one or more antennas 2220. The processing system 2214 includes a processor 2204 coupled to a computer-readable medium/memory 2206. The processor 2204 is responsible for general processing, including the execution of software stored on the computer-readable medium/memory 2206. The software, when executed by the processor 2204, causes the processing system 2214 to perform the various functions described supra for any particular apparatus. The computer-readable medium/memory 2206 may also be used for storing data that is manipulated by the processor 2204 when executing software. The processing system 2214 further includes at least one of the components 2104, 2106, 2108. The components may be software components running in the processor 2204, resident/stored in the computer readable medium/memory 2206, one or more hardware components coupled to the processor 2204, or some combination thereof. The processing system 2214 may be a component of the UE 350 and may include the memory 360 and/or at least one of the TX processor 368, the RX processor 356, and the controller/processor 359.

In one configuration, the apparatus 2102/2102' for wireless communication may include means for receiving information associated with a beamforming procedure from a base station. In one aspect, the base station may be an mmW base station. In another aspect, the information may include a subframe structure for use during the beamforming procedure, first codebook information for use by the base station during the beamforming procedure, and second codebook information to be used by the apparatus 2102/2102' during the beamforming procedure. In a further aspect, the first codebook information may indicate a first subset of beam orientations in a base station codebook. In an additional aspect, the second codebook information may indicate a second subset of beam orientations in a UE codebook. In still a further aspect, distinct groups in the second subset of beam orientations are each associated with a different antenna subarray of the apparatus 2102/2102'. In another configuration, the apparatus 2102/2102' for wireless communication may include means for determining all possible access beams based on the first subset of beam orientations in the base station codebook and the second subset of beam orientations in the UE codebook by: (i) fixing a first beam orientation associated with a first antenna subarray of the apparatus 2102/2102' for a duration of a first contiguous symbol block in the subframe structure, (ii) applying each beam orientation in the first subset of beam orientations to the first beam orientation associated with a first antenna subarray of the apparatus 2102/2102' during the first contiguous symbol block, and (iii) repeating (i) and (ii) using each beam orientation in the first subset of beam orientations and the second subset of beam orientations until all of the possible access beams have been determined. In a further configuration, the apparatus 2102/2102' for wireless communication may include means for determining an access beam for use in communicating with the base station based on at least one of the subframe structure, the first codebook information, and the second codebook information. For example, the means for determining the access beam may configured to select one of the possible access beams for use as the access beam when a reference signal measurement associated with the one of the possible access beams meets a threshold criteria. In addition, the means for determining the access beam may be configured to transmit information related to the reference signal measurement to the base station. In another configuration, the apparatus 2102/2102' for wireless communication may include means for determining metric information associated with the apparatus 2102/2102'. In a further configuration, the apparatus 2102/2102' for wireless communication may include means for transmitting the metric information associated with the apparatus 2102/2102' to the base station. In an aspect, the metric information may include at least one of GPS information associated with the UE, gyroscope information associated with the UE, or accelerometer information associated with the UE. In an aspect, the information associated with the beamforming procedure that is received from the base station may be based at least in part on the metric information.

The aforementioned means may be one or more of the aforementioned components of the apparatus 2102 and/or the processing system 2214 of the apparatus 2102' configured to perform the functions recited by the aforementioned means. As described supra, the processing system 2214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 23A:
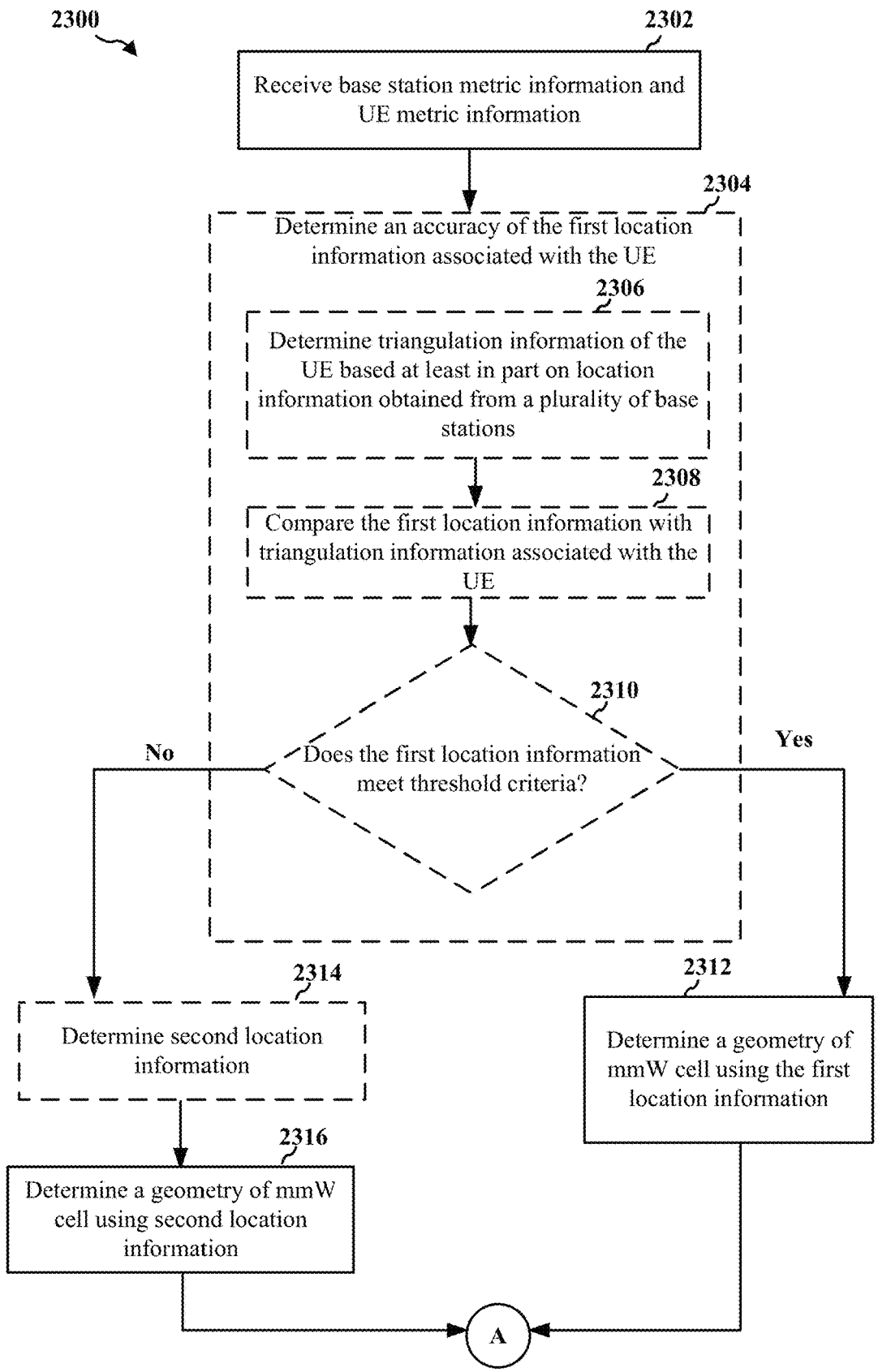
FIGS. 23A and 23B are a flowchart of a method of wireless communication.
Figure 23B:
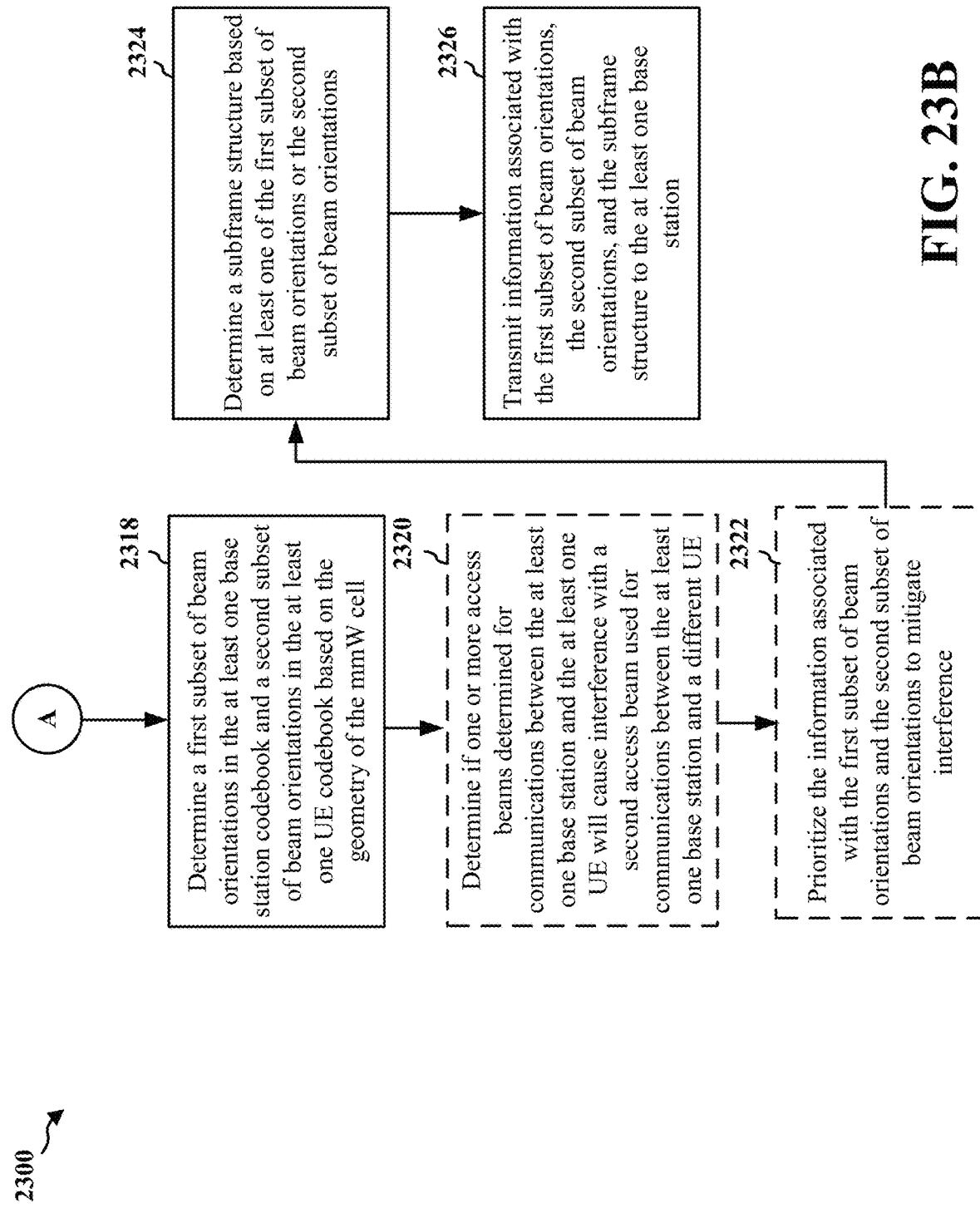

FIGS. 23A and 23B are a flowchart 2300 of a method that may be performed by a network entity (e.g., the network entity 1508, the apparatus 2402/2402'). The network entity may be a cloud-based server in communication with one or more mmW base stations. Operations indicated with dashed lines represent optional operations for various aspects of the disclosure.

As seen in FIG. 23A, at 2302, the network entity may receive at least one base station metric information and/or at least one UE metric information. In an aspect, the UE metric information may include at least one of first location information associated with the UE, gyroscope information associated with the UE, or accelerometer information associated with the UE. In an aspect, the UE metric information may include information associated with metric values, for example, measured by the UE based on BRSs transmitted to the UE by a base station (e.g., RSRP, RSRQ, RF energy level, etc.). In an aspect, the base station metric information may include information associated with a location of the base station and/or environment of the base station (e.g., obstacles in a cell provided by the base station). In an aspect, the base station metric information may include information associated with metric values, for example, measured by the base station based on signals transmitted to the base station.

Referring to FIG. 15, one or more data packets 1512 that include the base station metric information and/or the UE metric information may be transmitted to the network entity 1508. The transceiver 1513 of the network entity 1508 may receive the one or more data packets 1512 and extract information therefrom, e.g., to use the information included in the data packet(s) 1512 to determine the geometry 1515 of serving mmW cell 1502a.

As also seen in FIG. 23A, at 2304, the network entity may determine an accuracy of the first location information associated with the at least one UE. For example, the network entity may receive estimated coordinates or an indication of a geographic area in which the UE may be located or may be traveling (e.g., based on GPS information, accelerometer information, etc.), and the network entity may estimate a radial geographic area in which the UE may be located. Referring to FIG. 15, the processing system 1511 of the network entity 1508 may determine an accuracy of the location information associated with UE 1506 that is included in the data packet 1512.

As further seen in FIG. 23A, at 2306, the network entity may determine the accuracy of the first location information associated with the at least one UE by determining triangulation information of the at least one UE based at least in part on location information obtained from a plurality of base stations. For example, the network entity may determine triangulation information associated with the UE based on information received from a plurality of base stations (e.g., the network entity may receive one or more values indicating a geographic area in which the UE may be located, and the network entity may estimate a geographic area (e.g., radial area) in which the UE may be located). Referring to FIG. 15, the processing system 1511 of the network entity 1508 may determine the accuracy of the location information by determining triangulation information of the UE 1506 based at least in part on location information 1514 obtained from a plurality of base stations 1504a, 1504b, 1504c. Although three base stations are illustrated in FIG. 15 as transmitting location information 1514 to network entity 1508, location information from more or fewer than three base stations may be used in determining an accuracy location information without departing from the scope of the present disclosure.

As additionally seen in FIG. 23A, at 2308, the network entity may further determine the accuracy of the first location information by comparing the first location information with triangulation information associated with the at least one UE. For example, the network entity may compare the triangulation information to the first location information received from the UE, and the network entity may determine whether the triangulation information or the first location information received from UE is more accurate based on the comparison (e.g., the network entity may compare the radius of a geographic area in which the UE may be located according to the triangulation information to the radius of a geographic area in which the UE may be located according to the first location information, and the UE may select the smaller radius as the more accurate information). Referring to FIG. 15, the processing system 1511 of the network entity 1508 may determine the accuracy of the location information by comparing the location information in the data packet 1512 with the determined triangulation information that is based on the location information 1514 that is received from the plurality of base station 1504a, 1504b, 1504c.

As further seen in FIG. 23A, at 2310, the network entity may determine if the first location information meets the threshold criteria. In an aspect, the network entity may compare the first location information associated with the UE to a threshold criteria and the network entity may determine whether the first location information satisfies the threshold criteria based on the comparison (e.g., the network entity may compare a radius associated with a geographic area in which the UE may be located to a predetermined threshold value, such as a maximum allowable radius). For example, referring to FIG. 15, the processing system 1511 of the network entity 1508 may determine if the location information associated with the UE 1506 included in the data packet(s) 1512 meets a threshold criteria.

As seen in FIG. 23A, at 2312, the network entity may determine the geometry of the mmW cell based at least in part on the first location information when the first location information meets the threshold criteria. For example, the network entity may determine a geometry that indicates the location of the UE, e.g., with respect to the base station. For example, the network entity may determine, based on the first location information, a geographic location of the UE in a cell provided by the base station and/or a relative location of the UE with respect to the base station. The network entity may determine a location (e.g., geographic location) of the base station (e.g., based on the base station metric information). Further, the network entity may determine one or more obstacles in the cell provided by the base station, which may affect communication through an access beam between the UE and the base station. In an aspect, the network entity may determine an orientation and/or acceleration of the UE, which may affect the location of the UE relative to the base station. Based on one or more of the aforementioned locations, obstacles, orientation, and/or acceleration, the network entity may determine (e.g., generate) a mmW cell geometry, which may indicate respective beam orientations of the base station and the UE, e.g., relative to one another.

For example, referring to FIG. 15, the processing system 1511 of the network entity 1508 may determine a geometry 1515 of the serving mmW cell 1502a at least in part using the location information included in the data packet 1512 when the accuracy of the location information included in the data packet 1512 meets the threshold criteria. In a further example, the processing system 1511 of the network entity 1508 may determine the geometry 1515 of the serving mmW cell 1502a at least in part using the base station metric information and/or UE metric information included in the data packet(s) 1512.

As alternatively seen in FIG. 23A, at 2314, the network entity may determine second location information associated with the at least one UE when the accuracy of the first location information does not meet a threshold criteria. For example, the network entity may determine a geometry that indicates the location of the UE (e.g., with respect to the base station) based on second location information (e.g., triangulation information determined by the network entity based on information received from one or more base stations). For example, the network entity may determine, based on the second location information, a geographic location of the UE in a cell provided by the base station and/or a relative location of the UE with respect to the base station. The network entity may determine a location (e.g., geographic location) of the base station (e.g., based on the base station metric information). Further, the network entity may determine one or more obstacles in the cell provided by the base station, which may affect communication through an access beam between the UE and the base station. In an aspect, the network entity may determine an orientation and/or acceleration of the UE, which may affect the location of the UE relative to the base station. Based on one or more of the aforementioned locations, obstacles, orientation, and/or acceleration, the network entity may determine (e.g., generate) a mmW cell geometry, which may indicate respective beam orientations of the base station and the UE, e.g., relative to one another.

For example, referring to FIG. 15, the processing system 1511 of the network entity 1508 may determine a geometry 1515 of the serving mmW cell 1502a at least in part using the new location information (e.g., triangulation information) when the accuracy of the location information included in the data packet 1512 does not meet the threshold criteria.

As seen in FIG. 23B, at 2318, the network entity may determine a first subset of beam orientations in the at least one base station codebook and a second subset of beam orientations in the at least one UE codebook based on the geometry of the mmW cell. In an aspect, the first subset of beam orientations and the second subset of beam orientations may be for use in determining an access beam. The first subset of beam orientations may be beam orientations of the base station, while the second subset of beam orientations may be beam orientations of the UE.

In an aspect, the network entity may determine the location of the UE relative to the base station, which may include an orientation and/or acceleration of the UE. Using the mmW cell geometry, the network entity may determine a first subset of beam orientations, which may correspond to beam orientations at the base station. When the base station is located relative to the UE as indicated in the mmW cell geometry, the network entity may determine the respective metric values corresponding to one or more beam orientations. The network entity may select the first subset of beam orientations by selecting the beam orientations corresponding to the best or highest respective metric values, e.g., when the base station is located relative to the UE as indicated in the network map. The network entity may seed a base station codebook with the first subset of beam orientations.

Using the mmW cell geometry, the network entity may determine a second subset of beam orientations, which may correspond to beam orientations at the UE. When the UE is located relative to the base station as indicated in the mmW cell geometry, the network entity may determine the respective metric values corresponding to one or more beam orientations. The network entity may select the second subset of beam orientations by selecting the beam orientations corresponding to the best or highest respective metric values, e.g., when the UE is located relative to the base station as indicated in the network map.

For example, referring to FIG. 15, the processing system 1511 of the network entity 1508 may determine a first subset of beam orientations in a base station codebook and a second subset of beam orientations in a UE codebook that may be used as possible access beams based on the determined geometry 1515 of the serving mmW cell 1502a. In other words, the processing system 1511 of the network entity 1508 may seed the base station codebook and/or the UE codebook to limit the number of beams that need to be scanned during the beam scanning process. Referring to FIG. 16A, based on the determined mmW cell geometry 1515, the processing system 1511 of the network entity 1508 in FIG. 15 may determine that out of the sixteen beam orientations 1614 in the base station codebook 1615, a subset of three beam orientations 1616a, 1616b, and 1616c may be preferably used during the beam scanning process. Accordingly, the processing system 1511 of the network entity 1508 may seed the base station codebook 1615 with the subset of beam orientations 1616a, 1616b, 1616c. In addition, using the determined mmW cell geometry 1515, the processing system 1511 of the network entity 1508 in FIG. 15 may determine that one beam orientation 1622a,

1622*b*, 1622*c*, 1622*d* selected from each group of beam orientations associated with one of the UE subarrays 1610*a*, 1610*b*, 1610*c*, 1610*d* may be preferably used during the beam scanning process. Accordingly, the processing system 1511 of the network entity 1508 may seed the UE codebook 1630 with the subset of beam orientations 1622*a*, 1622*b*, 1622*c*, 1622*d*.

As also seen in FIG. 23B, at 2320, the network entity may determine if one or more access beams determined for communications between the at least one base station and the at least one UE will cause interference with a second access beam used for communications between the at least one base station and a different UE. For example, the network entity may determine, based on the mmW cell geometry, whether the UE is proximate to a different UE, which may cause interference to communication by the different UE. The network entity may determine whether a beam orientation of the UE may intersect a beam used by the different UE for communication with the base station. The network entity may select another beam orientation for the UE that does not intersect the beam used by the different UE. Referring to FIG. 15, the processing system 1511 of the network entity 1508 may determine if one or more of the possible access beams (e.g., used by the serving base station 1504*a* and the UE 1506) may cause interference with a second access beam used for communications between the serving base station 1504*a* and a different UE.

As additionally seen in FIG. 23B, at 2322, the network entity may prioritize the information associated with the first subset of beam orientations and the second subset of beam orientations such that the access beam determined for use in communications with the at least one base station and the UE will reduce the interference caused to the second access beam used for communications between the at least one base station and the different UE. For example, the network entity may assign a first priority to the first communication link between the base station and the different UE (e.g., the beam orientations used by the base station and the different UE, respectively). The network entity may assign a second priority to the second communication link between the base station and the UE (e.g., the beam orientations used by the base station and the UE, respectively). The second priority may indicate a lower priority than the first priority. Because the first communication link is prioritized over the second communication link, the network entity may assign the priorities to beam orientations of the first subset of beam orientations and the second subset of beam orientations. For example, the network entity may assign a first priority to a first pair of a first beam orientation of the first subset of beam orientations and a second beam orientation of the second subset of beam orientations, which may indicate that first pair of a first beam orientation of the first subset of beam orientations and a first beam orientation of the second subset of beam orientations is preferable or prioritized over other beam orientations that may be seeded in the first and second set of beam orientations for the base station and the UE, respectively. The first pair of the first beam orientation of the first subset of beam orientations and the first beam orientation of the second subset of beam orientations may be less likely than other pairs of beam orientations to cause interference to the first communication link between base station and the different UE. The network entity may similarly assign respective priorities to other pairs of beam orientations, such that respective assigned priorities are assigned in descending order indicating a likelihood of causing interference to the first communication link—e.g., the lowest assigned priority may indicate that pair of beam orientations is more likely to cause interference and, therefore, should be selected as the access beam after first attempting to select a pair of beam orientations having a higher assigned priority.

Referring to FIG. 15, when it is determined that one or more of the possible access beams will cause interference, the processing system 1511 of the network entity 1508 may prioritize the information associated with the first subset of beam orientations and the second subset of beam orientations such that the access beam determined for use in communications between the serving base station 1504*a* and the UE 1506 will cause the least amount of interference. Referring to FIGS. 16A and 16B, for example, a first pair of beam orientations 1616*a*, 1622*a* may be assigned a first priority, whereas a second pair of beam orientations 1616*a*, 1622*b* may be assigned a second priority that is lower than the first priority. Accordingly, the base station 1602 and the UE 1608 may first attempt to select the first pair of beam orientations 1616*a*, 1622*a* before attempting to select the second pair of beam orientations 1616*a*, 1622*b*.

As further seen in FIG. 23B, at 2324, the network entity may determine a subframe structure based on at least one of the first subset of beam orientations or the second subset of beam orientations. In an aspect, the subframe structure may be used in a beamforming procedure by the base station and the UE. For example, the network entity may determine the number of possible pairs of beam orientations (e.g., 3 beam orientations in the first subset of beam orientations and 4 beam orientations in the second subset of beam orientations). The network entity may assign possible beam orientations to one or more symbols of the subframe structure. For example, the network entity may assign each beam orientation of the first subset of beam orientations to a first contiguous symbol block of the subframe structure (e.g., the first beam orientation of the first subset of beam orientations may be assigned to symbols 0, 1, and 2), such that each beam orientation of the second subset of beam orientations is to be scanned using the first beam orientation of the first subset of beam orientations.

Referring to FIG. 15, based on the number of beams in the first subset of beam orientations and the number of beams in the second subset of beam orientations, the processing system 1511 of the network entity 1508 may determine a subframe structure to be used by the serving base station 1504*a* and the UE 1506 during the beam forming procedure. Referring to FIGS. 16A and 16B, each of the seeded beam orientations 1616*a*, 1616*b*, 1616*c* in the base station codebook 1615 may be scanned across each one of the directional beam orientations 1622*a*, 1622*b*, 1622*c*, 1622*d* in the UE codebook 1630 to determine all of the possible access beams. In the example illustrated in FIGS. 16A and 16B, there are twelve possible number of access beams (e.g., (3 beams at the base station)×(4 directional beams at the UE)=12 possible access beams). An individual access beam from the twelve possible access beams may be scanned using one of the twelve symbols in the subframe structure 1645 illustrated in FIG. 16B.

As also seen in FIG. 23B, at 2326, the network entity may transmit information associated with the first subset of beam orientations, the second subset of beam orientations, and the subframe structure to the at least one base station. For example, referring to FIG. 15, the transceiver 1513 of the network entity 1508 may transmit information associated with the first subset of beam orientations, the second subset of beam orientations, and the subframe structure to the serving base station 1504*a*. Referring to FIGS. 16A and 16B, information indicating the first subset of beam orientations 1616*a*, 1616*b*, 1616*c*, the second subset of beam orientations 1622a, 1622b, 1622c, 1622d, and the subframe structure 1645 may be transmitted to the base station 1602.

Figure 24:
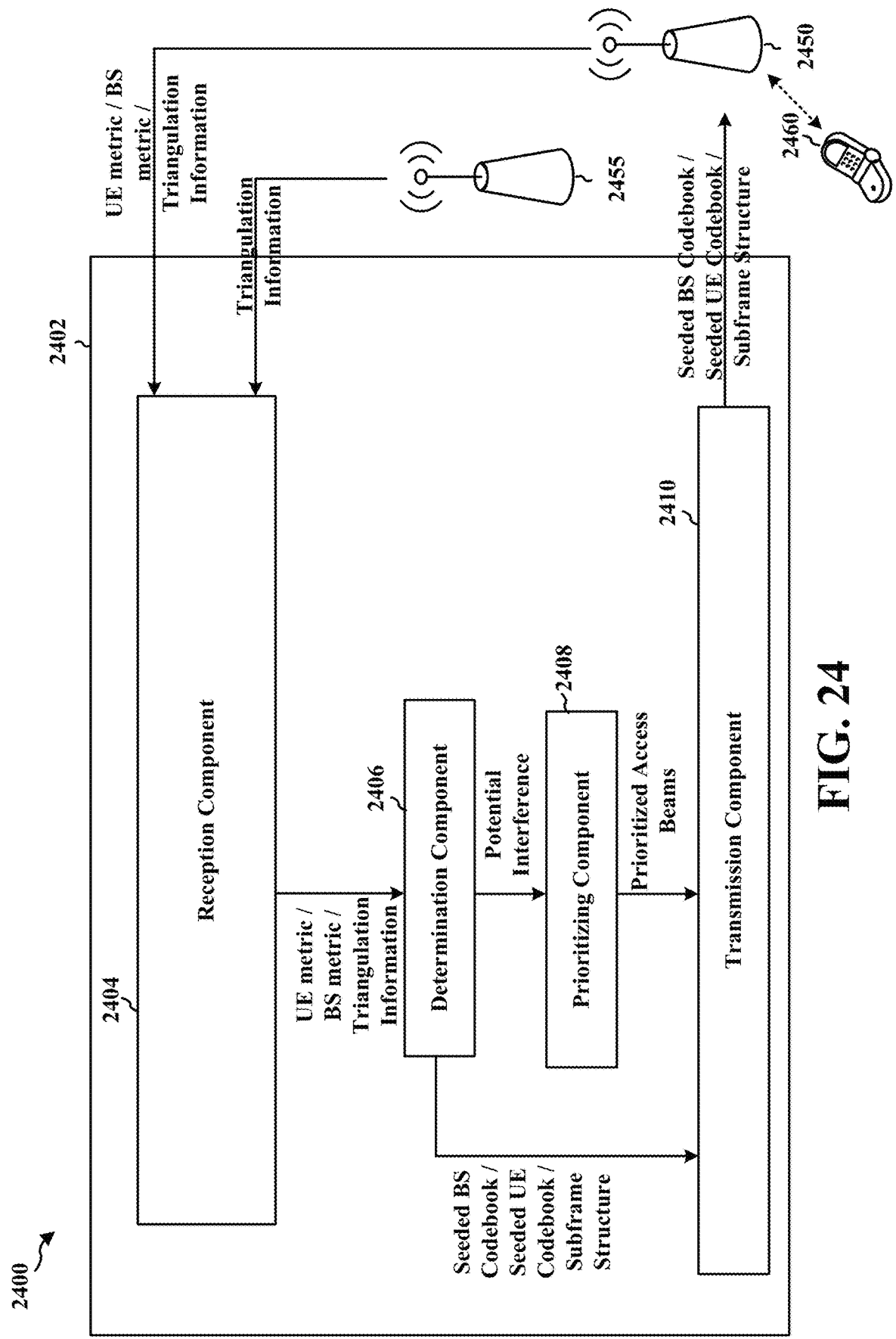
FIG. 24 is a conceptual data flow diagram illustrating the data flow between different means/components in an exemplary apparatus.

FIG. 24 is a conceptual data flow diagram 2400 illustrating the data flow between different means/components in an exemplary apparatus 2402. The apparatus may be a network entity in communication with a serving base station 2450 and one or more neighboring base stations 2455. The apparatus 2402 may include a reception component 2404 that receives UE metric information and base station metric information from serving base station 2450.

In an aspect, the UE metric information may include information associated with a UE 2460, which may be operating on a cell provided by the serving base station 2450. For example, the UE metric information may include at least one of first location information associated with the UE 2460, gyroscope information associated with the UE 2460, or accelerometer information associated with the UE 2460. Additionally or alternatively, the UE metric information may include information associated with one or more metric values determined by the UE 2460, such as RSRP, RSRQ, RF energy values, etc., and the metric values may correspond to beam orientations used for communication between the UE 2460 and the serving base station 2450. In an aspect, the UE metric information may include information indicating antenna subarrays of the UE 2460 and beam orientations that may be generated at such subarrays.

In an aspect, the base station metric information may include information associated with the base station 2450, such as a location of the base station 2450, communication links between the base station 2450 and one or more UEs, obstacles in the cell provided by the base station 2450, antenna component(s) of the base station 2450 that generate beam orientations, and/or other information related to the base station 2450. Additionally or alternatively, the base station metric information may include information associated with one or more metric values determined by the serving base station 2450, such as RSRP, RSRQ, RF energy values, etc., and the metric values may correspond to beam orientations used for communication between the serving base station 2450 and the UE 2460.

The reception component 2404 may send a signal associated with the UE metric information and the base station metric information to the determination component 2406. In addition, the reception component 2404 may receive triangulation information associated with the location of a UE 2460 from the one or more neighboring base stations 2455 and the serving base station 2450. The reception component 2404 may send a signal associated with the triangulation information to determination component 2406. The determination component 2406 may determine an accuracy of the first location information associated with the UE 2460. In an aspect, the determination component 2406 may determine the accuracy of the first location information associated with the UE 2460 by comparing the first location information to the triangulation information. For example, the determination component 2406 may determine the triangulation information of the at least one UE based at least in part on the triangulation information obtained from the one or more neighboring base stations 2455 and the serving base station 2450. The determination component 2406 may further determine the accuracy of the first location information by comparing the first location information with triangulation information associated with the at least one UE. In an aspect, the determination component 2406 may determine if the first location information meets the threshold criteria. For example, the determination component 2406 may determine if the first location information indicates a geographic area consistent with the serving base station 2450 and/or if the first location information is within a threshold margin of error (e.g., a radius of the geographic area of the UE 2460 indicated by the first location information satisfies a threshold radius).

In one aspect, the determination component 2406 may determine the geometry of the mmW cell based at least in part on the first location information when the first location information meets the threshold criteria. In another aspect, the determination component 2406 may determine second location information associated with the UE 2460 when the accuracy of the first location information does not meet a threshold criteria. Additionally, the determination component 2406 may determine a geometry of the mmW cell using the second location information. Still further, the determination component 2406 determine a first subset of beam orientations in the at least one base station codebook (e.g., seeded BS codebook) and a second subset of beam orientations in the at least one UE codebook (e.g., seeded UE codebook) based on the geometry of the mmW cell. The determination component 2406 may send a signal associated with the seeded BS codebook and the seeded UE codebook to the transmission component 2410.

In an aspect, the determination component 2406 may determine if one or more access beams determined for communications between the serving base station 2450 and the UE 2460 may cause interference with a second access beam used for communications between the at least one base station and a different UE (e.g., another communication link). The determination component 2406 may send, to the prioritizing component 2408, a signal indicating which potential access beams between the serving base station and the UE 2460 may cause interference. The prioritizing component 2408 may prioritize the information associated with the first subset of beam orientations and the second subset of beam orientations such that the access beam determined for use in communications with the serving base station 2450 and the UE 2460 may mitigate (e.g., minimize) the interference caused to the second access beam used for communications between the serving base station 2450 and the different UE. For example, the prioritizing component 2408 may assign priorities to one or more beam orientations of the first subset of beam orientations and may assign priorities to one or more beam orientations of the second subset of beam orientations. A higher assigned priority may indicate that the corresponding beam orientation is preferable and may be less likely to cause interference to another communication link. The prioritizing component 2408 may send, to the transmission component 2410, a signal indicating a prioritized list of beam orientations (e.g., potential access beams).

In addition, the determination component 2406 may determine a subframe structure based on at least one of the first subset of beam orientations or the second subset of beam orientations. In an aspect, the subframe structure may be used in a beamforming procedure by the base station and the UE. For example, the determination component 2406 may determine a number of possible access beams between the serving base station 2450 and the UE 2460, and the determination component 2406 may determine a number of a number of symbols needed to scan each potential access beam of the first subset of beam orientations or the second subset of beam orientations. In one aspect, the determination component 2406 may assign each potential access beam to a symbol of the subframe structure. The determination component 2406 may send, to the transmission component 2410, a signal associated with the subframe structure.

The transmission component 2410 may transmit information associated with the first subset of beam orientations, the second subset of beam orientations, and the subframe structure to the serving base station 2450. In an aspect, the first subset of beam orientations may seed a base station codebook for the base station 2450 and the second subset of beam orientations may seed a UE codebook for the UE 2460. The subframe structure may provide a structure so that the serving base station 2450 and the UE 2460 may scan each of the possible beam orientations seeded in the base station codebook and the UE codebook.

The apparatus may include additional components that perform each of the blocks of the algorithm in the aforementioned flowcharts of FIGS. 23A and 23B. As such, each block in the aforementioned flowcharts of FIGS. 23A and 23B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 25:
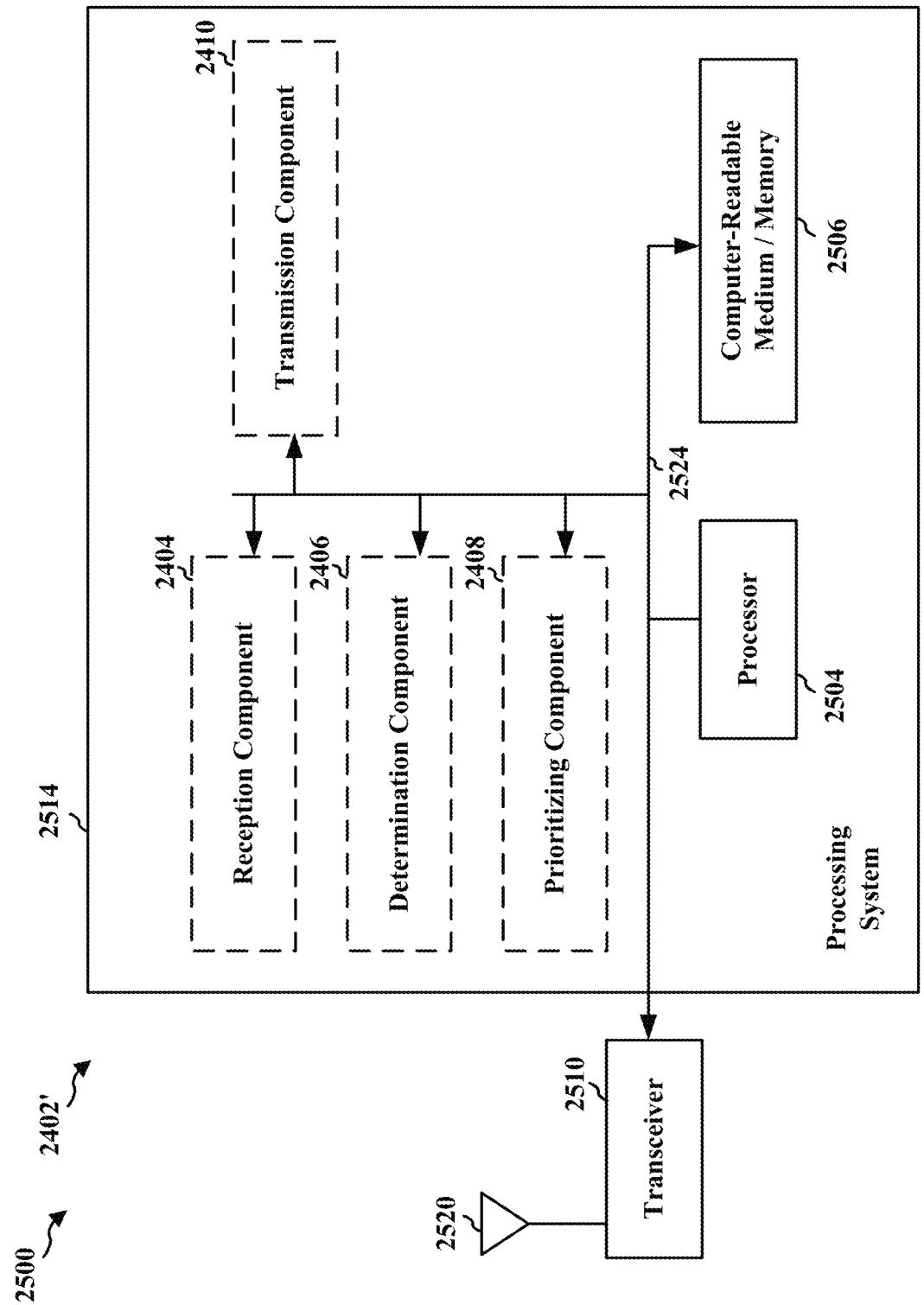
FIG. 25 is a diagram illustrating an example of a hardware implementation for an apparatus employing a processing system.

FIG. 25 is a diagram 2500 illustrating an example of a hardware implementation for an apparatus 2402' employing a processing system 2514. The processing system 2514 may be implemented with a bus architecture, represented generally by the bus 2524. The bus 2524 may include any number of interconnecting buses and bridges depending on the specific application of the processing system 2514 and the overall design constraints. The bus 2524 links together various circuits including one or more processors and/or hardware components, represented by the processor 2504, the components 2404, 2406, 2408, 2410 and the computer-readable medium/memory 2506. The bus 2524 may also link various other circuits such as timing sources, peripherals, voltage regulators, and power management circuits, which are well known in the art, and therefore, will not be described any further.

The processing system 2514 may be coupled to a transceiver 2510. The transceiver 2510 is coupled to one or more antennas 2520. The transceiver 2510 provides a means for communicating with various other apparatus over a transmission medium. The transceiver 2510 receives a signal from the one or more antennas 2520, extracts information from the received signal, and provides the extracted information to the processing system 2514, specifically the reception component 2404. In addition, the transceiver 2510 receives information from the processing system 2514, specifically the transmission component 2410, and based on the received information, generates a signal to be applied to the one or more antennas 2520. The processing system 2514 includes a processor 2504 coupled to a computer-readable medium/memory 2506. The processor 2504 is responsible for general processing, including the execution of software stored on the computer-readable medium/memory 2506. The software, when executed by the processor 2504, causes the processing system 2514 to perform the various functions described supra for any particular apparatus. The computer-readable medium/memory 2506 may also be used for storing data that is manipulated by the processor 2504 when executing software. The processing system 2514 further includes at least one of the components 2404, 2406, 2408, 2410. The components may be software components running in the processor 2504, resident/stored in the computer readable medium/memory 2506, one or more hardware components coupled to the processor 2504, or some combination thereof.

The apparatus may be a network entity (e.g., cloud-based server) that is connected to one or more base stations 102 via a fiber cable, an optical cable, a digital subscriber line (DSL) cable, or a backhaul link uses wireless communications (e.g., using a predetermined frequency or an mmW frequency).

In one configuration, the apparatus 2402/2402' may include means for receiving base station metric information associated with a base station and UE metric information associated with a UE. In an aspect, the UE metric information may include at least one of first location information associated with the UE, gyroscope information associated with the UE, or accelerometer information associated with the UE. In a configuration, the apparatus 2402/2402' may include means for determining a geometry of a mmW cell based on at least one of the base station metric information or the UE metric information. In a configuration, the apparatus 2402/2402' may include means for determining a first subset of beam orientations in a base station codebook and a second subset of beam orientations in a UE codebook based on the geometry of the mmW cell. In an aspect, the first subset of beam orientations and the second subset of beam orientations may be for use in determining an access beam. In still another aspect, the apparatus 2402/2402' may include means for determining a subframe structure based on at least one of the first subset of beam orientations or the second subset of beam orientations. In an aspect, the subframe structure may be used in a beamforming procedure by the base station and the UE. In one configuration, the apparatus 2402/2402' may include means for transmitting information associated with the first subset of beam orientations, the second subset of beam orientations, and the subframe structure to the base station. In another configuration, the apparatus 2402/2402' may include means for determining an accuracy of the first location information associated with the at least one UE. In a further configuration, the apparatus 2402/2402' may include means for determining second location information associated with the UE when the accuracy of the first location information does not meet a threshold criteria. In an aspect, the geometry of the mmW cell may be determined at least in part using the second location information when the accuracy of the first location information does not meet the threshold criteria. In another aspect, the geometry of the mmW cell may be determined at least in part using the first location information when the accuracy of the first location information meets the threshold criteria. In a further aspect, the means for determining the accuracy of the first location information associated with the UE is configured to determine triangulation information of the UE based at least in part on location information obtained from a plurality of base stations, and to compare the first location information with triangulation information associated with the UE, wherein the second location information is based on the triangulation information when the accuracy of the first location information does not meet a threshold criteria. In another configuration, the apparatus 2402/2402' may include means for determining if one or more access beams for communications between the base station and the UE will cause interference with a second access beam used for communications between the base station and a different UE. In an additional configuration, the apparatus 2402/2402' may include means for prioritizing the information associated with the first subset of beam orientations and the second subset of beam orientations when the one or more access beams are determined to cause interference with the second access beam.

Figure 26:
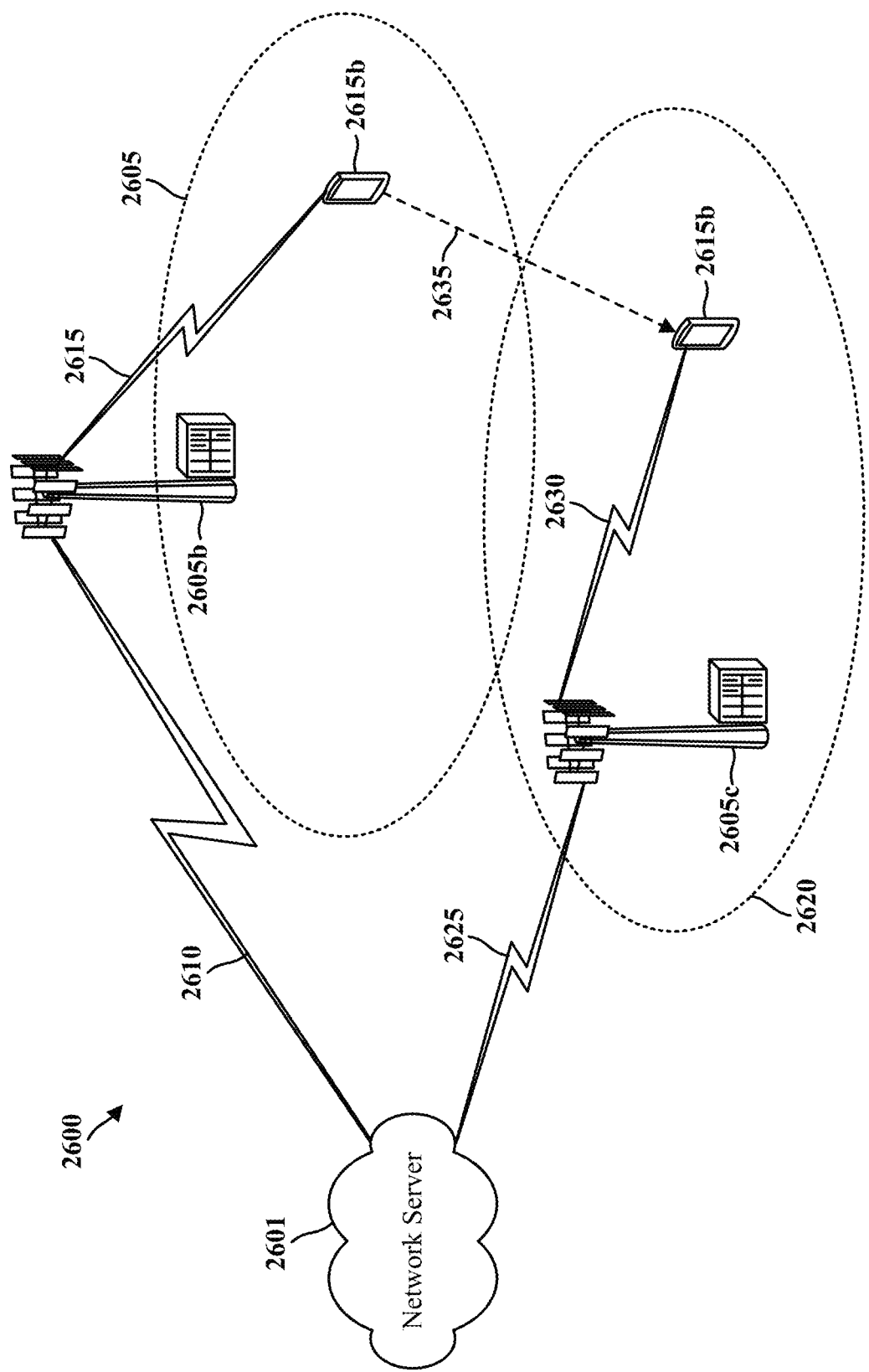
FIG. 26 illustrates examples of systems for wireless communications that supports UE localization via a mmW network map.

FIG. 26 illustrates an example of a wireless communications system 2600 for UE localization via a mmW network map. The wireless communications system 2600 may include at least one base station 2605a, and a network server 2601. In some cases, at least one UE 2615a may be within a geographic coverage area 2610 of the base station 2605a, and may communicate on a communication link. In relation to FIG. 1, the network server 2601 may be an aspect of the server 199, the base station 2605a may be an aspect of the base station 102 and/or the mmW base station 180, and the UE 2615a may be an aspect of the UE 104.

UE 2615a may report position information for UE 2615a to network server 2601 through base station 2605a. UE 2615a may transmit the position information on mmW control channels or low frequency coexisting channels, which may be examples of the communication link 120 or the communication link 184. In other examples, UE 2615a may transmit the position information to base station 2605a in response to a BRS. Base station 2605a may then transmit the position information to the network server 2601. The position information may include GPS information, gyroscope information, accelerometer information, or subarray geometry information. In some cases, base station 2605a may transmit the position information to the network server 2601 using backhaul links. The network server 2601 may determine the location and orientation of UE 2615a based on the position information. In some examples, network server 2601 may be a cloud-based server. In some examples, UE 2615a may transmit the position information to network server 2601 directly.

Network server 2601 may associate a communication service type of UE 2615a with the position information. UE 2615a and base station 2605a may be configured for various types of communication such as gaming, streaming high quality video, or voice communication. The position information may correspond to a type of service. For example, if UE 2615a is in a landscape position, UE 2615a may use services for video watching, or if UE 2615a is held at other angles, the angles may be associated with playing games or voice calls. Network server 2601 may receive the position information from base station 2605a and identify a service type of communication used by UE 2615a. The service type may be based on a QoS class identifier. In some cases, network server 2601 may detect an impending change in the service type for UE 2615a based on the position information (e.g., UE 2615a rotates from a vertical position to a horizontal position to stream videos).

Network server 2601 may determine a beamforming configuration based on a network map (or mmW cell geometry) and a service type of UE 2615a. Network server 2601 may create a network map of UE 2615a and base station 2605a based on the position information. Network server 2601 may also map the position of other UEs and/or base stations. Network server 2601 may identify a communication service type of UE 2615a based on the position information. Then, network server 2601 may identify a beamforming configuration for UE 2615a and base station 2605a to use based on the network map and the service type. The beamforming configuration may include, for example, a beam direction, a beam type, or a subframe configuration. The beam type may be, for example, a beam width (e.g., broad beam or narrow beam). Network server 2601 may transmit the beamforming configuration to base station 2605a, and base station 2605a may communicate with UE 2615a based on the beamforming configuration. Network server 2601 may detect an impending change of a service type, identify a new beamforming configuration, and transmit the new beamforming configuration to base station 2605a.

Figure 27:
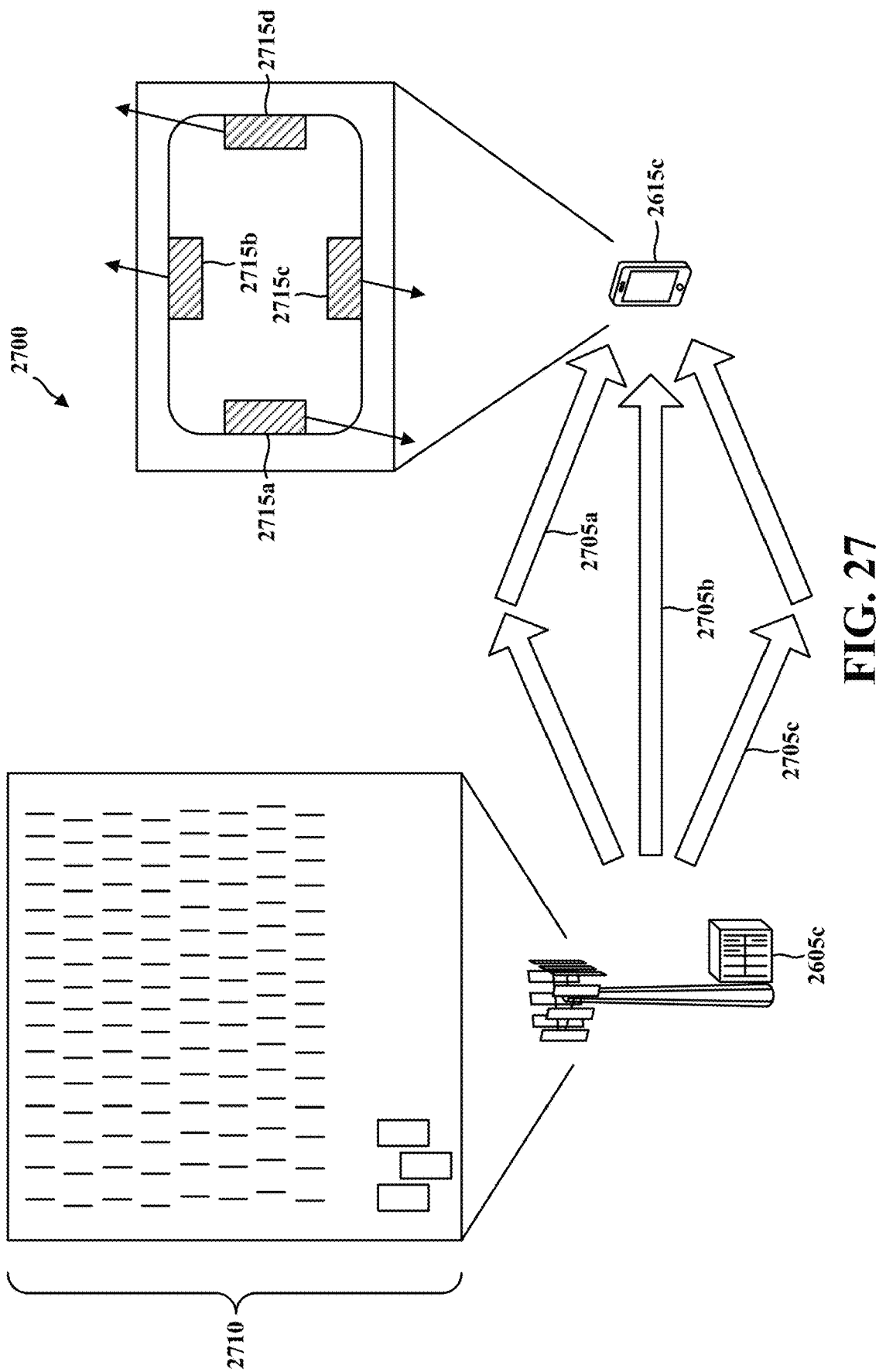
FIG. 27 illustrates an example of a beamforming transmission that supports UE localization via an mmW network map.

FIG. 27 illustrates an example of a beamforming transmission 2700 for UE localization via an mmW network map. The identification of position information in beamforming transmission 2700 may be performed by base station 2605c and UE 2615c, which may be examples of or may represent aspects of techniques performed by a base station 2605 or a UE 2615 respectively, as described with reference to FIG. 26.

Base station 2605c may include transmission array 2710. Transmission array 2710 may include multiple antennas for transmission. The multiple antennas may communicate with UE 2615c using multiple transmissions 2705. Each of the multiple transmissions 2705 may be transmitted on a beam with a different direction, as shown by transmissions 2705a, 2705b, and 2705b.

UE 2615c may include multiple antenna subarray units 2715. For example, UE 2615c may include antenna subarray units 2715a, 2715b, 2715b, and 2715d located at different positions on UE 2615c. Transmissions 2705a, 2705b, and 2705b may be received at different antenna subarray units 2715a, 2715b, 2715b, and 2715d. UE 2615c may identify which antenna subarray units 2715a, 2715b, 2715b, or 2715d received a transmission 2705, and may include subarray geometry information (e.g., the receiving antenna subarray unit 2715) in a transmission of position information to base station 2605c. Which subarray units 2715a, 2715b, 2715b, or 2715d received transmissions 2705 may correspond to UE 2615c being held at a certain angle. UE 2615c may also include GPS information, gyroscope information, or accelerometer information in the transmission of position information. A network server 201 may identify a location or orientation for UE 2615c based on the position information for UE 2615c, including the subarray geometry information.

Figure 28:
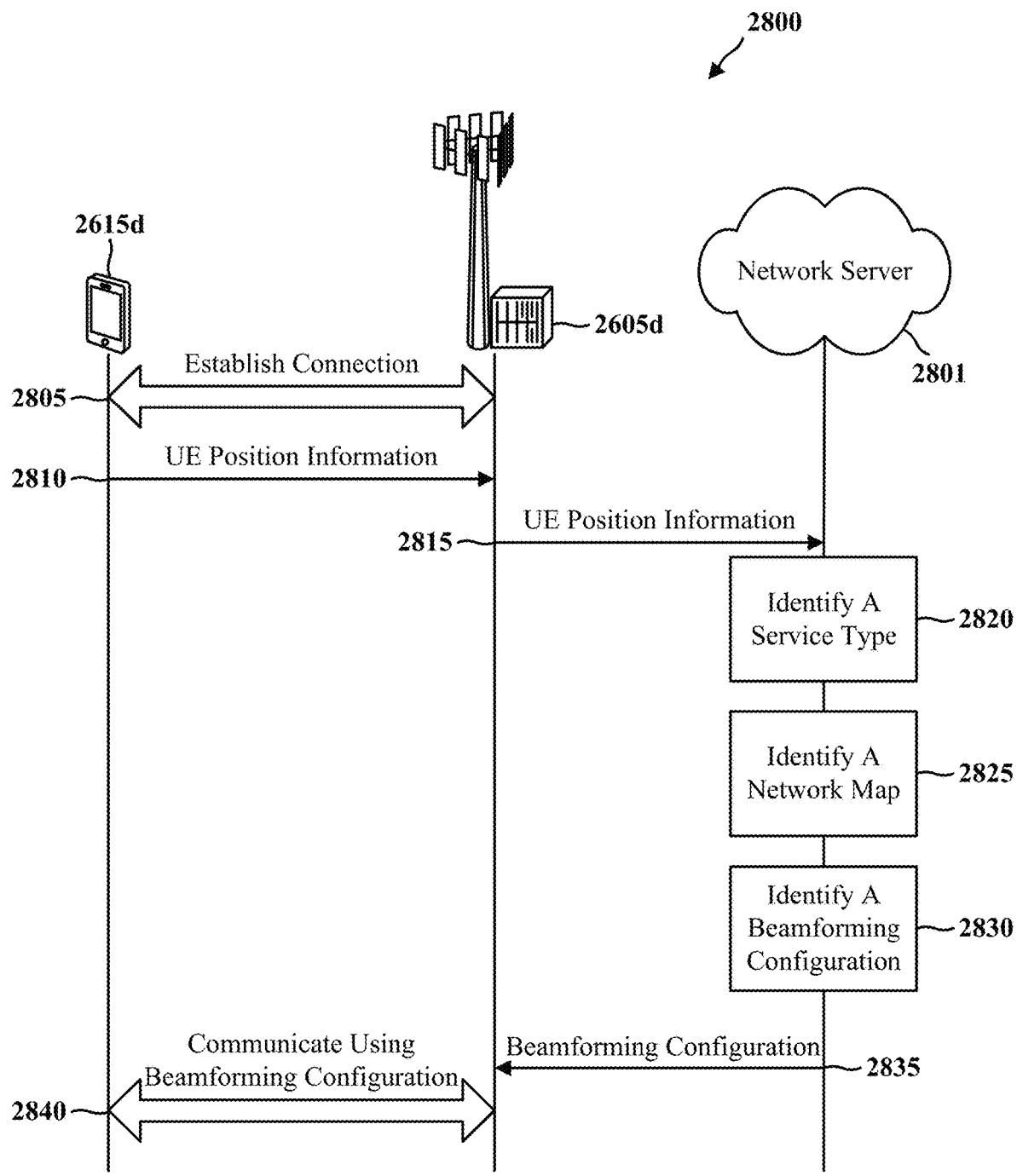
FIG. 28 illustrates an example of a process flow that supports UE localization via an mmW network map.

FIG. 28 illustrates an example of a process flow 2800 for UE localization via an mmW network map. Process flow 2800 may include base station 2605d, UE 2615d, and network server 2801, which may be examples of a base station 2605, a UE 2615, and a network server 2601 as described herein with reference to FIG. 26.

At 2805, base station 2605d and UE 2615d may establish a connection. In some cases, to establish the connection, base station 2605d may transmit BRS to UE 2615d. UE 2615d may scan for BRSs, and may detect the BRS from base station 2605d.

At 2810, UE 2615d may identify position information of the UE 2615d. The position information may include GPS information, gyroscope information, accelerometer information, or UE subarray geometry information. UE 2615d may transmit the identified position information to base station 2605d. In some cases, UE 2615d may identify and transmit metrics to base station 2605d. The metrics may include a channel quality indicator, a signal strength indicator, or a beam identifier. At 2815, base station 2605d may transmit the position information from UE 2615d to network server 2801.

At 2820, network server 2801 may identify a service type. In some cases, the service type may be associated with UE 2615d based on the received position information. The service type may include a voice communications service type, a video service type, a high definition video service type, a real-time gaming service type, a mission critical communications service type, or an IMS communications service type. In some cases, the service type may include a QoS class identifier. Additionally, network server 2801 may identify if the service type associated with UE 2615*d* is different from a previous service type associated with UE 2615*d*.

At 2825, network server 2801 may identify a network map. In some cases, the network map may include locations for UE 2615*d* and base station 2605*d*. The identifying the network map may be based on the received position information for UE 2615*d*. In some cases, network server 2801 may receive position information for a second UE 2615 from a second base station 2605. The network map may include relative position information for the second UE 2615 and the second base station 2605.

At 2830, network server 2801 may identify a beamforming configuration. The beamforming configuration may be for communication between base station 2605*d* and UE 2615-*e*. The identifying the beamforming configuration may be based on the identified service type and network map. The beamforming configuration may include one or more beam directions, a beam type, or a subframe configuration. In some cases, the beamforming configuration may additionally be based on relative position information for a second UE 2615 or a second base station 2605.

At 2835, network server 2801 may transmit the beamforming configuration to base station 2605*d*. At 28280, base station 2605*d* and UE 2615*d* may communicate using the beamforming configuration. For example, base station 2605*d* may transmit data to UE 2615*d* in a beam direction or on a beam type specified in the beamforming configuration. Base station 2605*d* may also transmit a BRS to UE 2615*d*, and may communicate based on UE 2615*d* detecting the BRS.

Figure 29:
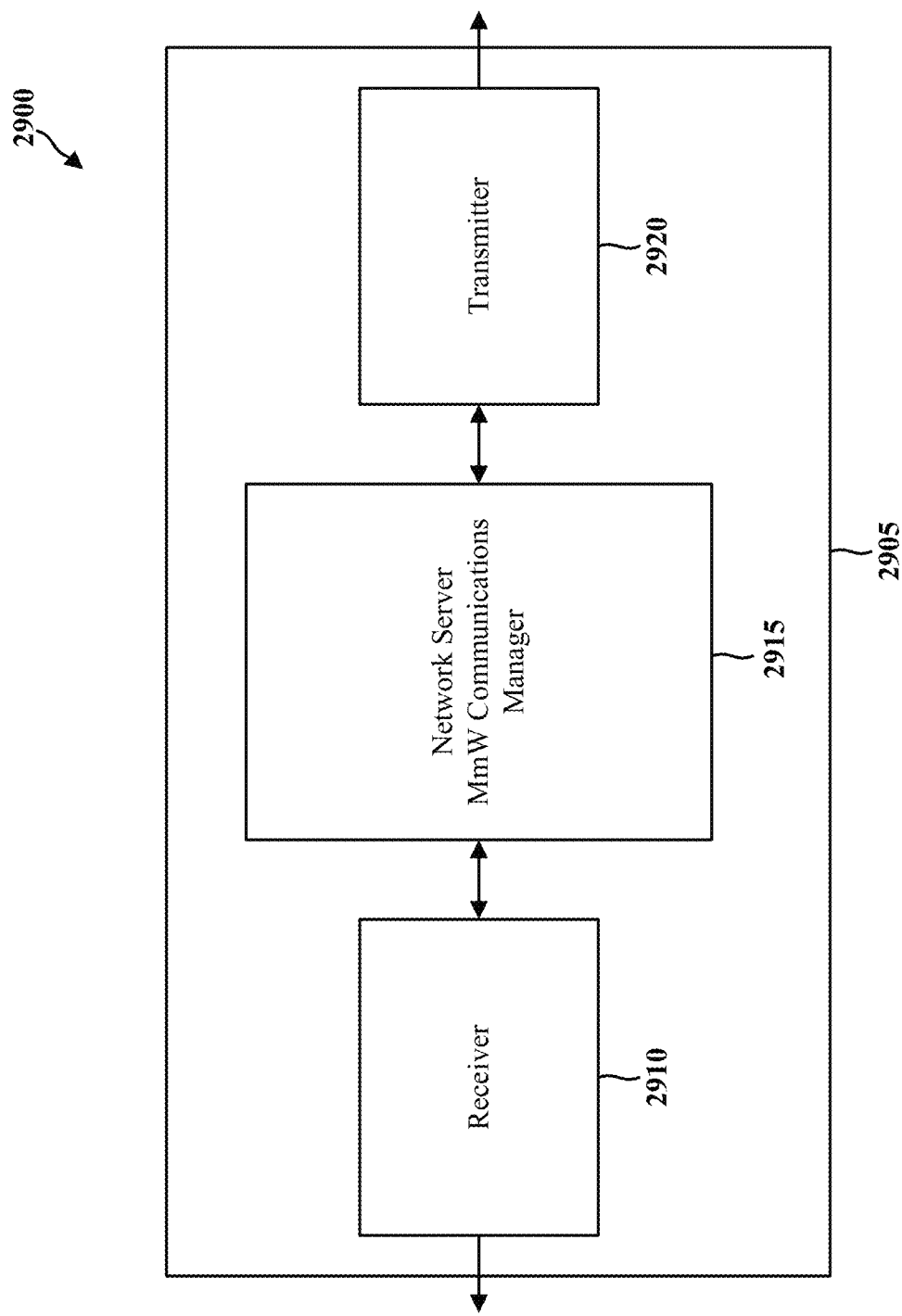
FIGS. 29 through 31 show block diagrams of a device that supports UE localization via an mmW network map.

FIG. 29 shows a block diagram 2900 of a wireless device 2905 that supports UE localization via an mmW network map in accordance with various aspects of the present disclosure. Wireless device 2905 may be an example of aspects of a network entity of the core network, such as the server 199 of FIG. 1 and/or the network server 2601 as described with reference to FIG. 26. Wireless device 2905 may include receiver 2910, network server mmW communications manager 2915, and transmitter 2920. Wireless device 2905 may also include a processor. Each of these components may be in communication with one another (e.g., via one or more buses).

Receiver 2910 may receive information such as packets, user data, or control information associated with various information channels (e.g., control channels, data channels, and information related to UE localization via an mmW network map, etc.). Information may be passed on to other components of the device. The receiver 2910 may be an example of aspects of the transceiver 3235 described with reference to FIG. 32.

Network server mmW communications manager 2915 may be an example of aspects of the network server mmW communications manager 3215 described with reference to FIG. 32.

Network server mmW communications manager 2915 may receive position information associated with a UE 2615, identify a service type associated with the UE 2615 based on the position information, identify a network map, the network map including a location of the UE 2615 and a base station 2605, and identify a beamforming configuration for communication between the base station 2605 and the UE 2615 based on the service type and the network map.

The network server mmW communications manager 2915 may be implemented in hardware, software executed by a processor, firmware, or any combination thereof. If implemented in software executed by a processor, the functions of the network server mmW communications manager 2915 may be executed by a general-purpose processor, a DSP, an ASIC, an FPGA or other programmable logic device, discrete gate or transistor logic, discrete hardware components, or any combination thereof designed to perform the functions described in the present disclosure. The network server mmW communications manager 2915 may be physically located at various positions, including being distributed such that portions of functions are implemented at different physical locations by one or more physical devices. In some examples, network server mmW communications manager 2915 may be a separate and distinct component in accordance with various aspects of the present disclosure. In other examples, network server mmW communications manager 2915 may be combined with one or more other hardware components, including but not limited to a receiver, a transmitter, a transceiver, one or more other components described in the present disclosure, or a combination thereof in accordance with various aspects of the present disclosure.

Transmitter 2920 may transmit signals generated by other components of the device. In some examples, the transmitter 2920 may be collocated with a receiver 2910 in a transceiver module. For example, the transmitter 2920 may be an example of aspects of the transceiver 3235 described with reference to FIG. 32. The transmitter 2920 may include a single antenna, or it may include a set of antennas. Transmitter 2920 may transmit the beamforming configuration to the base station 2605.

Figure 30:
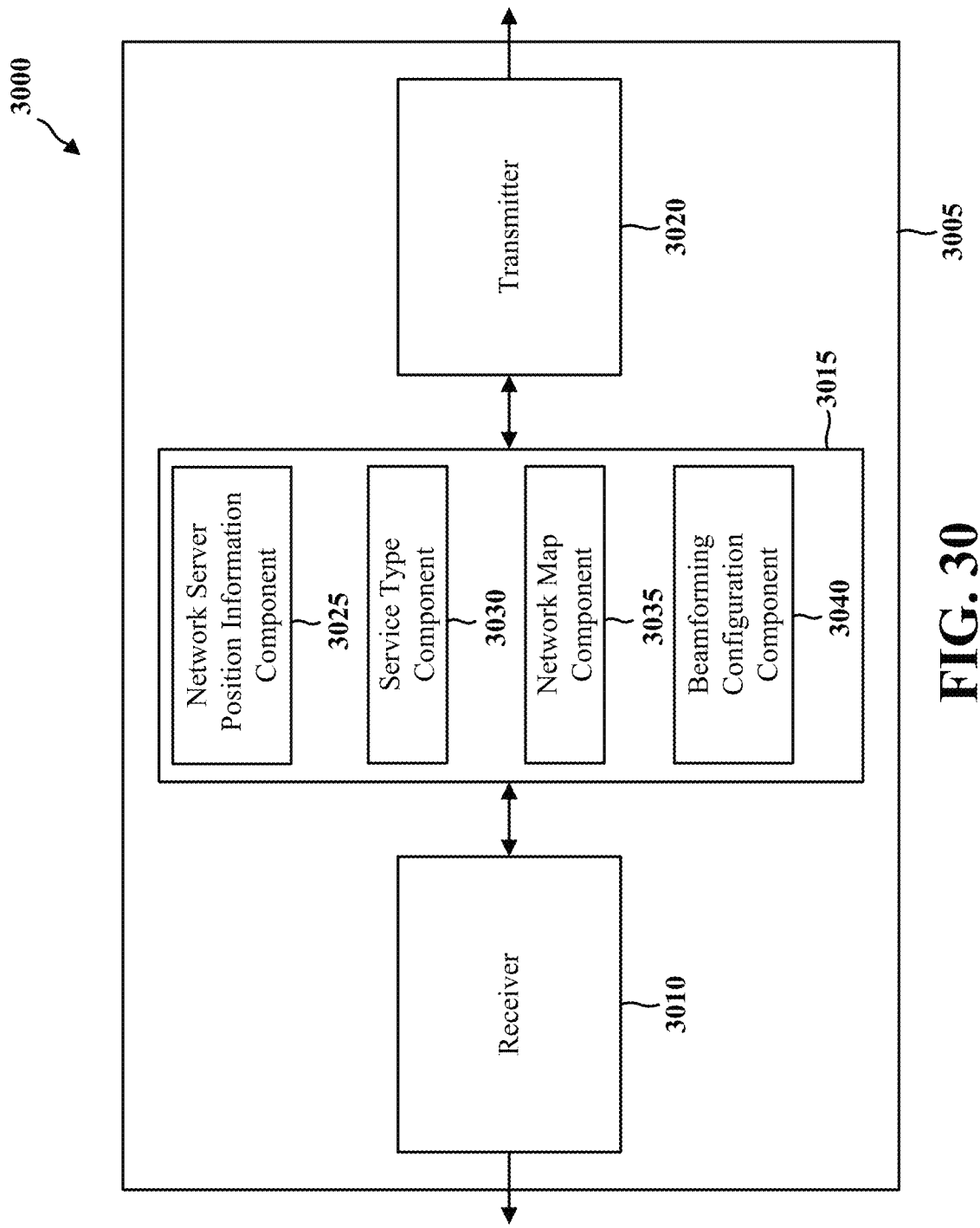

FIG. 30 shows a block diagram 3000 of a wireless device 3005 that supports UE localization via an mmW network map in accordance with various aspects of the present disclosure. Wireless device 3005 may be an example of aspects of a wireless device 2905 or an entity of a network server 2601 as described with reference to FIG. 26. Wireless device 3005 may include receiver 3010, network server mmW communications manager 3015, and transmitter 3020. Wireless device 3005 may also include a processor. Each of these components may be in communication with one another (e.g., via one or more buses).

Receiver 3010 may receive information such as packets, user data, or control information associated with various information channels (e.g., control channels, data channels, and information related to UE localization via an mmW network map, etc.). Information may be passed on to other components of the device. The receiver 3010 may be an example of aspects of the transceiver 3235 described with reference to FIG. 32.

Network server mmW communications manager 3015 may be an example of aspects of the network server mmW communications manager 3215 described with reference to FIG. 32. Network server mmW communications manager 3015 may also include network server position information component 3025, service type component 3030, network map component 3035, and beamforming configuration component 3040.

Network server position information component 3025 may receive position information associated with a UE 2615 and receive the position information includes receiving position information for a second UE 2615 from a second base station 2605. In some cases, the position information includes GPS information, gyroscope information, accelerometer information, UE subarray geometry information, or beam information from any of the UE subarrays, or a combination thereof.

Service type component 3030 may identify a service type associated with the UE 2615 based on the position information and identify that the service type associated with the UE 2615 is different from a previous service type associated with the UE 2615. In some cases, the service type includes a QoS class identifier. In some cases, the service type includes a voice communications service type, a video service type, a high-definition video service type, a real-time gaming service type, a mission critical communications service type, an IMS communications service type, or a combination thereof.

Network map component 3035 may identify a network map, the network map including a location of the UE 2615 and a base station 2605. In some cases, the network map includes a relative location of the second UE 2615 and the second base station 2605.

Beamforming configuration component 3040 may identify a beamforming configuration for communication between the base station 2605 and the UE 2615 based on the service type and the network map. In some cases, the beamforming configuration includes a beam direction, a beam type, a subframe configuration, or a combination thereof.

Transmitter 3020 may transmit signals generated by other components of the device. In some examples, the transmitter 3020 may be collocated with a receiver 3010 in a transceiver module. For example, the transmitter 3020 may be an example of aspects of the transceiver 3235 described with reference to FIG. 32. The transmitter 3020 may include a single antenna, or it may include a set of antennas.

Figure 31:
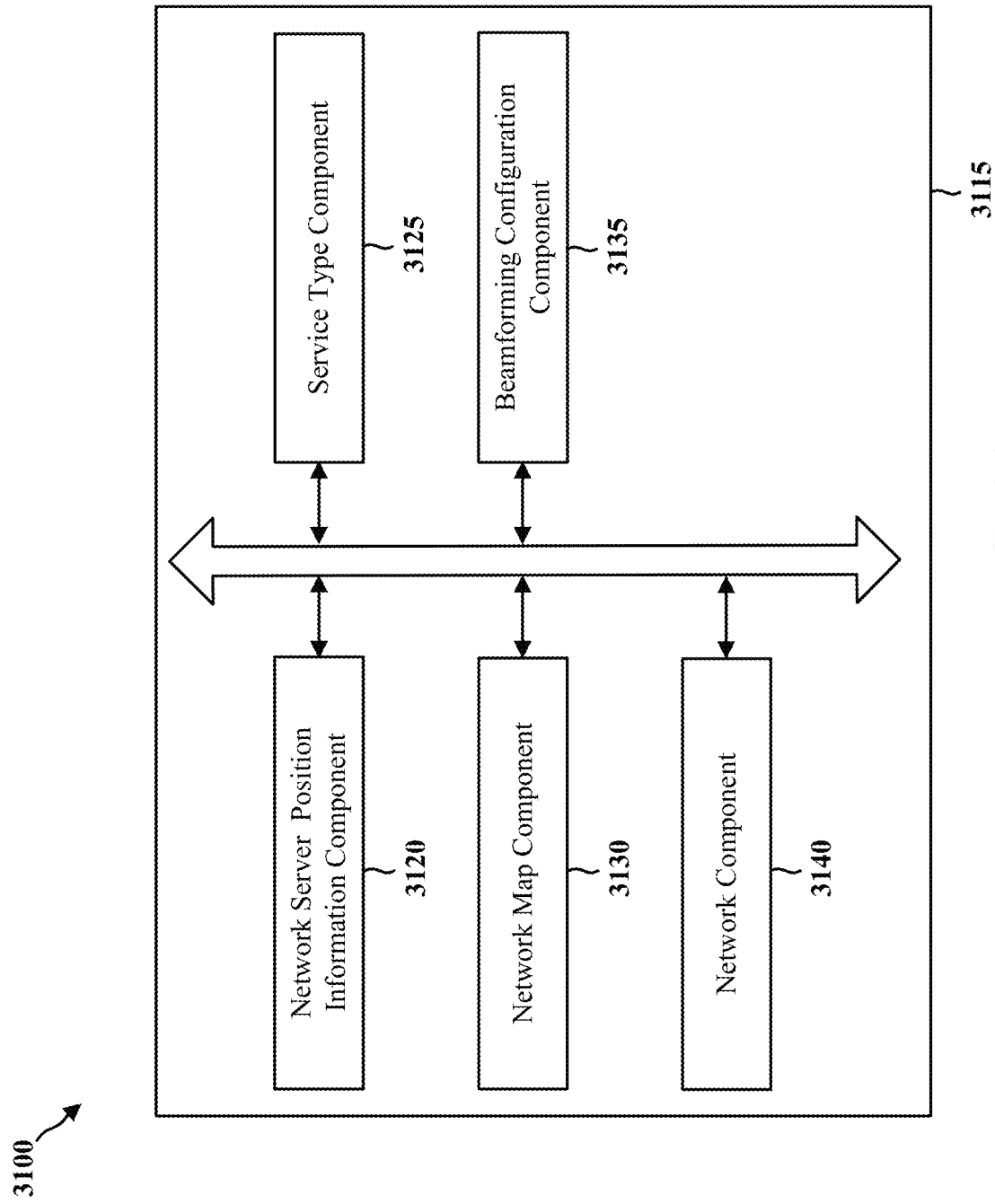

FIG. 31 shows a block diagram 3100 of a network server mmW communications manager 3115 that supports UE localization via an mmW network map in accordance with various aspects of the present disclosure. The network server mmW communications manager 3115 may be an example of aspects of a network server mmW communications manager 3015, a network server mmW communications manager 3115, or a network server mmW communications manager 3215 described with reference to FIGS. 30, 31, and 32. The network server mmW communications manager 3115 may include network server position information component 3120, service type component 3125, network map component 3130, beamforming configuration component 3135, and network component 3140. Each of these modules may communicate, directly or indirectly, with one another (e.g., via one or more buses).

Network server position information component 3120 may receive position information associated with a UE 2615 and receive the position information includes receiving position information for a second UE 2615 from a second base station 2605. In some cases, the position information includes GPS information, gyroscope information, accelerometer information, UE subarray geometry information, or beam information from any of the UE subarrays, or a combination thereof.

Service type component 3125 may identify a service type associated with the UE 2615 based on the position information and identify that the service type associated with the UE 2615 is different from a previous service type associated with the UE 2615. In some cases, the service type includes a QoS class identifier. In some cases, the service type includes a voice communications service type, a video service type, a high-definition video service type, a real-time gaming service type, a mission critical communications service type, an IMS communications service type, or a combination thereof.

Network map component 3130 may identify a network map, the network map including a location of the UE 2615 and a base station 2605. In some cases, the network map includes a relative location of the second UE 2615 and the second base station 2605.

Beamforming configuration component 3135 may identify a beamforming configuration for communication between the base station 2605 and the UE 2615 based on the service type and the network map. In some cases, the beamforming configuration includes a beam direction, a beam type, a subframe configuration, or a combination thereof. Network component 3140 may be associated with a core network. In some cases, the network server includes a part of the core network.

Figure 32:
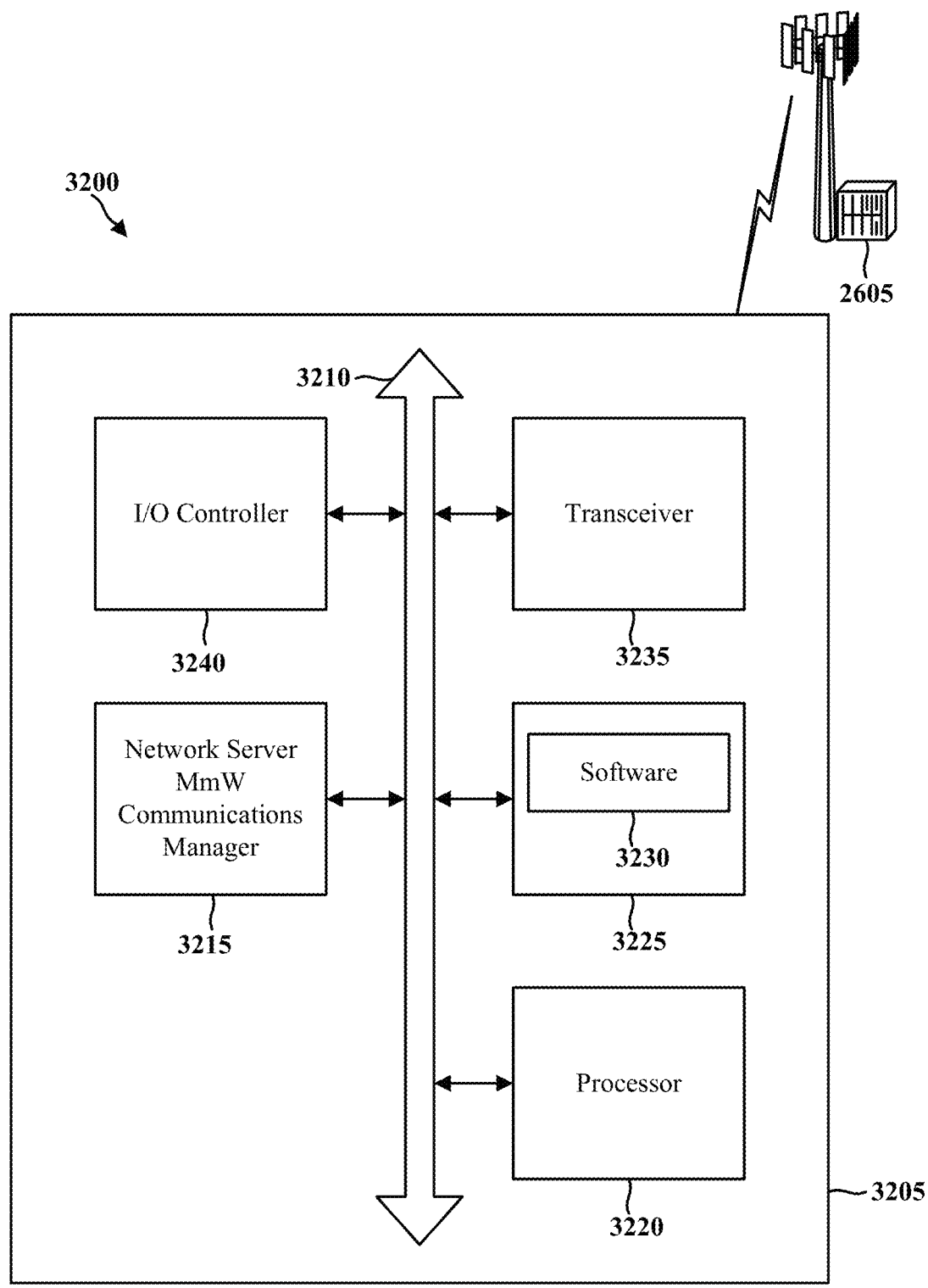
FIG. 32 illustrates a block diagram of a system including a network server that supports UE localization via an mmW network map.

FIG. 32 shows a diagram of a system 3200 including a device 3205 that supports UE localization via an mmW network map in accordance with various aspects of the present disclosure. Device 3205 may be an example of or include the components of wireless device 2905, wireless device 3005, or an entity of a network server (e.g., network server 2601) as described above, e.g., with reference to FIGS. 26, 29, and/or 30. Device 3205 may include components for bi-directional voice and data communications including components for transmitting and receiving communications, including network server mmW communications manager 3215, processor 3220, memory 3225, software 3230, transceiver 3235, and I/O controller 3240. These components may be in electronic communication via one or more busses (e.g., bus 3210).

Processor 3220 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 3220 may be configured to operate a memory array using a memory controller. In other cases, a memory controller may be integrated into processor 3220. Processor 3220 may be configured to execute computer-readable instructions stored in a memory to perform various functions (e.g., functions or tasks supporting UE localization via an mmW network map).

Memory 3225 may include RAM and ROM. The memory 3225 may store computer-readable, computer-executable software 3230 including instructions that, when executed, cause the processor to perform various functions described herein. In some cases, the memory 3225 may contain, among other things, a basic input/output system (BIOS) which may control basic hardware and/or software operation such as the interaction with peripheral components or devices.

Software 3230 may include code to implement aspects of the present disclosure, including code to support UE localization via an mmW network map. Software 3230 may be stored in a non-transitory computer-readable medium such as system memory or other memory. In some cases, the software 3230 may not be directly executable by the processor but may cause a computer (e.g., when compiled and executed) to perform functions described herein.

Transceiver 3235 may communicate bi-directionally, via one or more antennas, wired, or wireless links as described above. For example, the transceiver 3235 may represent a wireless transceiver and may communicate bi-directionally with another wireless transceiver. Transceiver 3235 may also include a modem to modulate the packets and provide the modulated packets to the antennas for transmission, and to demodulate packets received from the antennas.

I/O controller 3240 may manage input and output signals for device 3205. I/O controller 3240 may also manage peripherals not integrated into device 3205. In some cases, I/O controller 3240 may represent a physical connection or port to an external peripheral. In some cases, I/O controller 3240 may utilize an operating system such as iOS®, ANDROID®, MS-DOS®, MS-WINDOWS®, OS/2®, UNIX®, LINUX®, or another known operating system.

Figure 33:
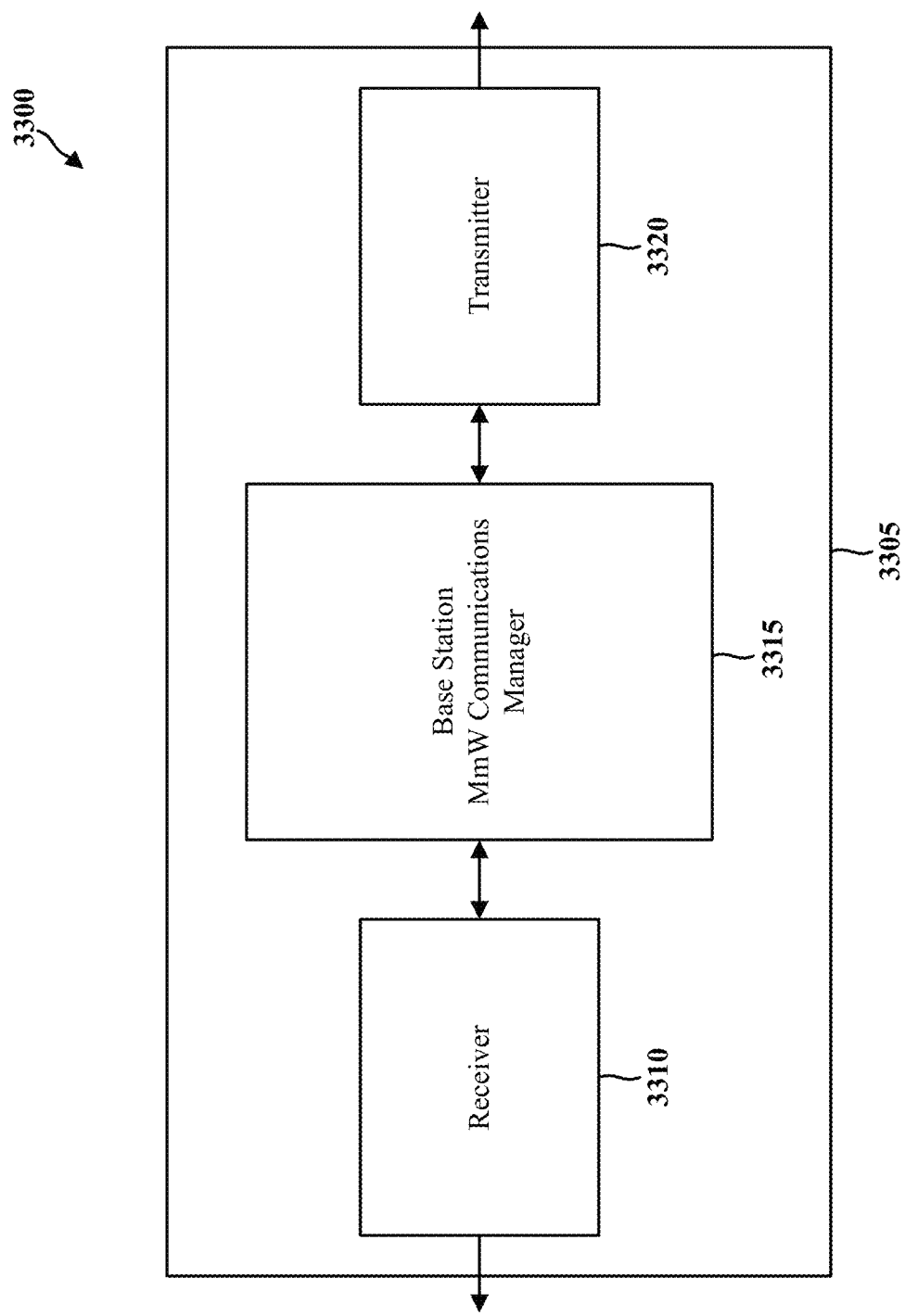
FIGS. 33 through 35 show block diagrams of a device that supports UE localization via an mmW network map.

FIG. 33 shows a block diagram 3300 of a wireless device 3305 that supports UE localization via an mmW network map in accordance with various aspects of the present disclosure. Wireless device 3305 may be an example of aspects of a base station 2605 as described with reference to FIG. 26. Wireless device 3305 may include receiver 3310, base station mmW communications manager 3315, and transmitter 3320. Wireless device 3305 may also include a processor. Each of these components may be in communication with one another (e.g., via one or more buses).

Receiver 3310 may receive information such as packets, user data, or control information associated with various information channels (e.g., control channels, data channels, and information related to UE localization via an mmW network map, etc.). Information may be passed on to other components of the device. The receiver 3310 may be an example of aspects of the transceiver 3635 described with reference to FIG. 36. Base station mmW communications manager 3315 may be an example of aspects of the base station mmW communications manager 3615 described with reference to FIG. 36.

Base station mmW communications manager 3315 may receive position information from a UE, transmit the position information to a network server, and receive, from the network server, a beamforming configuration based on the position information.

The base station mmW communications manager 3315 may be implemented in hardware, software executed by a processor, firmware, or any combination thereof. If implemented in software executed by a processor, the functions of the base station mmW communications manager 3315 may be executed by a general-purpose processor, a DSP, an ASIC, an FPGA or other programmable logic device, discrete gate or transistor logic, discrete hardware components, or any combination thereof designed to perform the functions described in the present disclosure. The base station mmW communications manager 3315 may be physically located at various positions, including being distributed such that portions of functions are implemented at different physical locations by one or more physical devices. In some examples, base station mmW communications manager 3315 may be a separate and distinct component in accordance with various aspects of the present disclosure. In other examples, base station mmW communications manager 3315 may be combined with one or more other hardware components, including but not limited to a receiver, a transmitter, a transceiver, one or more other components described in the present disclosure, or a combination thereof in accordance with various aspects of the present disclosure.

Transmitter 3320 may transmit signals generated by other components of the device. In some examples, the transmitter 3320 may be collocated with a receiver 3310 in a transceiver module. For example, the transmitter 3320 may be an example of aspects of the transceiver 3635 described with reference to FIG. 36. The transmitter 3320 may include a single antenna, or it may include a set of antennas.

Transmitter 3320 may transmit a BRS, communicate with the UE 2615 based on transmitting the BRS and transmit data to the UE 2615 based on the beamforming configuration, where the beamforming configuration is based on a service type of the data and the position information.

Figure 34:
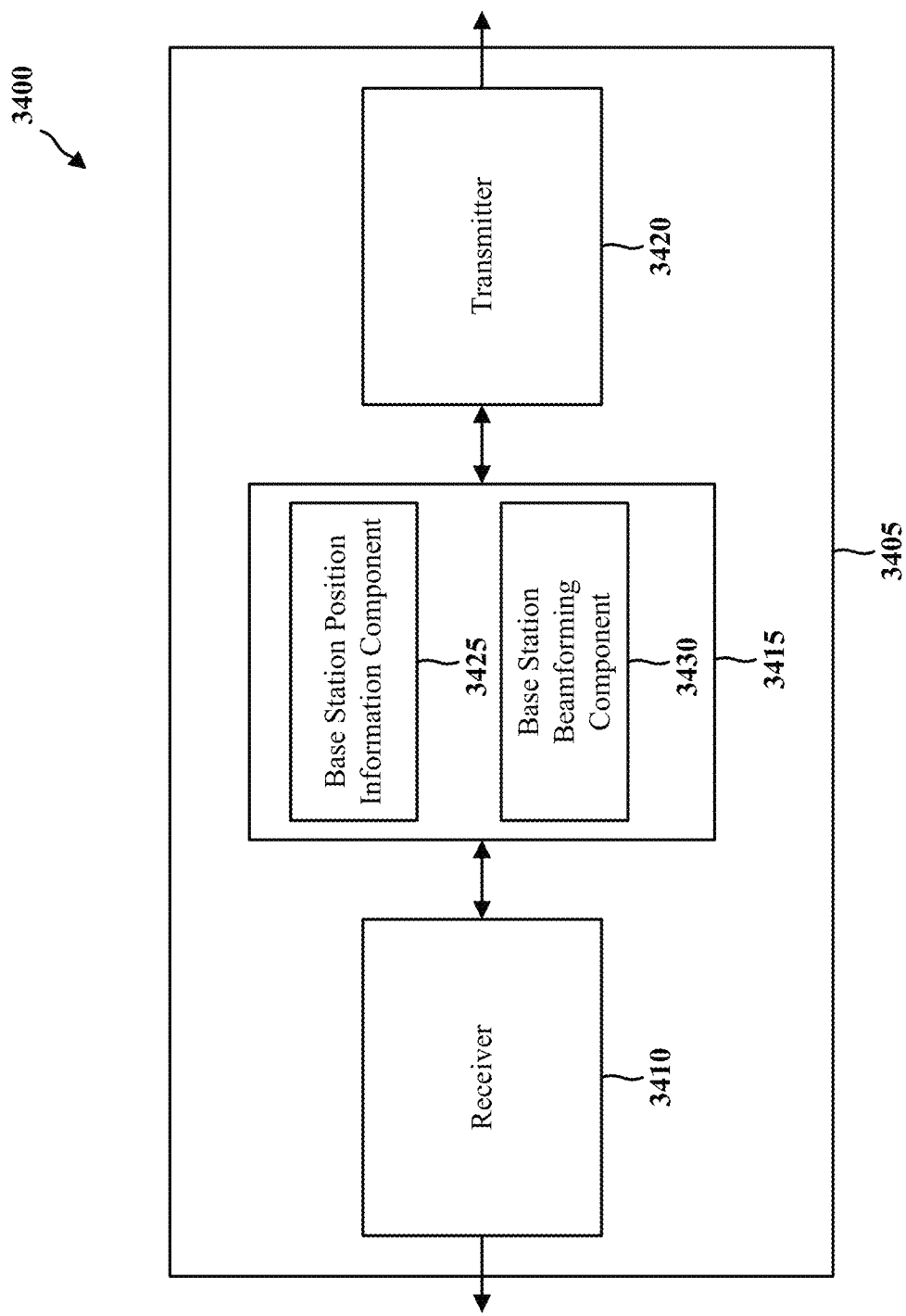

FIG. 34 shows a block diagram 3400 of a wireless device 3405 that supports UE localization via an mmW network map in accordance with various aspects of the present disclosure. Wireless device 3405 may be an example of aspects of a wireless device 3305 or a base station 2605 as described with reference to FIGS. 26 and 33. Wireless device 3405 may include receiver 3410, base station mmW communications manager 3415, and transmitter 3420. Wireless device 3405 may also include a processor. Each of these components may be in communication with one another (e.g., via one or more buses).

Receiver 3410 may receive information such as packets, user data, or control information associated with various information channels (e.g., control channels, data channels, and information related to UE localization via an mmW network map, etc.). Information may be passed on to other components of the device. The receiver 3410 may be an example of aspects of the transceiver 3635 described with reference to FIG. 36.

Base station mmW communications manager 3415 may be an example of aspects of the base station mmW communications manager 3615 described with reference to FIG. 36. Base station mmW communications manager 3415 may also include base station position information component 3425 and base station beamforming component 3430. Base station position information component 3425 may receive position information from a UE and transmit the position information to a network server.

Base station beamforming component 3430 may receive, from the network server, a beamforming configuration based on the position information. In some cases, the beamforming configuration includes a beam direction, a beam type, or a subframe type, or a combination thereof. In some cases, the beamforming configuration includes one or more beam directions. In some cases, the beamforming configuration is based on a location of a second UE, a second base station, or a combination thereof.

Transmitter 3420 may transmit signals generated by other components of the device. In some examples, the transmitter 3420 may be collocated with a receiver 3410 in a transceiver module. For example, the transmitter 3420 may be an example of aspects of the transceiver 3635 described with reference to FIG. 36. The transmitter 3420 may include a single antenna, or it may include a set of antennas.

Figure 35:
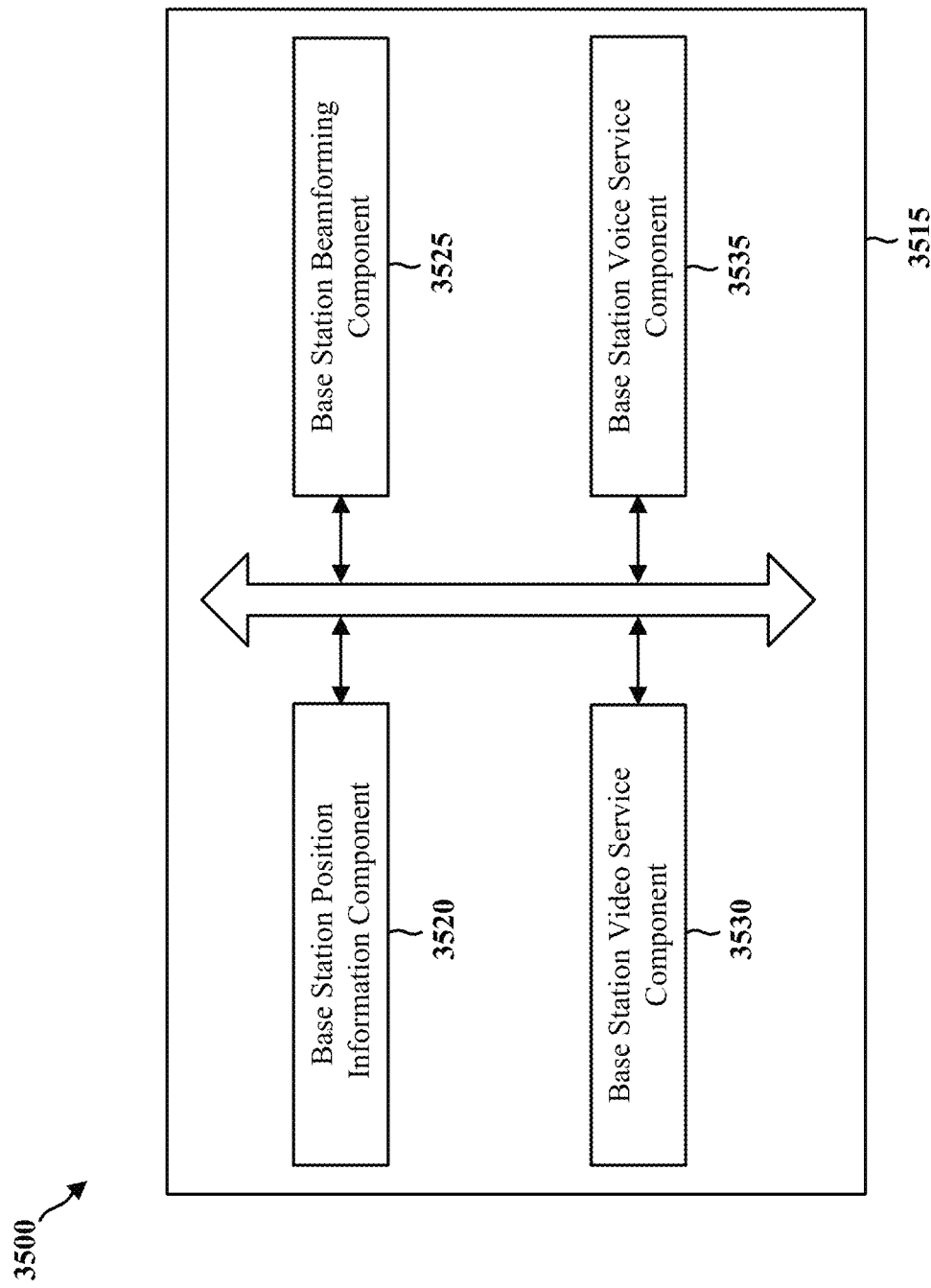

FIG. 35 shows a block diagram 3500 of a base station mmW communications manager 3515 that supports UE localization via an mmW network map in accordance with various aspects of the present disclosure. The base station mmW communications manager 3515 may be an example of aspects of a base station mmW communications manager 3315, 3415, and/or 3615 described with reference to FIGS. 33, 34, and 36. The base station mmW communications manager 3515 may include base station position information component 3520 and base station beamforming component 3525. Each of these components may communicate, directly or indirectly, with one another (e.g., via one or more buses). Base station position information component 3520 may receive position information from a UE 2615 and transmit the position information to a network server.

Base station beamforming component 3525 may receive, from the network server (e.g., network server 2601), a beamforming configuration based on the position information. In some cases, the beamforming configuration includes a beam direction, a beam type, or a subframe type, or a combination thereof. In some cases, the beamforming configuration includes one or more beam directions. In some cases, the beamforming configuration is based on a location of a second UE, a second base station 2605, or a combination thereof.

Base station video service component 3530 may manage video streaming services. For example, the video streaming services may provide live video streaming or buffered video streaming services to transmit to a UE 2615. The video services may include standard definition video and high definition video. Video services may utilize a beamforming configuration indicated by a network server and received by the base station beamforming component 3525.

Base station voice component 3535 may manage voice communications between the base station (e.g., base station 2605) and a UE 2615. Voice communications may utilize a beamforming configuration indicated by a network server (e.g., network server 2601) and received by the base station beamforming component 3525.

Figure 36:
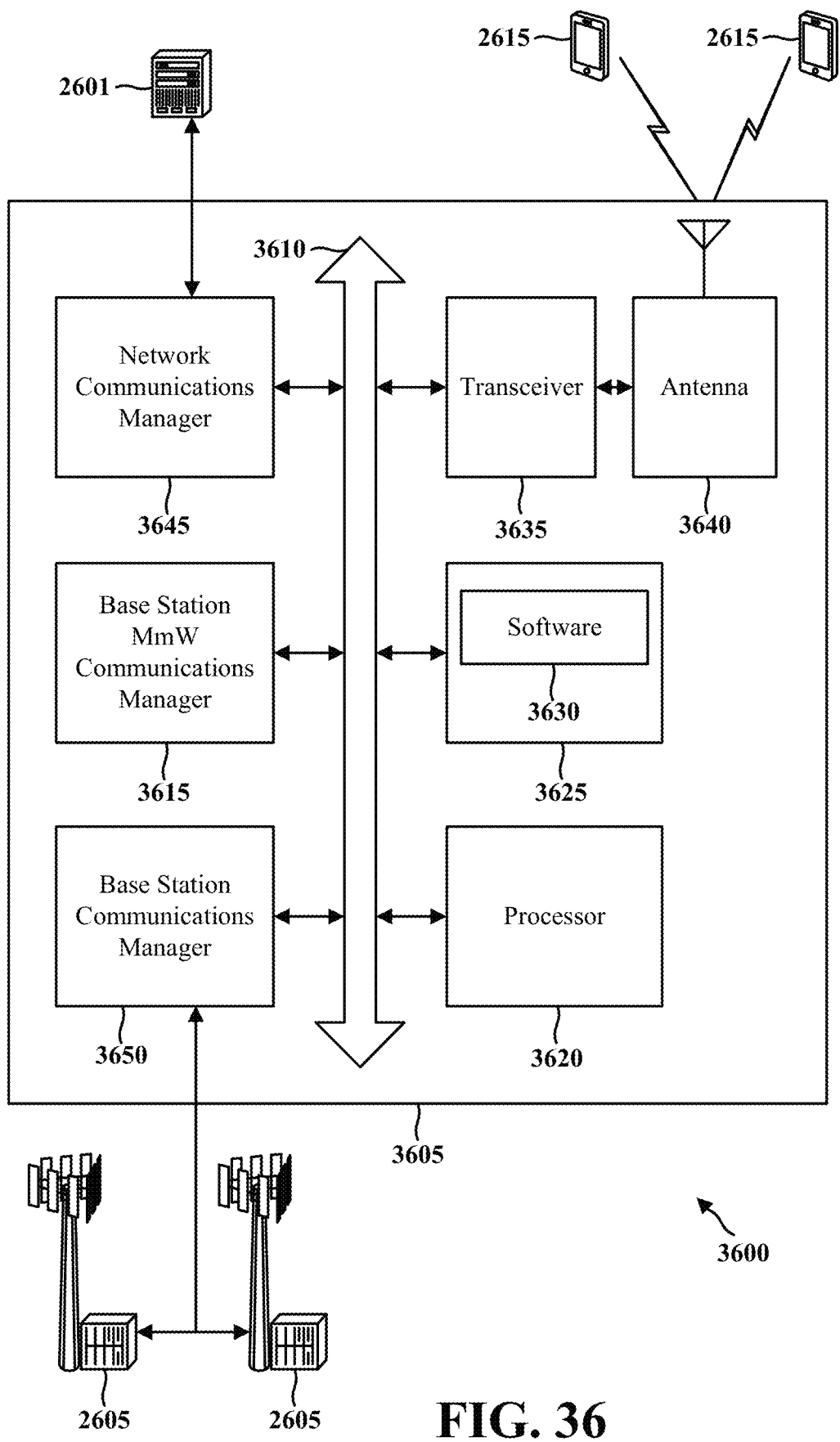
FIG. 36 illustrates a block diagram of a system including a base station that supports UE localization via an mmW network map.

FIG. 36 shows a diagram of a system 3600 including a device 3605 that supports UE localization via an mmW network map in accordance with various aspects of the present disclosure. Device 3605 may be an example of or include the components of a base station 2605 as described above, e.g., with reference to FIG. 26. Device 3605 may include components for bi-directional voice and data communications including components for transmitting and receiving communications, including base station mmW communications manager 3615, processor 3620, memory 3625, software 3630, transceiver 3635, antenna 3640, network communications manager 3645, and base station communications manager 3650. These components may be in electronic communication via one or more busses (e.g., bus 3610). Device 3605 may communicate wirelessly with one or more UEs 2615.

The base station mmW communications manager 3615 may be implemented in hardware, software executed by a processor, firmware, or any combination thereof. If implemented in software executed by a processor, the functions of the base station mmW communications manager 3615 may be executed by a general-purpose processor, a DSP, an ASIC, an FPGA or other programmable logic device, discrete gate or transistor logic, discrete hardware components, or any combination thereof designed to perform the functions described in the present disclosure. The base station mmW communications manager 3615 may be physically located at various positions, including being distributed such that portions of functions are implemented at different physical locations by one or more physical devices. In some examples, base station mmW communications manager 3615 may be a separate and distinct component in accordance with various aspects of the present disclosure. In other examples, base station mmW communications manager 3615 may be combined with one or more other hardware components, including but not limited to a receiver, a transmitter, a transceiver, one or more other components described in the present disclosure, or a combination thereof in accordance with various aspects of the present disclosure.

Processor 3620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 3620 may be configured to operate a memory array using a memory controller. In other cases, a memory controller may be integrated into processor 3620. Processor 3620 may be configured to execute computer-readable instructions stored in a memory to perform various functions (e.g., functions or tasks supporting UE localization via an mmW network map).

Memory 3625 may include RAM and ROM. The memory 3625 may store computer-readable, computer-executable software 3630 including instructions that, when executed, cause the processor to perform various functions described herein. In some cases, the memory 3625 may contain, among other things, a BIOS which may control basic hardware and/or software operation such as the interaction with peripheral components or devices.

Software 3630 may include code to implement aspects of the present disclosure, including code to support UE localization via an mmW network map. Software 3630 may be stored in a non-transitory computer-readable medium such as system memory or other memory. In some cases, the software 3630 may not be directly executable by the processor but may cause a computer (e.g., when compiled and executed) to perform functions described herein.

Transceiver 3635 may communicate bi-directionally, via one or more antennas, wired, or wireless links as described above. For example, the transceiver 3635 may represent a wireless transceiver and may communicate bi-directionally with another wireless transceiver. Transceiver 3635 may also include a modem to modulate the packets and provide the modulated packets to the antennas for transmission, and to demodulate packets received from the antennas. In some cases, the wireless device may include a single antenna 3640. However, in some cases the device may have more than one antenna 3640, which may be capable of concurrently transmitting or receiving multiple wireless transmissions.

Network communications manager 3645 may manage communications with the core network (e.g., via one or more wired backhaul links). For example, the network communications manager 3645 may manage the transfer of data communications for client devices, such as one or more UEs 2615.

The network communications manager 3645 may be implemented in hardware, software executed by a processor, firmware, or any combination thereof. If implemented in software executed by a processor, the functions of the network communications manager 3645 may be executed by a general-purpose processor, a DSP, an ASIC, an FPGA or other programmable logic device, discrete gate or transistor logic, discrete hardware components, or any combination thereof designed to perform the functions described in the present disclosure. The network communications manager 3645 may be physically located at various positions, including being distributed such that portions of functions are implemented at different physical locations by one or more physical devices. In some examples, network communications manager 3645 may be a separate and distinct component in accordance with various aspects of the present disclosure. In other examples, network communications manager 3645 may be combined with one or more other hardware components, including but not limited to a receiver, a transmitter, a transceiver, one or more other components described in the present disclosure, or a combination thereof in accordance with various aspects of the present disclosure.

Base station communications manager 3650 may manage communications with other base stations 2605, and may include a controller or scheduler for controlling communications with UEs 2615 in cooperation with other base stations 2605. For example, the base station communications manager 3650 may coordinate scheduling for transmissions to UEs 2615 for various interference mitigation techniques such as beamforming or joint transmission. In some examples, base station communications manager 3650 may provide an X2 interface within an Long Term Evolution (LTE)/LTE-A wireless communication network technology to provide communication between base stations 2605.

The base station communications manager 3650 may be implemented in hardware, software executed by a processor, firmware, or any combination thereof. If implemented in software executed by a processor, the functions of the base station communications manager 3650 may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 3650 may be physically located at various positions, including being distributed such that portions of functions are implemented at different physical locations by one or more physical devices. In some examples, base station communications manager 3650 may be a separate and distinct component in accordance with various aspects of the present disclosure. In other examples, base station communications manager 3650 may be combined with one or more other hardware components, including but not limited to a receiver, a transmitter, a transceiver, one or more other components described in the present disclosure, or a combination thereof in accordance with various aspects of the present disclosure.

Figure 37:
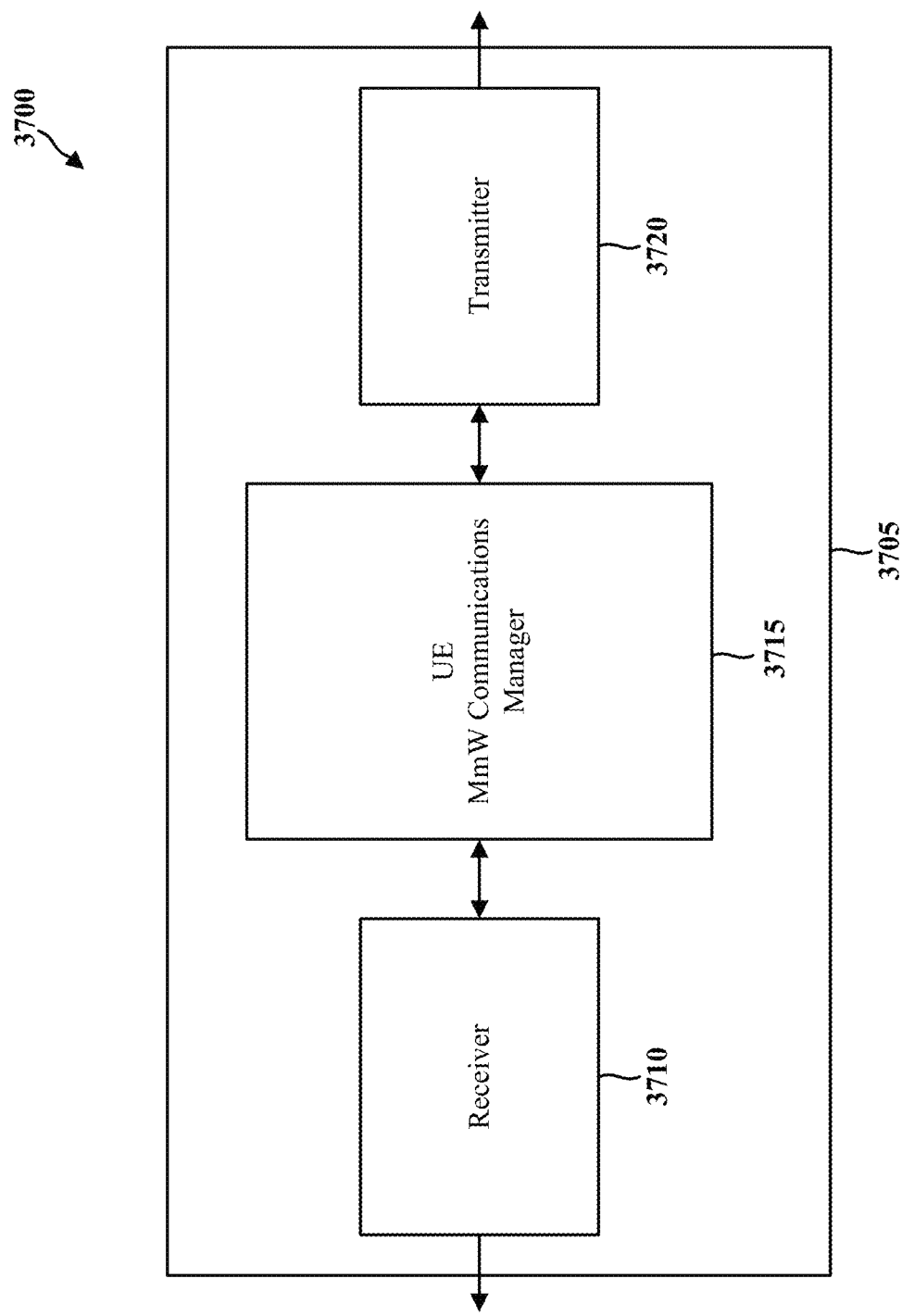
FIGS. 37 through 39 show block diagrams of a device that supports UE localization via an mmW network map.

FIG. 37 shows a block diagram 3700 of a wireless device 3705 that supports UE localization via an mmW network map in accordance with various aspects of the present disclosure. Wireless device 3705 may be an example of aspects of a UE 2615 as described with reference to FIG. 26. Wireless device 3705 may include receiver 3710, UE mmW communications manager 3715, and transmitter 3720. Wireless device 3705 may also include a processor. Each of these components may be in communication with one another (e.g., via one or more buses).

Receiver 3710 may receive information such as packets, user data, or control information associated with various information channels (e.g., control channels, data channels, and information related to UE localization via an mmW network map, etc.). Information may be passed on to other components of the device. The receiver 3710 may be an example of aspects of the transceiver 4035 described with reference to FIG. 40.

Receiver 3710 may receive data from a base station 2605 based on a beamforming configuration, where the beamforming configuration is based on a service type of the data and the position information. In some cases, the data from the base station 2605 is received using a set of antennas of the UE. UE mmW communications manager 3715 may be an example of aspects of the UE mmW communications manager 1615 described with reference to FIG. 16. UE mmW communications manager 3715 may identify position information of the UE.

The UE mmW communications manager 3715 may be implemented in hardware, software executed by a processor, firmware, or any combination thereof. If implemented in software executed by a processor, the functions of the UE mmW communications manager 3715 may be executed by a general-purpose processor, a DSP, an ASIC, an FPGA or other programmable logic device, discrete gate or transistor logic, discrete hardware components, or any combination thereof designed to perform the functions described in the present disclosure. The UE mmW communications manager 3715 may be physically located at various positions, including being distributed such that portions of functions are implemented at different physical locations by one or more physical devices. In some examples, UE mmW communications manager 3715 may be a separate and distinct component in accordance with various aspects of the present disclosure. In other examples, UE mmW communications manager 3715 may be combined with one or more other hardware components, including but not limited to a receiver, a transmitter, a transceiver, one or more other components described in the present disclosure, or a combination thereof in accordance with various aspects of the present disclosure.

Transmitter 3720 may transmit signals generated by other components of the device. In some examples, the transmitter 3720 may be collocated with a receiver 3710 in a transceiver module. For example, the transmitter 3720 may be an example of aspects of the transceiver 4035 described with reference to FIG. 40. The transmitter 3720 may include a single antenna, or it may include a set of antennas.

Transmitter 3720 may transmit metrics to the base station 2605, where transmitting the position information is based on detecting the BRS and transmit the position information to a base station 2605. In some cases, the metrics include a channel quality indicator, a signal strength indicator, or a beam identifier, or a combination thereof.

Figure 38:
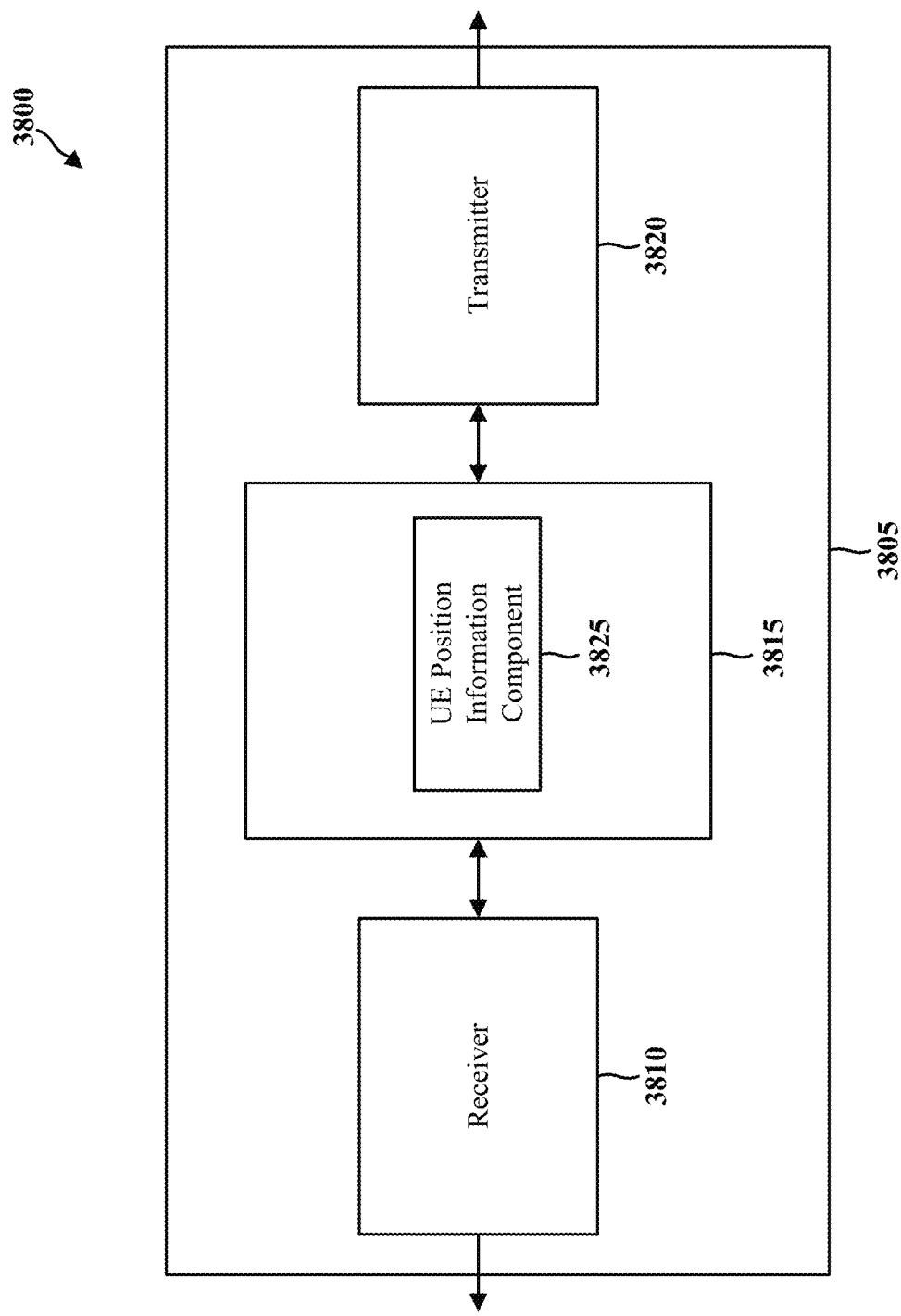

FIG. 38. shows a block diagram 3800 of a wireless device 3805 that supports UE localization via an mmW network map in accordance with various aspects of the present disclosure. Wireless device 3805 may be an example of aspects of a wireless device 3705 or a UE 2615 as described with reference to FIGS. 26 and 37. Wireless device 3805 may include receiver 3810, UE mmW communications manager 3815, and transmitter 3820. Wireless device 3805 may also include a processor. Each of these components may be in communication with one another (e.g., via one or more buses).

Receiver 3810 may receive information such as packets, user data, or control information associated with various information channels (e.g., control channels, data channels, and information related to UE localization via an mmW network map, etc.). Information may be passed on to other components of the device. The receiver 3810 may be an example of aspects of the transceiver 4035 described with reference to FIG. 40. UE mmW communications manager 3815 may be an example of aspects of the UE mmW communications manager 4015 described with reference to FIG. 40. UE mmW communications manager 3815 may also include UE position information component 3825.

UE position information component 3825 may identify position information of the UE. In some cases, the position information includes GPS information, gyroscope information, accelerometer information, UE subarray geometry information, or beam information from any of the UE subarrays, or any combination thereof.

Transmitter 3820 may transmit signals generated by other components of the device. In some examples, the transmitter 3820 may be collocated with a receiver 3810 in a transceiver module. For example, the transmitter 3820 may be an example of aspects of the transceiver 4035 described with reference to FIG. 40. The transmitter 3820 may include a single antenna, or it may include a set of antennas.

Figure 39:
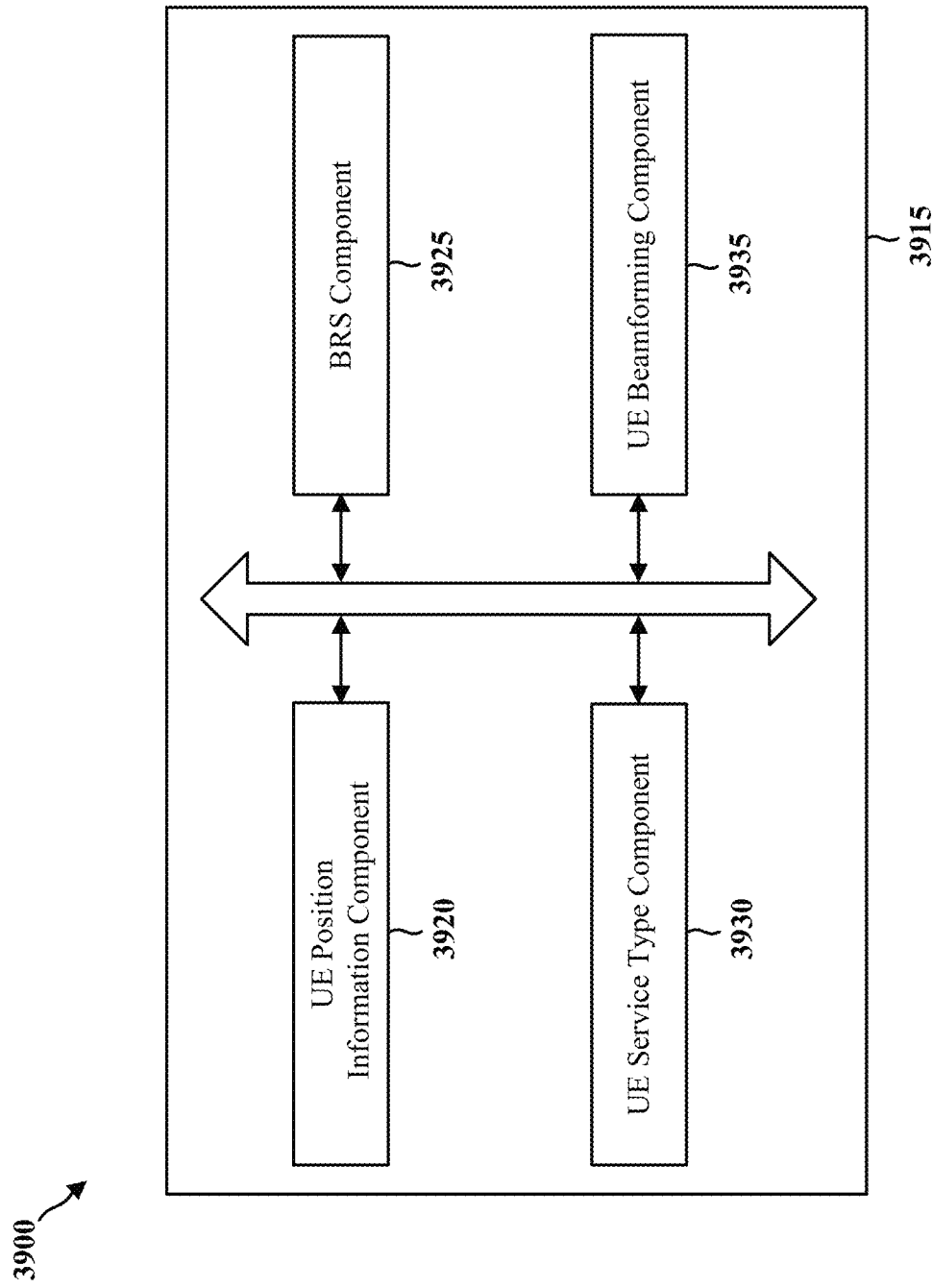

FIG. 39 shows a block diagram 3900 of a UE mmW communications manager 3915 that supports UE localization via an mmW network map in accordance with various aspects of the present disclosure. The UE mmW communications manager 3915 may be an example of aspects of a UE mmW communications manager 3715, 3815, 4015 described with reference to FIGS. 37, 38, and 40. The UE mmW communications manager 3915 may include UE position information component 3920, BRS component 3925, UE service type component 3930, and UE beamforming component 3935. Each of these modules may communicate, directly or indirectly, with one another (e.g., via one or more buses).

UE position information component 3920 may identify position information of the UE. In some cases, the position information includes GPS information, gyroscope information, accelerometer information, UE subarray geometry information, or beam information from any of the UE subarrays, or any combination thereof.

BRS component 3925 may scan for a BRS, detect the BRS on one or more beams, and communicate with the base station 2605 based on detecting the BRS.

UE service type component 3930 may receive data from the base station 2605 using a beamforming configuration based on a service type of the data. In some cases, the service type includes a QoS class identifier. In some cases, the service type includes a voice communications service type, a video service type, a high-definition video service type, a real time gaming service type, a mission critical communications service type, or an IMS communications service type.

UE beamforming component 3935 may receive data from the base station 2605 based on a beamforming configuration. In some cases, the beamforming configuration includes a beam direction, a beam type, or a subframe configuration, or a combination thereof. In some cases, the beamforming configuration includes one or more beam directions. In some cases, the beam direction is based on a location of a second UE.

Figure 40:
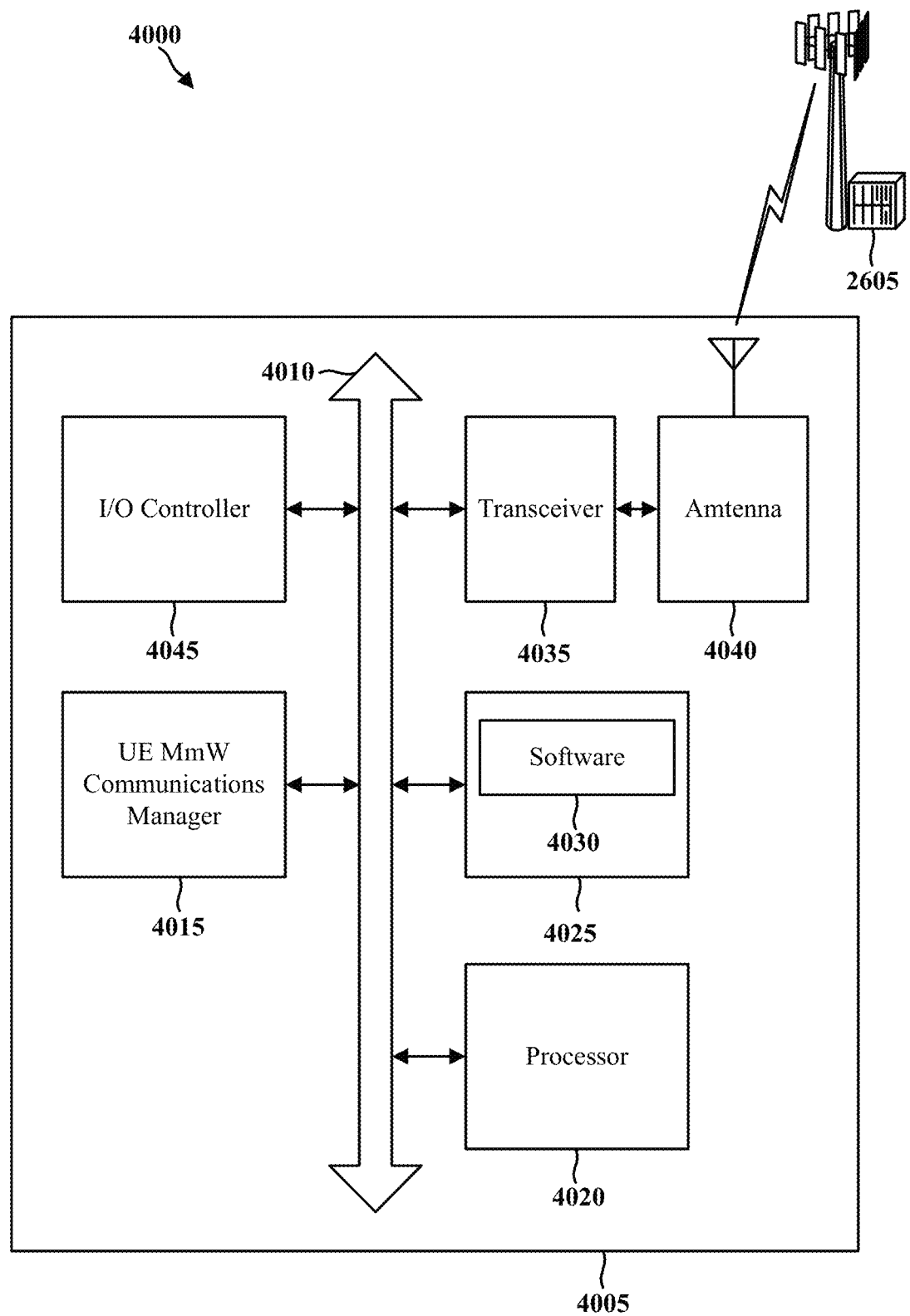
FIG. 40 illustrates a block diagram of a system including a UE that supports UE localization via an mmW network map.

FIG. 40 shows a diagram of a system 4000 including a device 4005 that supports UE localization via an mmW network map in accordance with various aspects of the present disclosure. Device 4005 may be an example of or include the components of UE 2615 as described above, e.g., with reference to FIG. 26. Device 4005 may include components for bi-directional voice and data communications including components for transmitting and receiving communications, including UE mmW communications manager 4015, processor 4020, memory 4025, software 4030, transceiver 4035, antenna 4040, and I/O controller 4045. These components may be in electronic communication via one or more busses (e.g., bus 4010). Device 4005 may communicate wirelessly with one or more base stations 2605.

The UE mmW communications manager 4015 may be implemented in hardware, software executed by a processor, firmware, or any combination thereof. If implemented in software executed by a processor, the functions of the UE mmW communications manager 4015 may be executed by a general-purpose processor, a DSP, an ASIC, an FPGA or other programmable logic device, discrete gate or transistor logic, discrete hardware components, or any combination thereof designed to perform the functions described in the present disclosure. The UE mmW communications manager 4015 may be physically located at various positions, including being distributed such that portions of functions are implemented at different physical locations by one or more physical devices. In some examples, UE mmW communications manager 4015 may be a separate and distinct component in accordance with various aspects of the present disclosure. In other examples, UE mmW communications manager 4015 may be combined with one or more other hardware components, including but not limited to a receiver, a transmitter, a transceiver, one or more other components described in the present disclosure, or a combination thereof in accordance with various aspects of the present disclosure.

Processor 4020 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 4020 may be configured to operate a memory array using a memory controller. In other cases, a memory controller may be integrated into processor 4020. Processor 4020 may be configured to execute computer-readable instructions stored in a memory to perform various functions (e.g., functions or tasks supporting UE localization via an mmW network map).

Memory 4025 may include RAM and ROM. The memory 4025 may store computer-readable, computer-executable software 4030 including instructions that, when executed, cause the processor to perform various functions described herein. In some cases, the memory 4025 may contain, among other things, a BIOS which may control basic hardware and/or software operation such as the interaction with peripheral components or devices.

Software 4030 may include code to implement aspects of the present disclosure, including code to support UE localization via an mmW network map. Software 4030 may be stored in a non-transitory computer-readable medium such as system memory or other memory. In some cases, the software 4030 may not be directly executable by the processor but may cause a computer (e.g., when compiled and executed) to perform functions described herein.

Transceiver 4035 may communicate bi-directionally, via one or more antennas, wired, or wireless links as described above. For example, the transceiver 4035 may represent a wireless transceiver and may communicate bi-directionally with another wireless transceiver. The transceiver 4035 may also include a modem to modulate the packets and provide the modulated packets to the antennas for transmission, and to demodulate packets received from the antennas.

In some cases, the wireless device may include a single antenna 4040. However, in some cases the device may have more than one antenna 4040, which may be capable of concurrently transmitting or receiving multiple wireless transmissions.

I/O controller 4045 may manage input and output signals for device 4005. I/O controller 4045 may also manage peripherals not integrated into device 4005. In some cases, I/O controller 4045 may represent a physical connection or port to an external peripheral. In some cases, I/O controller 4045 may utilize an operating system such as iOS®, ANDROID®, MS-DOS®, MS-WINDOWS®, OS/2®, UNIX®, LINUX®, or another known operating system.

Figure 41:
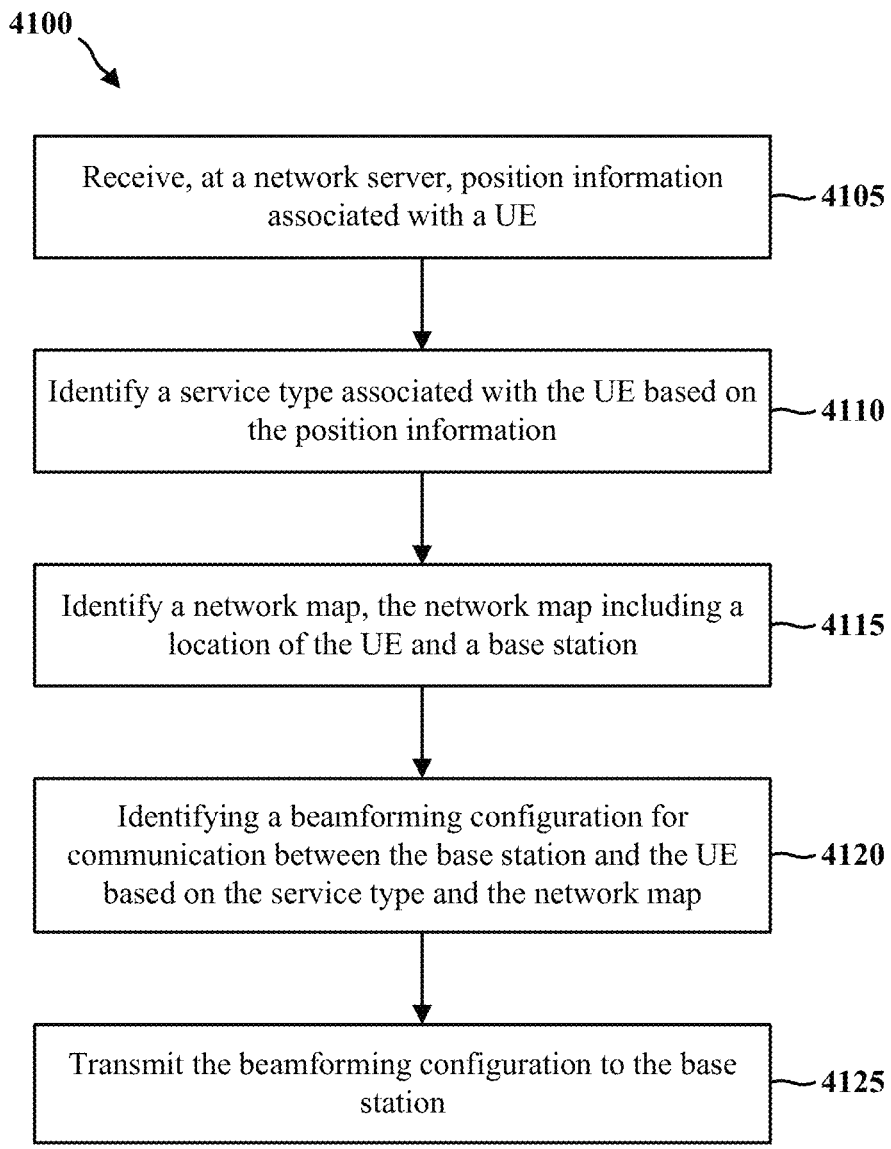
FIGS. 41 through 45 illustrate methods for UE localization via an mmW network map.

FIG. 41 shows a flowchart illustrating a method 4100 for UE localization via an mmW network map in accordance with various aspects of the present disclosure. The operations of method 4100 may be implemented by a network server (e.g., a network server 2601 of FIG. 26) or its components as described herein. For example, the operations of method 4100 may be performed by a network server mmW communications manager as described with reference to FIGS. 29 through 32. In some examples, a network server may execute a set of codes to control the functional elements of the device to perform the functions described below. Additionally or alternatively, the network server may perform aspects the functions described below using special-purpose hardware.

At block 4105 the network server may receive position information associated with a UE. The operations of block 4105 may be performed according to the methods described with reference to FIGS. 26 through 28. In certain examples, aspects of the operations of block 4105 may be performed by a network server position information component as described with reference to FIGS. 29 through 32.

At block 4110 the network server may identify a service type associated with the UE based at least in part on the position information. The operations of block 4110 may be performed according to the methods described with reference to FIGS. 26 through 28. In certain examples, aspects of the operations of block 4110 may be performed by a service type component as described with reference to FIGS. 29 through 32.

At block 4115 the network server may identify a network map, the network map include a location of the UE and a base station (e.g., base station 2605). The operations of block 4115 may be performed according to the methods described with reference to FIGS. 26 through 28. In certain examples, aspects of the operations of block 4115 may be performed by a network map component as described with reference to FIGS. 29 through 28.

At block 4120 the network server may identify a beamforming configuration for communication between the base station (e.g., the base station 2605) and the UE (e.g., the UE 2615) based at least in part on the service type and the network map. The operations of block 4120 may be performed according to the methods described with reference to FIGS. 26 through 28. In certain examples, aspects of the operations of block 4120 may be performed by a beamforming configuration component as described with reference to FIGS. 29 through 32.

At block 4125 the network server may transmit the beamforming configuration to the base station (e.g., the base station 2605). The operations of block 4125 may be performed according to the methods described with reference to FIGS. 26 through 28. In certain examples, aspects of the operations of block 4125 may be performed by a transmitter as described with reference to FIGS. 29 through 32.

Figure 42:
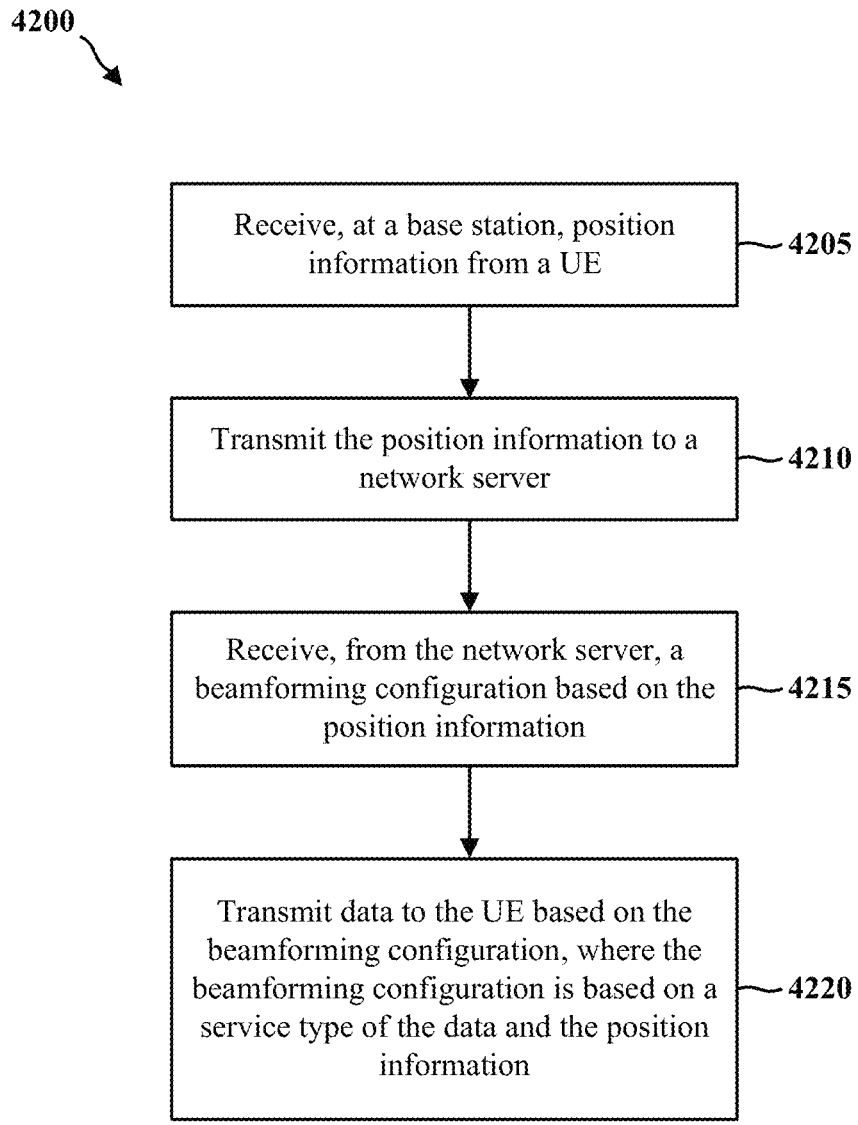

FIG. 42 shows a flowchart illustrating a method 4200 for UE localization via an mmW network map in accordance with various aspects of the present disclosure. The operations of method 4200 may be implemented by a base station 2605 or components of a base station as described herein. For example, the operations of method 4200 may be performed by a base station mmW communications manager as described with reference to FIGS. 33 through 36. In some examples, a base station 2605 may execute a set of codes to control the functional elements of the device to perform the functions described below. Additionally or alternatively, the base station 2605 may perform aspects the functions described below using special-purpose hardware.

At block 4205 the base station 2605 may receive position information from a UE. The operations of block 4205 may be performed according to the methods described with reference to FIGS. 26 through 28. In certain examples, aspects of the operations of block 4205 may be performed by a base station position information component as described with reference to FIGS. 33 through 36.

At block 4210 the base station 2605 may transmit the position information to a network server (e.g., network server 2601). The operations of block 4210 may be performed according to the methods described with reference to FIGS. 26 through 28. In certain examples, aspects of the operations of block 4210 may be performed by a base station position information component as described with reference to FIGS. 33 through 36.

At block 4215 the base station 2605 may receive, from the network server, a beamforming configuration based at least in part on the position information. The operations of block 4215 may be performed according to the methods described with reference to FIGS. 26 through 28. In certain examples, aspects of the operations of block 4215 may be performed by a base station beamforming component as described with reference to FIGS. 33 through 36.

At block 4220 the base station 2605 may transmit data to the UE based at least in part on the beamforming configuration, where the beamforming configuration may be based at least in part on a service type of the data and the position information. The operations of block 4220 may be performed according to the methods described with reference to FIGS. 26 through 28. In certain examples, aspects of the operations of block 4220 may be performed by a transmitter as described with reference to FIGS. 33 through 36.

Figure 43:
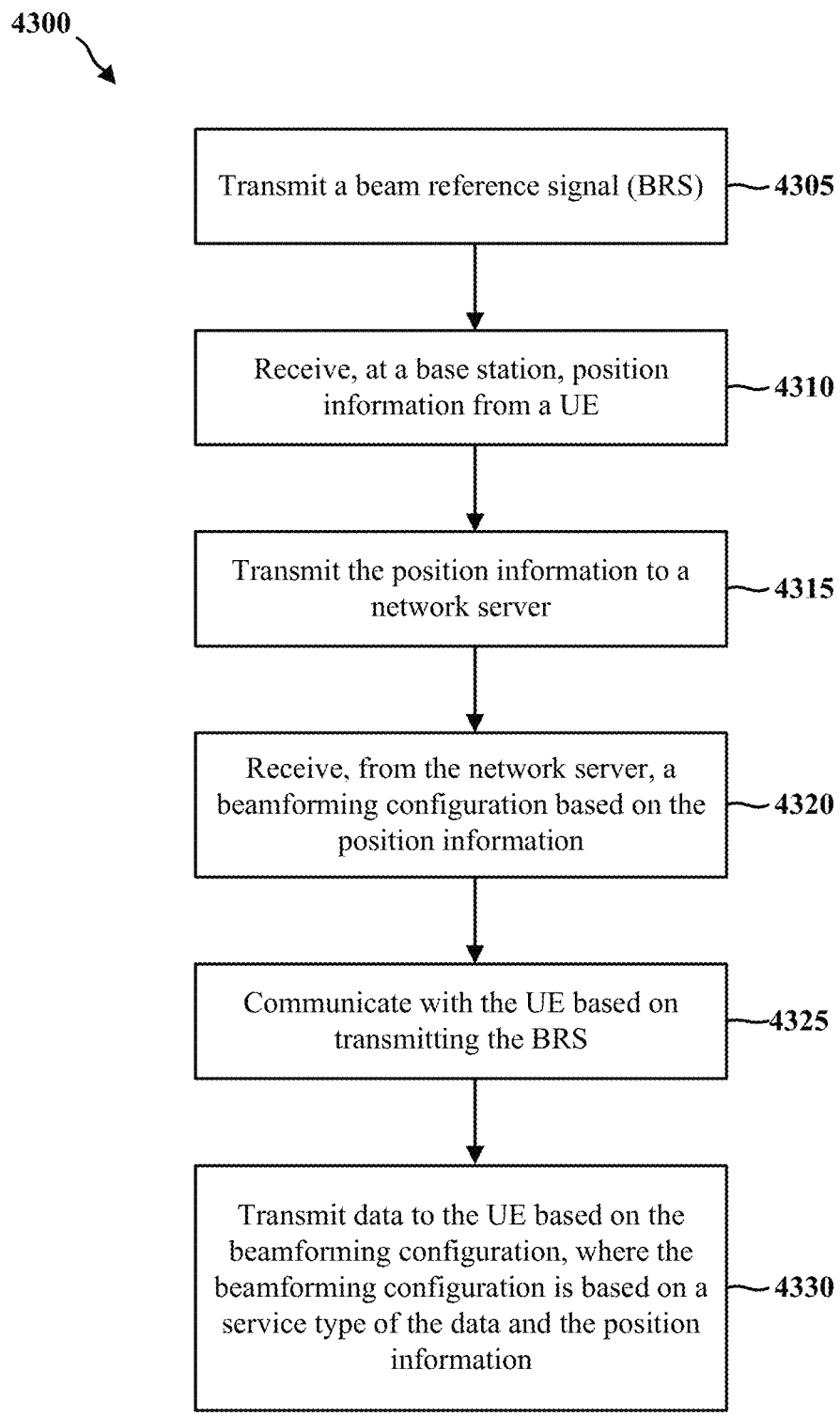

FIG. 43 shows a flowchart illustrating a method 4300 for UE localization via an mmW network map in accordance with various aspects of the present disclosure. The operations of method 4300 may be implemented by a base station 2605 or components of a base station as described herein. For example, the operations of method 4300 may be performed by a base station mmW communications manager as described with reference to FIGS. 33 through 36. In some examples, a base station 2605 may execute a set of codes to control the functional elements of the device to perform the functions described below. Additionally or alternatively, the base station 2605 may perform aspects the functions described below using special-purpose hardware.

At block 4305 the base station 2605 may transmit a BRS. The operations of block 4305 may be performed according to the methods described with reference to FIGS. 26 through 28. In certain examples, aspects of the operations of block 4305 may be performed by a transmitter as described with reference to FIGS. 33 through 36.

At block 4310 the base station 2605 may receive position information from a UE. The operations of block 4310 may be performed according to the methods described with reference to FIGS. 26 through 28. In certain examples, aspects of the operations of block 4310 may be performed by a base station position information component as described with reference to FIGS. 33 through 36.

At block 4315 the base station 2605 may transmit the position information to a network server. The operations of block 4315 may be performed according to the methods described with reference to FIGS. 26 through 28. In certain examples, aspects of the operations of block 4315 may be performed by a base station position information component as described with reference to FIGS. 33 through 36.

At block 4320 the base station 2605 may receive, from the network server, a beamforming configuration based at least in part on the position information. The operations of block 4320 may be performed according to the methods described with reference to FIGS. 26 through 28. In certain examples, aspects of the operations of block 4320 may be performed by a base station beamforming component as described with reference to FIGS. 33 through 36.

At block 4325 the base station 2605 may communicate with the UE based at least in part on transmitting the BRS, where transmitting the data to the UE is based at least in part on the communication. The operations of block 4325 may be performed according to the methods described with reference to FIGS. 26 through 28. In certain examples, aspects of the operations of block 4325 may be performed by a transmitter as described with reference to FIGS. 33 through 36.

At block 4330 the base station 2605 may transmit data to the UE (e.g., the UE 2615) based at least in part on the beamforming configuration, where the beamforming configuration is based at least in part on a service type of the data and the position information. The operations of block 4330 may be performed according to the methods described with reference to FIGS. 26 through 28. In certain examples, aspects of the operations of block 4330 may be performed by a transmitter as described with reference to FIGS. 33 through 36.

Figure 44:
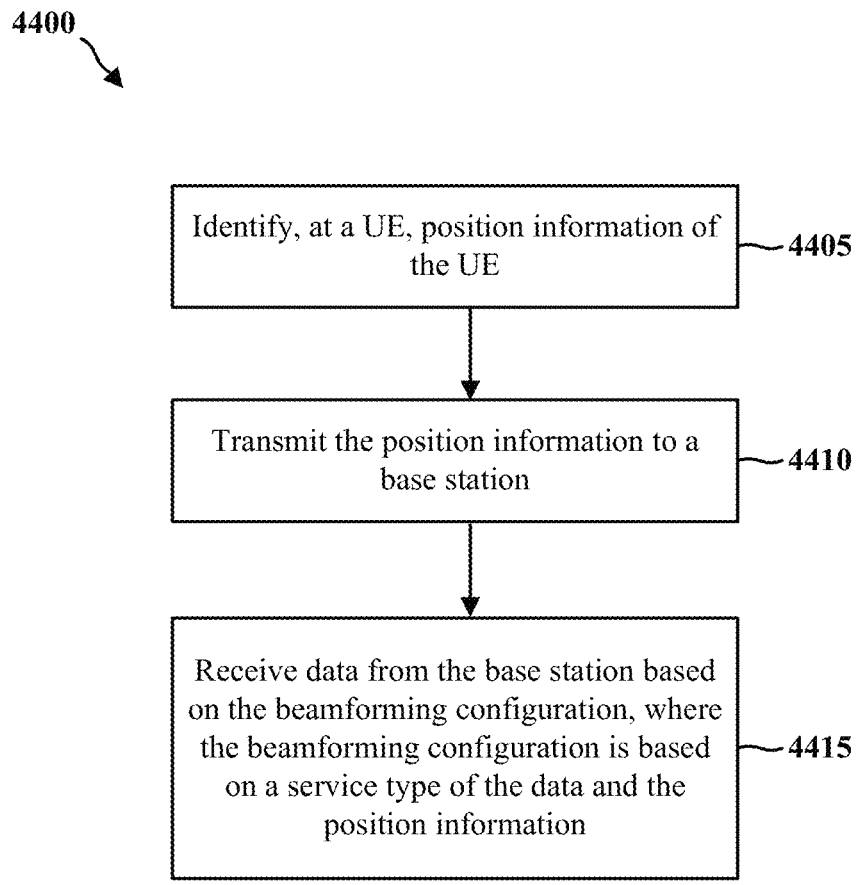

FIG. 44 shows a flowchart illustrating a method 4400 for UE localization via an mmW network map in accordance with various aspects of the present disclosure. The operations of method 4400 may be implemented by a UE 2615 or its components as described herein. For example, the operations of method 4400 may be performed by a UE mmW communications manager as described with reference to FIGS. 37 through 40. In some examples, a UE 2615 may execute a set of codes to control the functional elements of the device to perform the functions described below. Additionally or alternatively, the UE 2615 may perform aspects the functions described below using special-purpose hardware.

At block 4405 the UE 2615 may identify position information of the UE 2615. The operations of block 4405 may be performed according to the methods described with reference to FIGS. 26 through 28. In certain examples, aspects of the operations of block 4405 may be performed by a UE position information component as described with reference to FIGS. 37 through 40.

At block 4410 the UE 2615 may transmit the position information to a base station 2605. The operations of block 4410 may be performed according to the methods described with reference to FIGS. 26 through 28. In certain examples, aspects of the operations of block 4410 may be performed by a transmitter as described with reference to FIGS. 37 through 40.

At block 4415 the UE 2615 may receive data from the base station 2605 based at least in part on a beamforming configuration, where the beamforming configuration is based at least in part on a service type of the data and the position information. The operations of block 4415 may be performed according to the methods described with reference to FIGS. 26 through 28. In certain examples, aspects of the operations of block 4415 may be performed by a receiver as described with reference to FIGS. 37 through 40.

Figure 45:
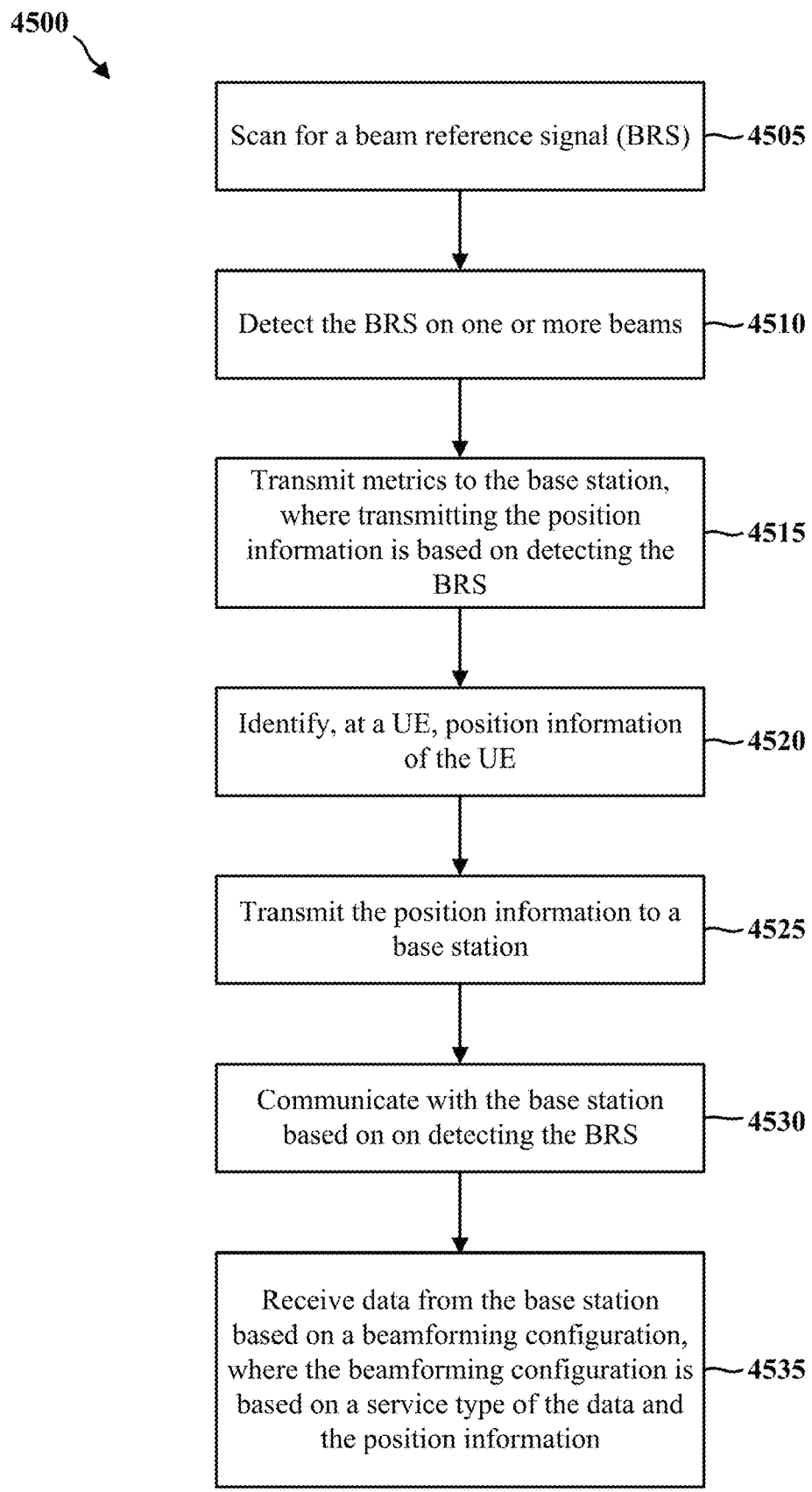

FIG. 45 shows a flowchart illustrating a method 4500 for UE localization via an mmW network map in accordance with various aspects of the present disclosure. The operations of method 4500 may be implemented by a UE 2615 or components of a UE as described herein. For example, the operations of method 4500 may be performed by a UE mmW communications manager as described with reference to FIGS. 37 through 40. In some examples, a UE 2615 may execute a set of codes to control the functional elements of the device to perform the functions described below. Additionally or alternatively, the UE 2615 may perform aspects the functions described below using special-purpose hardware.

At block 4505 the UE 2615 may scan for a BRS. The operations of block 4505 may be performed according to the methods described with reference to FIGS. 26 through 28. In certain examples, aspects of the operations of block 4505 may be performed by a BRS component as described with reference to FIGS. 37 through 40.

At block 4510 the UE 2615 may detect the BRS on one or more beams. The operations of block 4510 may be performed according to the methods described with reference to FIGS. 26 through 28. In certain examples, aspects of the operations of block 4510 may be performed by a BRS component as described with reference to FIGS. 37 through 40.

At block 4515 the UE 2615 may transmit metrics to the base station 2605, where transmitting the position information is based at least in part on detecting the BRS. The operations of block 4515 may be performed according to the methods described with reference to FIGS. 26 through 28. In certain examples, aspects of the operations of block 4515 may be performed by a transmitter as described with reference to FIGS. 37 through 40.

At block 4520 the UE 2615 may identify position information of the UE. The operations of block 4520 may be performed according to the methods described with reference to FIGS. 26 through 28. In certain examples, aspects of the operations of block 4520 may be performed by a UE position information component as described with reference to FIGS. 37 through 40.

At block 4525 the UE 2615 may transmit the position information to a base station 2605. The operations of block 4525 may be performed according to the methods described with reference to FIGS. 26 through 28. In certain examples, aspects of the operations of block 4525 may be performed by a transmitter as described with reference to FIGS. 37 through 40.

At block 4530 the UE 2615 may communicate with the base station 2605 based at least in part on detecting the BRS, where receiving the data from the base station 2605 is based at least in part on the communications. The operations of block 4530 may be performed according to the methods described with reference to FIGS. 26 through 28. In certain examples, aspects of the operations of block 4530 may be performed by a BRS component as described with reference to FIGS. 37 through 40.

At block 4535 the UE 2615 may receive data from the base station 2605 based at least in part on a beamforming configuration, where the beamforming configuration is based at least in part on a service type of the data and the position information. The operations of block 4535 may be performed according to the methods described with reference to FIGS. 26 through 28. In certain examples, aspects of the operations of block 4535 may be performed by a receiver as described with reference to FIGS. 37 through 40.

Figure 46:
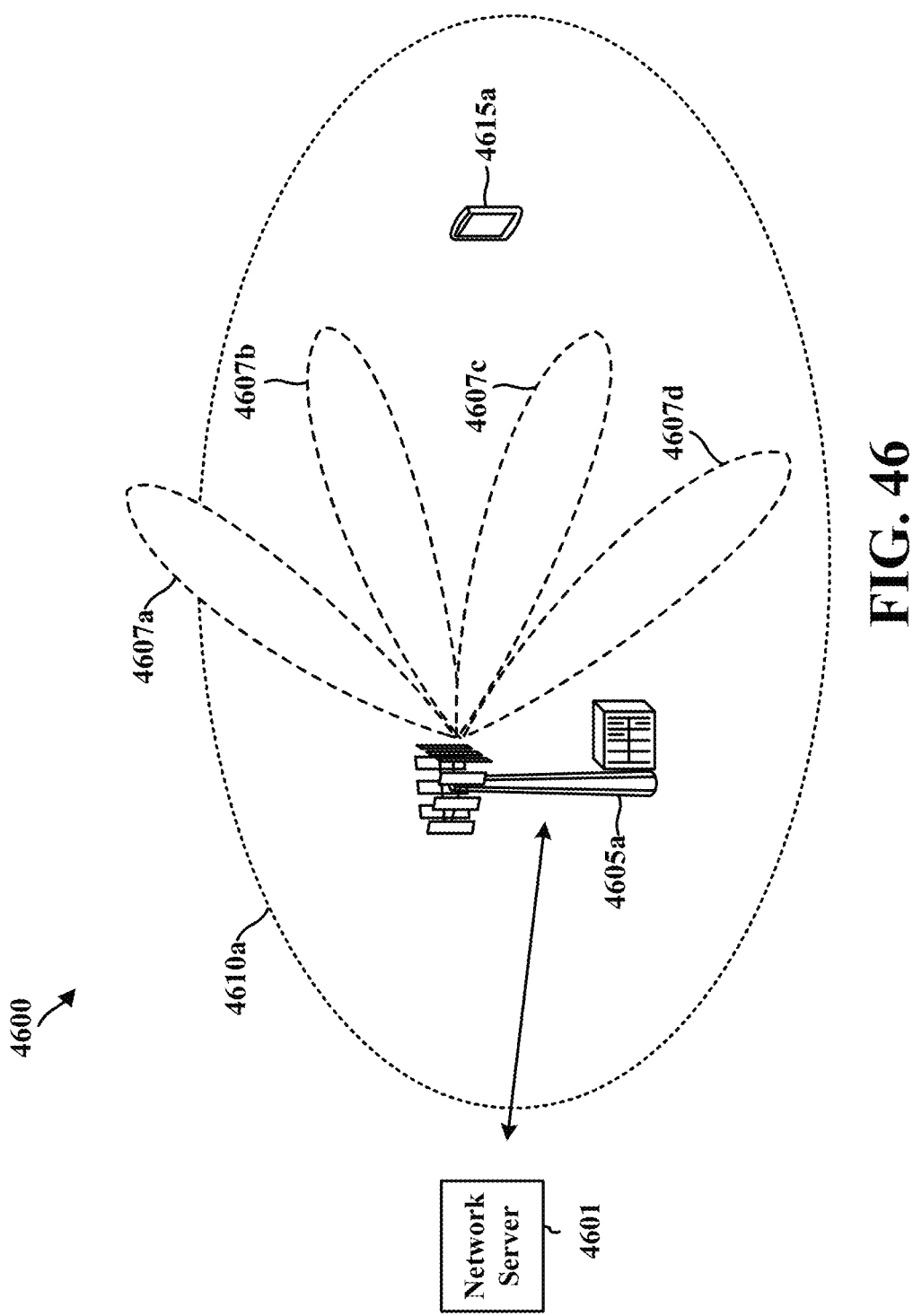
FIG. 46 illustrates an example of a wireless communications system that supports mmW network optimization via a network map.

FIG. 46 illustrates an example of a wireless communications system 4600 for mmW network optimization via a network map according to one or more aspects of the present disclosure. Wireless communications system 4600 may be an example of aspects of wireless communication system 100 of FIG. 1. Wireless communications system 4600 may be an LTE/LTEa, an NR, or a mmW wireless communication system. Wireless communications system 4600 may include a UE 4615a and a base station 4605a, which may be examples of the of FIG. 1. Broadly, wireless communications system 4600 illustrates aspects of an acquisition procedure, where UE 4615a discovers base station 4605b. In relation to FIG. 1, the network server 4601 may be an aspect of the server 199, the base station 4605a may be an aspect of the base station 102 and/or the mmW base station 180, and the UE 4615a may be an aspect of the UE 104

In some examples, base station 4605a may be a mmW base station that transmits beamformed transmissions on an active beam to UE 4615a. The transmissions from base stations 4605a may be beamformed or directional transmissions that are directed towards UE 4615a.

For example, base station 4605a may transmit DL synchronization signal on DL synchronization beams 4607. Base station 4605a may transmit DL synchronization signals (e.g., for random access) in a beamformed manner and swept through the angular coverage region (e.g., in azimuth and/or elevation). Each DL synchronization beam 4607 may be transmitted in a beam sweeping operation in different directions so as to cover the coverage area of base station 4605b. For example, DL synchronization beam 4607a may be transmitted in a first direction, DL synchronization beam 4607b may be transmitted in a second direction, DL synchronization beam 4607c may be transmitted in a third direction, and DL synchronization beam 4607d may be transmitted in a fourth direction. Although wireless communications system 4600 shows four DL synchronization beams 4607, it is to be understood that fewer and/or more DL synchronization beams 4607 may be transmitted. Moreover, the DL synchronization beams 4607 may be transmitted at differing beam widths, at different elevation angles, etc. In some aspects, DL synchronization beams 4607 may be associated with a beam index, e.g., an indicator identifying the beam. Though the beams in FIG. 46 are describe as DL synchronization beams 4607, the beams may be used to transmit any information such as data packets, pilot signals, etc.

In some examples, base station 4605a may be a mmW base station that transmits beamformed transmissions on an active beam to UE 4615a. When establishing a communication link with a UE 4615a, base station 4605a may scan a majority or entirety of coverage area 4610a to determine the direction in which to transmit one or more synchronization beams 4607. Scanning the entire coverage area 4610a may take a relatively long amount of time and, in some cases, UE 4615a may be moving during the scanning procedure. Thus, by the time base station 4605a determines the direction in which to project, UE 4615a may have already relocated to a different position and the scanning results may be inaccurate. This inaccuracy may result in base station 4605a reinitiating the scanning process, leading to more time used to establish communication with UE 4615a.

To improve efficient link establishment, improving coordination and/or communication between base station 4605a and UE 4615a may be facilitated by a network server 4601 (e.g., a node of EPC 160 of FIG. 1). The network server 4601 may leverage a network map to understand the motion and behavior of UE 4615a. For example, UE 4615a may be moving along a trajectory that is projected to enter the coverage area 4610a of base station 4605a. Using the network map and position information of the UE 4615a, the network server 4601 may determine a base station suitable for supporting communication with the UE 4615a. For example, the network server 4601 may determine that UE 4615a is entering the coverage area 4610a of base station 4605a and, to maintain a quality of service at the UE 4615a, base station 4605a may be used to support communication with the UE 4615a entering coverage area 4610a. The network server 4601 may communicate this information to base station 4605a indicating to base station 4605a that UE 4615a is projected to enter coverage area 4610a at a given time. In some examples, the network server 4601 may communicate suggested beam information such as one or more beamforming parameters (e.g., a beam orientation, a beam width, a beam separation, a beam pattern) to base station 4605a. Such communications may occur via a backhaul link or through wireless communication. Base station 4605a may then use appropriate beam scanning techniques based on the beamforming parameter or other beamforming information to establish communication with UE 4615a.

Figure 47:
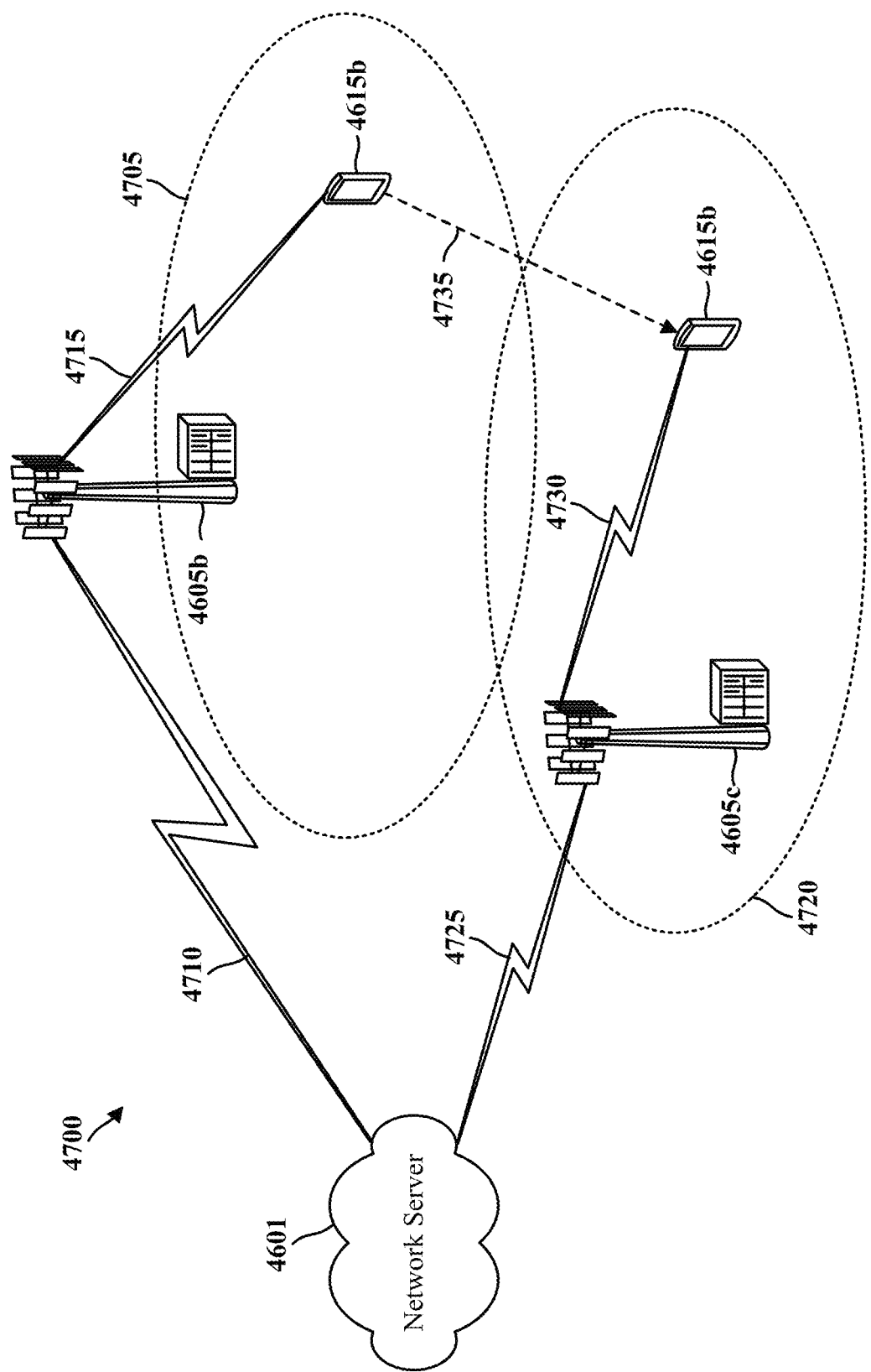
FIG. 47 illustrates an example of a wireless communications system that supports mmW network optimization via a network map.

FIG. 47 illustrates an example of a wireless communications system 4700 for mmW network optimization via a network map in accordance with one or more aspects of the present disclosure. Wireless communications system 4700 may be an example of aspects of wireless communication systems 100 and 4600 of FIGS. 1 and 46. Wireless communications system 4700 may be an LTE/LTE-A, an NR, or a mmW wireless communication system. Wireless communications system 4700 may include a UE 4615b and a base station 4605b and a base station 4605c, which may be examples of or may represent aspects of techniques performed by a UE 4615 or a base station 4605 as described with reference to FIG. 46. Wireless communications system 4700 may also include a network server 4601, which may be a cloud-based network server or other network node (e.g., a node of the EPC 160), as described with reference to FIG. 1. Broadly, wireless communications system 4700 illustrates aspects of an acquisition procedure, where UE 4615b moves from coverage area 4705 to coverage area 4720 and establishes communication with base station 4605c.

In some examples, base station 4605b may utilize beamforming by sending transmissions to a UE 4615b using one or more active beams. Base station 4605b may have a corresponding coverage area 4705 and may communicate with UE 4615b over communication link 4715 when UE 4615b is within coverage area 4705. UE 4615b may be located within coverage area 4705 and may be stationary or moving. Base station 4605b may also capable of communicating with a network server 4601 via communication link 4710

In some examples, base station 4605c may also utilize beamforming for communication with one or more UEs, such as UE 4615b. Base station 4605c may have a corresponding coverage area 4720 and may communicate with UE 4615b over communication link 4730 when UE 4615b is within coverage area 4720. Base station 4605b may communicate with a network server 4601 via communication link 4725.

In some examples, UE 4615b may be moving and may be initially located within coverage area 4705 associated with base station 4605b. As UE 4615b moves in direction 4735, for instance, the UE 4615b may leave coverage area 4705 (served by base station 4605b) and may enter (or may be projected to enter) coverage area 4720 (served by base station 4605c). In such cases, UE 4615b may participate in a handover process from base station 4605b to base station 4605c. In such instances, network server 4601 may assist in handover by providing information to at least one of base station 4605b and 4605c before, during, or after the handover process in order to aide with the establishment of communication between base station 4605c and UE 4615b.

In some aspects, one or more of UE 4615b, base station 4605b, and/or base station 4605c, may report various metrics (which may include position information of one or more UEs, such as UE 4615b) to network server 4601 in order to facilitate handover. The metrics may additionally (or alternatively) include GPS information, gyroscope information, and accelerometer information, or any other information related to the position, direction, movement, velocity, etc. of the UE.

Such reports may be transmitted via a reference signal (e.g., a beam reference signal (BRS)) to the network server 4601. The metrics may be reported periodically or aperiodically (e.g., based on a request for one or more metrics). In some instances, one or more of UE 4615b, base station 4605b, and/or base station 4605c may report information using control channels (e.g., an NR control channel, a mmW control channel), or on lower frequency coexisting or control channels (e.g., an LTE control channel). Using the position information associated with the UE 4615b, network server 4601 may create, modify, update, or restructure a network map associated with wireless communications system 4700. The network map may include information related to coverage areas 4705 and 4720, cells supported by base station 4605b or 4605c, the position and/or projected trajectory or UE 4615b (or other UEs within wireless communications system 4700), etc.

In some examples, network server 4601 may determine information related to beamforming, such as one or more beamforming parameters (e.g., a beam orientation, a beam width, a beam separation, a beam pattern) for a target base station (i.e., the base station to which UE 4615b is being handed over). The beamforming parameter may be determined based on a probability of successfully establishing a communication link with UE 4615b and the determination may be based on the network map. For instance, the network server 4601 may determine a beam width having a relative probability of reaching the UE 4615b and therefore resulting in link establishment more quickly than other beam widths. The network server 4601 may, additionally or alternatively, determine a beam pattern for communication with UE 4615b.

In some examples, base station 4605b may act as a serving base station by communicating with UE 4615b via communication link 4715. Base station 4605b may gather and report, e.g., periodically, various metrics related to UE 4615b (e.g., position information). Network server 4601 may use the reported information and, along with information reported from other cells to create, update, modify, or restructure a network map associated with wireless communications system 4700. UE 4615b may move in direction 4735, leaving coverage area 4705 and entering coverage area 4720. In order to maintain a quality of service at the UE 4615b, it may be beneficial for base station 4605c to establish a communication link 4730 with UE 4615b as quickly as possible. Based on the position information and the network map, network server 4601 may determine that UE 4615b is moving in direction 4735 and will be entering coverage area 4720. Knowing the trajectory or projected location of UE 4615b, network server 4601 may determine one or more beamforming parameters for assisting in handover from base station 4605b to base station 4605c. Network server 4601 may then indicate, to base station 4605c, that UE 4615b may be arriving within coverage area 4720 and, in some cases, network server 4601 may signal to base station 4605c information related to beamforming, such as the determined one or more beamforming parameters, which may aide in establishing a connection with UE 4615b as UE 4615b enters coverage area 4720. In some examples, network server 4601 may provide base station 4605c with information regarding the general area in which UE 4615b will be located upon entering coverage area 4720 allowing base station 4605c to engage in scanning a smaller geographic space or azimuthal range in order to establish a communication link with UE 4615b. In other examples, network server 4601 may provide specific beam orientations or patterns allowing base station 4605c to possibly eliminate the scanning procedure entirely, and instead transmit using one or more active beams directly to UE 4615b. Thus, base station 4605b and base station 4605c may coordinate via network server 4601 to assist in handoff and more efficient beam scanning.

Figure 48:
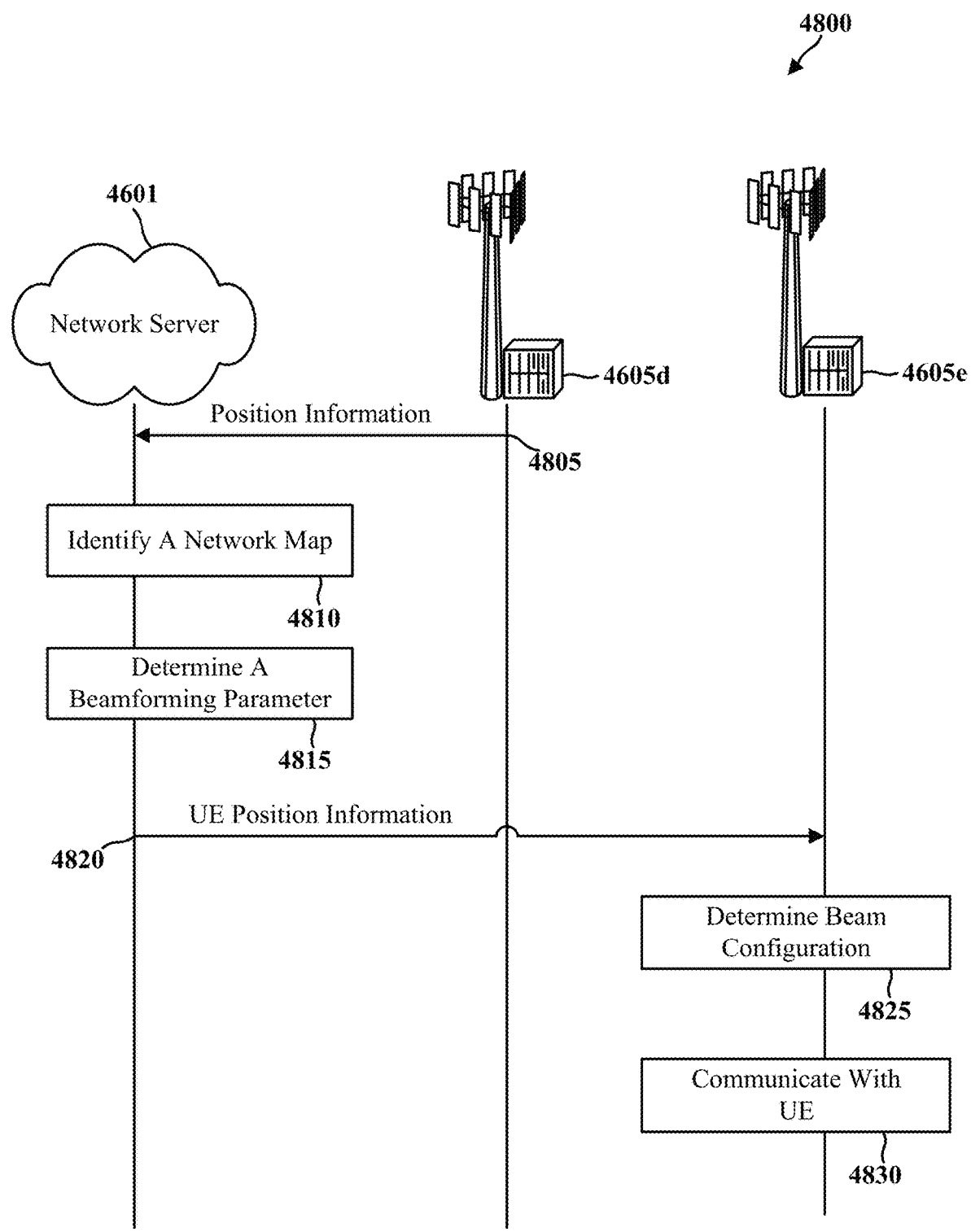
FIG. 48 illustrates an example of a process flow that supports millimeter-wave network optimization via a network map.

FIG. 48 illustrates an example of a process flow 4800 for mmW network optimization via a network map in accordance with one or more aspects of the present disclosure. Process flow 4800 may illustrate aspects performed by a mmW wireless communication system. Process flow 4800 may include a network server 4601 and a base station 4605d and a base station 4605e, which may be examples of or may represent aspects of techniques performed by a UE 4615 or base station 4605 as described with reference to FIGS. 46-47.

At 4805, network server 4601 receives position information associated with a UE. The positioning information may be transmitted periodically. The positioning information may include GPS information, gyroscope information, accelerometer information, a UE subarray geometry information, beam information from a UE subarray, or any combination thereof. Position information may further indicate a beam evolution based at least in part on communication between the UE and a serving base station. In some examples, positioning information may further include a position of the UE at each of multiple times, or a change in position of the UE over time, or a combination thereof.

The position information may be received by network server 4601 from base station 4605d, which may be associated with the UE. In some examples, the position information may be received by network server 4601 from the UE. The position information may be received via a mmW control channel, or a lower frequency channel.

At 4810, network server 4601 identifies a network map, based at least in part on the position information. The network map may include relative locations of mmW cells, coverage areas of the mmW cells, and the UE. The network server 4601 may identify base station 4605e from a plurality of base stations based at least in part on the position information and the network map. The network server 4601 may further determine a probability that UE will enter a cell associated with base station 4605e base at least in part on the position information. The network server 4601 may transmit an indication of the probability to base station 4605e.

At 4815, the network server 4601 determines a beamforming parameter. The beamforming parameter may be based at least in part on identifying base station 4605e. The beamforming parameter may include a beam orientation, a beam width, a beam separation, a beam pattern or a combination thereof.

At 4820, the network server 4601 transmits the beamforming parameter, which may be based at least in part on a network map and position information associated with the UE, to base station 4605e. Base station 4605e may also receive an indication that the UE will enter a cell associated with base station 4605e. The indication may be received from network server 4601.

At 4825, base station 4605e determines a beam configuration for communicating with the UE based at least in part on the beamforming parameter. Base station 4605e may determine the beam configuration based in part on the indication that the UE will enter the cell. Base station 4605e may receive handover information associated with base station 4605d from the network server 4601. Base station 4605e may perform handover from base station 4605d based at least in part on the indication that the UE will enter the cell, and based on the beam configuration. Base station 4605e may also identify a frame structure (or subframe structure) associated with the UE.

At 4830, base station 4605e communicates with the UE, based at least in part on the beam configuration. Transmitting the determined beam configuration may be based at least in part on the frame structure associated with the UE.

Figure 49:
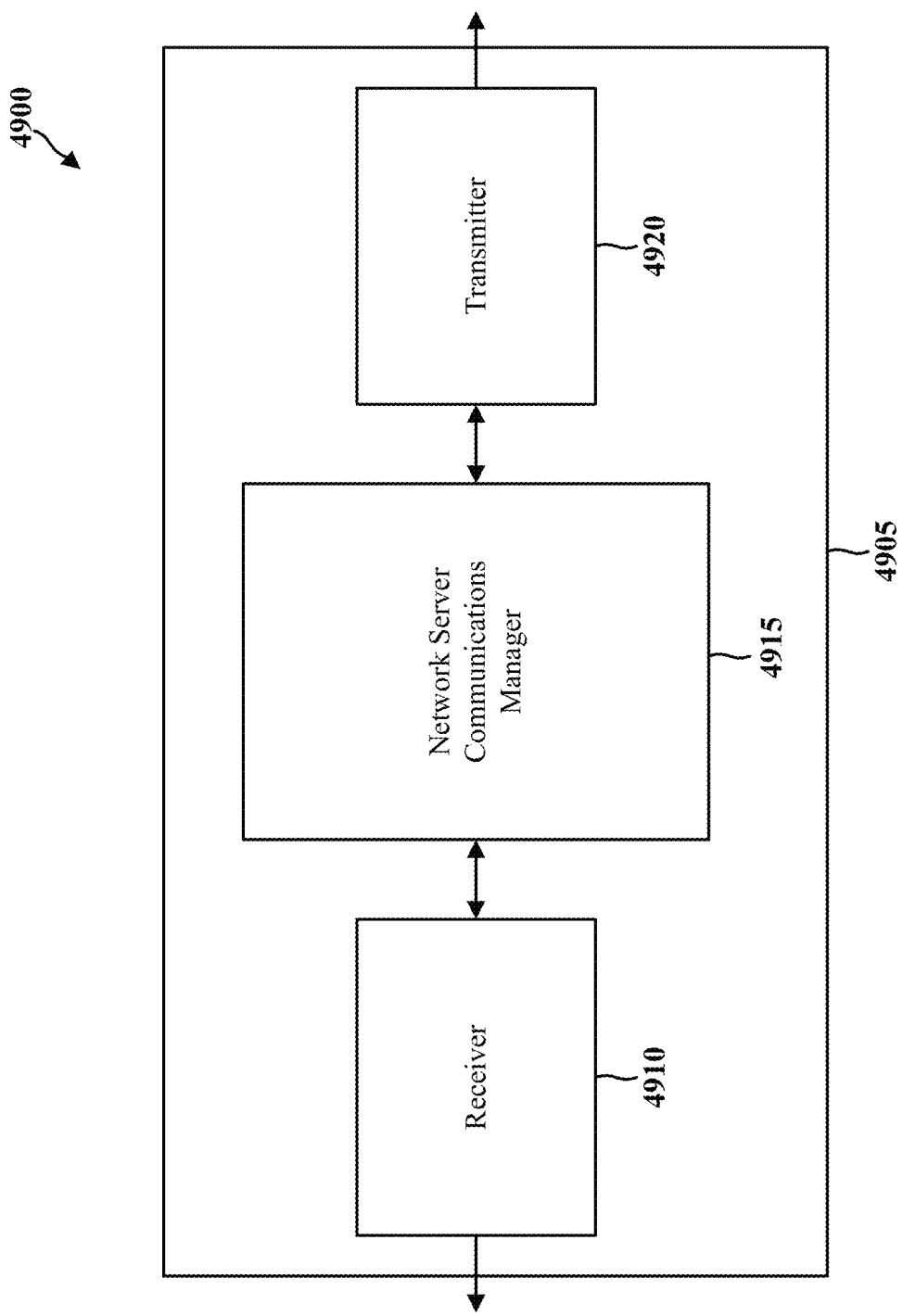
FIGS. 49 through 51 show block diagrams of a device that supports mmW network optimization via a network map.

FIG. 49 shows a block diagram 4900 of a wireless device 4905 that supports millimeter-wave network optimization via a network map in accordance with various aspects of the present disclosure. Wireless device 4905 may be an example of aspects of a network server 4601 as described with reference to FIGS. 46 and 47. Wireless device 4905 may include receiver 4910, network server communications manager 4915, and transmitter 4920. Wireless device 4905 may also include a processor. Each of these components may be in communication with one another (e.g., via one or more buses).

Receiver 4910 may receive information such as packets, user data, or control information associated with various information channels (e.g., control channels, data channels, and information related to millimeter-wave network optimization via a network map, etc.). Information may be passed on to other components of the device. The receiver 4910 may be an example of aspects of the transceiver 5235 described with reference to FIG. 52.

Network server communications manager 4915 may be an example of aspects of the network server communications manager 5215 described with reference to FIG. 52.

Network server communications manager 4915 may receive position information associated with a UE, identify a network map based on the position information, determine a beamforming parameter associated with a handover based on the position information and the network map, and transmit the beamforming parameter to a base station associated with the handover.

The network server communications manager 4915 may be implemented in hardware, software executed by a processor, firmware, or any combination thereof. If implemented in software executed by a processor, the functions of the network server communications manager 4915 may be executed by a general-purpose processor, a DSP, an ASIC, an FPGA or other programmable logic device, discrete gate or transistor logic, discrete hardware components, or any combination thereof designed to perform the functions described in the present disclosure. The network server communications manager 4915 may be physically located at various positions, including being distributed such that portions of functions are implemented at different physical locations by one or more physical devices. In some examples, network server communications manager 4915 may be a separate and distinct component in accordance with various aspects of the present disclosure. In other examples, network server communications manager 4915 may be combined with one or more other hardware components, including but not limited to a receiver, a transmitter, a transceiver, one or more other components described in the present disclosure, or a combination thereof in accordance with various aspects of the present disclosure.

Transmitter 4920 may transmit signals generated by other components of the device. In some examples, the transmitter 4920 may be collocated with a receiver 4910 in a transceiver module. For example, the transmitter 4920 may be an example of aspects of the transceiver 5235 described with reference to FIG. 52. The transmitter 4920 may include a single antenna, or it may include a set of antennas.

Figure 50:
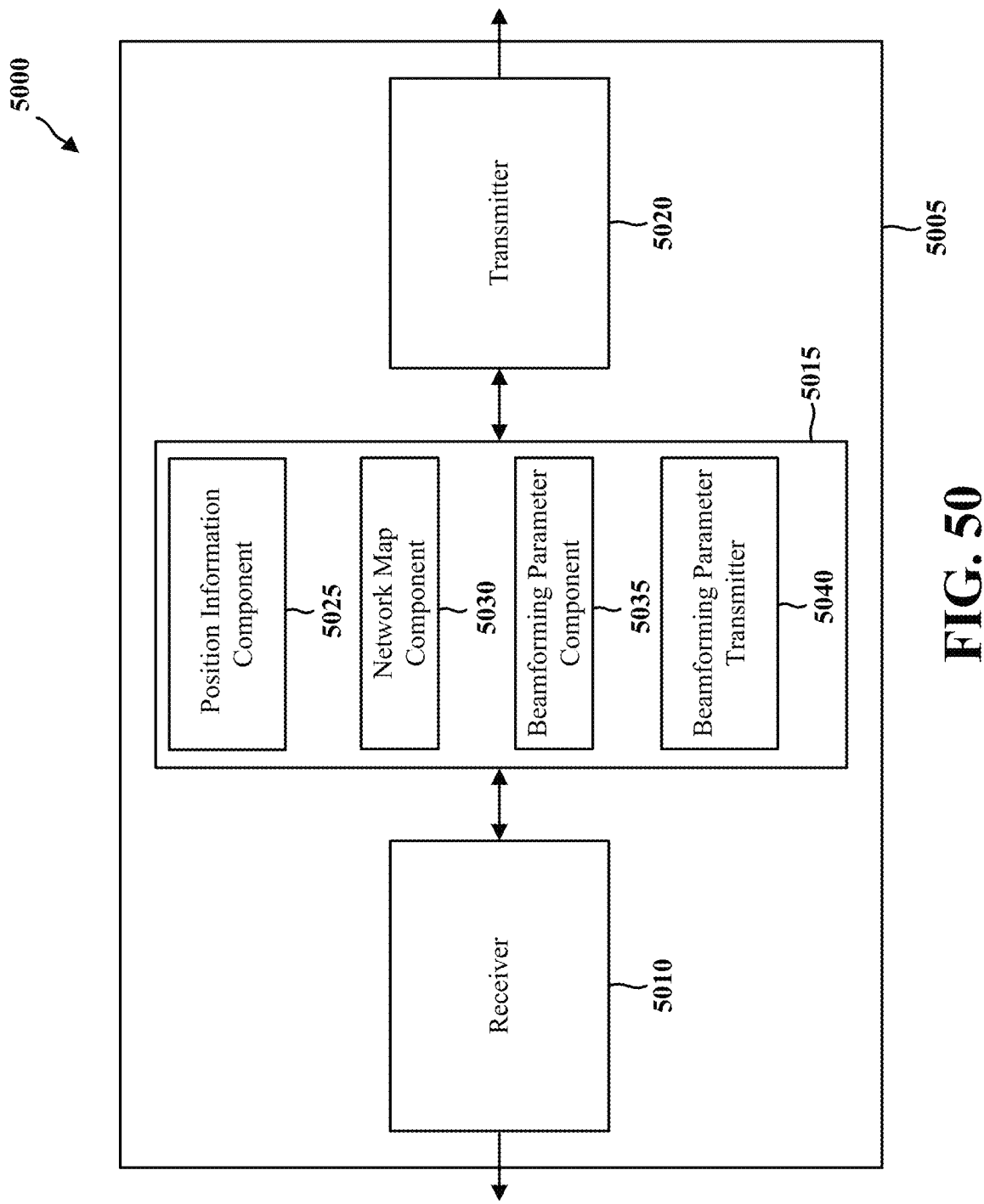

FIG. 50 shows a block diagram 5000 of a wireless device 5005 that supports mmW network optimization via a network map in accordance with various aspects of the present disclosure. Wireless device 5005 may be an example of aspects of a wireless device 4905 or a network server 4601 as described with reference to FIGS. 46, 47, and 50. Wireless device 5005 may include receiver 5010, network server communications manager 5015, and transmitter 5020. Wireless device 5005 may also include a processor. Each of these components may be in communication with one another (e.g., via one or more buses).

Receiver 5010 may receive information such as packets, user data, or control information associated with various information channels (e.g., control channels, data channels, and information related to millimeter-wave network optimization via a network map, etc.). Information may be passed on to other components of the device. The receiver 5010 may be an example of aspects of the transceiver 5235 described with reference to FIG. 52.

Network server communications manager 5015 may be an example of aspects of the network server communications manager 5215 described with reference to FIG. 52.

Network server communications manager 5015 may also include position information component 5025, network map component 5030, beamforming parameter component 5035, and beamforming parameter transmitter 5040.

Position information component 5025 may receive position information associated with a UE and receive the position information includes receiving position information periodically. In some cases, the position information includes GPS information, or gyroscope information, or accelerometer information, or UE subarray geometry information, or beam information from a UE subarray, or any combination thereof. In some cases, the position information indicates a beam evolution based on communication between the UE and a serving base station. In some cases, the position information includes a position of the UE at each of multiple times, or a change in position of the UE over time, or a combination thereof. In some cases, the position information is received from a second base station associated with the UE. In some cases, the position information is received from the UE. In some cases, the position information is received via a mmW control channel or a lower frequency channel.

Network map component 5030 may identify a network map based on the position information. In some cases, the network map includes relative locations of mmW cells, coverage areas of the mmW cells, and the UE.

Beamforming parameter component 5035 may determine a beamforming parameter associated with a handover based on the position information and the network map. In some cases, the beamforming parameter includes a beam orientation, a beam width, a beam separation, a beam pattern, or a combination thereof.

Beamforming parameter transmitter 5040 may transmit the beamforming parameter to a base station associated with the handover.

Transmitter 5020 may transmit signals generated by other components of the device. In some examples, the transmitter 5020 may be collocated with a receiver 5010 in a transceiver module. For example, the transmitter 5020 may be an example of aspects of the transceiver 5235 described with reference to FIG. 52. The transmitter 5020 may include a single antenna, or it may include a set of antennas.

Figure 51:
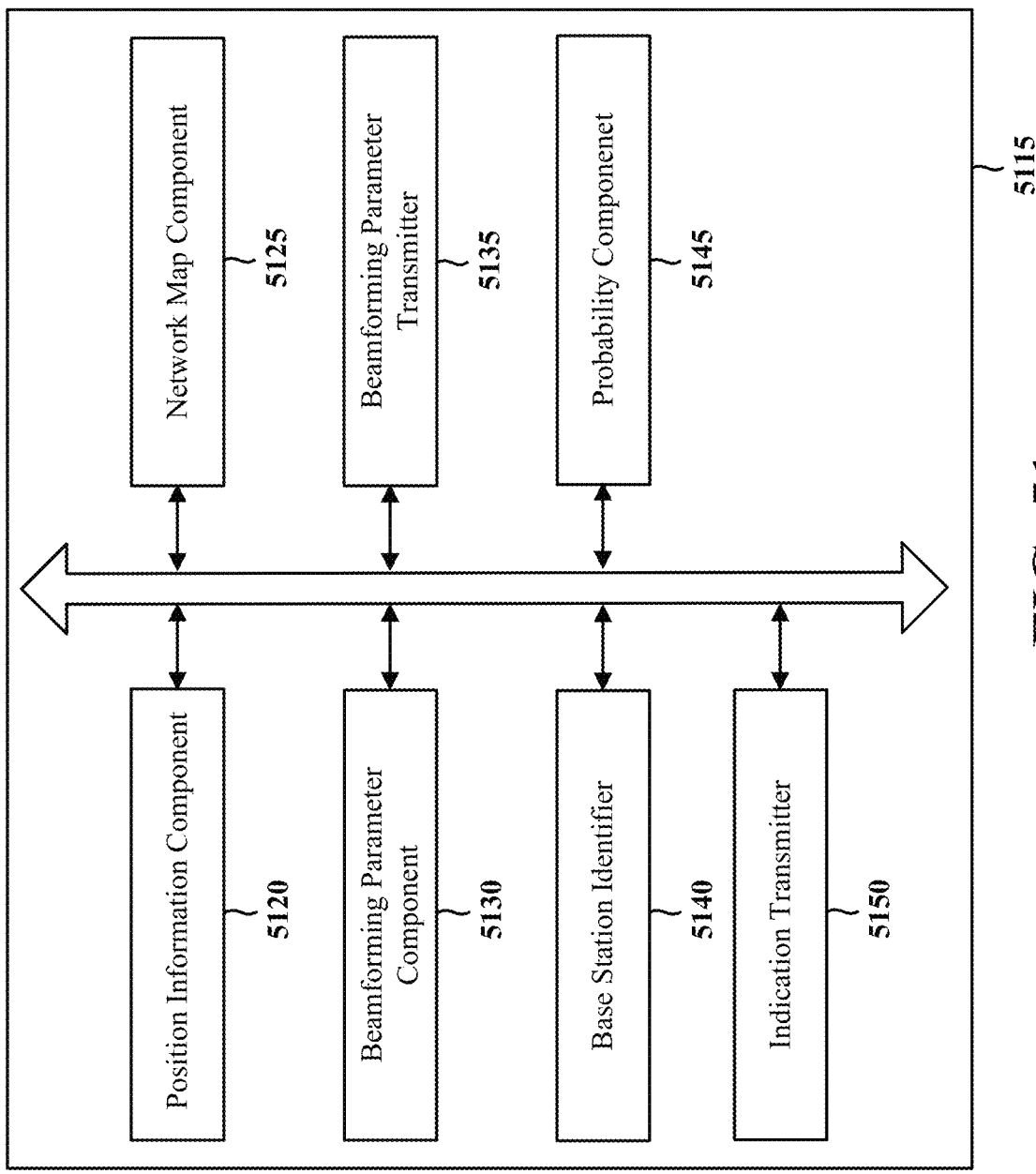

FIG. 51 shows a block diagram 5100 of a network server communications manager 5115 that supports millimeter-wave network optimization via a network map in accordance with various aspects of the present disclosure. The network server communications manager 5115 may be an example of aspects of a network server communications manager 4915, a network server communications manager 5015, or a network server communications manager 5215 described with reference to FIGS. 50, 51, and 52. The network server communications manager 5115 may include position information component 5120, network map component 5125, beamforming parameter component 5130, beamforming parameter transmitter 5135, base station identifier 5140, probability component 5145, and indication transmitter 5150. Each of these modules may communicate, directly or indirectly, with one another (e.g., via one or more buses).

Position information component 5120 may receive position information associated with a UE and receive the position information includes receiving position information periodically. In some cases, the position information includes GPS information, or gyroscope information, or accelerometer information, or UE subarray geometry information, or beam information from a UE subarray, or any combination thereof. In some cases, the position information indicates a beam evolution based on communication between the UE and a serving base station. In some cases, the position information includes a position of the UE at each of multiple times, or a change in position of the UE over time, or a combination thereof. In some cases, the position information is received from a second base station associated with the UE. In some cases, the position information is received from the UE. In some cases, the position information is received via a mmW control channel or a lower frequency channel.

Network map component 5125 may identify a network map based on the position information. In some cases, the network map includes relative locations of mmW cells, coverage areas of the mmW cells, and the UE.

Beamforming parameter component 5130 may determine a beamforming parameter associated with a handover based on the position information and the network map. In some cases, the beamforming parameter includes a beam orientation, a beam width, a beam separation, a beam pattern, or a combination thereof.

Beamforming parameter transmitter 5135 may transmit the beamforming parameter to a base station associated with the handover.

Base station identifier 5140 may identify the base station from a set of base stations based on the position information and the network map, where determining the beamforming parameter is based on identifying the base station.

Probability component 5145 may determine a probability that the UE will enter a cell associated with the base station based on the position information and determine the probability that the UE will enter the cell associated includes identifying a trajectory of the UE based on the position information.

Indication transmitter 5150 may transmit an indication of the probability to the base station.

Figure 52:
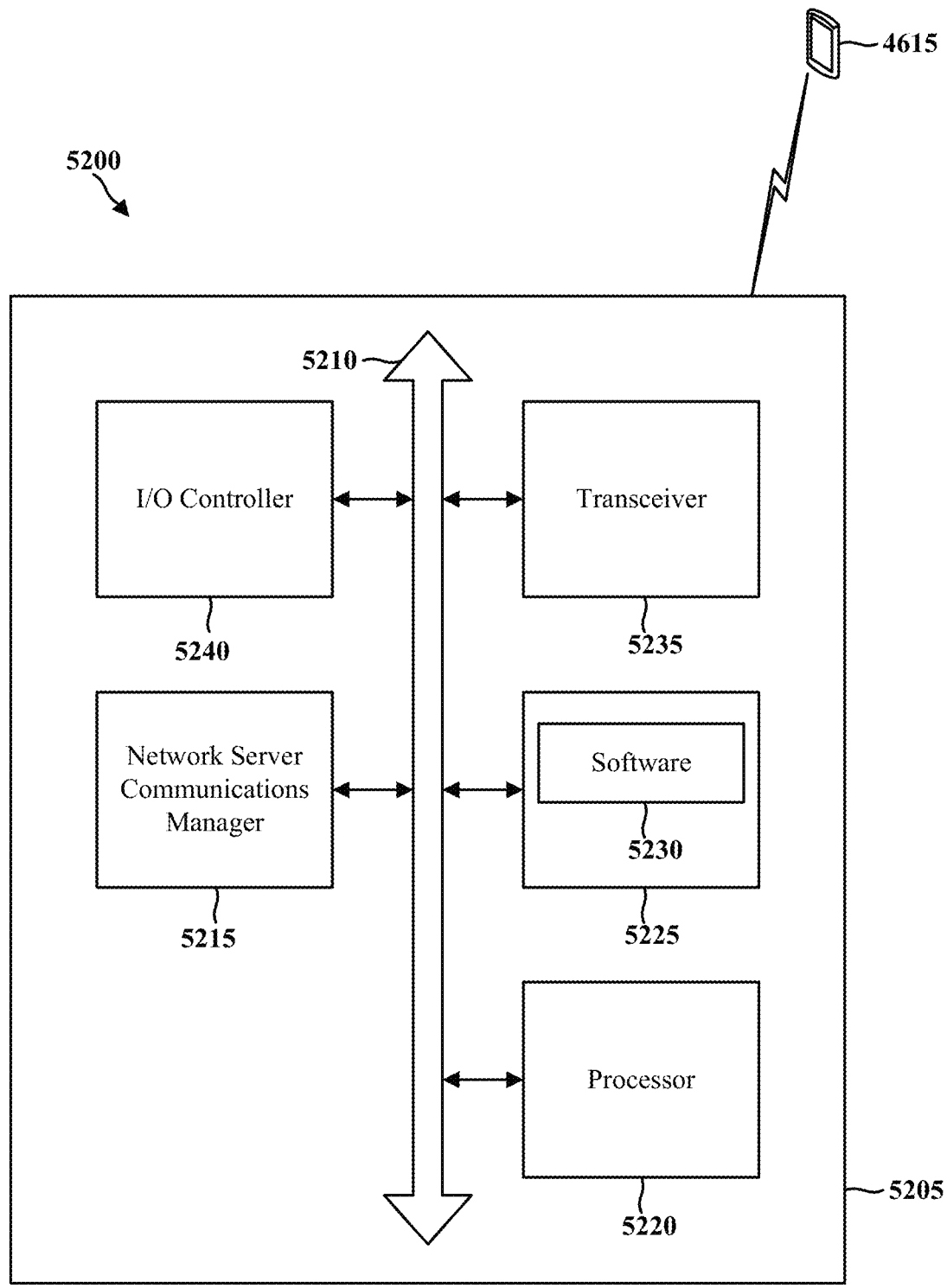
FIG. 52 illustrates a block diagram of a system including a network server that supports mmW network optimization via a network map.

FIG. 52 shows a diagram of a system 5200 including a device 5205 that supports mmW network optimization via a network map in accordance with various aspects of the present disclosure. Device 5205 may be an example of or include the components of wireless device 4905, wireless device 5005, or a network server 4601 as described above, e.g., with reference to FIGS. 46, 47, 49, and 50. Device 5205 may include components for bi-directional voice and data communications including components for transmitting and receiving communications, including network server communications manager 5215, processor 5220, memory 5225, software 5230, transceiver 5235, and I/O controller 5240. These components may be in electronic communication via one or more busses (e.g., bus 5210).

The network server communications manager 5215 may be implemented in hardware, software executed by a processor, firmware, or any combination thereof. If implemented in software executed by a processor, the functions of the network server communications manager 5215 may be executed by a general-purpose processor, a DSP, an ASIC, an FPGA or other programmable logic device, discrete gate or transistor logic, discrete hardware components, or any combination thereof designed to perform the functions described in the present disclosure. The network server communications manager 5215 may be physically located at various positions, including being distributed such that portions of functions are implemented at different physical locations by one or more physical devices. In some examples, network server communications manager 5215 may be a separate and distinct component in accordance with various aspects of the present disclosure. In other examples, network server communications manager 5215 may be combined with one or more other hardware components, including but not limited to a receiver, a transmitter, a transceiver, one or more other components described in the present disclosure, or a combination thereof in accordance with various aspects of the present disclosure.

Processor 5220 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 5220 may be configured to operate a memory array using a memory controller. In other cases, a memory controller may be integrated into processor 5220. Processor 5220 may be configured to execute computer-readable instructions stored in a memory to perform various functions (e.g., functions or tasks supporting millimeter-wave network optimization via a network map).

Memory 5225 may include random access memory (RAM) and read only memory (ROM). The memory 5225 may store computer-readable, computer-executable software 5230 including instructions that, when executed, cause the processor to perform various functions described herein. In some cases, the memory 5225 may contain, among other things, a basic input/output system (BIOS) which may control basic hardware and/or software operation such as the interaction with peripheral components or devices.

Software 5230 may include code to implement aspects of the present disclosure, including code to support millimeter-wave network optimization via a network map. Software 5230 may be stored in a non-transitory computer-readable medium such as system memory or other memory. In some cases, the software 5230 may not be directly executable by the processor but may cause a computer (e.g., when compiled and executed) to perform functions described herein.

Transceiver 5235 may communicate bi-directionally, via one or more antennas, wired, or wireless links as described above. For example, the transceiver 5235 may represent a wireless transceiver and may communicate bi-directionally with another wireless transceiver. The transceiver 5235 may also include a modem to modulate the packets and provide the modulated packets to the antennas for transmission, and to demodulate packets received from the antennas.

I/O controller 5240 may manage input and output signals for device 5205. I/O controller 5240 may also manage peripherals not integrated into device 5205. In some cases, I/O controller 5240 may represent a physical connection or port to an external peripheral. In some cases, I/O controller 5240 may utilize an operating system such as iOS®, ANDROID®, MS-DOS®, MS-WINDOWS®, OS/2®, UNIX®, LINUX®, or another known operating system.

Figure 53:
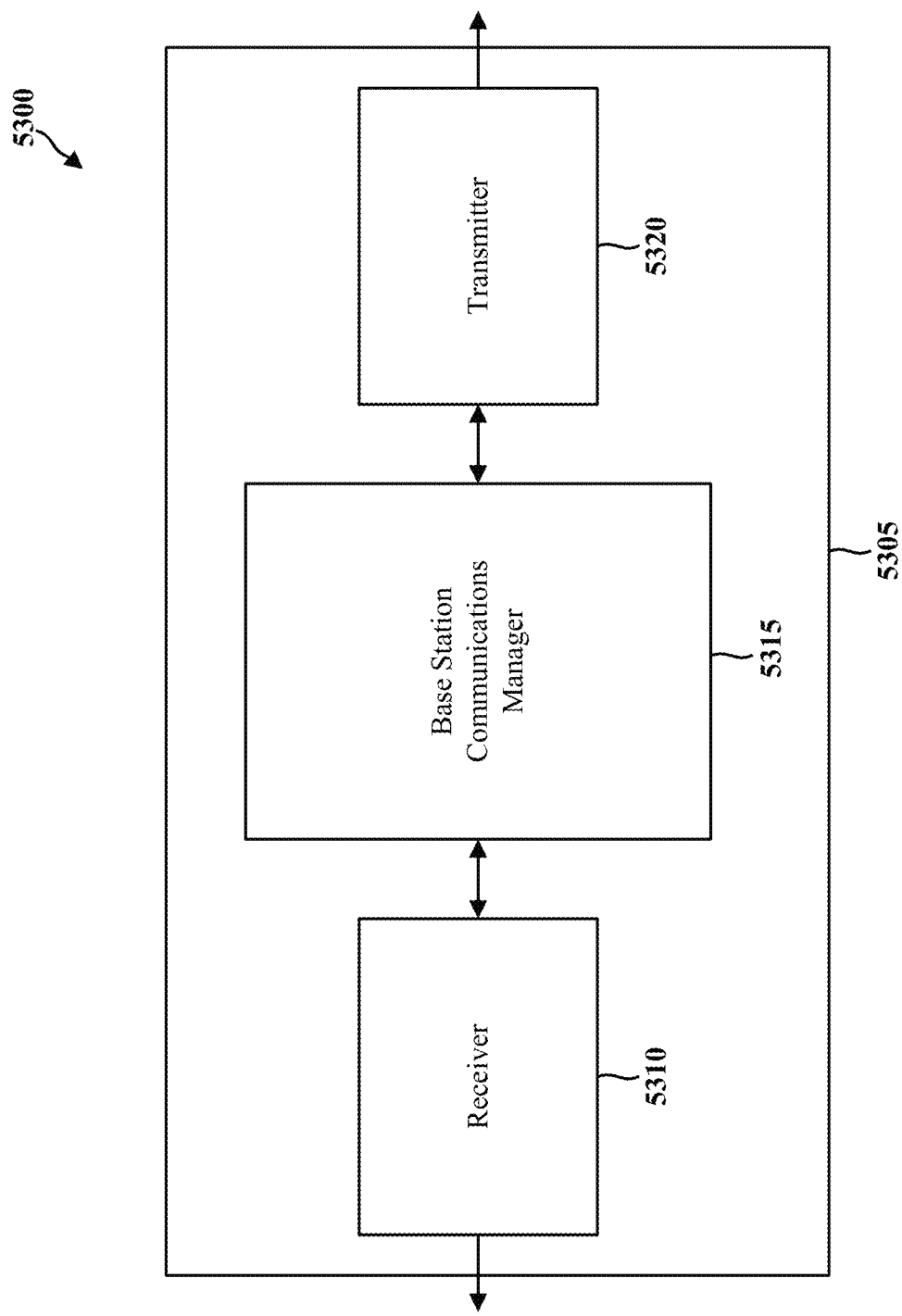
FIGS. 53 through 55 show block diagrams of a device that supports mmW network optimization via a network map.

FIG. 53 shows a block diagram 5300 of a wireless device 5305 that supports millimeter-wave network optimization via a network map in accordance with various aspects of the present disclosure. Wireless device 5305 may be an example of aspects of a base station 4605 as described with reference to FIG. 46. Wireless device 5305 may include receiver 5310, base station communications manager 5315, and transmitter 5320. Wireless device 5305 may also include a processor. Each of these components may be in communication with one another (e.g., via one or more buses).

Receiver 5310 may receive information such as packets, user data, or control information associated with various information channels (e.g., control channels, data channels, and information related to millimeter-wave network optimization via a network map, etc.). Information may be passed on to other components of the device. The receiver 5310 may be an example of aspects of the transceiver 5635 described with reference to FIG. 56.

Base station communications manager 5315 may be an example of aspects of the base station communications manager 5615 described with reference to FIG. 56.

Base station communications manager 5315 may establish a connection with a network server, receive, at a base station, a beamforming parameter from the network server, the beamforming parameter based on a network map and position information associated with a UE, determine, by the base station, a beam configuration for communicating with the UE based on the beamforming parameter, and communicate with the UE based on the beam configuration.

The base station communications manager 5315 may be implemented in hardware, software executed by a processor, firmware, or any combination thereof. If implemented in software executed by a processor, the functions of the base station communications manager 5315 may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 5315 may be physically located at various positions, including being distributed such that portions of functions are implemented at different physical locations by one or more physical devices. In some examples, base station communications manager 5315 may be a separate and distinct component in accordance with various aspects of the present disclosure. In other examples, base station communications manager 5315 may be combined with one or more other hardware components, including but not limited to a receiver, a transmitter, a transceiver, one or more other components described in the present disclosure, or a combination thereof in accordance with various aspects of the present disclosure.

Transmitter 5320 may transmit signals generated by other components of the device. In some examples, the transmitter 5320 may be collocated with a receiver 5310 in a transceiver module. For example, the transmitter 5320 may be an example of aspects of the transceiver 5635 described with reference to FIG. 56. The transmitter 5320 may include a single antenna, or it may include a set of antennas.

Figure 54:
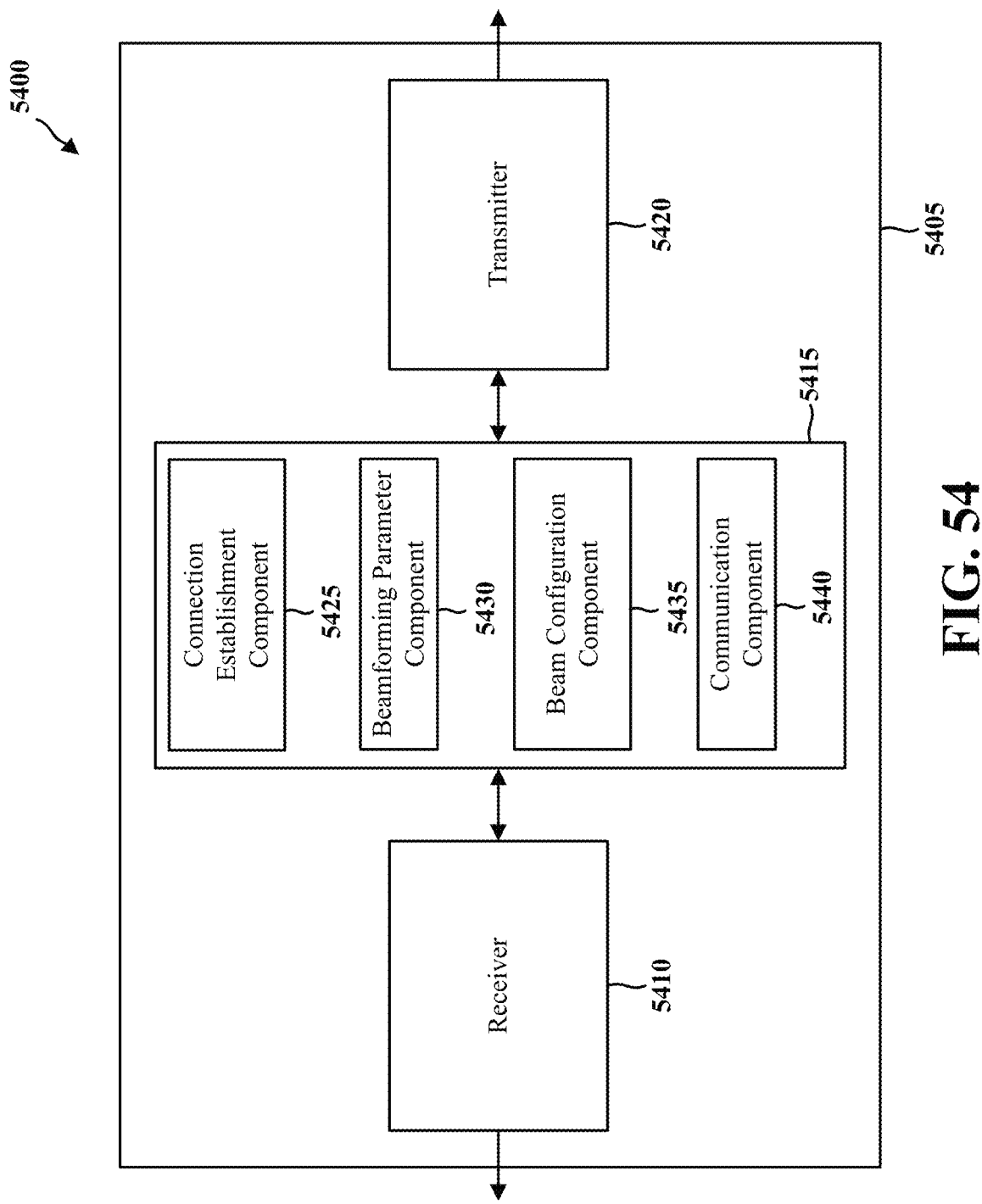

FIG. 54 shows a block diagram 5400 of a wireless device 5405 that supports mmW network optimization via a network map in accordance with various aspects of the present disclosure. Wireless device 5405 may be an example of aspects of a wireless device 5305 or a base station 4605 as described with reference to FIGS. 46 and 53. Wireless device 5405 may include receiver 5410, base station communications manager 5415, and transmitter 5420. Wireless device 5405 may also include a processor. Each of these components may be in communication with one another (e.g., via one or more buses).

Receiver 5410 may receive information such as packets, user data, or control information associated with various information channels (e.g., control channels, data channels, and information related to millimeter-wave network optimization via a network map, etc.). Information may be passed on to other components of the device. The receiver 5410 may be an example of aspects of the transceiver 5635 described with reference to FIG. 56.

Base station communications manager 5415 may be an example of aspects of the base station communications manager 5615 described with reference to FIG. 56.

Base station communications manager 5415 may also include connection establishment component 5425, beamforming parameter component 5430, beam configuration component 5435, and communication component 5440.

Connection establishment component 5425 may establish a connection with a network server.

Beamforming parameter component 5430 may receive, at a base station, a beamforming parameter from the network server, the beamforming parameter based on a network map and position information associated with a UE.

Beam configuration component 5435 may determine, by the base station, a beam configuration for communicating with the UE based on the beamforming parameter and determine the beam configuration based on the indication. In some cases, the beam configuration includes beam scanning information.

Communication component 5440 may communicate with the UE based on the beam configuration.

Transmitter 5420 may transmit signals generated by other components of the device. In some examples, the transmitter 5420 may be collocated with a receiver 5410 in a transceiver module. For example, the transmitter 5420 may be an example of aspects of the transceiver 5635 described with reference to FIG. 56. The transmitter 5420 may include a single antenna, or it may include a set of antennas.

Figure 55:
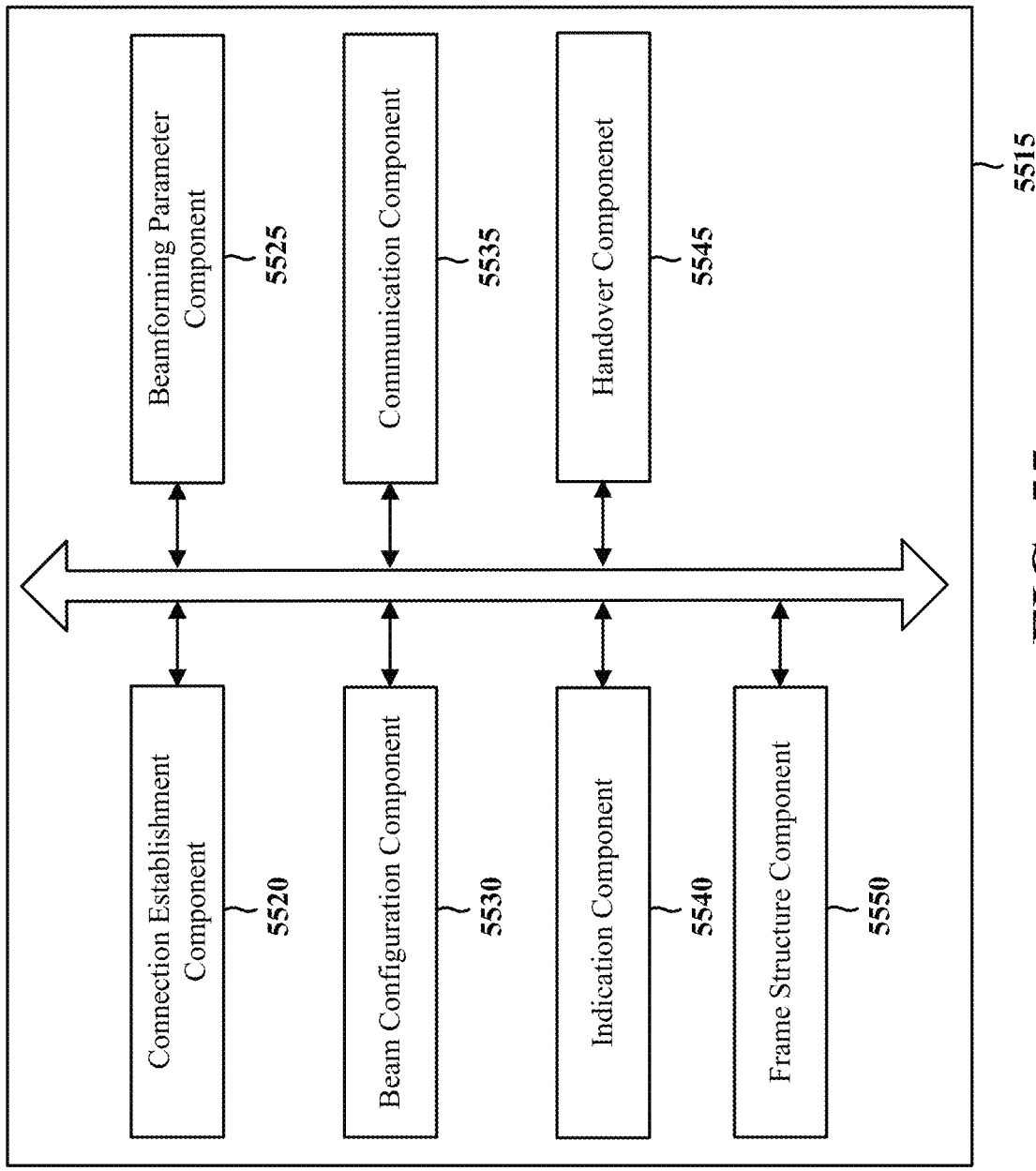

FIG. 55 shows a block diagram 5500 of a base station communications manager 5515 that supports millimeter-wave network optimization via a network map in accordance with various aspects of the present disclosure. The base station communications manager 5515 may be an example of aspects of a base station communications manager 5315, 5415, and/or 5615 described with reference to FIGS. 53, 54, and 56. The base station communications manager 5515 may include connection establishment component 5520, beamforming parameter component 5525, beam configuration component 5530, communication component 5535, indication component 5540, handover component 5545, and frame structure component 5550. Each of these modules may communicate, directly or indirectly, with one another (e.g., via one or more buses).

Connection establishment component 5520 may establish a connection with a network server.

Beamforming parameter component 5525 may receive, at a base station, a beamforming parameter from the network server, the beamforming parameter based on a network map and position information associated with a UE.

Beam configuration component 5530 may determine, by the base station, a beam configuration for communicating with the UE based on the beamforming parameter and determine the beam configuration is based on the indication. In some cases, the beam configuration includes beam scanning information.

Communication component 5535 may communicate with the UE based on the beam configuration.

Indication component 5540 may identify an indication that the UE will enter a cell associated with the base station at a future time and receive the indication from the network server.

Handover component 5545 may perform handover of the UE from a second base station to the base station based on the indication and the beam configuration and receive handover information from the network server, the handover information associated with a second base station. In some cases, the handover is performed after or at the future time.

Frame structure component 5550 may identify a frame structure associated with the UE, where transmitting the beam configuration is based on the frame structure.

Figure 56:
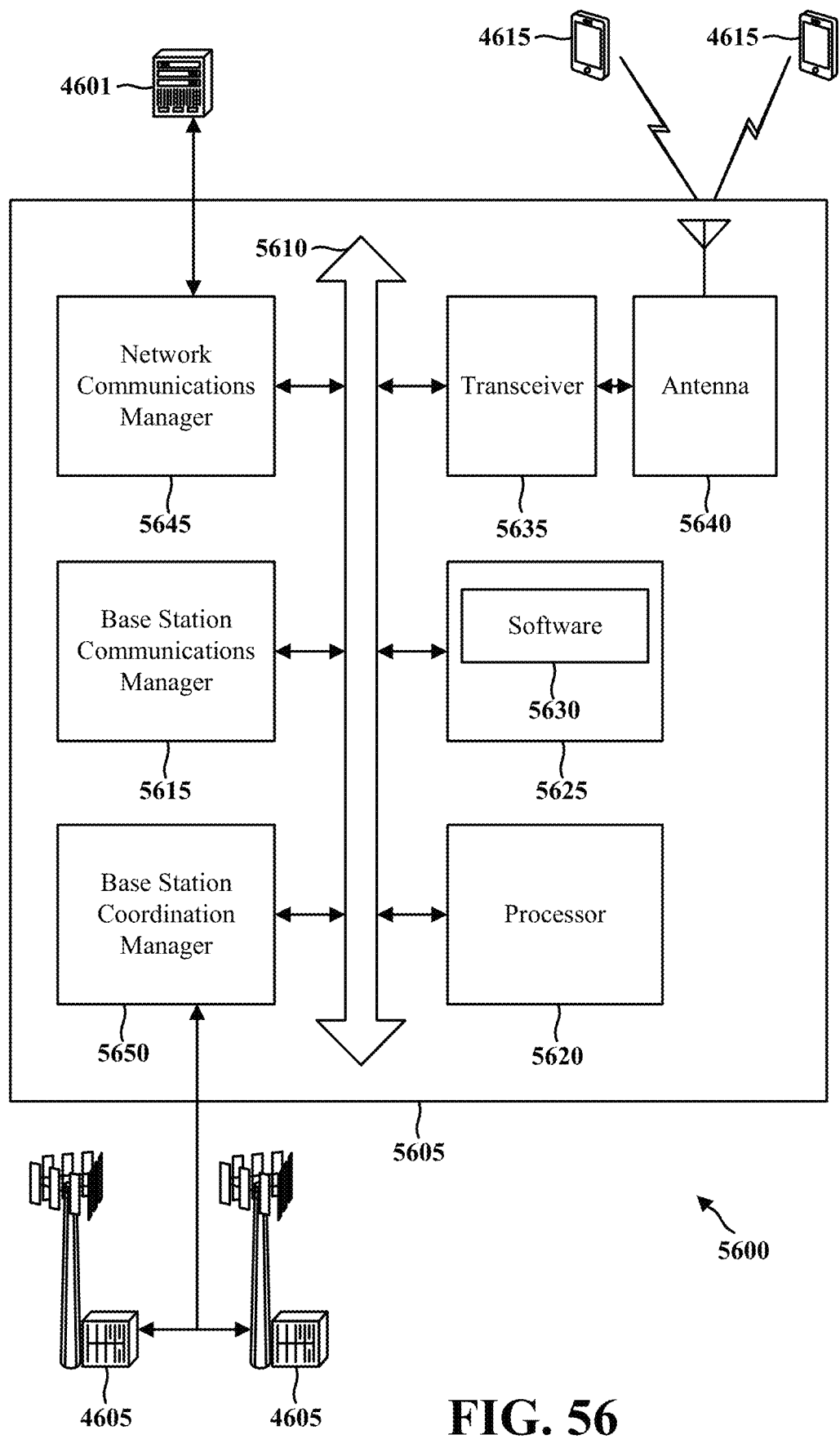
FIG. 56 illustrates a block diagram of a system including a base station that supports millimeter-wave network optimization via a network map.

FIG. 56 shows a diagram of a system 5600 including a device 5605 that supports millimeter-wave network optimization via a network map in accordance with various aspects of the present disclosure. Device 5605 may be an example of or include the components of base station 4605 as described above, e.g., with reference to FIG. 46. Device 5605 may include components for bi-directional voice and data communications including components for transmitting and receiving communications, including base station communications manager 5615, processor 5620, memory 5625, software 5630, transceiver 5635, antenna 5640, network communications manager 5645, and base station coordination manager 5650. These components may be in electronic communication via one or more busses (e.g., bus 5610). Device 5605 may communicate wirelessly with one or more UEs 4615.

Base station communications manager 5615 may manage communications with other base station 4605, and may include a controller or scheduler for controlling communications with UEs 4615 in cooperation with other base stations 4605. For example, the base station communications manager 5615 may coordinate scheduling for transmissions to UEs 4615 for various interference mitigation techniques such as beamforming or joint transmission. In some examples, base station communications manager 5615 may provide an X2 interface within an LTE/LTE-A wireless communication network technology to provide communication between base stations 4605.

The base station communications manager 5615 may be implemented in hardware, software executed by a processor, firmware, or any combination thereof. If implemented in software executed by a processor, the functions of the base station communications manager 5615 may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 5615 may be physically located at various positions, including being distributed such that portions of functions are implemented at different physical locations by one or more physical devices. In some examples, base station communications manager 5615 may be a separate and distinct component in accordance with various aspects of the present disclosure. In other examples, base station communications manager 5615 may be combined with one or more other hardware components, including but not limited to a receiver, a transmitter, a transceiver, one or more other components described in the present disclosure, or a combination thereof in accordance with various aspects of the present disclosure.

Processor 5620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 5620 may be configured to operate a memory array using a memory controller. In other cases, a memory controller may be integrated into processor 5620. Processor 5620 may be configured to execute computer-readable instructions stored in a memory to perform various functions (e.g., functions or tasks supporting millimeter-wave network optimization via a network map).

Memory 5625 may include RAM and ROM. The memory 5625 may store computer-readable, computer-executable software 5630 including instructions that, when executed, cause the processor to perform various functions described herein. In some cases, the memory 5625 may contain, among other things, a BIOS which may control basic hardware and/or software operation such as the interaction with peripheral components or devices.

Software 5630 may include code to implement aspects of the present disclosure, including code to support millimeter-wave network optimization via a network map. Software 5630 may be stored in a non-transitory computer-readable medium such as system memory or other memory. In some cases, the software 5630 may not be directly executable by the processor but may cause a computer (e.g., when compiled and executed) to perform functions described herein.

Transceiver 5635 may communicate bi-directionally, via one or more antennas, wired, or wireless links as described above. For example, the transceiver 5635 may represent a wireless transceiver and may communicate bi-directionally with another wireless transceiver. The transceiver 5635 may also include a modem to modulate the packets and provide the modulated packets to the antennas for transmission, and to demodulate packets received from the antennas.

In some cases, the wireless device may include a single antenna 5640. However, in some cases the device may have more than one antenna 5640, which may be capable of concurrently transmitting or receiving multiple wireless transmissions.

Network communications manager 5645 may manage communications with the core network (e.g., via one or more wired backhaul links). For example, the network communications manager 5645 may manage the transfer of data communications for client devices, such as one or more UEs 4615.

The network communications manager 5645 may be implemented in hardware, software executed by a processor, firmware, or any combination thereof. If implemented in software executed by a processor, the functions of the network communications manager 5645 may be executed by a general-purpose processor, a DSP, an ASIC, an FPGA or other programmable logic device, discrete gate or transistor logic, discrete hardware components, or any combination thereof designed to perform the functions described in the present disclosure. The network communications manager 5645 may be physically located at various positions, including being distributed such that portions of functions are implemented at different physical locations by one or more physical devices. In some examples, network communications manager 5645 may be a separate and distinct component in accordance with various aspects of the present disclosure. In other examples, network communications manager 5645 may be combined with one or more other hardware components, including but not limited to a receiver, a transmitter, a transceiver, one or more other components described in the present disclosure, or a combination thereof in accordance with various aspects of the present disclosure.

Base station coordination manager 5650 may manage communications with other base station 4605, and may include a controller or scheduler for controlling communications with UEs 4615 in cooperation with other base stations 4605. For example, the base station coordination manager 5650 may coordinate scheduling for transmissions to UEs 4615 for various interference mitigation techniques such as beamforming or joint transmission. In some examples, base station coordination manager 5650 may provide an X2 interface within an LTE/LTE-A wireless communication network technology to provide communication between base stations 4605.

The base station coordination manager 5650 may be implemented in hardware, software executed by a processor, firmware, or any combination thereof. If implemented in software executed by a processor, the functions of the base station coordination manager 5650 may be executed by a general-purpose processor, a DSP, an ASIC, an FPGA or other programmable logic device, discrete gate or transistor logic, discrete hardware components, or any combination thereof designed to perform the functions described in the present disclosure. The base station coordination manager 5650 may be physically located at various positions, including being distributed such that portions of functions are implemented at different physical locations by one or more physical devices. In some examples, base station coordination manager 5650 may be a separate and distinct component in accordance with various aspects of the present disclosure. In other examples, base station coordination manager 5650 may be combined with one or more other hardware components, including but not limited to a receiver, a transmitter, a transceiver, one or more other components described in the present disclosure, or a combination thereof in accordance with various aspects of the present disclosure.

Figure 57:
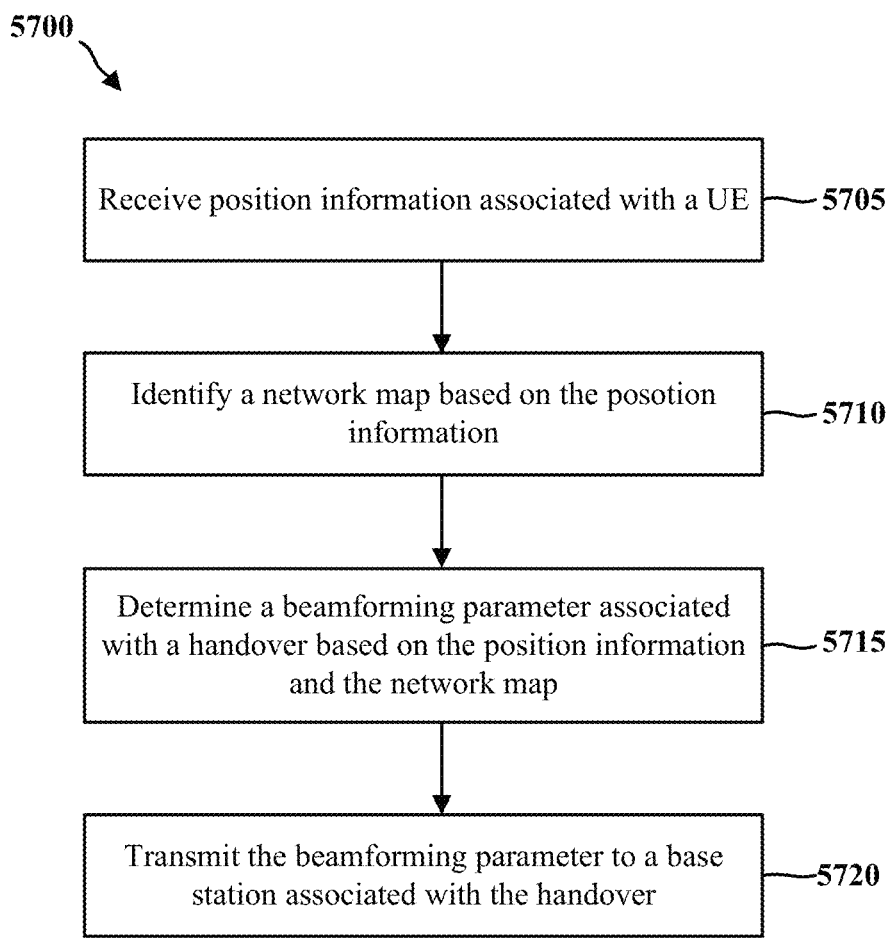
FIGS. 57 through 60 illustrate methods for mmW network optimization via a network map.

FIG. 57 shows a flowchart illustrating a method 5700 for millimeter-wave network optimization via a network map in accordance with various aspects of the present disclosure. The operations of method 5700 may be implemented by a network server 4601 or components of a network server as described herein. For example, the operations of method 5700 may be performed by a network server communications manager as described with reference to FIGS. 49 through 52. In some examples, a network server 4601 may execute a set of codes to control the functional elements of the device to perform the functions described below. Additionally or alternatively, the network server 4601 may perform aspects the functions described below using special-purpose hardware.

At block 5705 the network server 4601 may receive position information associated with a UE. The operations of block 5705 may be performed according to the methods described with reference to FIGS. 46 through 48. In certain examples, aspects of the operations of block 5705 may be performed by a position information component as described with reference to FIGS. 49 through 52.

At block 5710 the network server 4601 may identify a network map based at least in part on the position information. The operations of block 5710 may be performed according to the methods described with reference to FIGS. 46 through 48. In certain examples, aspects of the operations of block 5710 may be performed by a network map component as described with reference to FIGS. 49 through 52.

At block 5715 the network server 4601 may determine a beamforming parameter associated with a handover based at least in part on the position information and the network map. The operations of block 5715 may be performed according to the methods described with reference to FIGS. 46 through 48. In certain examples, aspects of the operations of block 5715 may be performed by a beamforming parameter component as described with reference to FIGS. 49 through 52.

At block 5720 the network server 4601 may transmit the beamforming parameter to a base station associated with the handover. The operations of block 5720 may be performed according to the methods described with reference to FIGS. 46 through 48. In certain examples, aspects of the operations of block 5720 may be performed by a beamforming parameter transmitter as described with reference to FIGS. 49 through 52.

Figure 58:
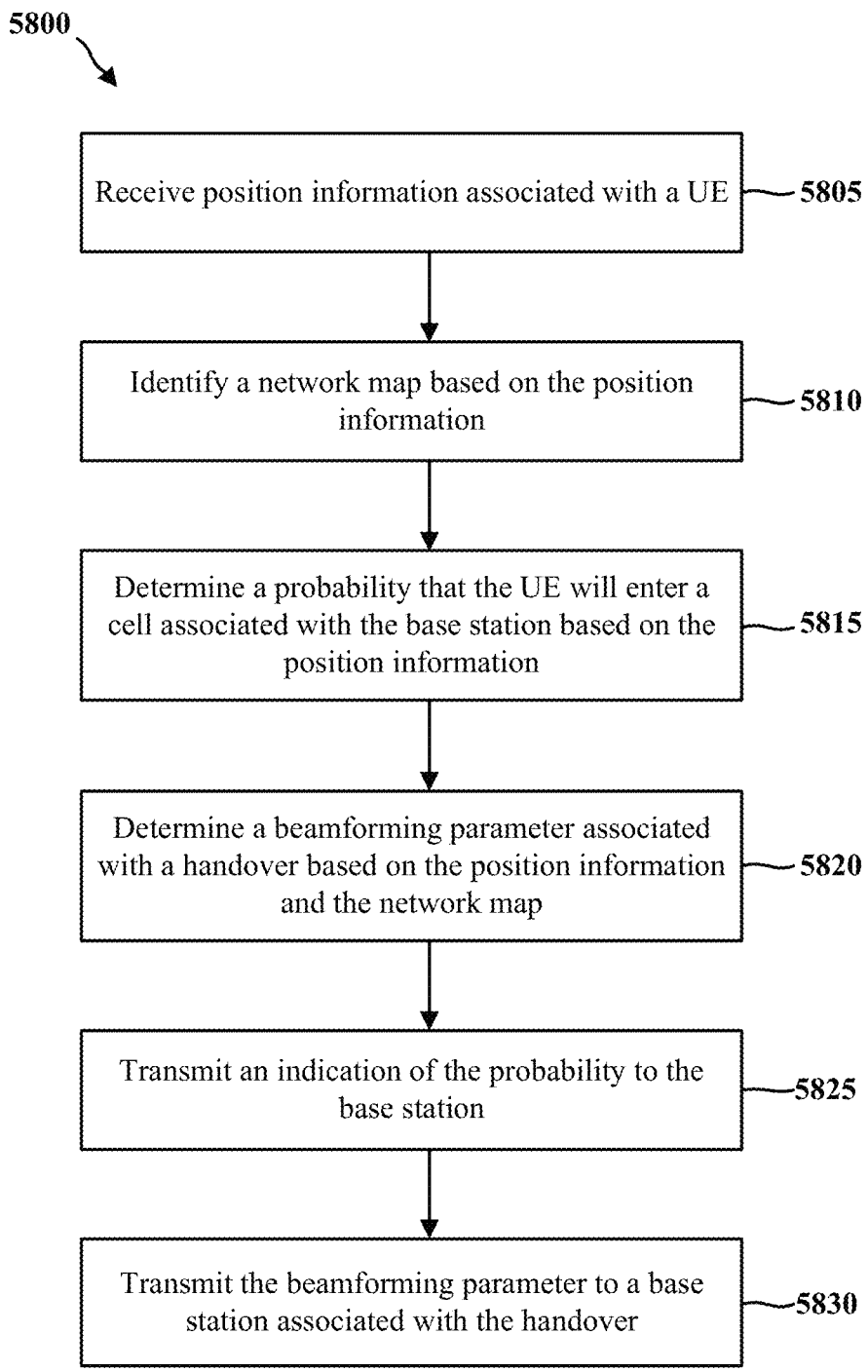

FIG. 58 shows a flowchart illustrating a method 5800 for millimeter-wave network optimization via a network map in accordance with various aspects of the present disclosure. The operations of method 5800 may be implemented by a network server 4601 or components of a network server as described herein. For example, the operations of method 5800 may be performed by a network server communications manager as described with reference to FIGS. 49 through 52. In some examples, a network server 4601 may execute a set of codes to control the functional elements of the device to perform the functions described below. Additionally or alternatively, the network server 4601 may perform aspects the functions described below using special-purpose hardware.

At block 5805 the network server 4601 may receive position information associated with a UE. The operations of block 5805 may be performed according to the methods described with reference to FIGS. 46 through 48. In certain examples, aspects of the operations of block 5805 may be performed by a position information component as described with reference to FIGS. 49 through 52.

At block 5810 the network server 4601 may identify a network map based at least in part on the position information. The operations of block 5810 may be performed according to the methods described with reference to FIGS. 46 through 48. In certain examples, aspects of the operations of block 5810 may be performed by a network map component as described with reference to FIGS. 49 through 52.

At block 5815 the network server 4601 may determine a probability that the UE will enter a cell associated with the base station based at least in part on the position information. The operations of block 5815 may be performed according to the methods described with reference to FIGS. 46 through 48. In certain examples, aspects of the operations of block 5815 may be performed by a probability component as described with reference to FIGS. 49 through 52.

At block 5820 the network server 4601 may determine a beamforming parameter associated with a handover based at least in part on the position information and the network map. The operations of block 5820 may be performed according to the methods described with reference to FIGS. 46 through 48. In certain examples, aspects of the operations of block 5820 may be performed by a beamforming parameter component as described with reference to FIGS. 49 through 52.

At block 5825 the network server 4601 may transmit an indication of the probability to the base station. The operations of block 5825 may be performed according to the methods described with reference to FIGS. 46 through 48. In certain examples, aspects of the operations of block 5825 may be performed by an indication transmitter as described with reference to FIGS. 49 through 52.

At block 5830 the network server 4601 may transmit the beamforming parameter to a base station associated with the handover. The operations of block 5830 may be performed according to the methods described with reference to FIGS. 46 through 48. In certain examples, aspects of the operations of block 5830 may be performed by a beamforming parameter transmitter as described with reference to FIGS. 49 through 52.

Figure 59:
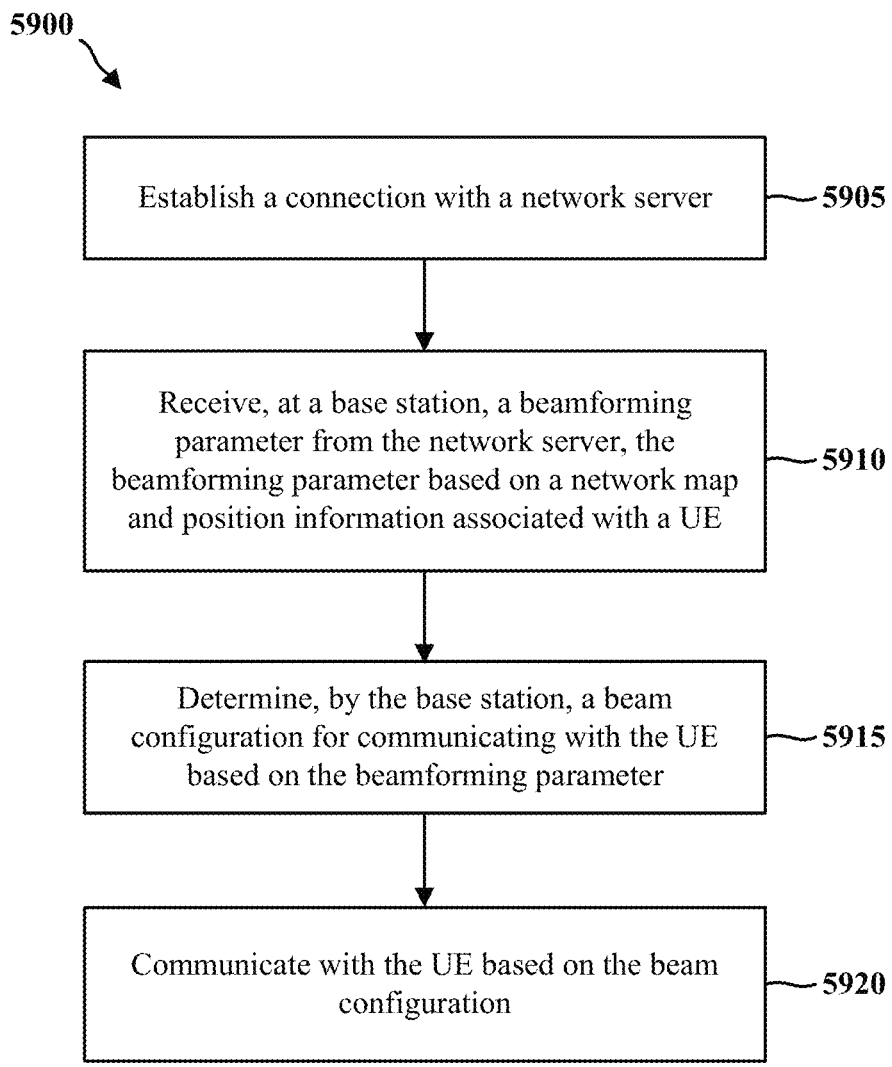

FIG. 59 shows a flowchart illustrating a method 5900 for millimeter-wave network optimization via a network map in accordance with various aspects of the present disclosure. The operations of method 5900 may be implemented by a base station 4605 or components of a base station as described herein. For example, the operations of method 5900 may be performed by a base station communications manager as described with reference to FIGS. 53 through 56. In some examples, a base station 4605 may execute a set of codes to control the functional elements of the device to perform the functions described below. Additionally or alternatively, the base station 4605 may perform aspects the functions described below using special-purpose hardware.

At block 5905 the base station 4605 may establish a connection with a network server. The operations of block 5905 may be performed according to the methods described with reference to FIGS. 46 through 48. In certain examples, aspects of the operations of block 5905 may be performed by a connection establishment component as described with reference to FIGS. 53 through 56.

At block 5910 the base station 4605 may receive, at a base station, a beamforming parameter from the network server, the beamforming parameter based at least in part on a network map and position information associated with a UE. The operations of block 5910 may be performed according to the methods described with reference to FIGS. 46 through 48. In certain examples, aspects of the operations of block 5910 may be performed by a beamforming parameter component as described with reference to FIGS. 53 through 56.

At block 5915 the base station 4605 may determine, by the base station, a beam configuration for communicating with the UE based at least in part on the beamforming parameter. The operations of block 5915 may be performed according to the methods described with reference to FIGS. 46 through 48. In certain examples, aspects of the operations of block 5915 may be performed by a beam configuration component as described with reference to FIGS. 53 through 56.

At block 5920 the base station 4605 may communicate with the UE based at least in part on the beam configuration. The operations of block 5920 may be performed according to the methods described with reference to FIGS. 46 through 48. In certain examples, aspects of the operations of block 5920 may be performed by a communication component as described with reference to FIGS. 53 through 56.

Figure 60:
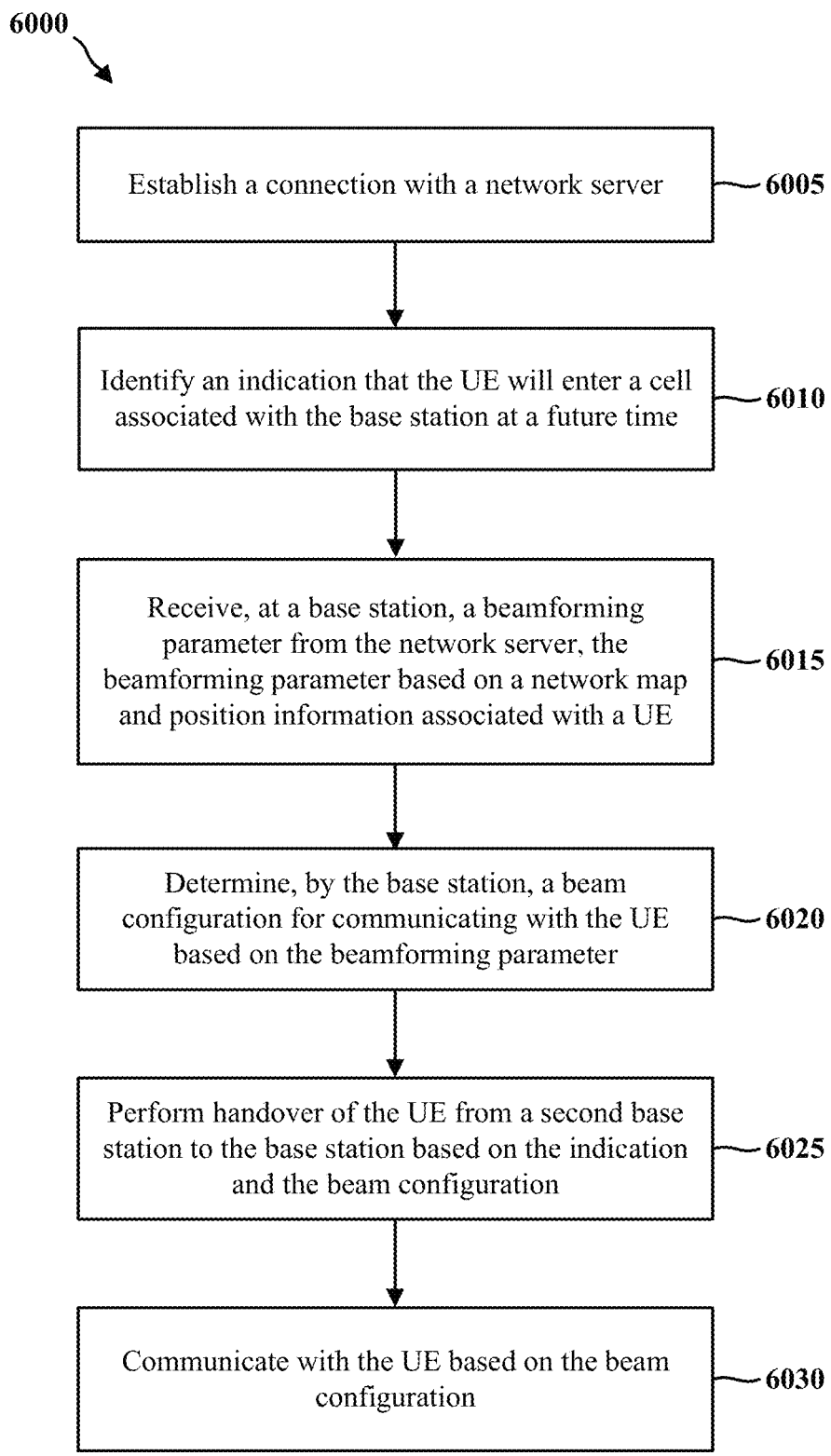

FIG. 60 shows a flowchart illustrating a method 6000 for millimeter-wave network optimization via a network map in accordance with various aspects of the present disclosure. The operations of method 6000 may be implemented by a base station 4605 or components of a base station as described herein. For example, the operations of method 6000 may be performed by a base station communications manager as described with reference to FIGS. 53 through 56. In some examples, a base station 4605 may execute a set of codes to control the functional elements of the device to perform the functions described below. Additionally or alternatively, the base station 4605 may perform aspects the functions described below using special-purpose hardware.

At block 6005 the base station 4605 may establish a connection with a network server. The operations of block 6005 may be performed according to the methods described with reference to FIGS. 46 through 48. In certain examples, aspects of the operations of block 6005 may be performed by a connection establishment component as described with reference to FIGS. 53 through 56.

At block 6010 the base station 4605 may identify an indication that the UE will enter a cell associated with the base station at a future time. The operations of block 6010 may be performed according to the methods described with reference to FIGS. 46 through 48. In certain examples, aspects of the operations of block 6010 may be performed by an indication component as described with reference to FIGS. 53 through 56.

At block 6015 the base station 4605 may receive, at a base station, a beamforming parameter from the network server, the beamforming parameter based at least in part on a network map and position information associated with a UE. The operations of block 6015 may be performed according to the methods described with reference to FIGS. 46 through 48. In certain examples, aspects of the operations of block 6015 may be performed by a beamforming parameter component as described with reference to FIGS. 53 through 56.

At block 6020 the base station 4605 may determine, by the base station 4605, a beam configuration for communicating with the UE based at least in part on the beamforming parameter. The operations of block 6020 may be performed according to the methods described with reference to FIGS. 46 through 48. In certain examples, aspects of the operations of block 6020 may be performed by a beam configuration component as described with reference to FIGS. 53 through 56.

At block 6025 the base station 4605 may perform handover of the UE from a second base station to the base station based at least in part on the indication and the beam configuration. The operations of block 6025 may be performed according to the methods described with reference to FIGS. 46 through 48. In certain examples, aspects of the operations of block 6025 may be performed by a handover component as described with reference to FIGS. 53 through 56.

At block 6030 the base station 4605 may communicate with the UE based at least in part on the beam configuration. The operations of block 6030 may be performed according to the methods described with reference to FIGS. 46 through 48. In certain examples, aspects of the operations of block 6030 may be performed by a communication component as described with reference to FIGS. 53 through 56.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communication by a network server, comprising:
    receiving, at a network server, position information associated with a user equipment (UE) in a first coverage area of a first base station;
    identifying a service type associated with the UE based at least in part on the position information;
    creating, by the network server, a network map, the network map comprising a location of the UE, the first base station, and a second base station within a second coverage area;
    identifying a beamforming configuration including one of a specific beamforming orientation or pattern corresponding to a projected location of the UE within the second coverage area and for communication between the second base station and the UE based at least in part on the service type, which is based at least in part on the position information, and the network map created by the network server; and
    transmitting the beamforming configuration including the one of the specific beamforming orientation or pattern to the second base station for a handover of the UE from the first base station.

2. The method of claim 1, wherein:
    the position information comprises global positioning service (GPS) information, gyroscope information, accelerometer information, UE subarray geometry information, or beam information from any of the UE subarrays, or a combination thereof.

3. The method of claim 1, further comprising:
    identifying that the service type associated with the UE is different from a previous service type associated with the UE.

4. The method of claim 1, wherein:
    the service type comprises a quality of service (QoS) class identifier.

5. The method of claim 4, wherein:
    the service type comprises a voice communications service type, a video service type, a high-definition video service type, a real-time gaming service type, a mission critical communications service type, an Internet protocol multimedia subsystem (IMS) communications service type, or a combination thereof.

6. The method of claim 1, wherein:
    the beamforming configuration comprises a beam direction, a beam type, a subframe configuration, or a combination thereof.

7. The method of claim 1, further comprising:
    receiving the position information comprises receiving position information for a second UE from the second base station.

8. The method of claim 7, wherein:
    the network map comprises a relative location of the second UE and the second base station.

9. The method of claim 1, wherein:
    the network server comprises a part of a core network.

10. A method for wireless communication by a first base station, comprising:
    receiving, from a network server, a beamforming configuration including one of a specific beamforming orientation or pattern corresponding to a projected location of a user equipment (UE) within a first coverage area of the first base station based at least in part on position information of the UE in a second coverage area of a second base station; and
    transmitting data to the UE based at least in part on the beamforming configuration,
    wherein the beamforming configuration is based at least in part on a network map of the network server, a service type of the data, which is based at least in part on the position information, and the position information; and
    wherein the beamforming configuration including the one of the specific beamforming orientation or pattern is received from the network server during handover of the UE from the second base station to the first base station.

11. The method of claim 10, further comprising:
    transmitting a beam reference signal (BRS); and
    communicating with the UE based at least in part on transmitting the BRS, wherein
    transmitting the data to the UE is based at least in part on the communication.

12. The method of claim 10, wherein:
    the beamforming configuration comprises a beam direction, a beam type, or a subframe type, or a combination thereof.

13. The method of claim 12, wherein:
    the beamforming configuration comprises one or more beam directions.

14. The method of claim 12, wherein:
    the beamforming configuration is based at least in part on a location of a second UE, the second base station, or a combination thereof.

15. A method for wireless communication by a user equipment (UE), comprising:
    identifying, at a UE, position information of the UE in a first coverage area;
    transmitting the position information to a first base station for transmission to a network server; and receiving data from a second base station in a second coverage area based at least in part on a beamforming configuration including one of a specific beamforming orientation or pattern received at the second base station from the network server and corresponding to a projected location of the UE within the second coverage area, wherein the beamforming configuration is based at least in part on a network map of a network server, a service type of the data, which is based at least in part on the position information, and the position information; and wherein the UE is handed over from the first base station to the second base station.

16. The method of claim 15, further comprising:
scanning for a beam reference signal (BRS);
detecting the BRS on one or more beams; and
communicating with the first base station based at least in part on detecting the BRS, wherein receiving the data from the second base station is based at least in part on the communications.

17. The method of claim 16, further comprising:
transmitting metrics to the first base station, wherein transmitting the position information is based at least in part on detecting the BRS.

18. The method of claim 17, wherein:
the metrics comprise a channel quality indicator, a signal strength indicator, or a beam identifier, or a combination thereof.

19. The method of claim 15, wherein:
the position information comprises global positioning service (GPS) information, gyroscope information, accelerometer information, UE subarray geometry information, or beam information from any of the UE subarrays, or any combination thereof.

20. The method of claim 15, wherein:
the service type comprises a quality of service (QoS) class identifier.

21. The method of claim 20, wherein:
the service type comprises a voice communications service type, a video service type, a high-definition video service type, a real time gaming service type, a mission critical communications service type, or an Internet protocol multimedia subsystem (IMS) communications service type.

22. The method of claim 15, wherein:
the beamforming configuration comprises a beam direction, a beam type, or a subframe configuration, or a combination thereof.

23. The method of claim 22, wherein:
the beamforming configuration comprises one or more beam directions.

24. The method of claim 22, wherein:
the beam direction is based at least in part on a location of a second UE.

25. The method of claim 15, wherein:
the data from the second base station is received using a plurality of antennas of the UE.

26. A method for wireless communications by a network server, comprising:
receiving, at the network server, position information associated with a user equipment (UE) including relative location information for a plurality of cells and the UE;
creating, by the network server, a network map including the relative location information based at least in part on the position information;
determining a beamforming parameter including one of a specific beamforming orientation or pattern corresponding to a projected location of the UE associated with a handover from a first base station to a second base station based at least in part on the position information and the network map; and
transmitting the beamforming parameter including the one of the specific beamforming orientation or pattern from the network server to the second base station.

27. The method of claim 26, further comprising:
identifying the second base station from a plurality of base stations based at least in part on the position information and the network map, wherein determining the beamforming parameter is based at least in part on identifying the second base station.

28. The method of claim 26, further comprising:
determining a probability that the UE will enter a cell associated with the second base station based at least in part on the position information; and
transmitting an indication of the probability to the second base station.

29. The method of claim 28, wherein the determining the probability that the UE will enter the cell associated with the second base station comprises identifying a trajectory of the UE based at least in part on the position information.

30. The method of claim 26, further comprising:
receiving the position information comprises receiving position information periodically.

* * * * *